(12) United States Patent
Oguchi et al.

(10) Patent No.: US 9,726,560 B2
(45) Date of Patent: Aug. 8, 2017

(54) OPTICAL SENSOR, METHOD FOR MANUFACTURING OPTICAL SENSOR, OPTICAL ENCODER, TORQUE DETECTION APPARATUS, AND ELECTRIC POWER STEERING APPARATUS

(71) Applicants: Toshiaki Oguchi, Kanagawa (JP); Kunihiko Sasao, Kanagawa (JP); Sumio Sugita, Kanagawa (JP)

(72) Inventors: Toshiaki Oguchi, Kanagawa (JP); Kunihiko Sasao, Kanagawa (JP); Sumio Sugita, Kanagawa (JP)

(73) Assignee: NSK LTD., Tokyo (JP)

( * ) Notice: Subject to any disclaimer, the term of this patent is extended or adjusted under 35 U.S.C. 154(b) by 334 days.

(21) Appl. No.: 14/355,106

(22) PCT Filed: Oct. 31, 2012

(86) PCT No.: PCT/JP2012/078172
§ 371 (c)(1),
(2) Date: Apr. 29, 2014

(87) PCT Pub. No.: WO2013/065739
PCT Pub. Date: May 10, 2013

(65) Prior Publication Data
US 2014/0311258 A1    Oct. 23, 2014

(30) Foreign Application Priority Data

Oct. 31, 2011 (JP) .................................. 2011-239795
Oct. 31, 2011 (JP) .................................. 2011-239797
(Continued)

(51) Int. Cl.
*G01L 3/12* (2006.01)
*G01D 5/347* (2006.01)
(Continued)

(52) U.S. Cl.
CPC .............. *G01L 3/12* (2013.01); *B62D 5/0481* (2013.01); *G01D 5/345* (2013.01); *G01D 5/3473* (2013.01);
(Continued)

(58) Field of Classification Search
CPC ........... G01L 3/08; G01L 3/12; B62D 5/0481; G01D 5/345; G01D 5/34707; G01D 5/34715; G01D 5/3473
(Continued)

(56) References Cited

U.S. PATENT DOCUMENTS 5,721,447 A    2/1998  Oosawa et al.
6,049,080 A    4/2000  Ito
(Continued)

FOREIGN PATENT DOCUMENTS

CN    1138752 A    12/1996
CN    1181500 A    5/1998
(Continued)

OTHER PUBLICATIONS

Communication dated Mar. 15, 2016 from the Japanese Patent Office in counterpart application No. 2015-137344.
(Continued)

*Primary Examiner* — Renee Chavez
(74) *Attorney, Agent, or Firm* — Sughrue Mion, PLLC

(57) ABSTRACT

An optical sensor, an optical encoder, a torque detection apparatus, and an electric power steering apparatus less affected by fluctuations in the amount of detected light and with an improved resolution are provided. The optical sensor includes a first polarizing layer that splits incident light to light with a first polarization direction, a first photoreceiver that receives first polarized light split by the first polarizing layer, a second polarizing layer that splits the incident light to light with a second polarization direction, and a second
(Continued)

photoreceiver that receives second polarized light split by the second polarizing layer. The first photoreceiver and the second photoreceiver are positioned alternatingly and spaced uniformly with each other.

14 Claims, 92 Drawing Sheets

(30) Foreign Application Priority Data

Oct. 31, 2011 (JP) ................................. 2011-239800
Aug. 30, 2012 (JP) ................................. 2012-190487

(51) Int. Cl.
*G01D 5/34* (2006.01)
*G01L 3/08* (2006.01)
*B62D 5/04* (2006.01)

(52) U.S. Cl.
CPC ..... *G01D 5/34707* (2013.01); *G01D 5/34715* (2013.01); *G01L 3/08* (2013.01)

(58) Field of Classification Search
USPC .................................................... 250/231.13
See application file for complete search history.

(56) References Cited

U.S. PATENT DOCUMENTS

| | | | |
|---|---|---|---|
| 6,587,211 | B1 | 7/2003 | Gelbart |
| 2002/0195551 | A1 | 12/2002 | Baxter et al. |
| 2003/0145663 | A1 | 8/2003 | Heisenberg et al. |
| 2003/0155489 | A1 | 8/2003 | Yasuda et al. |
| 2006/0126066 | A1* | 6/2006 | Kawakami ........... G02B 27/288 356/364 |
| 2014/0306099 | A1* | 10/2014 | Oguchi ................ G01D 5/3473 250/225 |
| 2014/0360804 | A1* | 12/2014 | Oguchi ................ G01D 5/3473 180/446 |

FOREIGN PATENT DOCUMENTS

| | | |
|---|---|---|
| CN | 1727859 A | 2/2006 |
| DE | 102009022712 A1 | 12/2010 |
| EP | 1560044 A1 | 8/2005 |
| JP | 58-042003 A | 3/1983 |
| JP | 1207640 A | 8/1989 |
| JP | 4313278 A | 11/1992 |
| JP | 6163977 A | 6/1994 |
| JP | 09-326131 A | 12/1997 |
| JP | 2000-284117 A | 10/2000 |
| JP | 2002-521684 A | 7/2002 |
| JP | 2003-194586 A | 7/2003 |
| JP | 2005-114704 A | 4/2005 |
| JP | 2006-337860 A | 12/2006 |
| JP | 2007-219340 A | 8/2007 |
| JP | 2009-168706 A | 7/2009 |
| JP | 2010-190632 A | 9/2010 |
| WO | 2004/008196 A1 | 1/2004 |

OTHER PUBLICATIONS

Communication dated Aug. 18, 2015 from the State Intellectual Property Office of the People's Republic of China in counterpart application No. 201280053880.8.
International Search Report of PCT/JP2012/078172, dated Jan. 15, 2013.
Communication dated Jul. 24, 2015 from the European Patent Office in counterpart application No. 12845796.7.
Communication dated Jul. 26, 2016, from the Japanese Patent Office in counterpart Japanese application No. 2015-137348.

* cited by examiner

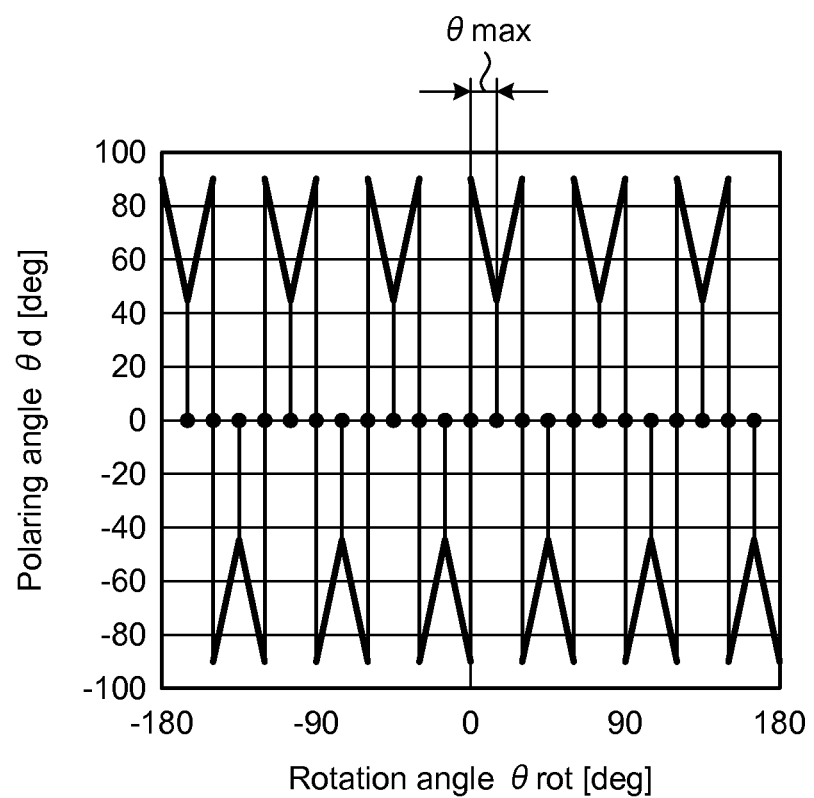

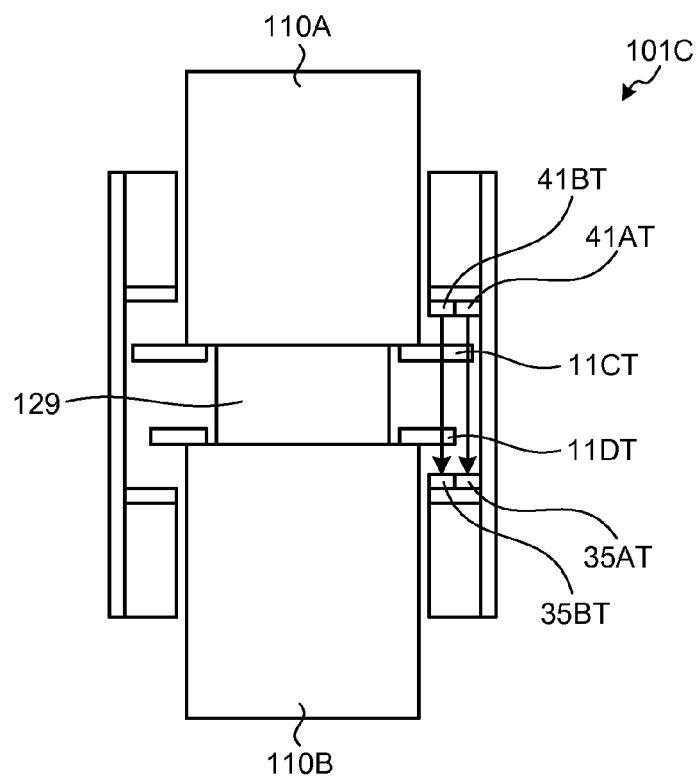
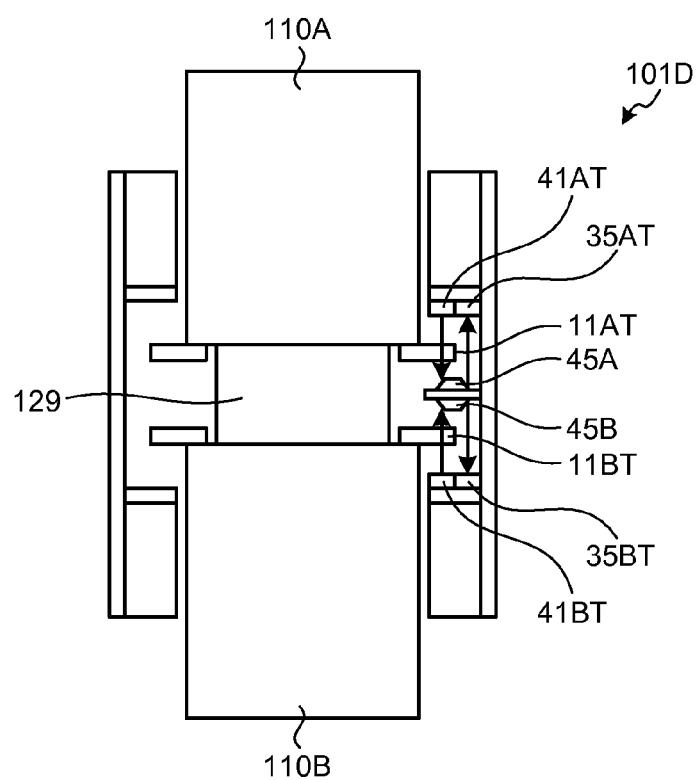

OPTICAL SENSOR, METHOD FOR MANUFACTURING OPTICAL SENSOR, OPTICAL ENCODER, TORQUE DETECTION APPARATUS, AND ELECTRIC POWER STEERING APPARATUS

CROSS REFERENCE TO RELATED APPLICATIONS

This application is a National Stage of International Application No. PCT/JP2012/078172 filed Oct. 31, 2012, claiming priority based on Japanese Patent Application Nos. 2011-239785, filed Oct. 31, 2011, 2011-239797, filed Oct. 31, 2011, 2011-239800, filed Oct. 31, 2011 and 2012-190487, filed Aug. 30, 2012, the contents of all of which are incorporated herein by reference in their entirety.

FIELD

The present invention relates to an optical sensor, a method for manufacturing an optical sensor, an optical encoder, a torque detection apparatus, and an electric power steering apparatus.

BACKGROUND

Encoders are used in detecting the position or the angle of a movable component in various mechanical devices. Generally, there are encoders that detect a relative position or angle, and those that detect an absolute position or angle. There are also optical encoders and magnetic encoders. The optical encoders are more affected by foreign substances and the like, and by fluctuations in the amount of detected light.

Patent Literature 1 discloses a technology for achieving a highly noise-resistant and versatile optical encoder capable of accurate movement detections. In this technology, in a detecting optical system, a laser beam output from a light source and with which a scale is irradiated is passed through or is reflected on the scale. A polarization splitting unit then splits the laser beam thus passed through or reflected into polarized components having given polarization directions, and light intensity detecting units detect the respective light intensities of the polarized components thus split.

Patent Literature 2 discloses a technology for enabling an optical encoder to detect an absolute angle within one rotation, without being affected by fluctuations in the amount of detected light caused by some foreign substances or the like. In this technology, ring-shaped signal tracks are provided on an optical scale disk that is rotatably supported and whose rotation angle is to be detected. The signal tracks include polarizers each of which is provided correspondingly to each segment in the circumferential direction of the optical scale disk. The adjacent polarizers have different polarization directions in a rotating direction of the optical scale, and the polarization directions are rotated m/2 times (where m is an integer equal to or more than zero) when the optical scale disk is rotated once.

CITATION LIST

Patent Literature

Patent Literature 1: Japanese Laid-open Patent Publication No. 2003-194586
Patent Literature 2: Japanese Laid-open Patent Publication No. 2009-168706

SUMMARY

Technical Problem

In the technology disclosed in Patent Literature 1, optical sensors might end up being affected by the amount of detected light when a foreign substance or the like blocks one of the polarized components. In the technology disclosed in Patent Literature 2, no consideration is given to optical sensors for polarization splitting.

The present invention is made in consideration of the above, and an object of the present invention is to provide an optical sensor, an optical encoder, a torque detection apparatus, and an electric power steering apparatus that are less affected by fluctuations in the amount of detected light and have an improved resolution.

Solution to Problem

According to an aspect of the present invention in order to solve the above-mentioned problems and achieve the purpose, there is provided an optical sensor including: a first polarizing layer that splits incident light to light with a first polarization direction; a first photoreceiver that receive first polarized light split by the first polarizing layer; a second polarizing layer that splits the incident light to light with a second polarization direction; and a second photoreceiver that receives second polarized light split by the second polarizing layer, wherein the first photoreceiver and the second photoreceiver are positioned alternatingly and spaced uniformly with each other.

Such a structure enables the incident light to be split into the first polarized light and the second polarized light. As a result, the computing unit can calculate the polarization angle of the transmissive light or the reflected light based on the signal intensities of the polarized component having the first polarization direction and of the polarized component having the second polarization direction thus split. Because the chances of the first photoreceivers and the second photoreceivers being blocked by a foreign substance by approximately the same degree can be increased, the possibility of the signal intensity output from one of the first photoreceivers and the second photoreceivers dropping extremely can be reduced. Therefore, even when the intensity of the incident light is decreased by a foreign substance, the optical sensor can detect a change in the polarization direction of the transmissive light or the reflected light in a manner less affected by foreign substances.

According to a preferred aspect, it is preferable that a polarization axis of the first polarized light is relatively different from a polarization axis of the second polarized light by 90 degrees. With this structure, the computing unit can calculate a polarization angle easily.

According to a preferred aspect, it is preferable that the first photoreceiver and the second photoreceiver have a comb-like shape engaging and spaced uniformly with each other. Therefore, even when the intensity of the incident light is decreased by a foreign substance, the optical sensor can detect a change in the polarization direction of the transmissive light or the reflected light in a manner less affected by foreign substances.

According to a preferred aspect, it is preferable that the optical sensor further includes a light-shielding film that stops the incident light that is incident on the first photoreceiver and the second photoreceiver. Therefore, the optical sensor can adjust the amount of incident light, whereby allowing the reachable range of the incident light to be adjusted. As a result, the optical sensor can detect a change in the polarization direction of the transmissive light or the reflected light highly accurately.

According to an another aspect of the present invention in order to solve the above-mentioned problems and achieve the purpose, there is provided a method for manufacturing an optical sensor including: forming photoreceivers by arranging a first photoreceiver and a second photoreceiver receiving light alternatingly and spaced uniformly with each other on a surface of a substrate; and forming polarizing layers by positioning a first polarizing layer that splits incident light to first polarized light polarized in a first polarization direction on top of the first photoreceiver to allow the first polarized light to be incident on the first photoreceiver, and by positioning a second polarizing layer that splits the incident light to second polarized light polarized in a second polarization direction on top of the second photoreceiver to allow the second polarized light to be incident on the second photoreceiver.

The first photoreceivers and the second photoreceivers manufactured through such a process can increase the chances of the first photoreceivers and the second photoreceivers being blocked by a foreign substance by approximately the same degree. Therefore, the possibility of the signal intensity output from one of the first photoreceivers and the second photoreceivers dropping extremely can be reduced. Therefore, even when the intensity of the incident light is decreased by a foreign substance, the optical sensor can detect a change in the polarization direction of the transmissive light or the reflected light in a manner less affected by foreign substances.

According to a preferred aspect, it is preferable that at the forming polarizing layers, using the substrate as a first substrate, the first polarizing layer and the second polarizing layer are formed on a surface of a second substrate, the second substrate is bonded onto the first substrate in such a manner that the first polarizing layer is positioned on top of the first photoreceiver and the second polarizing layer is positioned on top of the second photoreceiver. In this manner, the polarizing layers and the photoreceivers can be laminated easily, whereby allowing the optical sensor to be manufactured easily.

According to a preferred aspect, it is preferable that at the forming polarizing layers, using the substrate as a first substrate, the first polarizing layer is formed on a surface of a second substrate, the second polarizing layer is formed on a surface of a third substrate, and the first substrate, the second substrate, and the third substrate are bonded together in such a manner that the first polarizing layer is positioned on top of the first photoreceiver and the second polarizing layer is positioned on top of the second photoreceiver. In this manner, the polarizing layers and the photoreceivers can be laminated easily, whereby allowing the optical sensor to be manufactured easily.

According to a still another aspect in order to solve the above-mentioned problems and achieve the purpose, there is provided an optical encoder including: a light source; an optical scale causing light from the light source to be polarized differently depending on positions at which the light is passed or is reflected on the optical scale; an optical sensor including a first polarizing layer that splits incident light that is incident on the first polarizing layer after being passed through or reflected on the optical scale to light with a first polarization direction, a first photoreceiver that receives first polarized light split by the first polarizing layer, a second polarizing layer that splits the incident light to light with a second polarization direction, and a second photoreceiver that receives second polarized light split by the second polarizing layer, the first photoreceiver and the second photoreceiver being positioned alternatingly and spaced uniformly with each other; and a computing unit that calculates a relative movement of the optical scale with respect to the optical sensor based on a light intensity of the first polarized light and a light intensity of the second polarized light.

With such a structure, the incident light is split into the first polarized light and the second polarized light. As a result, the computing unit can calculate the polarization angle of the transmissive light or the reflected light based on signal intensities of the polarized component having the first polarization direction and of the polarized component having the second polarization direction thus split. The chances of the first photoreceivers and the second photoreceivers being blocked by a foreign substance by approximately the same degree can be increased, so that the possibility of the signal intensity output from one of the first photoreceivers and the second photoreceivers dropping extremely can be reduced. Therefore, even when the intensity of the incident light is decreased by a foreign substance, the optical sensor can detect a change in the polarization direction of the transmissive light or the reflected light in a manner less affected by foreign substances.

According to a preferred aspect, it is preferable that a polarization axis of the first polarized light is relatively different from a polarization axis of the second polarized light by 90 degrees. With this structure, the computing unit can calculate a polarization angle easily.

According to a preferred aspect, it is preferable that the first photoreceiver and the second photoreceiver have a comb-like shape engaging and spaced uniformly with each other. Therefore, even when the intensity of the incident light is decreased by a foreign substance, the optical sensor can detect a change in the polarization direction of the transmissive light or the reflected light in a manner less affected by foreign substances.

According to a preferred aspect, it is preferable that the optical encoder further includes a light-shielding film that stops the incident light that is incident on the first photoreceiver and the second photoreceiver. Therefore, the optical sensor can adjust the amount of incident light, whereby allowing the reachable range of the incident light to be adjusted. As a result, the optical sensor can detect a change in the polarization direction of the transmissive light or the reflected light highly accurately.

According to a still another aspect in order to solve the above-mentioned problems and achieve the purpose, there is provided a torque detection apparatus that detects torque by using torsion of a torsion bar, the torque detection apparatus including: a first rotating shaft and a second rotating shaft that are connected with the torsion bar in which torsion is produced by receiving torque; a plurality of optical scales moving with respective rotations of the first rotating shaft and the second rotating shaft; an optical sensor that is paired with the optical scale, and detects a polarization of transmissive light or reflected light varying depending on where light source light output to the optical scale is passed through or is reflected; and a computing unit that calculates a rotation angle of the optical scale with respect to the optical sensor, and calculates rotational displacements of the first rotating shaft and the second rotating shaft, wherein the optical sensor includes a first polarizing layer that splits incident light that is the transmissive light or the reflected light to light with a first polarization direction, a first photoreceiver that receives first polarized light split by the first polarizing layer; a second polarizing layer that splits the incident light to light with a second polarization direction; and a second photoreceiver that receives second polarized light split by the second polarizing layer, the first photoreceiver and the second photoreceiver being positioned alternatingly and spaced uniformly with each other.

With such a structure, the incident light is split into the first polarized light and the second polarized light. As a result, the computing unit can calculate the polarization angle of the transmissive light or the reflected light based on the signal intensities of the polarized component having the first polarization direction and of the polarized component having the second polarization direction thus split. The chances of the first photoreceivers and the second photoreceivers being blocked by a foreign substance by approximately the same degree can be increased, so that the possibility of the signal intensity output from one of the first photoreceivers and the second photoreceivers dropping extremely can be reduced. Therefore, even when the intensity of the incident light is decreased by a foreign substance, the optical sensor can detect a change in the polarization direction of the transmissive light or the reflected light in a manner less affected by foreign substances. With this structure, the computing unit can calculate a polarization angle easily.

According to a preferred aspect, it is preferable that a polarization axis of the first polarized light is relatively different from a polarization axis of the second polarized light by 90 degrees. With this structure, the computing unit can calculate a polarization angle easily.

According to a preferred aspect, it is preferable that the first photoreceiver and the second photoreceiver have a comb-like shape engaging and spaced uniformly with each other. Therefore, even when the intensity of the incident light is decreased by a foreign substance, the optical sensor can detect a change in the polarization direction of the transmissive light or the reflected light in a manner less affected by foreign substances.

According to a preferred aspect, it is preferable that the torque detection apparatus further includes a light-shielding film that stops the incident light that is incident on the first photoreceiver and the second photoreceiver. Therefore, the optical sensor can adjust the amount of incident light, whereby allowing the reachable range of the incident light to be adjusted. As a result, the optical sensor can detect a change in the polarization direction of the transmissive light or the reflected light highly accurately.

According to a preferred aspect, it is preferable that the computing unit calculates an absolute rotation angle of at least one of the first rotating shaft and the second rotating shaft from a relative rotation angle of the optical scale with respect to the optical sensor, and outputs detected torque acquired from the rotational displacements of the first rotating shaft and the second rotating shaft, and the absolute rotation angle. In this manner, the torque detection apparatus can function as a torque angle sensor.

According to a preferred embodiment of the present invention, it is preferable that the electric power steering apparatus include the torque detection apparatus, and the first rotating shaft and the second rotating shaft be mounted on the steering shaft. With such a structure, the electric power steering apparatus can allow the torque detection apparatus to detect a steering force of a driver communicated to an input shaft via a steering wheel as steering torque.

Advantageous Effects of Invention

The present invention can provide an optical sensor, an optical encoder, a torque detection apparatus, and an electric power steering apparatus less affected by fluctuations in the amount of detected light and with an improved resolution.

BRIEF DESCRIPTION OF DRAWINGS

FIG. 2-1 is a schematic for explaining an arrangement of an optical scale and an optical sensor.

FIG. 2-2 is a schematic for explaining an exemplary modification of the arrangement of the optical scale and the optical sensor.

FIG. 7 is a schematic for explaining the relation between a rotation angle and a polarization axis direction in the optical scale according to the first embodiment.

FIG. 8-1 is a schematic for explaining the wire grid pattern on the optical scale according to the first embodiment.

FIG. 8-2 is a schematic for explaining the wire grid pattern on the optical scale according to the first embodiment.

FIG. 9-1 is a schematic for explaining the wire grid pattern on the optical scale according to the first embodiment.

FIG. 9-2 is a schematic for explaining the wire grid pattern on the optical scale according to the first embodiment.

FIG. 10-1 is a schematic for explaining the wire grid pattern on the optical scale according to the first embodiment.

FIG. 10-2 is a schematic for explaining the wire grid pattern on the optical scale according to the first embodiment.

FIG. 11-1 is a schematic for explaining a detection area of the optical scale according to the first embodiment.

FIG. 11-2 is a schematic for explaining a detection area of the optical scale according to the first embodiment.

FIG. 11-3 is a schematic for explaining a detection area of the optical scale according to the first embodiment.

FIG. 11-4 is a schematic for explaining a detection area of the optical scale according to the first embodiment.

FIG. 12-1 is a schematic for explaining an optical sensor according to the first embodiment.

FIG. 12-2 is a schematic for explaining the optical sensor according to the first embodiment.

FIG. 13-1 is a schematic for explaining splitting of incident light into polarized components in the optical sensor according to the first embodiment.

FIG. 13-2 is a schematic for explaining splitting of incident light into polarized components in the optical sensor according to the first embodiment.

FIG. 13-3 is a schematic for explaining splitting of incident light into polarized components in the optical sensor according to the first embodiment.

FIG. 15-1 is a schematic for explaining an exemplary modification of the optical sensor according to the first embodiment.

FIG. 15-2 is a schematic for explaining an exemplary modification of the optical sensor according to the first embodiment.

FIG. 15-3 is a schematic for explaining an exemplary modification of the optical sensor according to the first embodiment.

FIG. 18-1 is a schematic for explaining the optical sensor manufacturing process according to the first embodiment.

FIG. 18-2 is a schematic for explaining the optical sensor manufacturing process according to the first embodiment.

FIG. 18-3 is a schematic for explaining the optical sensor manufacturing process according to the first embodiment.

FIG. 18-4 is a schematic for explaining the optical sensor manufacturing process according to the first embodiment.

FIG. 18-5 is a schematic for explaining the optical sensor manufacturing process according to the first embodiment.

FIG. 18-6 is a schematic for explaining the optical sensor manufacturing process according to the first embodiment.

FIG. 24-1 is a schematic for explaining the wire grid pattern on the optical scale according to the second embodiment.

FIG. 24-2 is a schematic for explaining the wire grid pattern on the optical scale according to the second embodiment.

FIG. 25-1 is a schematic for explaining the wire grid pattern on the optical scale according to the second embodiment.

FIG. 25-2 is a schematic for explaining the wire grid pattern on the optical scale according to the second embodiment.

FIG. 33-1 is a schematic for explaining an arrangement of optical scales and optical sensors in the torque sensor according to the fourth embodiment.

FIG. 33-2 is a schematic for schematically explaining the optical scales and the optical sensors in the torque sensor according to the fourth embodiment.

FIG. 37 is a schematic for explaining an arrangement of optical scales and optical sensors in a torque sensor according to a fifth embodiment of the present invention.

FIG. 38 is a schematic for explaining an arrangement of optical scales and optical sensors in a torque sensor according to a sixth embodiment of the present invention.

FIG. 52-1 is a schematic for explaining the optical sensor manufacturing process according to the thirteenth embodiment.

FIG. 52-2 is a schematic for explaining the optical sensor manufacturing process according to the thirteenth embodiment.

FIG. 52-3 is a schematic for explaining the optical sensor manufacturing process according to the thirteenth embodiment.

FIG. 52-4 is a schematic for explaining the optical sensor manufacturing process according to the thirteenth embodiment.

FIG. 52-5 is a schematic for explaining the optical sensor manufacturing process according to the thirteenth embodiment.

FIG. 53-1 is a schematic for explaining manufacturing of a polarizing layer in the optical sensor manufacturing process according to a modification of the thirteenth embodiment.

FIG. 53-2 is a schematic for explaining manufacturing of the polarizing layer in the optical sensor manufacturing process according to the modification of the thirteenth embodiment.

FIG. 53-3 is a schematic for explaining manufacturing of the polarizing layer in the optical sensor manufacturing process according to the modification of the thirteenth embodiment.

FIG. 54-1 is a schematic for explaining manufacturing of the polarizing layer in the optical sensor manufacturing process according to a modification of the thirteenth embodiment.

FIG. 54-2 is a schematic for explaining manufacturing of the polarizing layer in the optical sensor manufacturing process according to the modification of the thirteenth embodiment.

FIG. 57-1 is a schematic for explaining the optical sensor package manufacturing process according to the fourteenth embodiment.

FIG. 57-2 is a schematic for explaining the optical sensor package manufacturing process according to the fourteenth embodiment.

FIG. 57-3 is a schematic for explaining the optical sensor package manufacturing process according to the fourteenth embodiment.

FIG. 57-4 is a schematic for explaining the optical sensor package manufacturing process according to the fourteenth embodiment.

FIG. 57-5 is a schematic for explaining the optical sensor package manufacturing process according to the fourteenth embodiment.

FIG. 57-6 is a schematic for explaining the optical sensor package manufacturing process according to the fourteenth embodiment.

FIG. 59-1 is a schematic for explaining the optical sensor package manufacturing process according to the fourteenth embodiment.

FIG. 59-2 is a schematic for explaining the optical sensor package manufacturing process according to the fourteenth embodiment.

FIG. 59-3 is a schematic for explaining the optical sensor package manufacturing process according to the fourteenth embodiment.

FIG. 59-4 is a schematic for explaining the optical sensor package manufacturing process according to the fourteenth embodiment.

FIG. 59-5 is a schematic for explaining the optical sensor package manufacturing process according to the fourteenth embodiment.

FIG. 59-6 is a schematic for explaining the optical sensor package manufacturing process according to the fourteenth embodiment.

FIG. 69-1 is a schematic for explaining the light source package manufacturing process according to the fifteenth embodiment.

FIG. 69-2 is a schematic for explaining the light source package manufacturing process according to the fifteenth embodiment.

FIG. 69-3 is a schematic for explaining the light source package manufacturing process according to the fifteenth embodiment.

FIG. 69-4 is a schematic for explaining the light source package manufacturing process according to the fifteenth embodiment.

FIG. 69-5 is a schematic for explaining the light source package manufacturing process according to the fifteenth embodiment.

FIG. 69-6 is a schematic for explaining the light source package manufacturing process according to the fifteenth embodiment.

FIG. 74-1 is a schematic for explaining the optical scale manufacturing process according to the sixteenth embodiment.

FIG. 74-2 is a schematic for explaining the optical scale manufacturing process according to the sixteenth embodiment.

FIG. 74-3 is a schematic for explaining the optical scale manufacturing process according to the sixteenth embodiment.

FIG. 74-4 is a schematic for explaining the optical scale manufacturing process according to the sixteenth embodiment.

FIG. 74-5 is a schematic for explaining the optical scale manufacturing process according to the sixteenth embodiment.

FIG. 74-6 is a schematic for explaining the optical scale manufacturing process according to the sixteenth embodiment.

FIG. 74-7 is a schematic for explaining the optical scale manufacturing process according to the sixteenth embodiment.

FIG. 75 is a flowchart for explaining an optical scale manufacturing process according to a seventeenth embodiment of the present invention.

FIG. 76-1 is a schematic for explaining the optical scale manufacturing process according to the seventeenth embodiment.

FIG. 76-2 is a schematic for explaining the optical scale manufacturing process according to the seventeenth embodiment.

FIG. 76-3 is a schematic for explaining the optical scale manufacturing process according to the seventeenth embodiment.

FIG. 76-4 is a schematic for explaining the optical scale manufacturing process according to the seventeenth embodiment.

FIG. 76-5 is a schematic for explaining the optical scale manufacturing process according to the seventeenth embodiment.

FIG. 76-6 is a schematic for explaining the optical scale manufacturing process according to the seventeenth embodiment.

FIG. 77 is a schematic for explaining an example of a wire grid pattern on the optical scale according to the seventeenth embodiment.

FIG. 78 is a schematic for explaining an example of the wire grid pattern on the optical scale according to the seventeenth embodiment.

Figure 79:
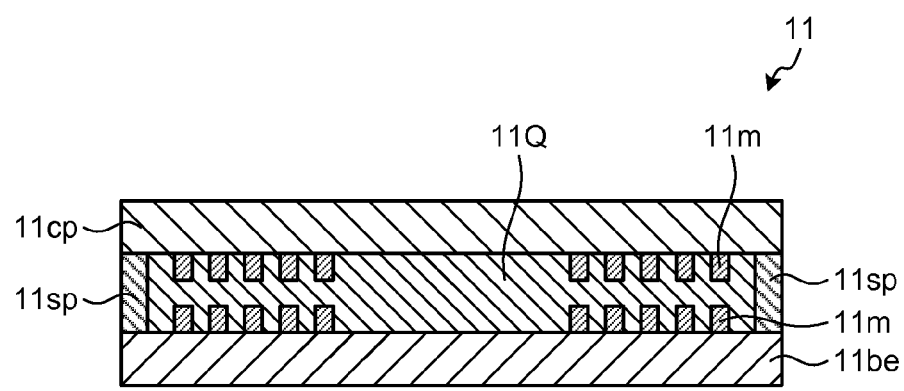

FIG. 79 is a schematic for explaining an example of the wire grid pattern on the optical scale according to the seventeenth embodiment.

Figure 80:
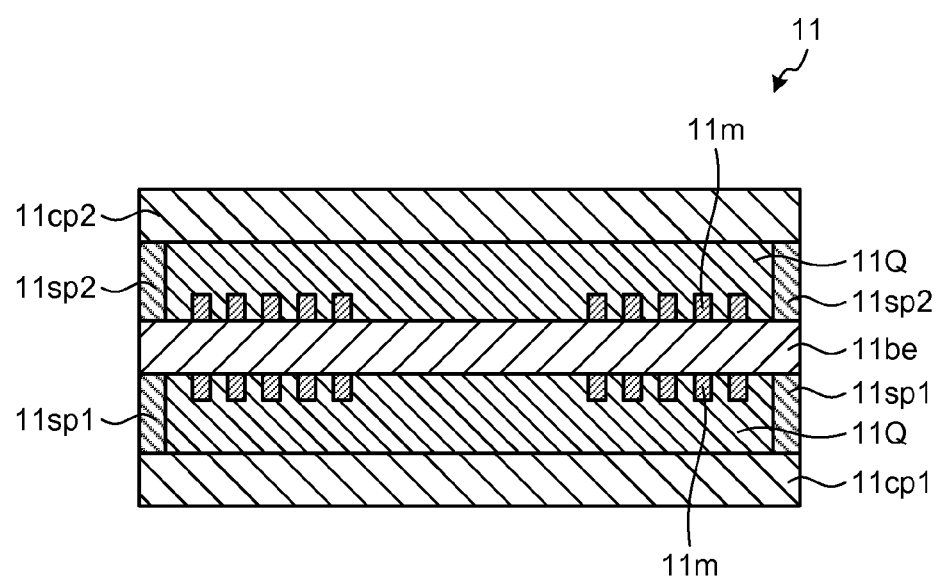

FIG. 80 is a schematic for explaining an example of the wire grid pattern on the optical scale according to the seventeenth embodiment.

Figure 81:
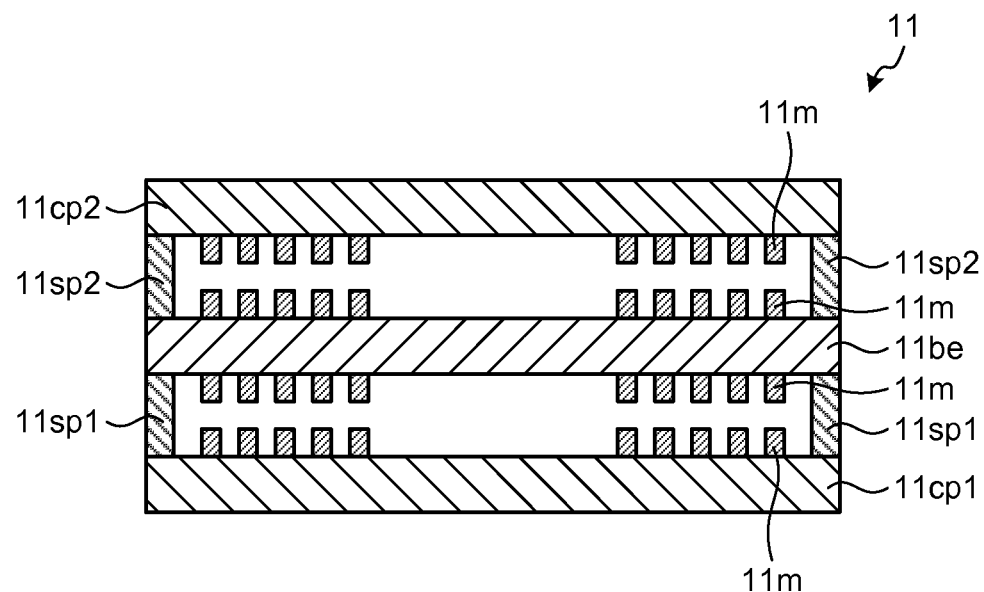

FIG. 81 is a schematic for explaining an example of the wire grid pattern on the optical scale according to the seventeenth embodiment.

Figure 82:
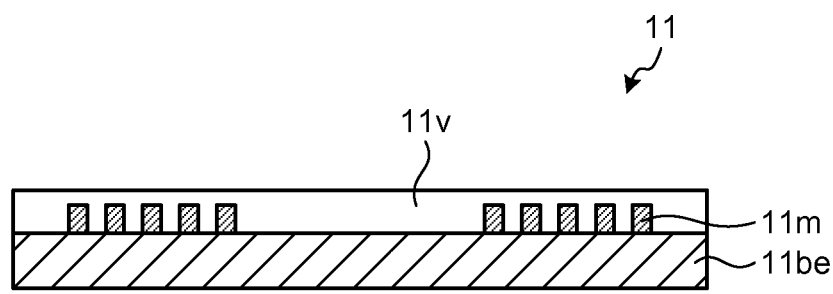

FIG. 82 is a schematic for explaining an example of the wire grid pattern on the optical scale according to the seventeenth embodiment.

Figure 83:
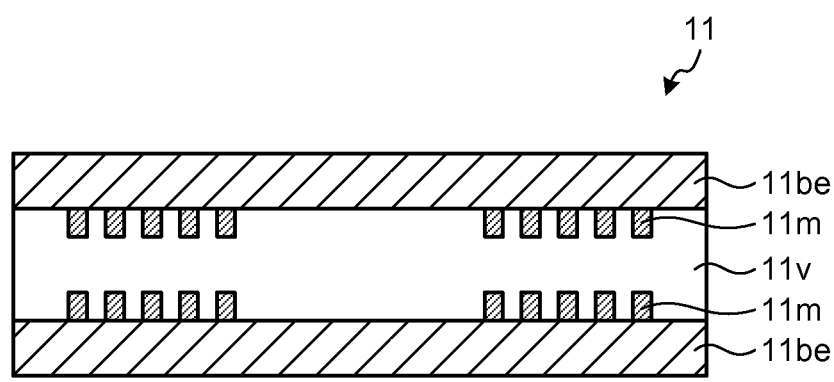

FIG. 83 is a schematic for explaining an example of the wire grid pattern on the optical scale according to the seventeenth embodiment.

Figure 84:
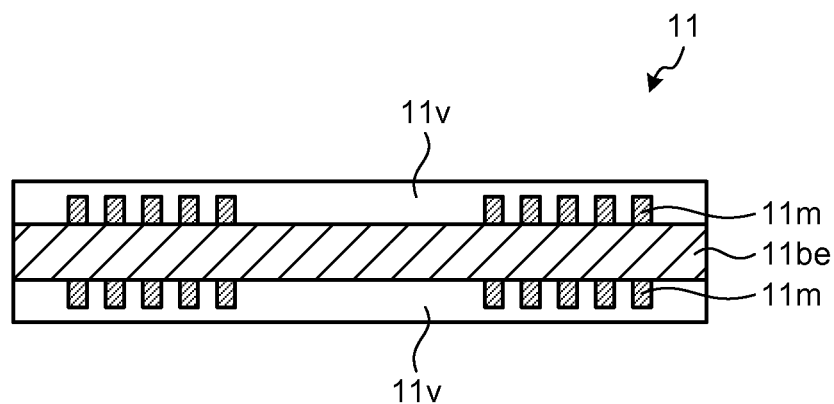

FIG. 84 is a schematic for explaining an example of the wire grid pattern on the optical scale according to the seventeenth embodiment.

Figure 85:
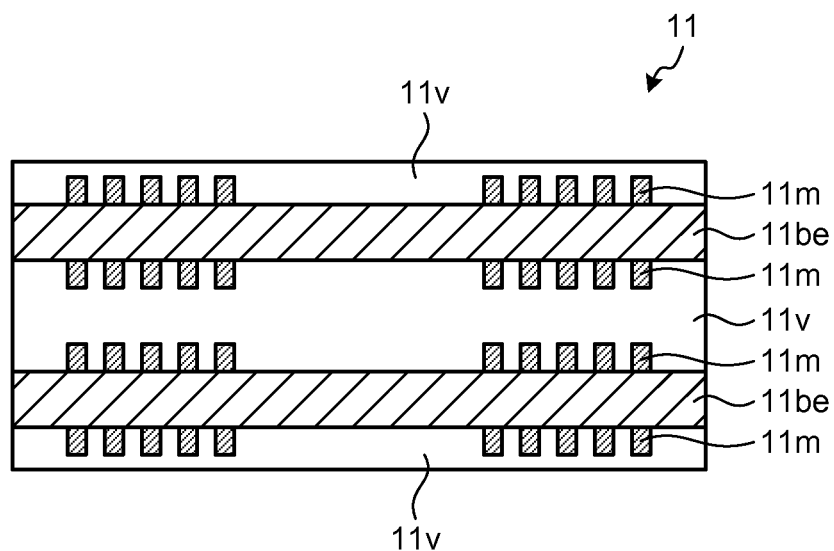

FIG. 85 is a schematic for explaining an example of the wire grid pattern on the optical scale according to the seventeenth embodiment.

Figure 86:
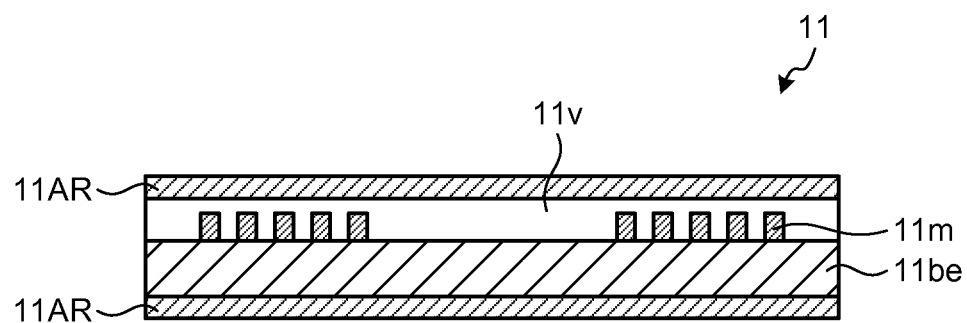

FIG. 86 is a schematic for explaining an example of the wire grid pattern on the optical scale according to the seventeenth embodiment.

Figure 87:
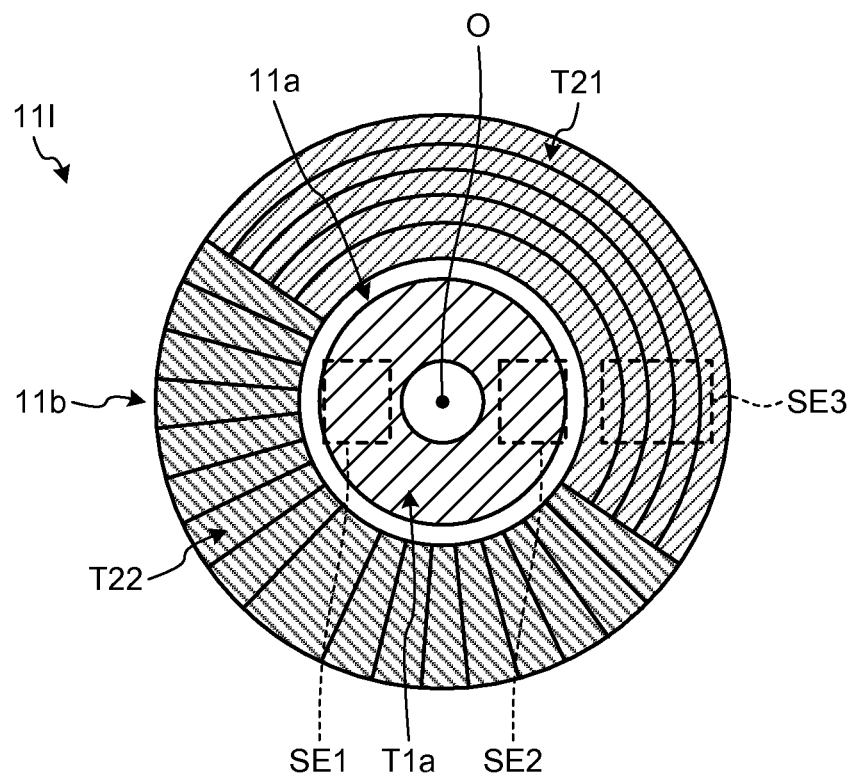

FIG. 87 is a schematic for explaining an optical scale according to an eighteenth embodiment of the present invention.

Figure 88:
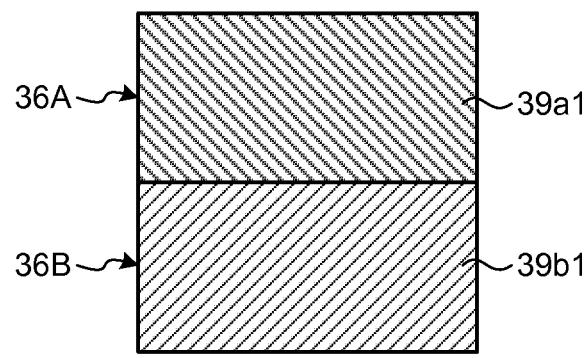

FIG. 88 is a schematic for explaining the polarizing axes in the optical sensor according to the eighteenth embodiment.

Figure 89:
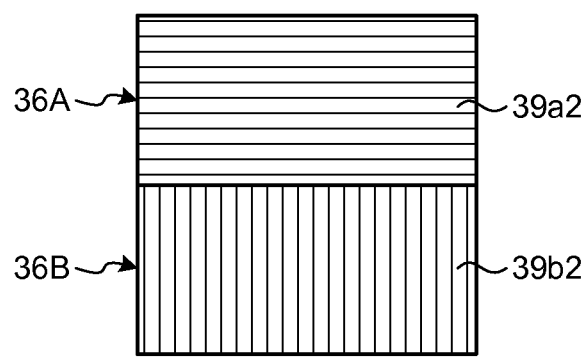

FIG. 89 is a schematic for explaining the polarizing axes in the optical sensor according to the eighteenth embodiment.

Figure 90:
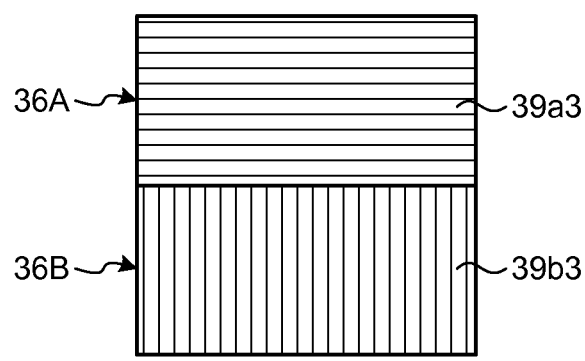

FIG. 90 is a schematic for explaining the polarizing axes in the optical sensor according to the eighteenth embodiment.

Figure 91:
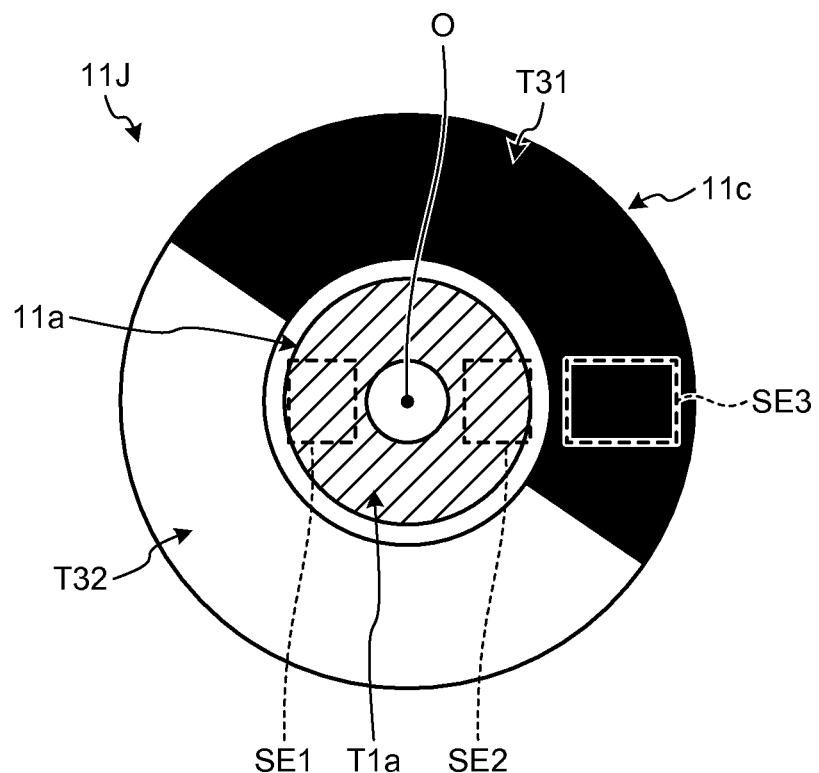

FIG. 91 is a schematic for explaining an exemplary modification of the optical scale according to the eighteenth embodiment.

Figure 92:
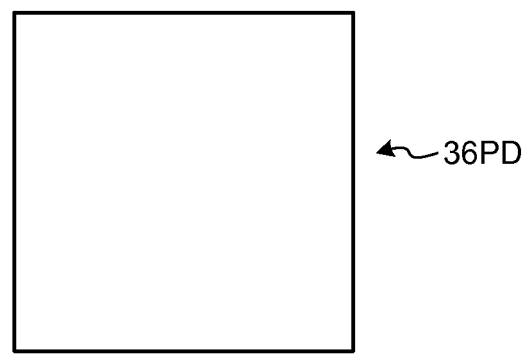

FIG. 92 is a schematic for explaining an exemplary modification of the optical sensor according to the eighteenth embodiment.

Figure 93:
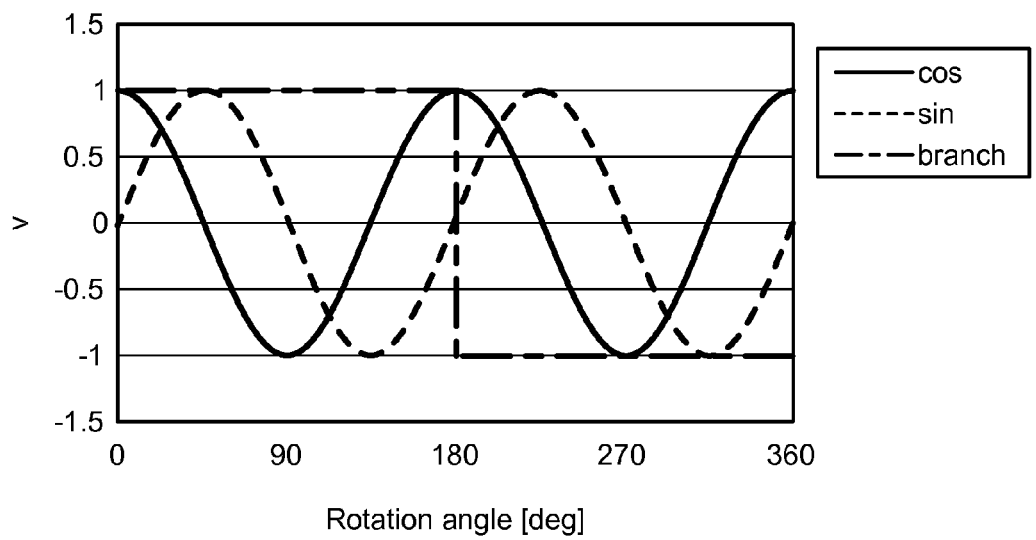

FIG. 93 is a schematic for explaining outputs from the encoder according to the eighteenth embodiment.

Figure 94:
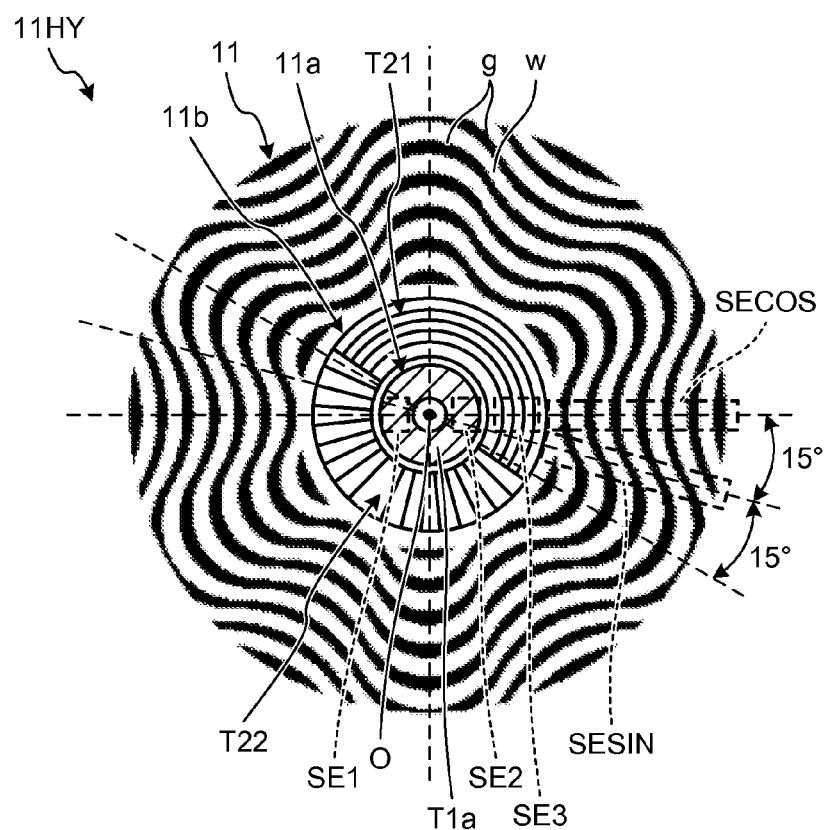

FIG. 94 is a schematic for explaining an optical scale according to a nineteenth embodiment of the present invention.

Figure 95:
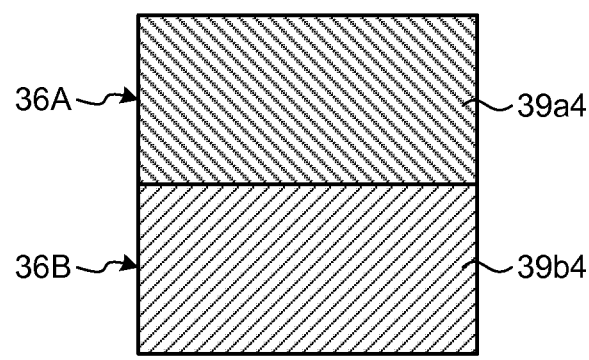

FIG. 95 is a schematic for explaining polarizing axes of the optical sensor according to the nineteenth embodiment.

Figure 96:
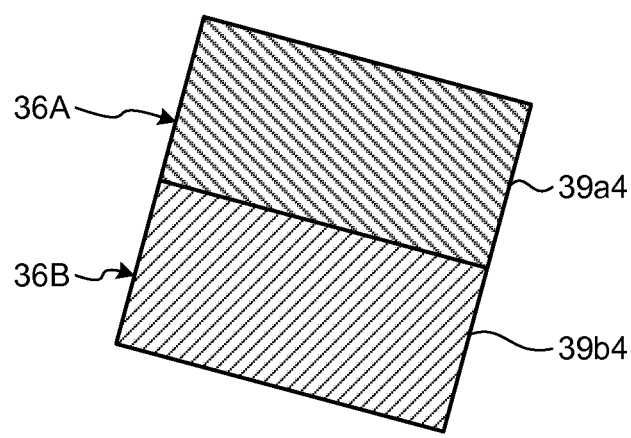

FIG. 96 is a schematic for explaining the polarizing axes of the optical sensor according to the nineteenth embodiment.

Figure 97:
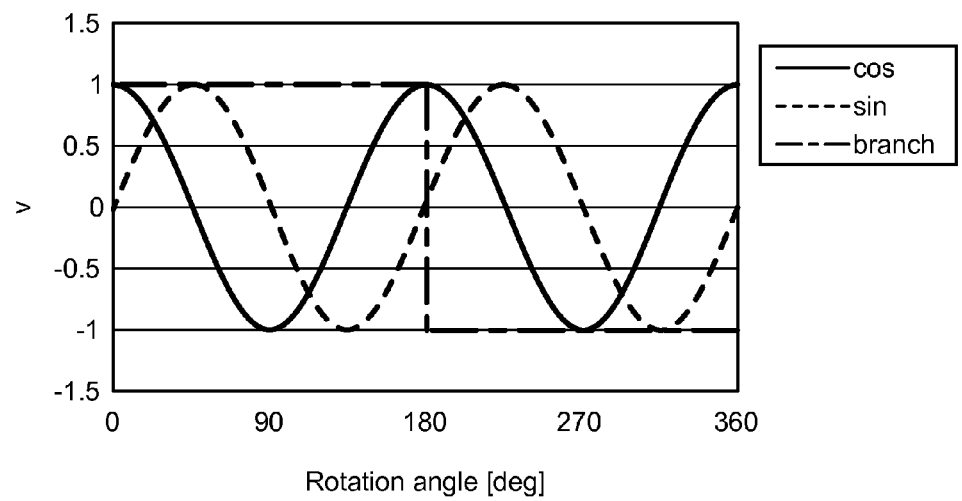

FIG. 97 is a schematic for explaining outputs from the encoder according to the nineteenth embodiment.

Figure 98:
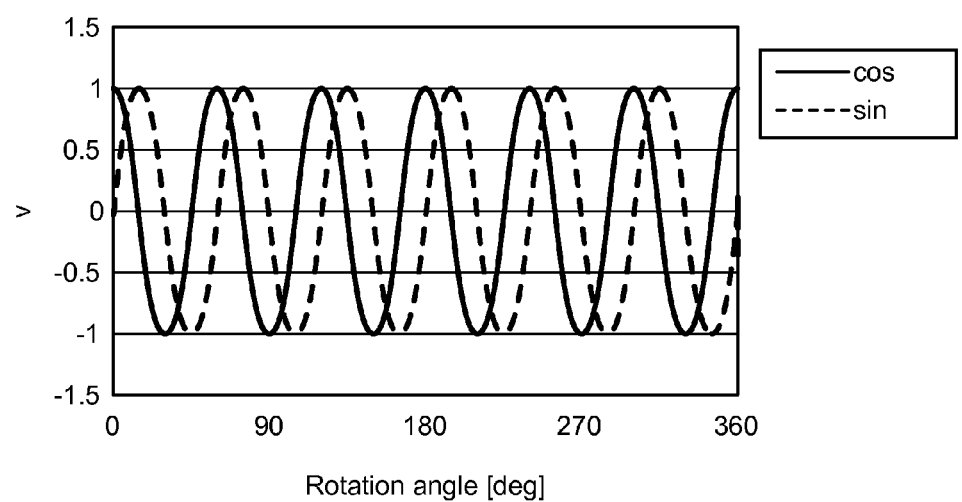

FIG. 98 is a schematic for explaining outputs from the encoder according to the nineteenth embodiment.

Figure 99:
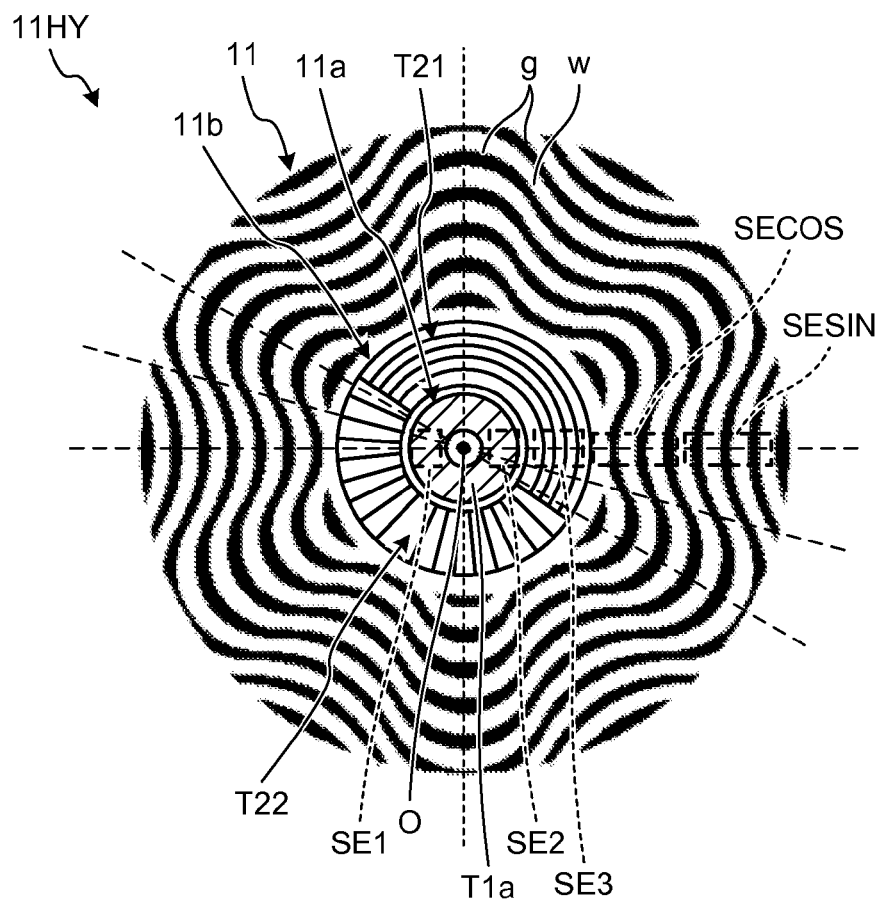

FIG. 99 is a schematic for explaining an exemplary modification of the encoder according to the nineteenth embodiment.

Figure 100:
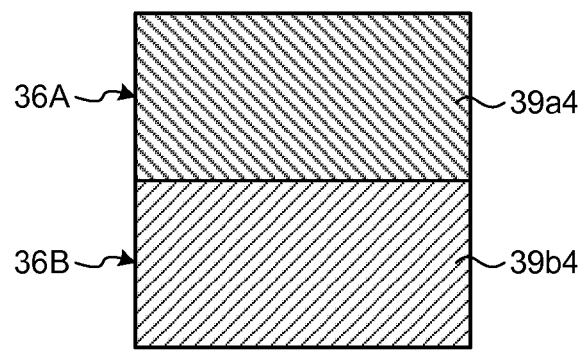

FIG. 100 is a schematic for explaining an optical sensor in the encoder illustrated in FIG. 99.

Figure 101:
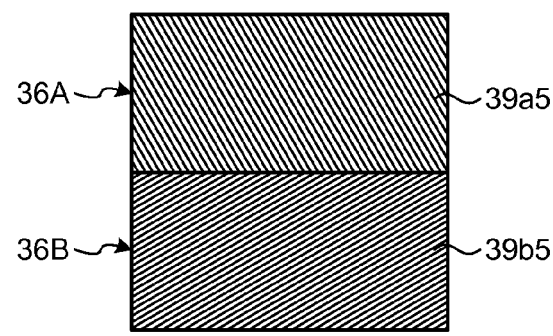

FIG. 101 is a schematic for explaining the optical sensor in the encoder illustrated in FIG. 99.

Figure 102:
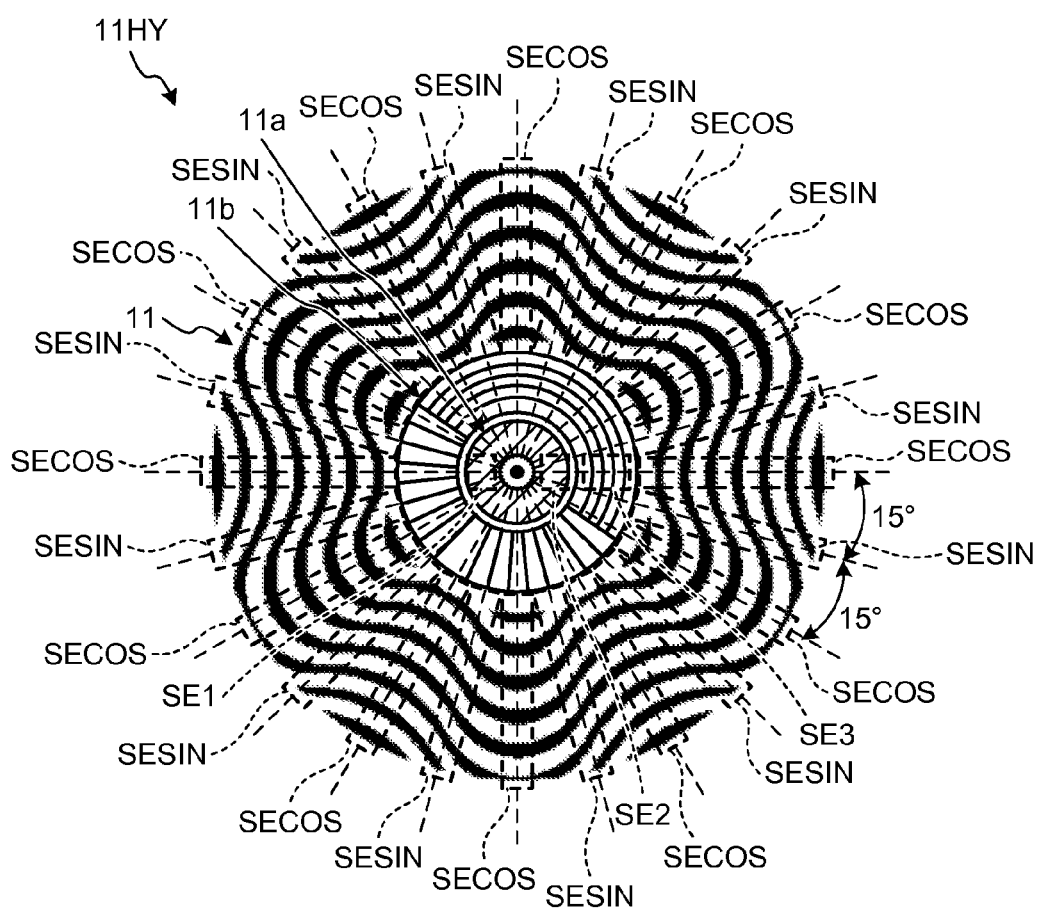

FIG. 102 is a schematic for explaining an exemplary modification of the encoder according to the nineteenth embodiment.

Figure 103:
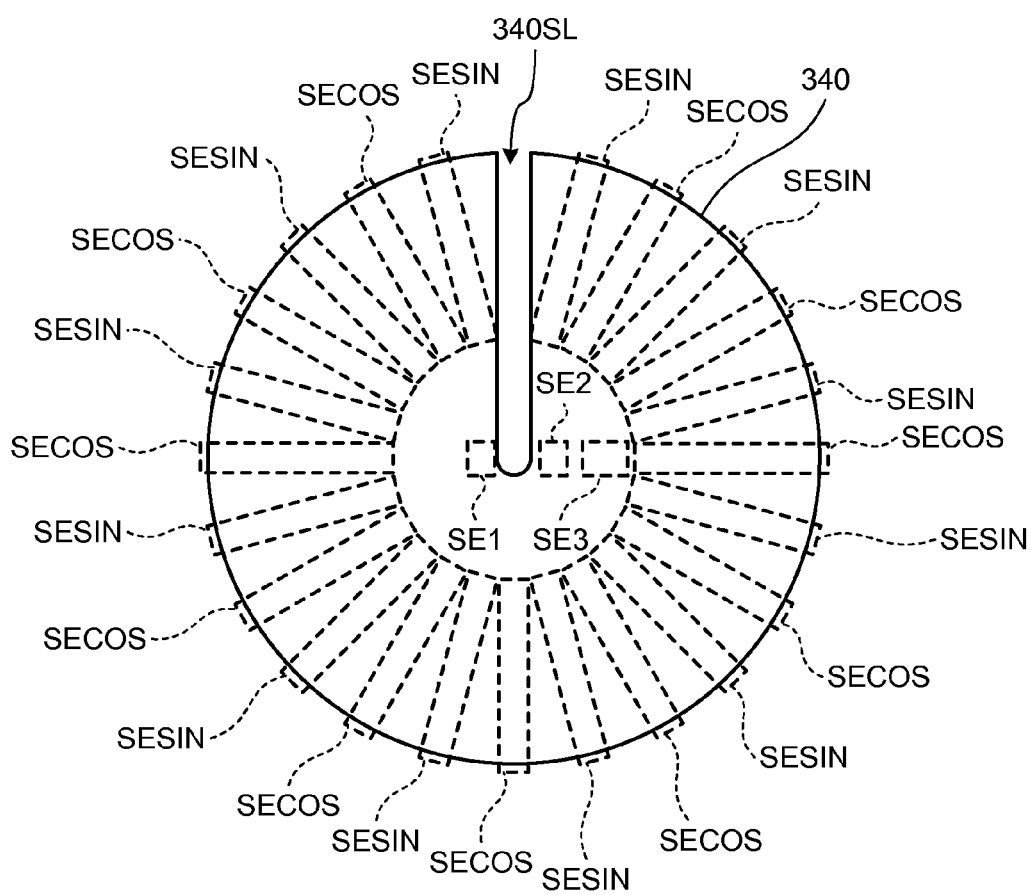

FIG. 103 is a schematic for explaining an arrangement of the optical sensors in the encoder illustrated in FIG. 102.

Figure 104:
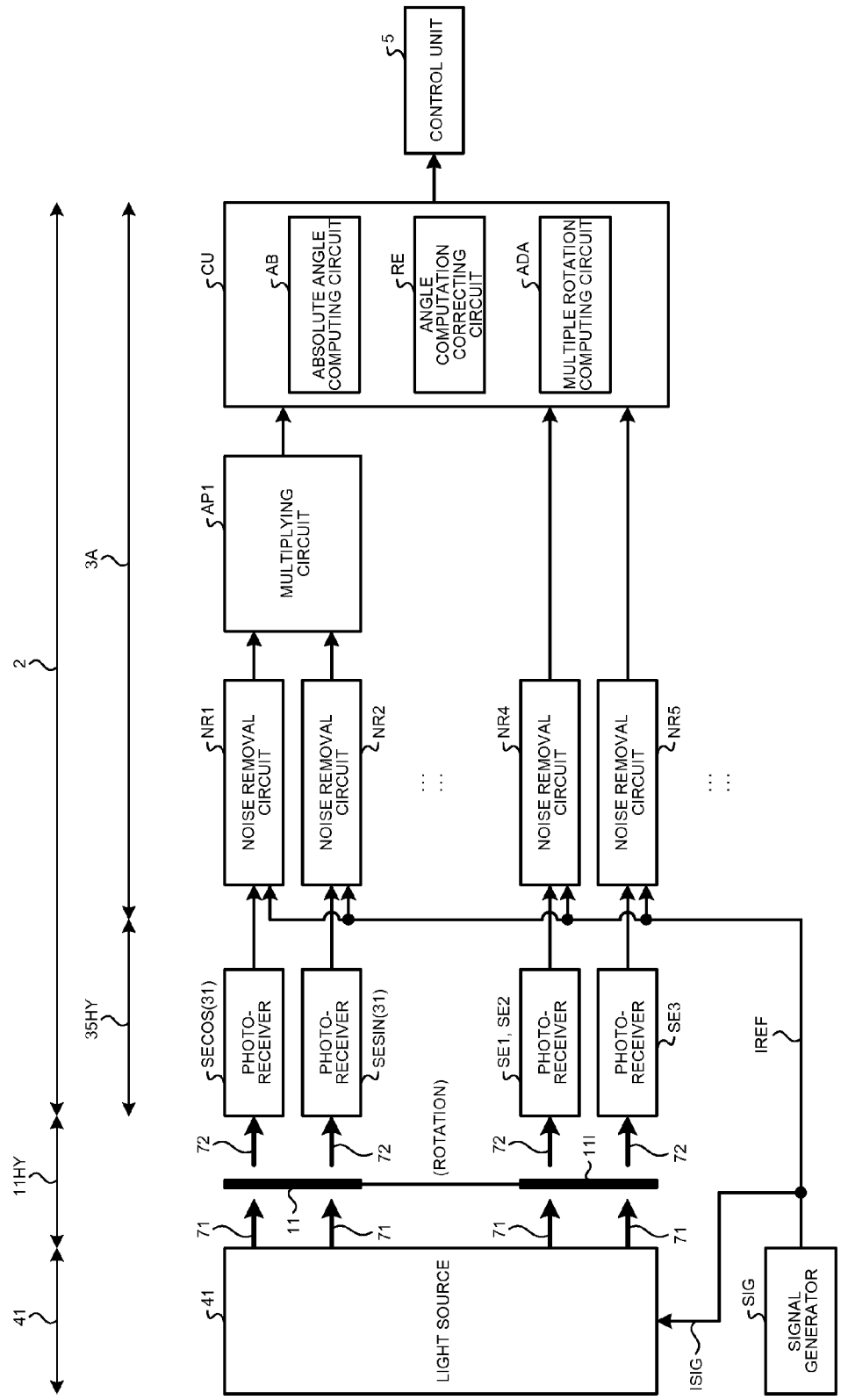

FIG. 104 is a block diagram of the encoder according to the nineteenth embodiment.

Figure 105:
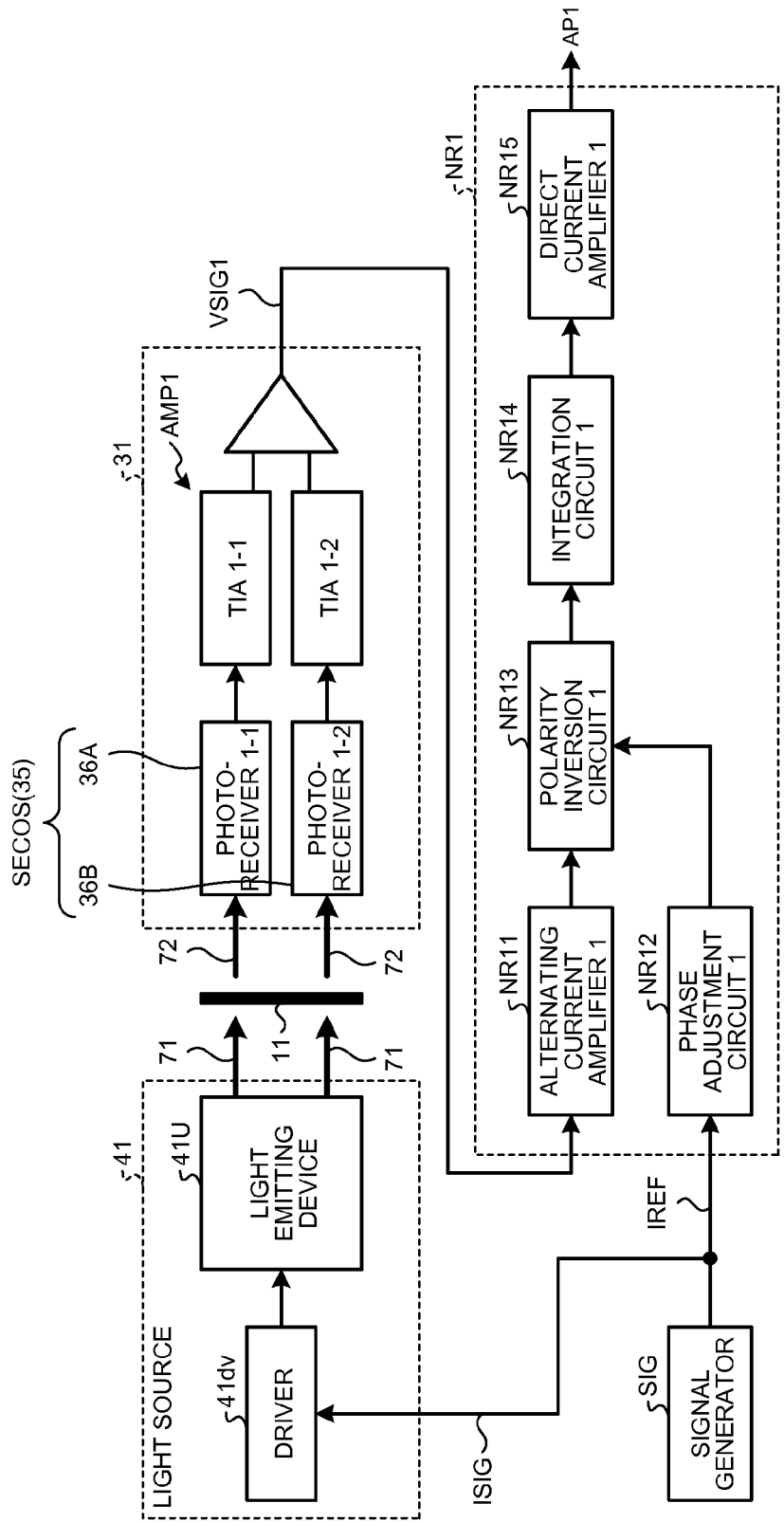

FIG. 105 is a block diagram of the encoder according to the nineteenth embodiment.

Figure 106:
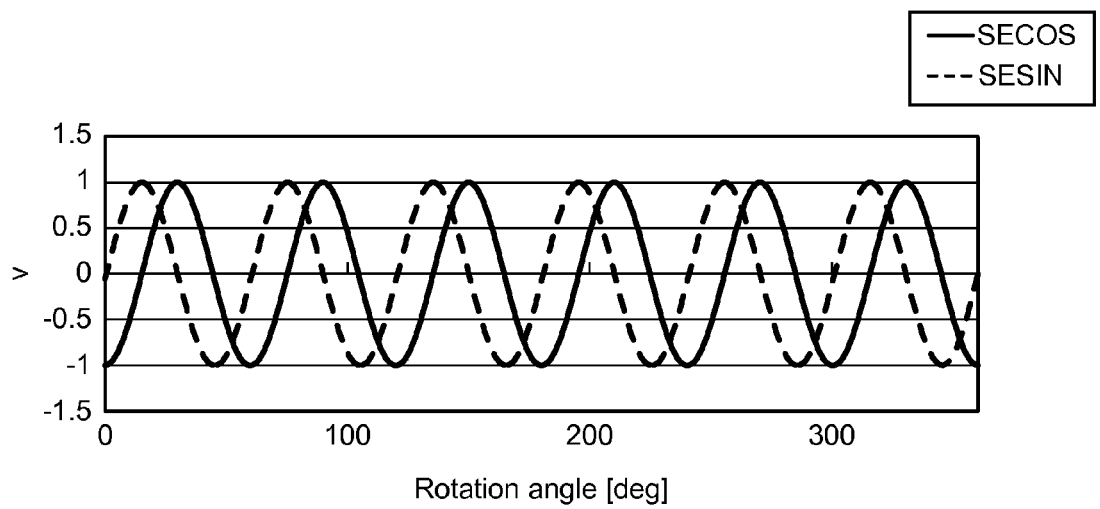

FIG. 106 is a schematic for explaining angle detection signal outputs from the encoder according to the nineteenth embodiment.

Figure 107:
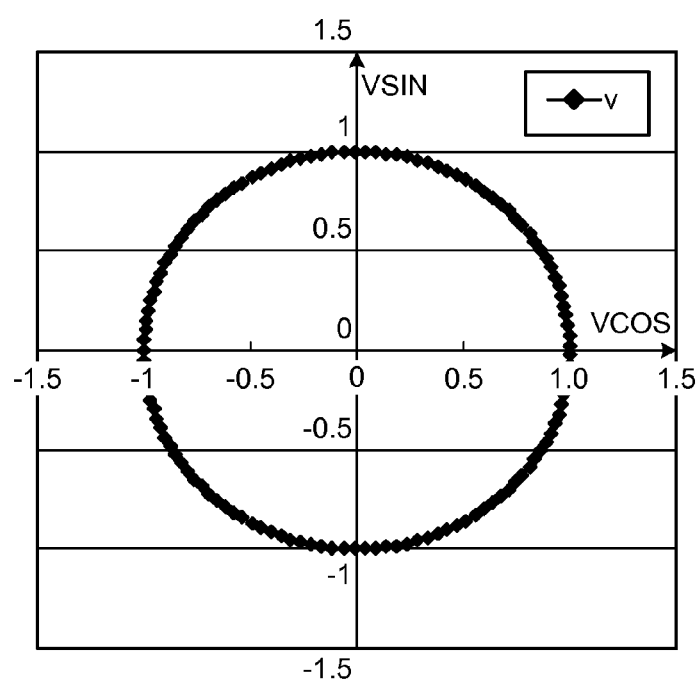

FIG. 107 is a schematic for explaining the angle detection signal outputs from the encoder according to the nineteenth embodiment.

Figure 108:
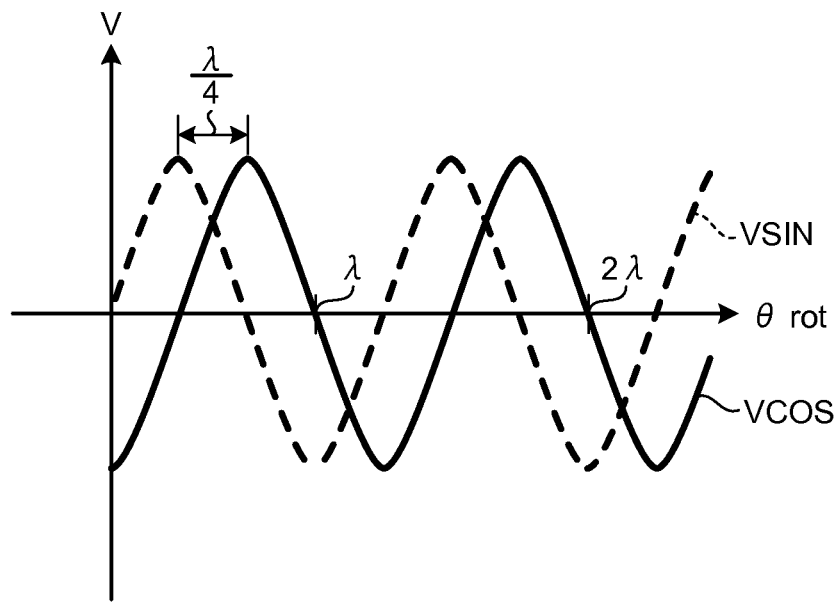

FIG. 108 is a schematic for explaining the angle detection signal outputs from the encoder according to the nineteenth embodiment.

Figure 109:
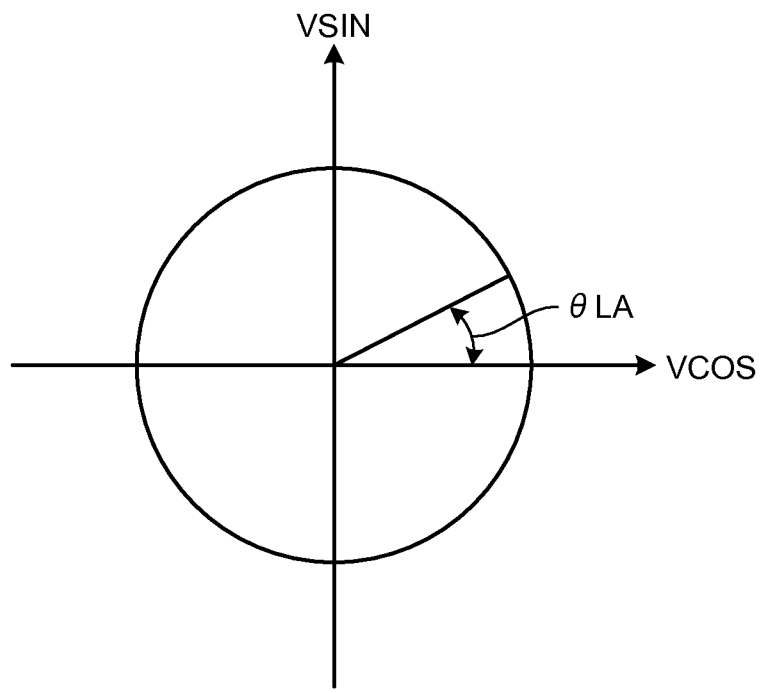

FIG. 109 is a schematic for explaining the angle detection signal outputs from the encoder according to the nineteenth embodiment.

Figure 110:
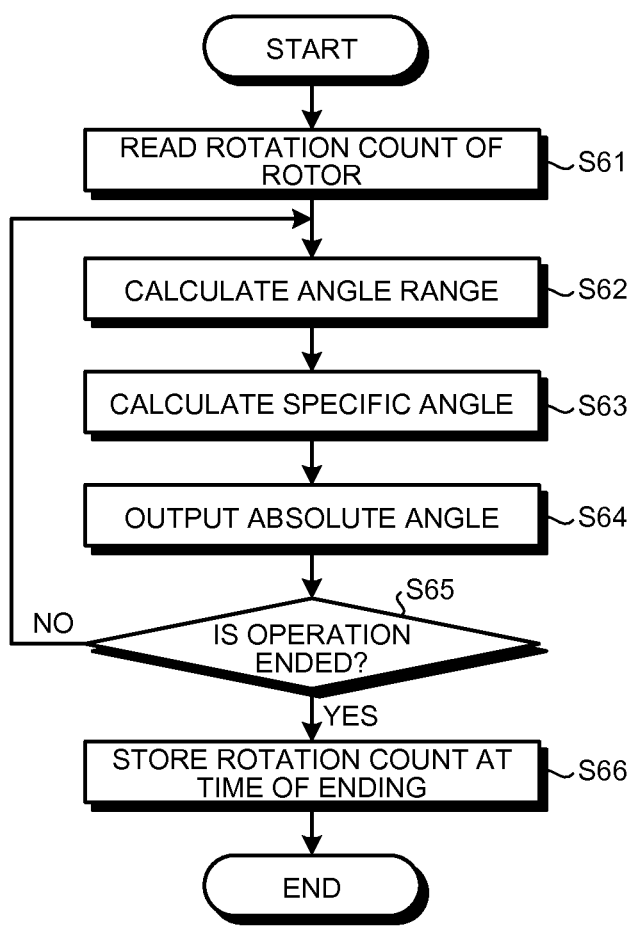

FIG. 110 is a flowchart for explaining the angle detection signal outputs from the encoder according to the nineteenth embodiment.

Figure 111:
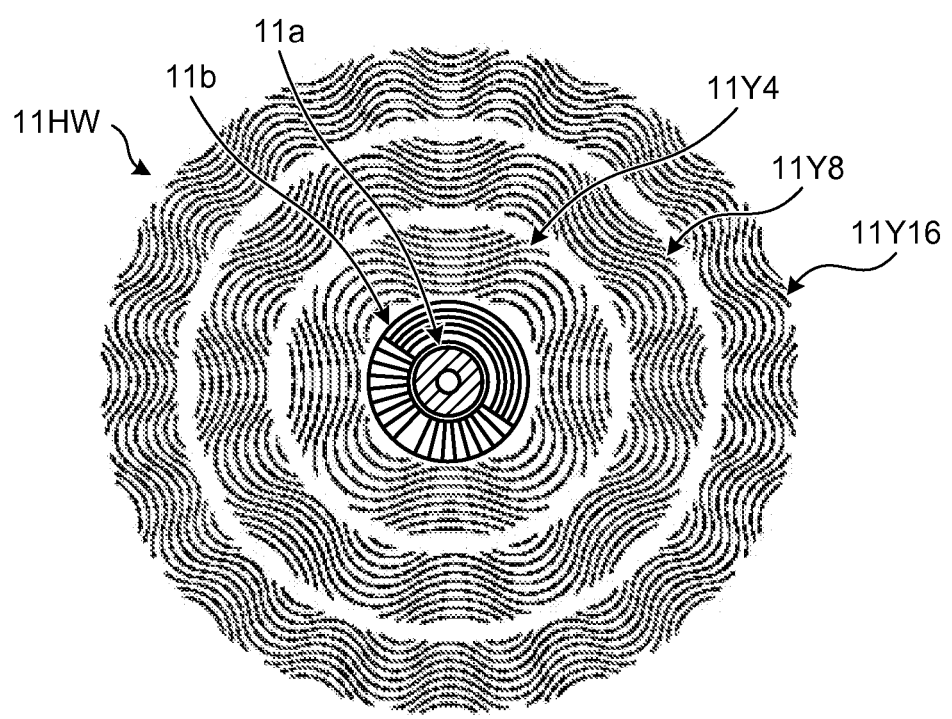

FIG. 111 is a schematic for explaining an optical scale according to a twentieth embodiment of the present invention.

Figure 112:
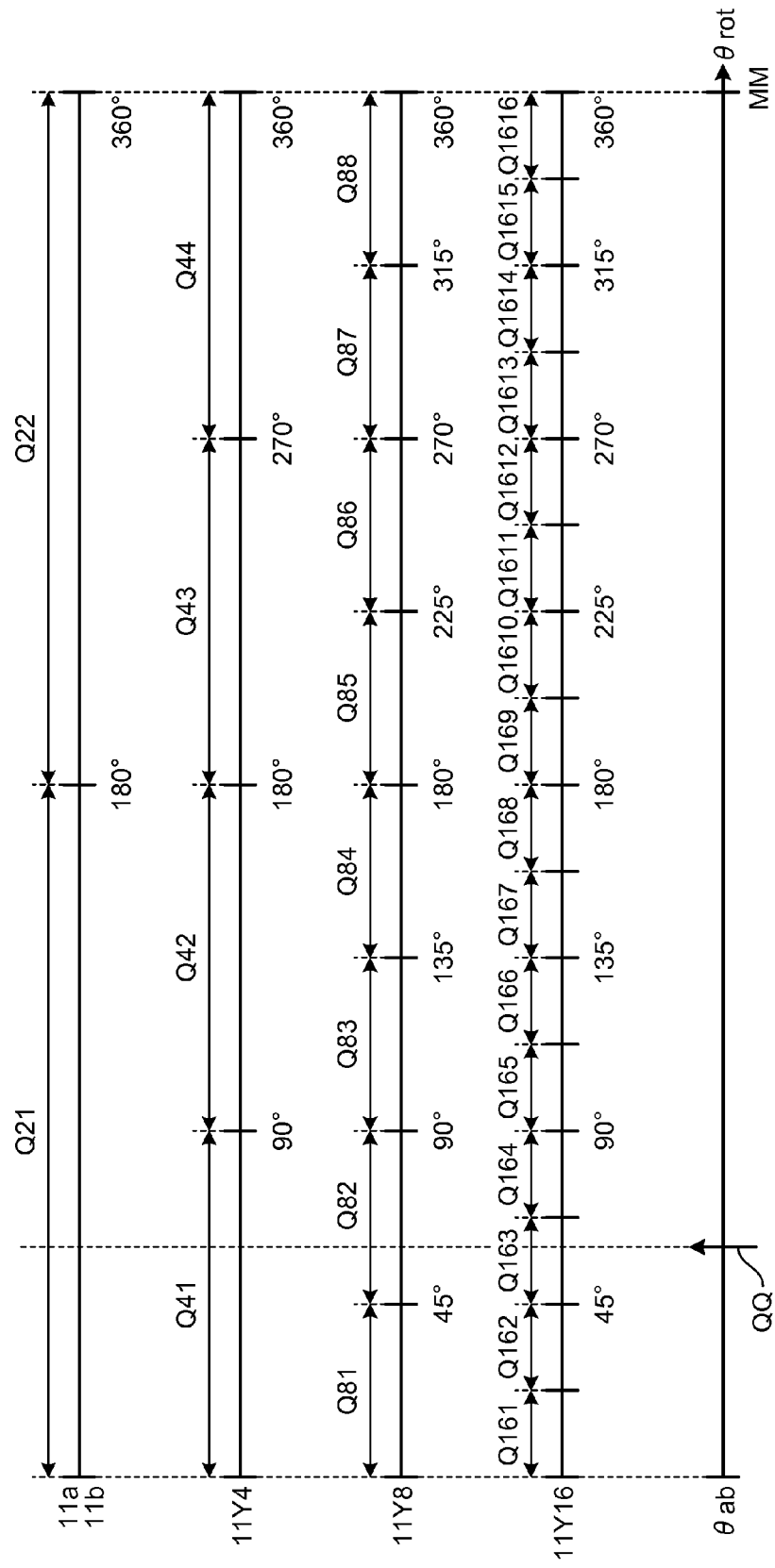

FIG. 112 is a schematic for explaining a relation between a rotation angle and an angle range in the optical scale according to the twentieth embodiment.

Figure 1:
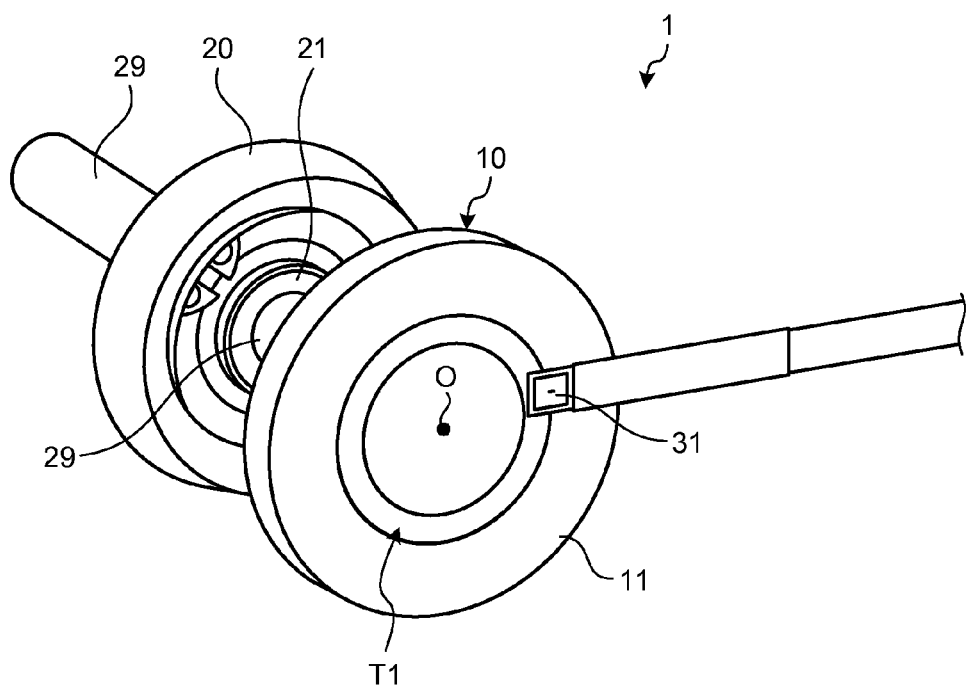
FIG. 1 is a schematic of a structure of an encoder unit according to a first embodiment of the present invention.
Figures 1, 113:
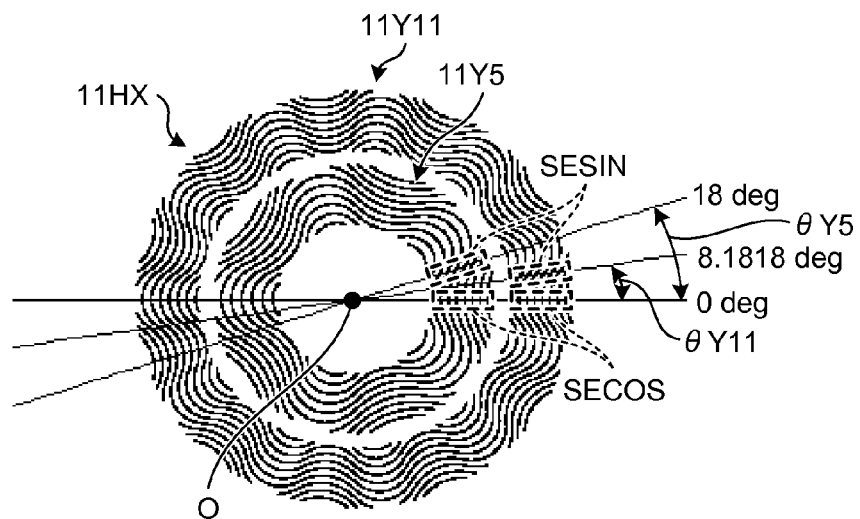
Figures 2, 113:
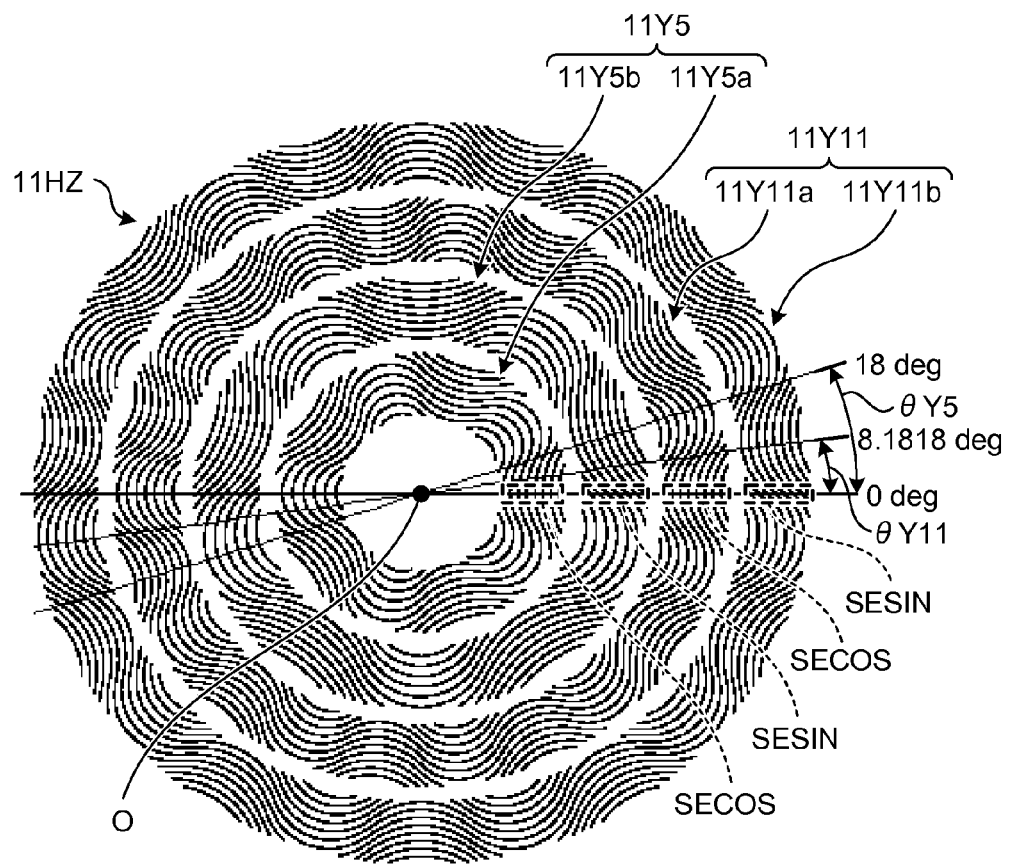

FIG. 113-1 is a schematic for explaining an optical scale according to a twenty-first embodiment of the present invention.

Figures 1, 2:
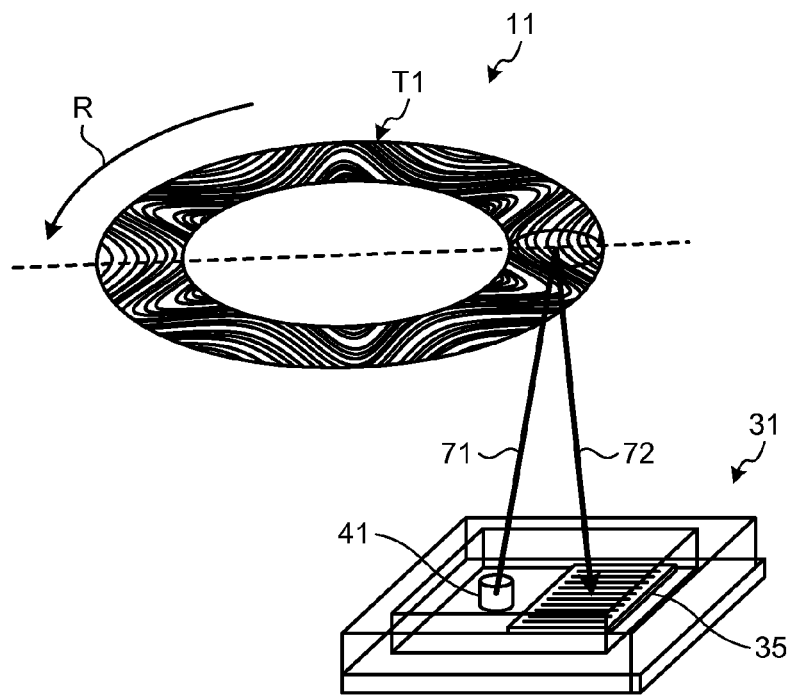
Figure 2:
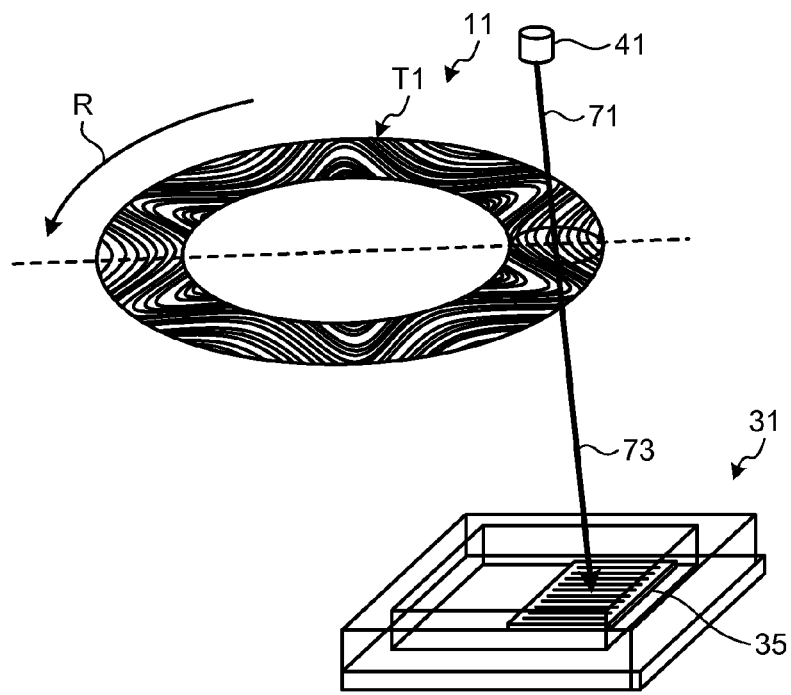

FIG. 113-2 is a schematic for explaining the optical scale according to the twenty-first embodiment.

Figures 1, 114:
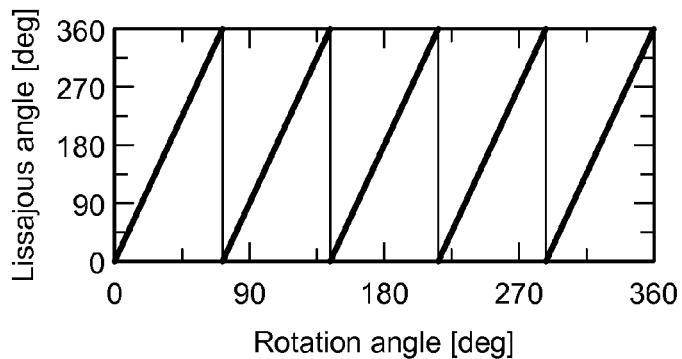
Figures 2, 114:
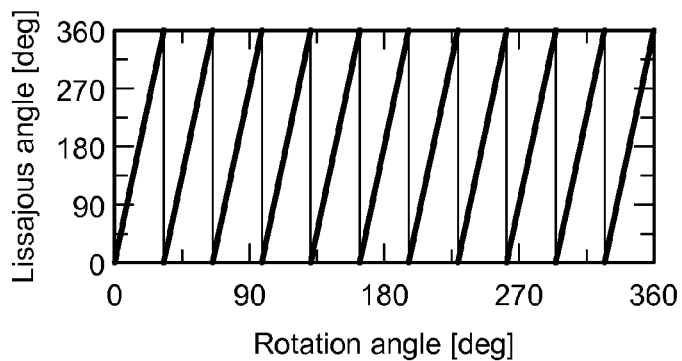
Figures 3, 114:
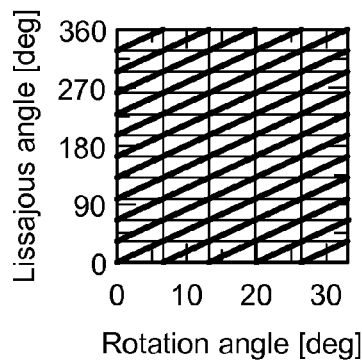
Figures 4, 114:
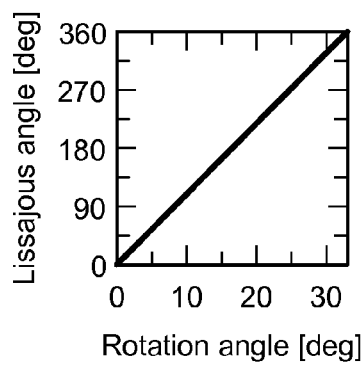

FIG. 114-1 is a schematic for explaining a relation between a rotation angle and a Lissajous angle in the optical scales according to the twenty-first embodiment.

FIG. 114-2 is a schematic for explaining a relation between a rotation angle and a Lissajous angle in the optical scale according to the twenty-first embodiment.

Figure 3:
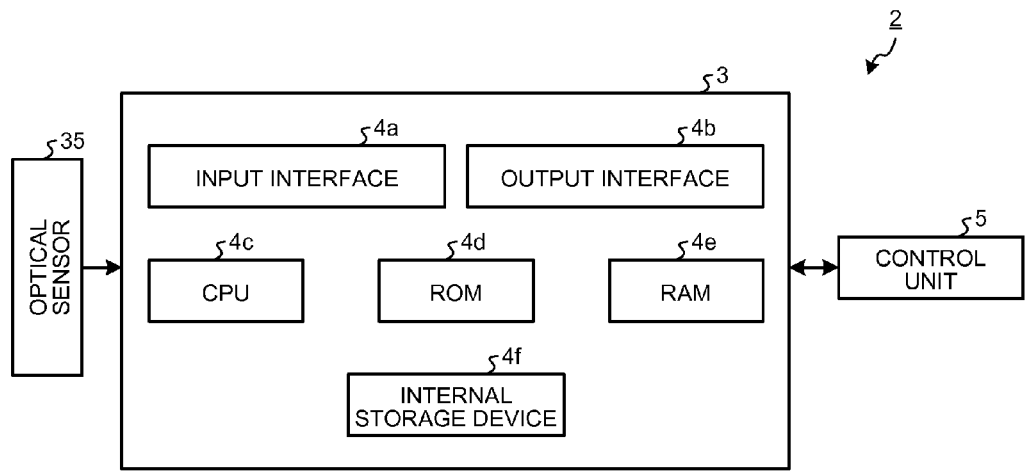
FIG. 3 is a block diagram of the encoder according to the first embodiment.

FIG. 114-3 is a schematic for explaining a relation between a rotation angle and a Lissajous angle in the optical scale according to the twenty-first embodiment.

Figure 4:
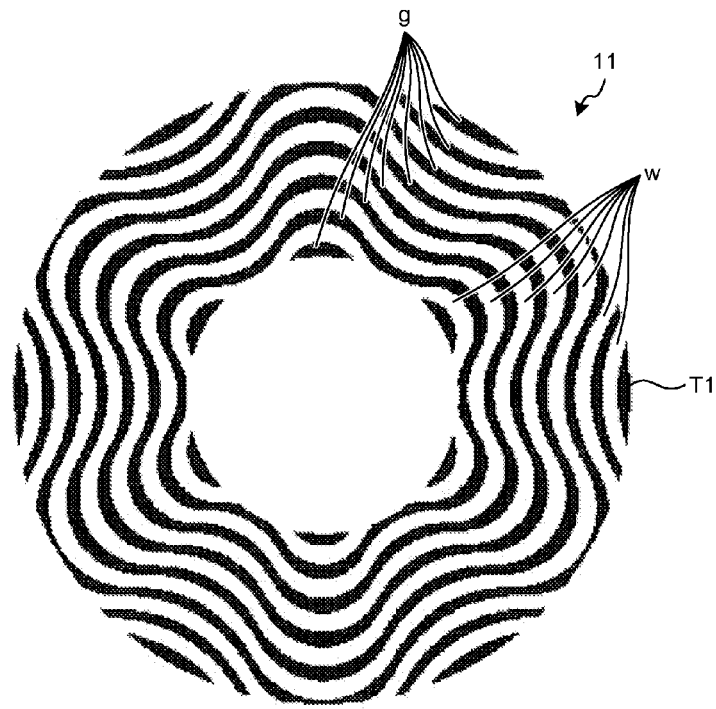
FIG. 4 is a schematic for explaining an example of a wire grid pattern on the optical scale according to the first embodiment.

FIG. 114-4 is a schematic for explaining a relation between a rotation angle and a Lissajous angle in the optical scale according to the twenty-first embodiment.

Figures 1, 115:
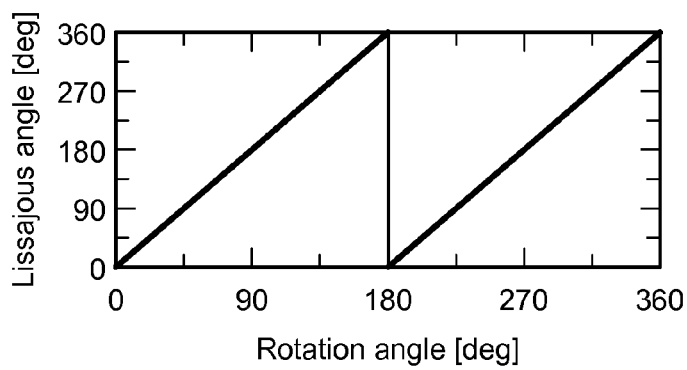
Figures 2, 115:
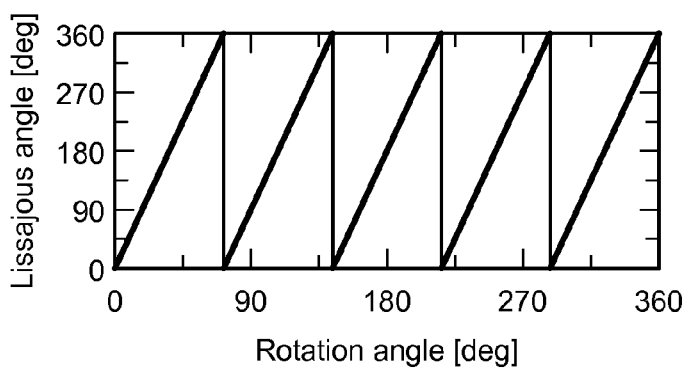
Figures 3, 115:
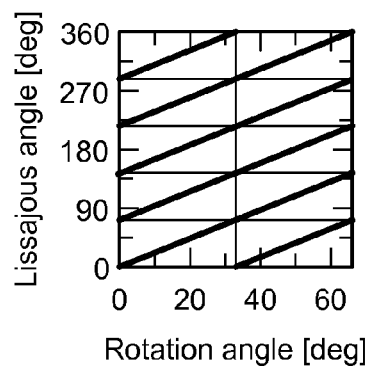
Figures 4, 115:
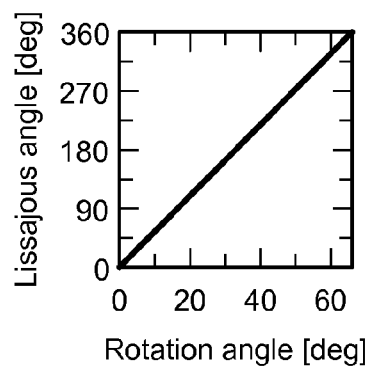

FIG. 115-1 is a schematic for explaining a relation between a rotation angle and a Lissajous angle in the optical scale according to the twenty-first embodiment.

FIG. 115-2 is a schematic for explaining a relation between a rotation angle and a Lissajous angle in the optical scale according to the twenty-first embodiment.

FIG. 115-3 is a schematic for explaining a relation between a rotation angle and a Lissajous angle in the optical scale according to the twenty-first embodiment.

FIG. 115-4 is a schematic for explaining a relation between a rotation angle and a Lissajous angle in the optical scale according to the twenty-first embodiment.

Figures 1, 116:
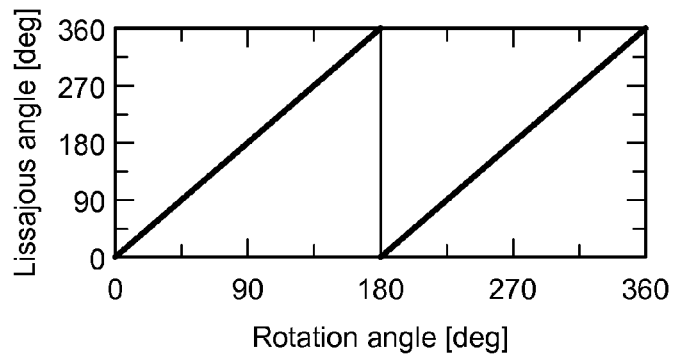
Figures 2, 116:
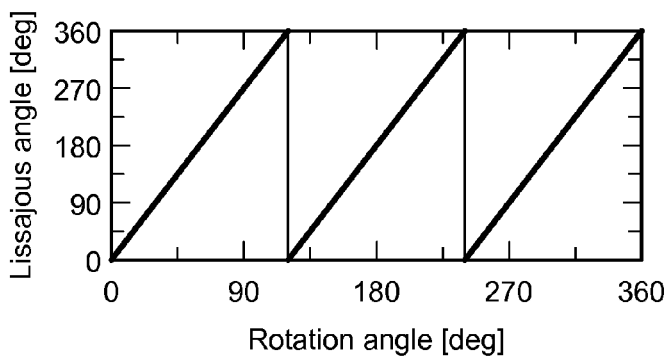
Figures 3, 116:
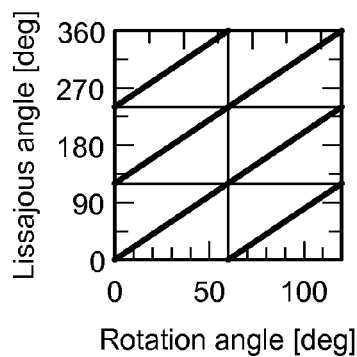
Figures 4, 116:
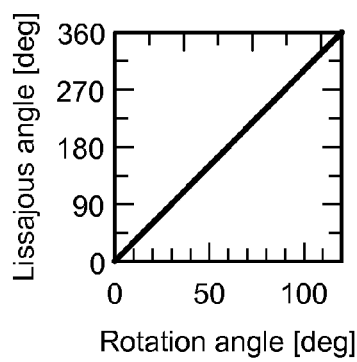

FIG. 116-1 is a schematic for explaining a relation between a rotation angle and a Lissajous angle in the optical scale according to the twenty-first embodiment.

FIG. 116-2 is a schematic for explaining a relation between a rotation angle and a Lissajous angle in the optical scale according to the twenty-first embodiment.

FIG. 116-3 is a schematic for explaining a relation between a rotation angle and a Lissajous angle in the optical scale according to the twenty-first embodiment.

FIG. 116-4 is a schematic for explaining a relation between a rotation angle and a Lissajous angle in the optical scale according to the twenty-first embodiment.

Figures 1, 117:
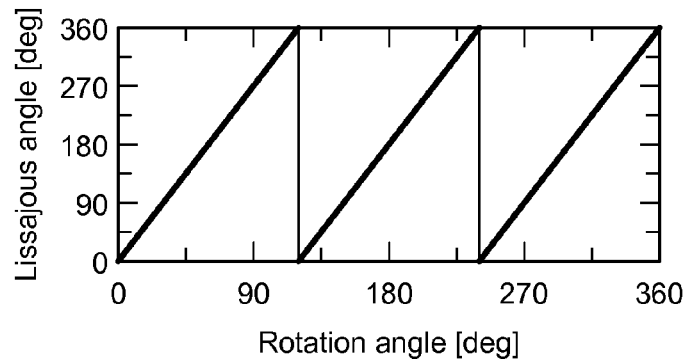
Figures 2, 117:
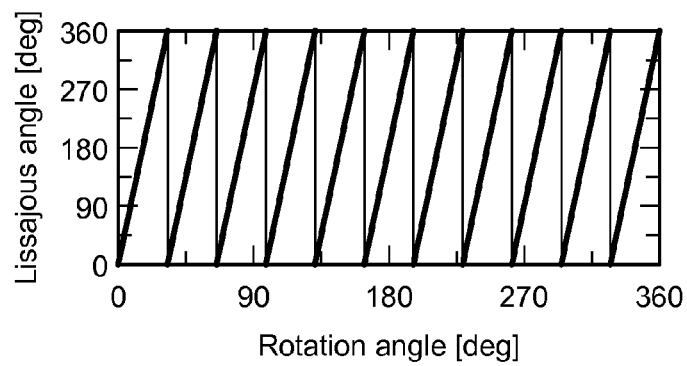
Figures 3, 117:
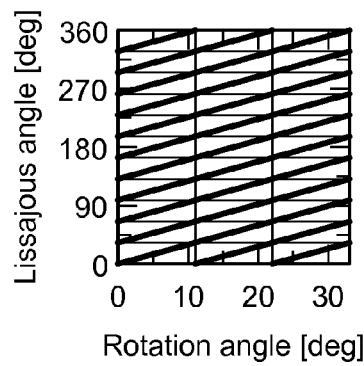
Figures 4, 117:
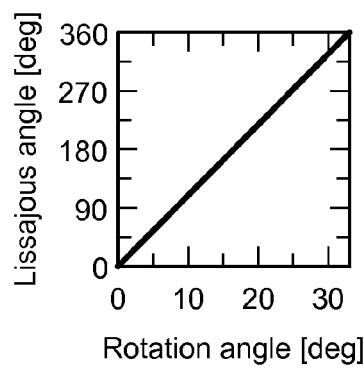

FIG. 117-1 is a schematic for explaining a relation between a rotation angle and a Lissajous angle in the optical scale according to the twenty-first embodiment.

FIG. 117-2 is a schematic for explaining a relation between a rotation angle and a Lissajous angle in the optical scale according to the twenty-first embodiment.

FIG. 117-3 is a schematic for explaining a relation between a rotation angle and a Lissajous angle in the optical scale according to the twenty-first embodiment.

FIG. 117-4 is a schematic for explaining a relation between a rotation angle and a Lissajous angle in the optical scale according to the twenty-first embodiment.

Figures 1, 118:
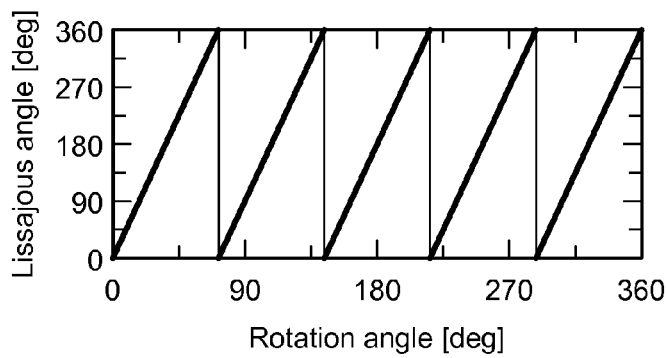
Figures 2, 118:
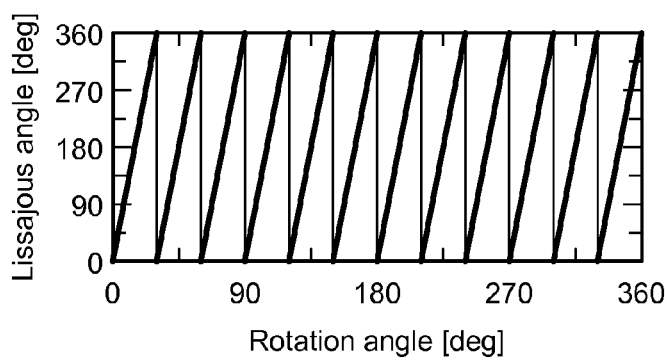
Figures 3, 118:
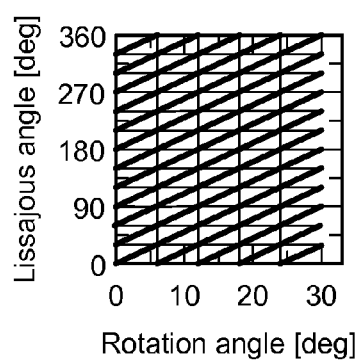
Figures 4, 118:
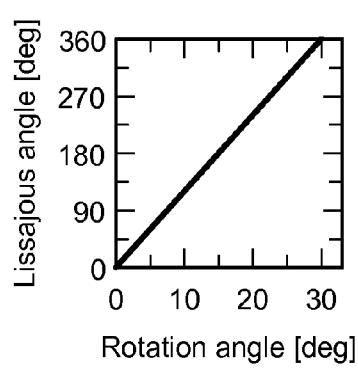

FIG. 118-1 is a schematic for explaining a relation between a rotation angle and a Lissajous angle in the optical scale according to the twenty-first embodiment.

FIG. 118-2 is a schematic for explaining a relation between a rotation angle and a Lissajous angle in the optical scale according to the twenty-first embodiment.

FIG. 118-3 is a schematic for explaining a relation between a rotation angle and a Lissajous angle in the optical scale according to the twenty-first embodiment.

FIG. 118-4 is a schematic for explaining a relation between a rotation angle and a Lissajous angle in the optical scale according to the twenty-first embodiment.

Figures 1, 119:
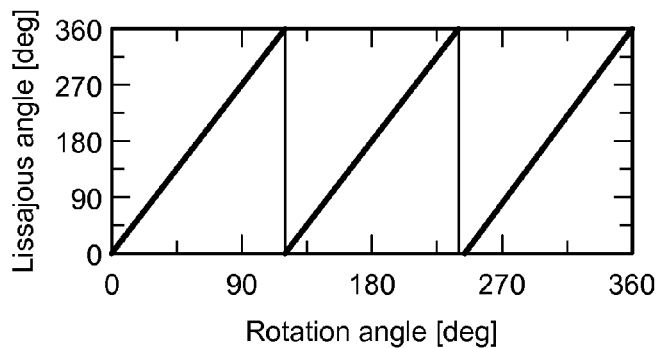
Figures 2, 119:
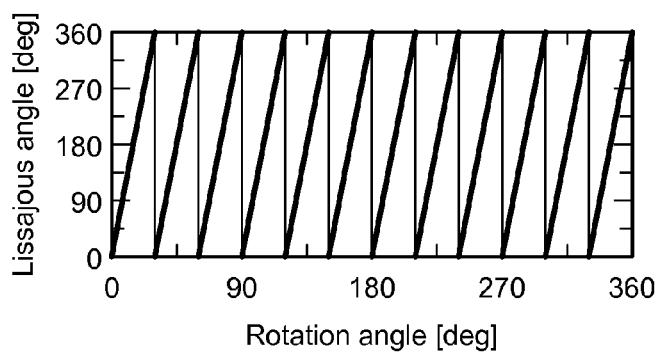
Figures 3, 119:
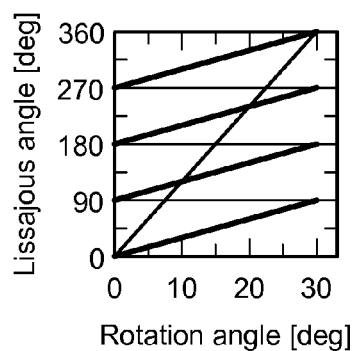
Figures 4, 119:
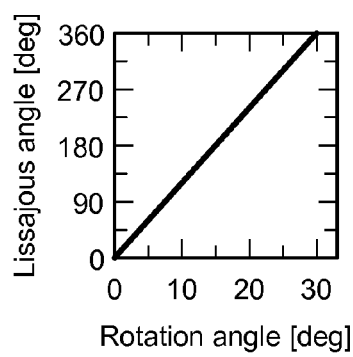

FIG. 119-1 is a schematic for explaining a relation between a rotation angle and a Lissajous angle in an optical scale according to a comparative example.

FIG. 119-2 is a schematic for explaining a relation between a rotation angle and a Lissajous angle in the optical scale according to the comparative example.

FIG. 119-3 is a schematic for explaining a relation between a rotation angle and a Lissajous angle in the optical scale according to the comparative example.

FIG. 119-4 is a schematic for explaining a relation between a rotation angle and a Lissajous angle in the optical scale according to the comparative example.

Figure 120:
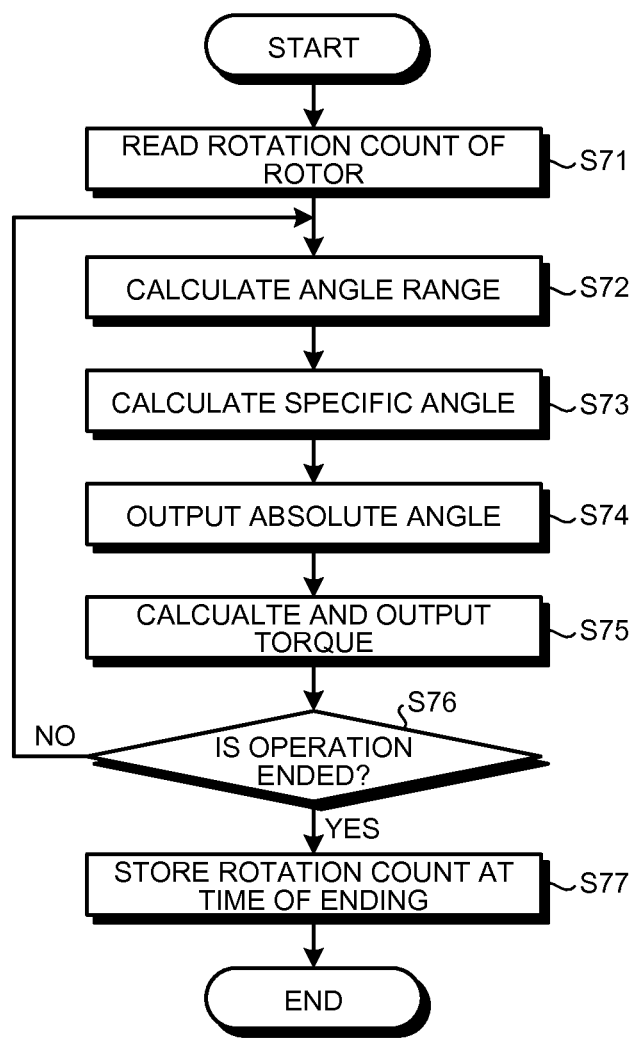

FIG. 120 is a flowchart for explaining an operation of a torque detection apparatus according to a twenty-second embodiment of the present invention.

DESCRIPTION OF EMBODIMENTS

Embodiments of the present invention will now be explained in detail with reference to some drawings. The descriptions in the following embodiments are not intended to limit the scope of the present invention in any way. The elements described hereunder include those that can be easily thought of by those skilled in the art and substantially the same elements. The elements described hereunder may also be combined as appropriate.

First Embodiment

FIG. 1 is a schematic of a structure of an encoder unit according to a first embodiment of the present invention. This encoder unit 1 includes a shaft 29 connected to a rotary machine such as a motor, a stator 20, a rotor 10, and an optical sensor package 31 in which an optical sensor, which is described later, capable of reading a signal pattern is packaged.

The rotor 10 has an optical scale 11 that is a disk-shaped member. The optical scale 11 is made of silicon, glass, or a polymer material, for example. The optical scale 11 has signal tracks T1 on one or both of the disk surfaces. The shaft 29 is mounted on the opposite surface of the rotor 10 on which the optical scale 11 is mounted.

The stator 20 is fixed independently of the shaft 29 and the rotor 10. The stator 20 has a bearing 21. The stator 20 supports the shaft 29 rotatably via the bearing 21. When the shaft 29 is rotated by the rotation of the motor, the rotor 10 is caused to rotate in association with the shaft 29 about a center O as an axial center. The optical sensor package 31 is fixed to the stator 20 via a housing. When the rotor 10 is rotated, the signal tracks T1 on the optical scale 11 move relatively to the optical sensor package 31.

FIG. 2-1 is a schematic for explaining an arrangement of the optical scale and the optical sensor. When the rotor 10 described above is rotated, the signal tracks T1 on the optical scale 11 move relatively to the optical sensor package 31 in a direction R, for example. The optical sensor package 31 includes an optical sensor 35 capable of reading the signal tracks T1 on the optical scale 11 and a light source 41. The light source light 71 from the light source 41 is reflected on the signal tracks T1 on the optical scale 11, and the optical sensor 35 detects the reflected light 72 thus reflected as incident light. The encoder unit 1 according to the first embodiment may include an arrangement of a transmissive optical scale and optical sensor, without limitation to that of the reflective optical scale and the optical sensor described above.

FIG. 2-2 is a schematic for explaining an exemplary modification of the arrangement of the optical scale and the optical sensor. When the rotor 10 is rotated, the signal tracks T1 on the optical scale 11 move relatively to the optical sensor package 31 in the direction R, for example. As illustrated in FIG. 2-2, in the transmissive modification, the optical sensor package 31 includes the optical sensor 35 capable of reading the signal tracks T1 on the optical scale 11. The light source 41 is arranged at a position facing the optical sensor 35 across the optical scale 11. With this structure, the light source light 71 from the light source 41 is passed through the signal tracks T1 on the optical scale 11, and the optical sensor 35 detects the transmissive light 73 thus passed through as the incident light.

FIG. 3 is a block diagram of the encoder according to the first embodiment. The encoder 2 includes the encoder unit 1 and a computing unit 3. As illustrated in FIG. 3, the optical sensor 35 included in the encoder unit 1 is connected to the computing unit 3. The computing unit 3 is connected to a control unit 5 of the rotary machine such as a motor.

The encoder 2 uses the optical sensor 35 to detect the reflected light 72 or the transmissive light 73 which is the light source light 71 passed through or reflected on the optical scale 11 and becoming incident on the optical sensor 35. The computing unit 3 computes a relative position of the rotor 10 included in the encoder unit 1 with respect to the optical sensor package 31, from the detection signal from the optical sensor 35. The computing unit 3 then outputs the information of the relative position to the control unit 5 of the rotary machine such as a motor as a control signal.

The computing unit 3 is a computer such as a personal computer (PC), and includes an input interface 4a, an output interface 4b, a central processing unit (CPU) 4c, a read-only memory (ROM) 4d, a random access memory (RAM) 4e, and an internal storage device 4f. The input interface 4a, the output interface 4b, the CPU 4c, the ROM 4d, the RAM 4e, and the internal storage device 4f are connected via an internal bus. The computing unit 3 may be configured as a dedicated processing circuit.

The input interface 4a receives an input signal from the optical sensor 35 included in the encoder unit 1, and outputs the input signal to the CPU 4c. The output interface 4b receives a control signal from the CPU 4c, and outputs the control signal to the control unit 5.

The ROM 4d stores therein computer programs such as a basic input/output system (BIOS). The internal storage device 4f is a hard disk drive (HDD) or a flash memory, for example, and stores therein an operating system program and application programs. The CPU 4c implements various functions by executing the computer programs stored in the ROM 4d or in the internal storage device 4f, using the RAM 4e as a working area.

The internal storage device 4f stores therein a database in which a polarization axis of the optical scale 11, which is described later, is associated with an output of the optical sensor 35.

FIG. 4 is a schematic for explaining an example of a wire grid pattern on the optical scale according to the first embodiment. The signal tracks T1 illustrated in FIG. 4 is made of an arrangement of wires g, which is referred to as a wire grid pattern, formed on the optical scale 11 illustrated in FIG. 1.

The wire g is arranged in plurality, in such a manner that the wires do not intersect with one another, and in such a manner that each of the tangential directions of the respective wires changes continuously. Provided between the adjacent wires g is a transmissive area w through which the entire or a part of the light source light 71 is allowed to pass. When the width of the wire g and the pitch between the adjacent wires g, that is, the width of the wire g and the width of the transmissive area w, are made sufficiently smaller than the wavelength of the light source light 71 from the light source 41, the optical scale 11 can polarize the reflected light 72 or the transmissive light 73 of the light source light 71.

This structure allows the polarization of the transmissive light 73 or the reflected light 72 to change correspondingly to the tangential directions of the respective wires, which are dependent on the position where the light source light 71 output to the optical scale 11 is passed through or is reflected. Therefore, the optical scale 11 does not need to be provided with highly granular segments each having a different polarizing direction. As a result, the optical scale 11 allows a high resolution to be achieved even when the size of the optical scale is reduced. When the size of the optical scale 11 is reduced, the arrangement of the light source 41 and the optical sensor 35 can be designed more freely. Furthermore, the optical scale 11 can have a higher heat resistance than that of a photo-induced polarizer. Because the optical scale 11 has a line pattern without any intersections even locally, a highly accurate optical scale with a smaller error can be achieved. Furthermore, because the optical scale 11 can be stably manufactured through a bulk-exposure or nanoimprinting, highly accurate optical scales with small error can be achieved.

Figure 5:
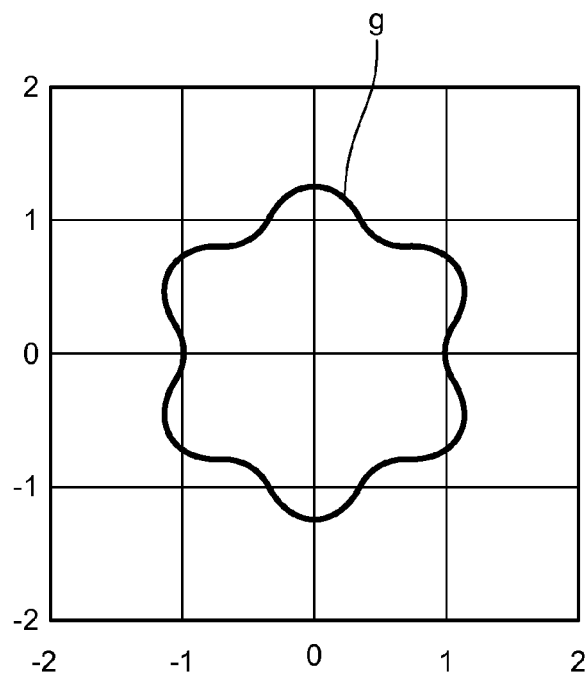
FIG. 5 is a schematic for explaining an example of the wire pattern according to the first embodiment.
Figure 6:
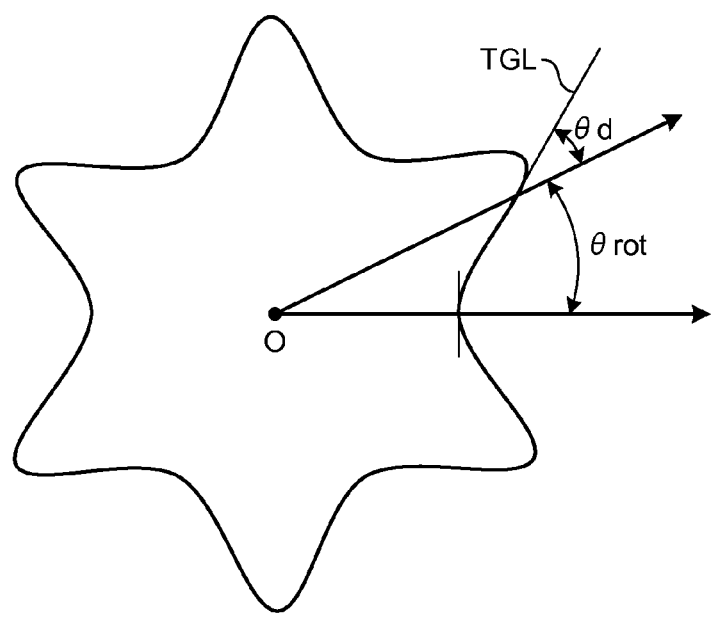
FIG. 6 is a schematic for explaining a relation between a rotation angle and a polarization axis direction in the optical scale according to the first embodiment.
Figures 1, 74:
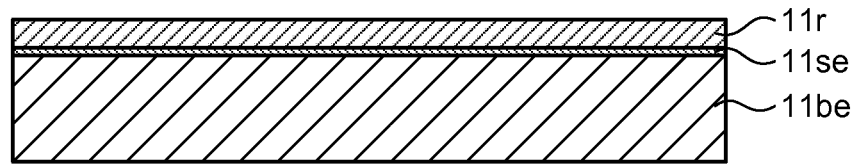
Figures 2, 74:
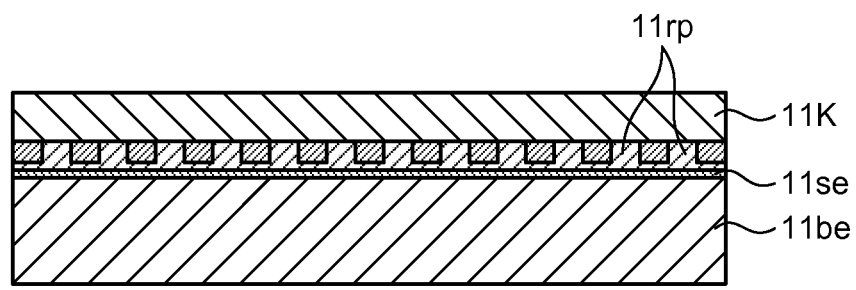
Figures 3, 74:
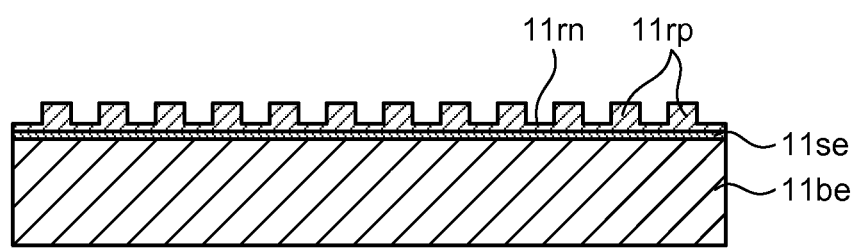
Figures 4, 74:
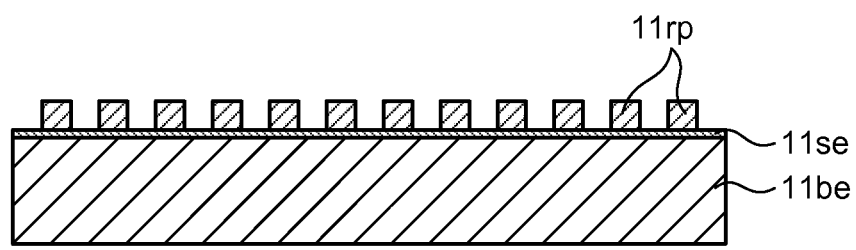
Figures 5, 74:
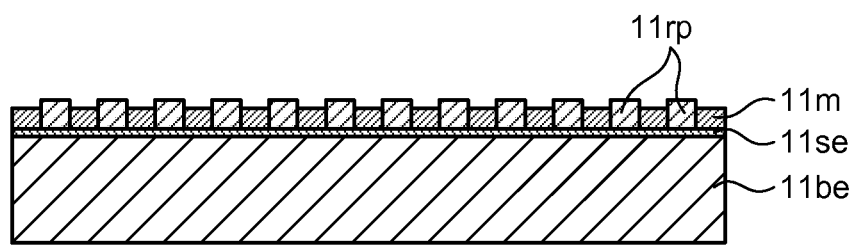
Figures 6, 74:
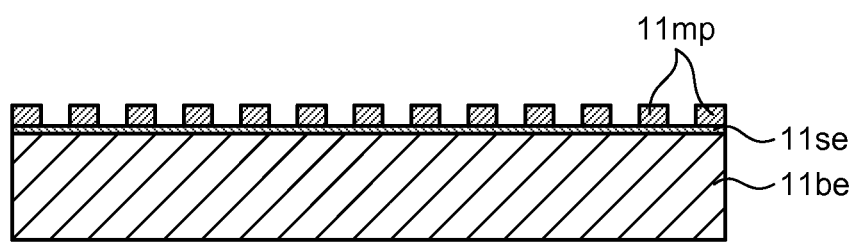
Figures 7, 74:
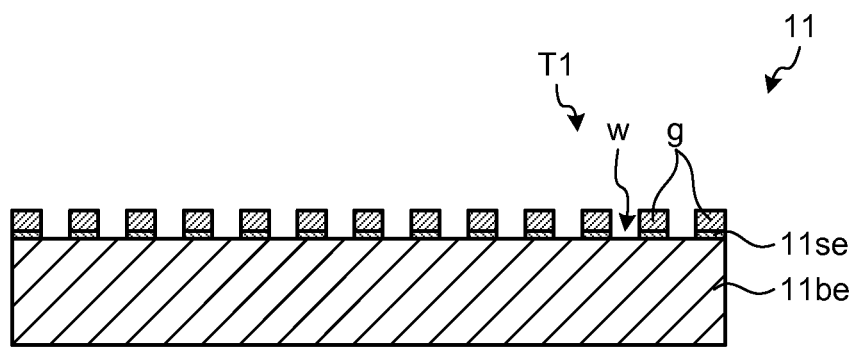

FIG. 5 is a schematic for explaining an example of the wire pattern according to the first embodiment. As the wires g, the pattern illustrated in FIG. 5 is arranged in plurality at different distances from the coordinates (0, 0), but arranged so that the tangential directions of the respective wires g are orientated the same. Each of such patterns is cut out as a donut-like shape, as illustrated in FIG. 4. FIGS. 6 and 7 are schematics for explaining a relation between a rotation angle and a polarization axis direction in the optical scale according to the first embodiment. In FIG. 6, θrot denotes a rotation angle, and θd denotes a change in an angle of the tangent on the wire with respect to the moving radius direction, that is, a change in an angle of the tangent line TGL along the tangential direction detected by the optical sensor package 31. When the rotation angle is 360 degrees, that is, when the signal tracks T1 are rotated once, θd changes as illustrated in FIG. 7. In the pattern of the wire g illustrated in FIG. 5, for example, when the rotation angle θrot changes from 0 degrees to 15 degrees, the tangential angle θd changes from 90 degrees to 45 degrees. In the same manner, for example, when the rotation angle θrot changes from 15 degrees to 30 degrees, the tangential angle θd changes from 45 degrees to 90 degrees. In this manner, the optical scale 11 allows the tangential angle θd to change in a cyclic manner, correspondingly to the rotation angle θrot. As illustrated in FIG. 7, a jump in the tangential angle θd occurs every time there is a 30-degree change in the rotation angle θrot. The computing unit 3 can handle such tangential angles θd corresponding to every 30-degree change in the rotation angle θrot as the same tangential direction (polarization axis). Explained so far is an example in which the amount of the change in the tangential angle θd is 45 degrees, but the embodiment is not limited thereto, and the amount of the change in the tangential angle θd may be less than 45 degrees, for example.

Figures 1, 8:
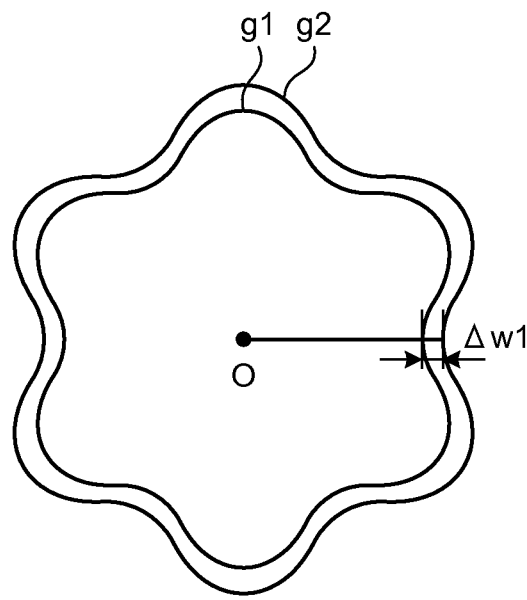
Figures 2, 8:
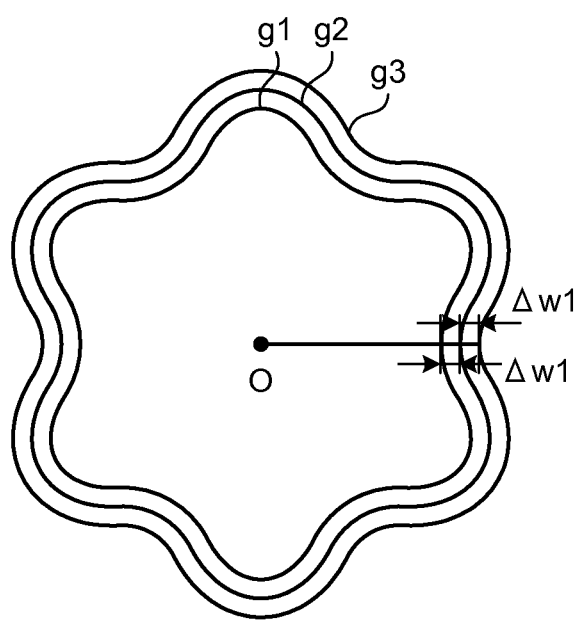
Figures 1, 9:
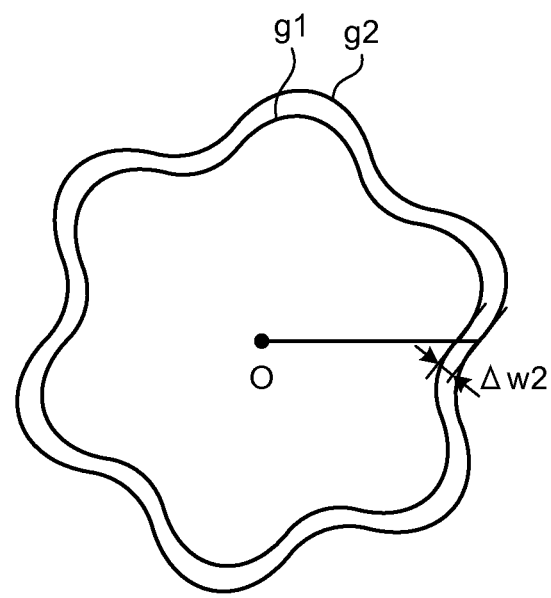
Figures 2, 9:
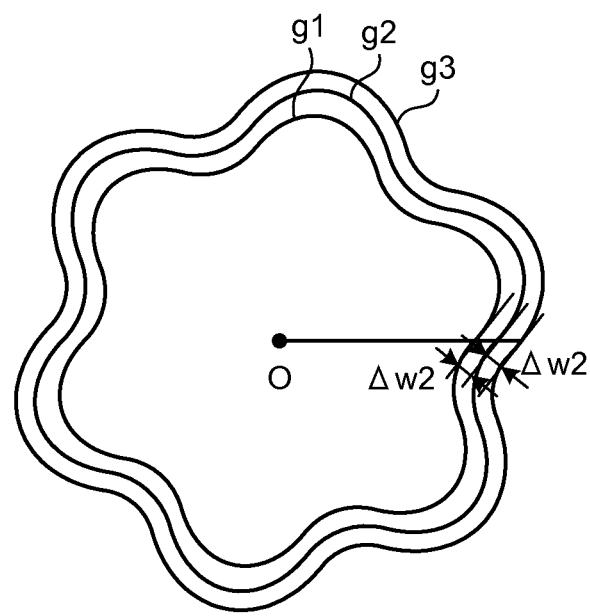

FIGS. 8-1, 8-2, 9-1, 9-2, 10-1, and 10-2 are schematics for explaining the wire grid pattern on the optical scale according to the first embodiment. In the wire grid pattern according to the embodiment, to allow a polarization axis to be detected based on θd which is the tangential angle, adjacent wires g1 and g2 are changed continuously while maintaining the same tangential angle. As illustrated in FIGS. 8-1 and 9-1, the wire grid pattern according to the embodiment is provided in such a manner that the width Δw1 and the width Δw2 of the transmissive area are different between positions where the tangential directions are different.

For example, the width Δw1 of the transmissive area where the adjacent wires g1 and g2 are curved, as illustrated in FIG. 8-1, is set wider than the width Δw2 of the transmissive area illustrated in FIG. 9-1. Such a configuration allows a plurality of wires to be arranged easily in a manner allowing each of the tangential directions to change continuously. The adjacent wires g1 and g2 form a wire grid pattern illustrated in FIG. 10-1. By arranging the adjacent wires g at the same regularity, the signal tracks T1 forming the wire grid pattern illustrated in FIG. 4 can be achieved.

In the wire grid pattern according to the embodiment illustrated in FIGS. 8-2 and 9-2, the center line of each of the wires g illustrated in FIG. 4 is indicated. In the wire grid pattern according to the embodiment, to allow a polarization axis to be detected based on θd which is the tangential angle, the adjacent wires g1 and g2 are changed continuously while maintaining the same tangential angle. In the wire grid pattern, the adjacent wires g2 and g3 are also changed continuously while maintaining the same tangential angle. The reference point of the tangential angle of the wires g1, g2, and g3 is the center O of the rotor 10 (the position corresponding to (0, 0) in FIG. 5), as mentioned earlier.

As illustrated in FIG. 8-2, the pitch Δw1 (interval) between the center lines of the adjacent wires g1 and g2 in the radial direction is the same as the pitch Δw1 between the center lines of the adjacent wires g2 and g3. As illustrated in FIG. 9-2, the pitch Δw2 between the center lines of the adjacent wires g1 and g2 in the radial direction is the same as the pitch Δw2 between the center lines of the adjacent wires g2 and g3. This configuration allows the wire g1, the wire g2, and the wire g3 to have the same tangential angle with respect to the same radial direction of the wire g1, the wire g2, and the wire g3.

The wires g1, g2, and g3 are arranged in a manner not intersecting one another, and in such a manner that each of the tangential directions changes continuously. As a result, at the positions where the tangential angles are oriented differently (at positions of different radial directions), the wires g1, g2, and g3 are arranged so that the pitch Δw1 illustrated in FIG. 8-2 becomes different from the pitch Δw2 illustrated in FIG. 9-2, for example. For example, the pitch Δw1 in the area where the adjacent wires g1 and g2 are curved (wound), as illustrated in FIG. 8-2, is set wider than the pitch Δw2 illustrated in FIG. 9-2. In this manner, the tangential directions of the respective adjacent wires g1, g2, and g3 are oriented the same between areas where the respective pitches Δw1 (interval) between the wires are the same, while the tangential directions on the wires g1, g2, and g3 are oriented differently between the areas where the respective pitches Δw2 (interval) and pitch Δw1 (interval) are different. Such a configuration allows a plurality of wires to be arranged easily in a manner allowing each of the tangential directions to change continuously.

Figures 1, 10:
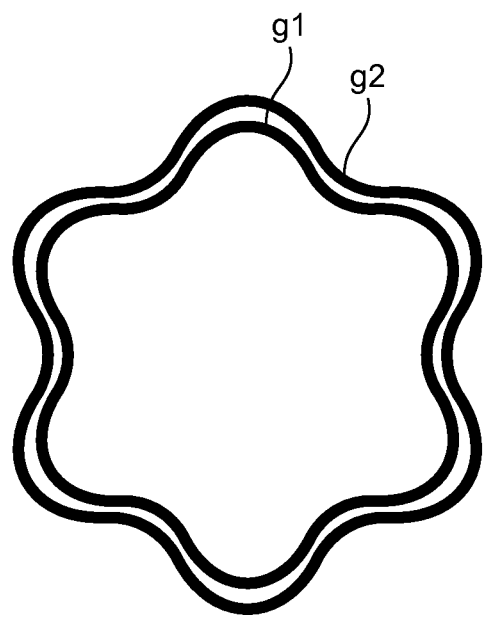
Figures 2, 10:
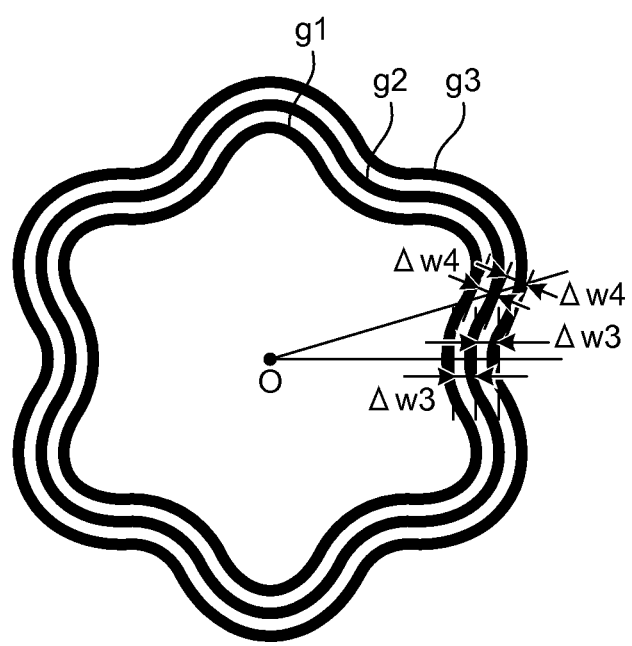

The pitch of the wires may be defined as an interval between the edges of the adjacent wires g1 and g2, as illustrated in FIG. 10-2. Along the same radial direction, the pitch (interval) Δw3 between edges of the adjacent wires g1 and g2 remains the same as the pitch Δw3 between the edges of the adjacent wires g2 and g3. Along the radial direction, the pitch Δw4 between the edges of the adjacent wires g1 and g2 remains the same as the pitch Δw4 between the edges of the adjacent wires g2 and g3. In this manner, along the same radial direction across the wires g1, g2, and g3, the tangential angles of the respective wires g1, g2, and g3 are kept the same.

The wires g1, g2, and g3 are arranged in a manner not intersecting one another, and in such a manner that each of the tangential directions changes continuously. As a result, the wire grid pattern according to the embodiment is arrangement in such a manner that, the pitch Δw3 and the pitch Δw4 illustrated in FIG. 10-2, for example, are different between the areas where the tangential angles of the wires are different. The pitch Δw3 as illustrated in FIG. 10-2 in the area where the adjacent wires g1 and g2 are curved (wound) is set wider than the pitch Δw4 in the area where the wires g1 and g2 are linear. Such a configuration allows a plurality of wires to be arranged easily in a manner allowing each of the tangential directions to change continuously.

As explained above, by arranging the wires g1, g2, and g3 at the same regularity, the signal tracks T1 having the wire grid pattern illustrated in FIG. 4 can be achieved. Each of the wires g illustrated in FIG. 4 is based on a closed curve, and is arranged so that the pitch (interval) of the adjacent wires g remains the same along the same radial direction with the reference point at the center O. Furthermore, because each of the wires g on the optical scale 11 can be manufactured as a continuous pattern, the optical scale 11 can be formed using a simple line-and-space pattern. Therefore, accuracy of the photolithography process, for example, can be improved. As a result, the optical scale 11 can be produced as a highly accurate scale. Furthermore, when the wires g are arranged to have an equal pitch (interval) between the adjacent wires g along the same radial direction with a reference point at the center O, the pitch (interval) of the adjacent wires g, that is, the line-and-space ratio between the wires g1, g2, and g3, may not be one to one, but changed as appropriate depending on the positions, as long as such positions are at different radial directions with the reference point at the center O. In this manner, the optical scale 11 can correct the polarization ratio by changing the line width ratio.

Figures 1, 11:
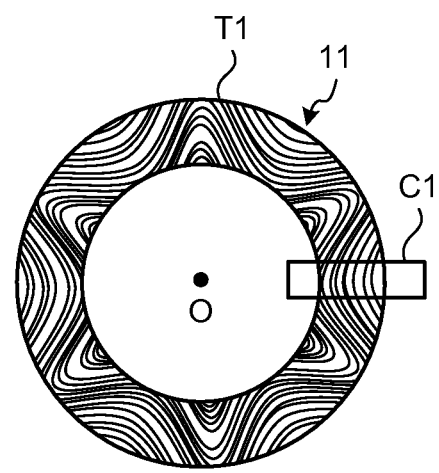
Figures 2, 11:
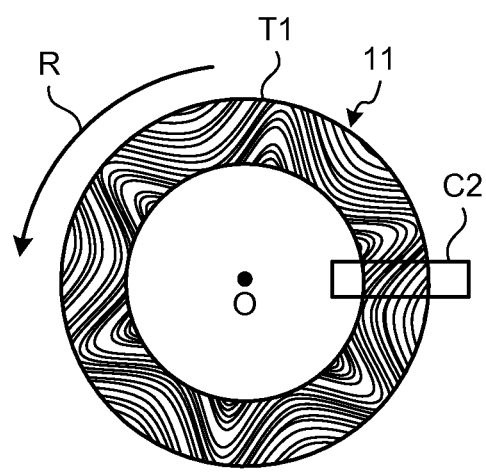
Figures 3, 11:
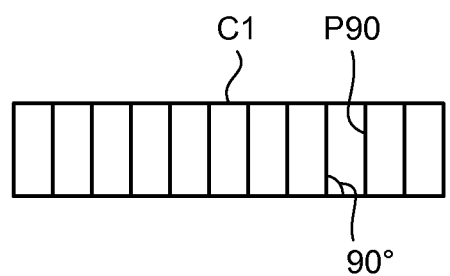
Figures 4, 11:
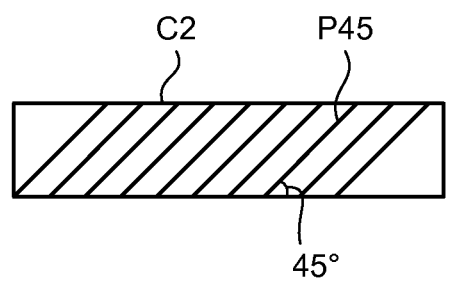

FIGS. 11-1, 11-2, 11-3, and 11-4 are schematics for explaining a detection area of the optical scale according to the first embodiment. In FIG. 11-1, the optical sensor 35 detects the polarization axis based on the wire grid pattern of the signal tracks T1 in a sensing area C1. In FIG. 11-2, the optical sensor 35 detects the polarization axis based on the wire grid pattern of the signal tracks T1 in a sensing area C2. The sensing area herein means an area where the light source light is passed through or reflected on the optical scale 11.

As illustrated in FIGS. 11-1 and 11-2, as the optical scale 11 is rotated in the direction R, the sensing area of the signal tracks T1 on the optical scale is changed. As mentioned earlier, a plurality of wires are arranged in such a manner that each of the tangential directions changes continuously, as the signal tracks T1 on the optical scale 11. In other words, as mentioned earlier, in the sensing area C1, the adjacent wires g of the signal tracks T1 are arranged at an equal interval. In the sensing area C2 as well, the adjacent wires g are arranged at an equal interval.

The interval between the adjacent wires g in the sensing area C1 may be different from that in the sensing area C2. In other words, the intervals between the adjacent wires g are different at the positions where the tangential directions are oriented differently. The light source light 71 output to the wires g becomes the reflected light 72 or the transmissive light 73 having its polarization axis changed correspondingly to the tangential direction of the wires g.

FIG. 11-3 indicates that the direction P90 of the pattern in the sensing area C1 illustrated in FIG. 11-1 is +90 degrees, for example. FIG. 11-4 indicates that the direction P45 of the pattern in the sensing area C2 illustrated in FIG. 11-2 is +45 degrees. The polarization axis of the incident light that is incident on the optical sensor 35 changes as the optical scale 11 is rotated, because the tangential angle of the wire grid pattern changes. Therefore, the rotation of the optical scale 11 can be recognized by detecting a change in the polarization axis. Explained now is the optical sensor 35 according to the first embodiment serving as a polarization splitting unit by detecting a change in the polarization axis.

Figures 1, 12:
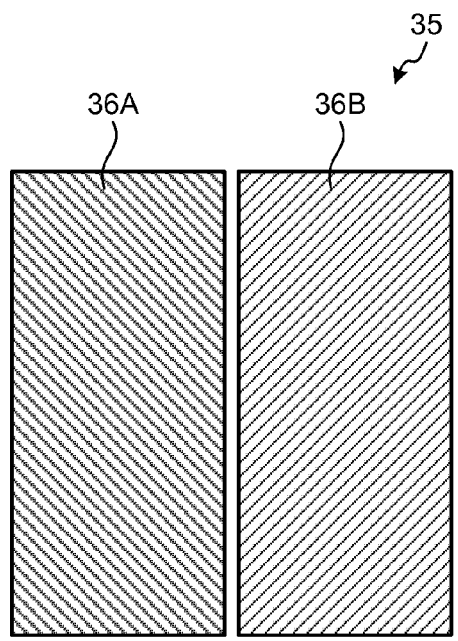
Figures 2, 12:
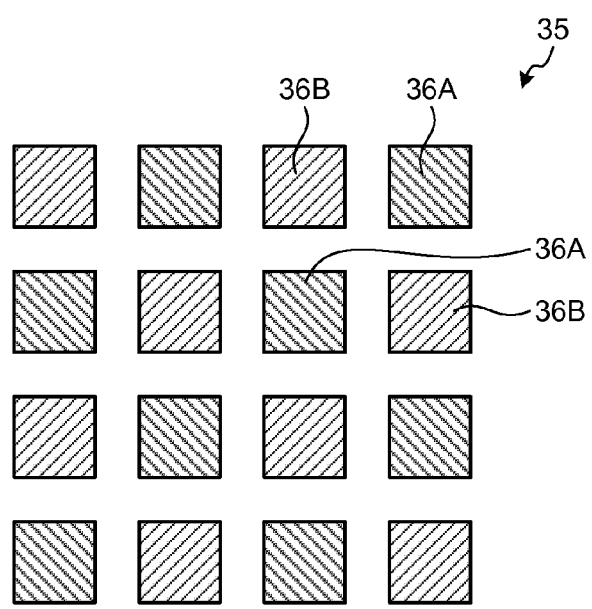

FIGS. 12-1 and 12-2 are schematics for explaining the optical sensor according to the first embodiment. As illustrated in FIG. 12-1, the optical sensor 35 includes a first optical sensor 36A and a second optical sensor 36B. The first optical sensor 36A includes a first polarizing layer that splits incident light into light with a first polarization direction, and a first photoreceiver for receiving first polarized light split by the first polarizing layer, and is capable of detecting the intensity of light with the first polarization direction. The second optical sensor 36B includes a second polarizing layer that splits the incident light into light with a second polarization direction, and a second photoreceiver for receiving second polarized light split by the second polarizing layer, and is capable of detecting the intensity of light with the second polarization direction.

This structure enables the incident light to split into the first polarized light and the second polarized light. As a result, the computing unit 3 can calculate the polarization angle of the reflected light 72 or the transmissive light 73 based on signal intensities of the polarized component having the first polarization direction and of the polarized component having the second polarization direction thus split. The first polarization direction and the second polarization direction are preferably different from each other by 90 degrees to allow the computing unit 3 to calculate the polarization angle easily.

As illustrated in FIG. 12-2, the first optical sensor 36A and the second optical sensor 36B may be arranged alternatingly in the vertical and the horizontal directions on the optical sensor 35. With this configuration, even when a foreign substance blocks a part of the sensing area, the chances of the first optical sensor 36A and the second optical sensor 36B being blocked by approximately the same degree can be increased, so that the possibility of the signal intensity output from one of these sensors dropping extremely can be reduced. Therefore, even when the intensity of the incident light is decreased by a foreign substance, the encoder 2 can detect a change in the polarization direction via a differential signal V, which is described later, in a manner less affected by foreign substances.

Figures 1, 13:
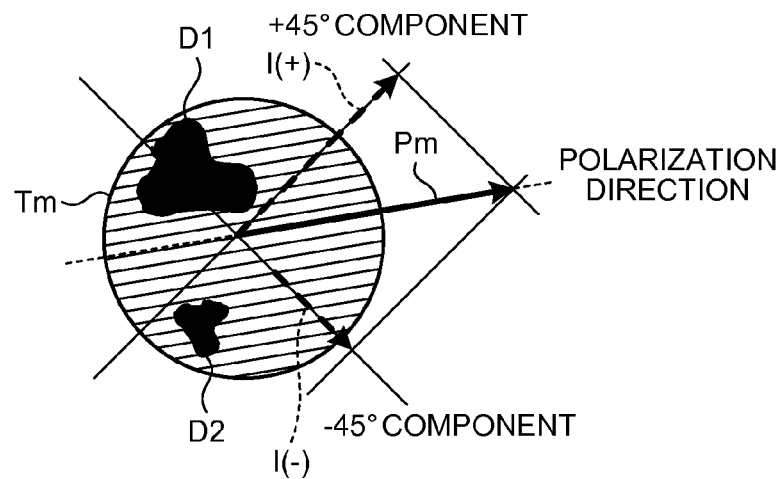
Figures 2, 13:
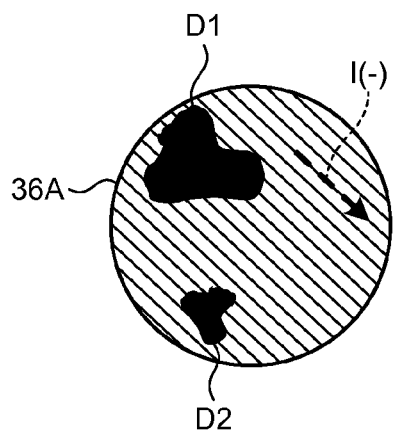
Figures 3, 13:
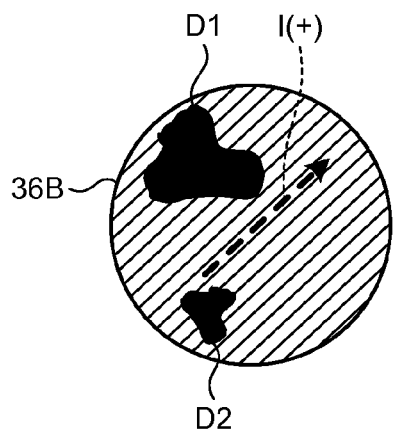

FIGS. 13-1, 13-2, and 13-3 are schematics for explaining splitting of incident light into polarized components in the optical sensor according to the first embodiment. As illustrated in FIG. 13-1, the light source light 71 polarized to a polarization direction Pm by the optical scale 11 becomes incident on a sensing area Tm of the optical sensor 35. In FIG. 13-1, a foreign substance D1 and a foreign substance D2 are present in the sensing area Tm of the optical sensor 35. The polarization direction Pm of the incident light can be expressed by a signal intensity I(−) of the component having the first polarization direction and a signal intensity I(+) of the component having the second polarization direction. The first polarization direction and the second polarization direction are preferably different by 90 degrees, and these components are, for example, +45 degrees component and −45 degrees component with respect to a reference direction.

As illustrated in FIG. 13-2, the first optical sensor 36A detects the light intensity passed through the first polarizing layer that splits the incident light to the light with the first polarization direction. Therefore, the first optical sensor 36A detects the signal intensity I(−) of the component with the first polarization direction. As illustrated in FIG. 13-3, the second optical sensor 36B detects the light intensity passed through the polarizing layer that splits the incident light to the light with the second polarization direction. Therefore, the second optical sensor 36B detects the signal intensity I(+) of the component having the second polarization direction.

The computing unit 3 illustrated in FIG. 3 acquires the signal intensity I(−) of the component having the first polarization direction and the signal intensity I(+) of the component having the second polarization direction which are detection signals received from the optical sensor 35. The computing unit 3 then calculates the differential signal V from the signal intensity I(−) of the component having the first polarization direction and the signal intensity I(+) of the component having the second polarization direction, following Equation (1) below.

$$V = [I(+) - I(-)]/[I(+) + I(-)] = \sin(2\theta d) \quad (1)$$

Because the differential signal V calculated from Equation (1) does not include parameters affected by the light intensity of the light source 41, the encoder 2 can reduce the influences of fluctuations such as those in the distance between the optical sensor 35 and the optical scale 11, and in the light intensity of the light source 41. Furthermore, even when the light intensity of the incident light is decreased by foreign substances D1 and D2 as illustrated in FIG. 13-1, the encoder 2 can detect a change in the polarization direction Pm via the differential signal V while suppressing the influence of the foreign substances D1 and D2.

Figure 14:
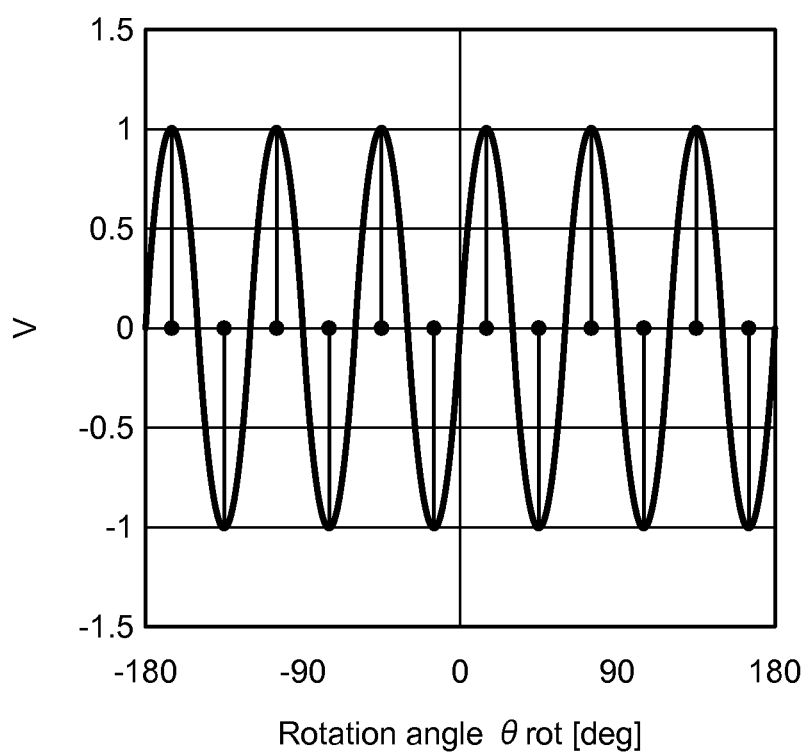
FIG. 14 is a schematic for explaining a relation between a rotation angle and a differential signal in the optical sensor according to the first embodiment.

FIG. 14 is a schematic for explaining a relation between a rotation angle and a differential signal in the optical sensor according to the first embodiment. The vertical axis in FIG. 14 represents the differential signal V, and the horizontal axis represents the rotation angle θrot illustrated in FIG. 6. When the rotation angle θrot reaches 360 degrees, that is, when the optical scale 11 is rotated by once, the differential signal V indicates a waveform with six cycles. This waveform matches the cycles of the curves in the wire pattern illustrated in FIG. 5, which has a wave-like form with six cycles in the 360 degrees. The waveform of the differential signal V illustrated in FIG. 14 is a sine wave, for example. The number of waves is merely an example, and is not limited to the number of cycles described above. Although the differential signal V has different phases for the transmissive light and for the reflected light, the differential signal V remains the same in having a waveform with six cycles.

The computing unit 3 stores information representing the relation between the rotation angle θrot and the differential signal V illustrated in FIG. 14 in at least one of the RAM 4e and the internal storage device 4f, and the CPU 4c can calculate the number of rotations of the rotor 10 from information of the differential signal V.

For example, the computing unit 3 can calculate the tangential angle θd from the relation between the tangential angle θd and the rotation angle θrot illustrated in FIG. 7 and the differential signal V indicated in Equation (1) above. When the maximum angle θmax denotes a rotational angle which is related to the number of wave-like forms (curves) on the optical scale 11 of when the tangential angle θd is changed by the maximum degree, as illustrated in FIG. 7, a ratio of change in θd per θrot can be expressed as Equation (2) below.

$$\frac{d\theta d}{d\theta rot} = \pm \frac{(\pi/4)}{\theta \max} \quad (2)$$

Information of the relation between the rotation angle θrot and the differential signal V can be acquired by substituting θd calculated from Equation (2) in Equation (1). The computing unit 3 can then calculate the rotation angle θrot from the differential signal V from the detection signal of the optical sensor 35, based on the information of the relation between the rotation angle θrot and the differential signal V.

By providing the optical scale with the wire grid pattern in which the tangential angle θd and the maximum angle θmax of the tangential angle θd are changed by desired degrees, the encoder 2 can be a detection apparatus with a relation between the rotation angle θrot and the differential signal V.

As described earlier, the encoder 2 includes the optical scale 11 is provided with a plurality of wires arranged in a manner not intersecting one another, and in such a manner that each of the tangential directions changes continuously. The optical sensor 35 also includes a first polarizing layer that splits incident light that is the light source light 71 being incident from the light source 41 and passed through or reflected on the optical scale 11 to the light with a first polarization direction, the first optical sensor 36A for receiving the first polarized light split by the first polarizing layer, the second polarizing layer that splits the incident light into the light with the second polarization direction, and the second optical sensor 36B for receiving the second polarized light split by the second polarizing layer. The computing unit 3 serving as a computing unit then calculates the amount of relative movement between the optical scale 11 and the optical sensor 35, from the intensity of the first polarized light and the intensity of the second polarized light.

With this structure, the optical sensors detect the rotation angle of the rotor 10 using the polarizations of the transmissive light 73 or the reflected light 72 thus split. Therefore, the encoder 2 can reduce the influence of fluctuations in the amount of detected light caused by foreign substances or the like, compared with when the intensity of the incident light is directly detected. Because the tolerance of foreign substances is increased, the encoder can be used in an increased number of environments.

Furthermore, the encoder 2 can reduce the influence of fluctuations in the amount of detected light due to precisions in the optical path (the distance from the optical scale to the optical sensor), even when used is an optical encoder unit. As a result, the arrangement of the light sources and the optical sensors can be designed more freely. In this manner, the encoder unit 1 can be reduced in size. Furthermore, an optical encoder can also achieve a higher resolution, compared with a magnetic encoder.

Modifications of Optical Sensor

FIGS. 15-1, 15-2, 15-3, and 16 are schematics for explaining exemplary modifications of the optical sensor according to the first embodiment. The optical sensor 35 includes the first optical sensor 36A and the second optical sensor 36B. The first optical sensor 36A includes an electrode base 36KA and the first photoreceivers 36a, and is capable of detecting the intensity of the light with the first polarization direction. Each of the first photoreceivers 36a has a first polarizing layer that splits incident light to the light with the first polarization direction, and receives first polarized light split by the first polarizing layer.

Figures 1, 15:
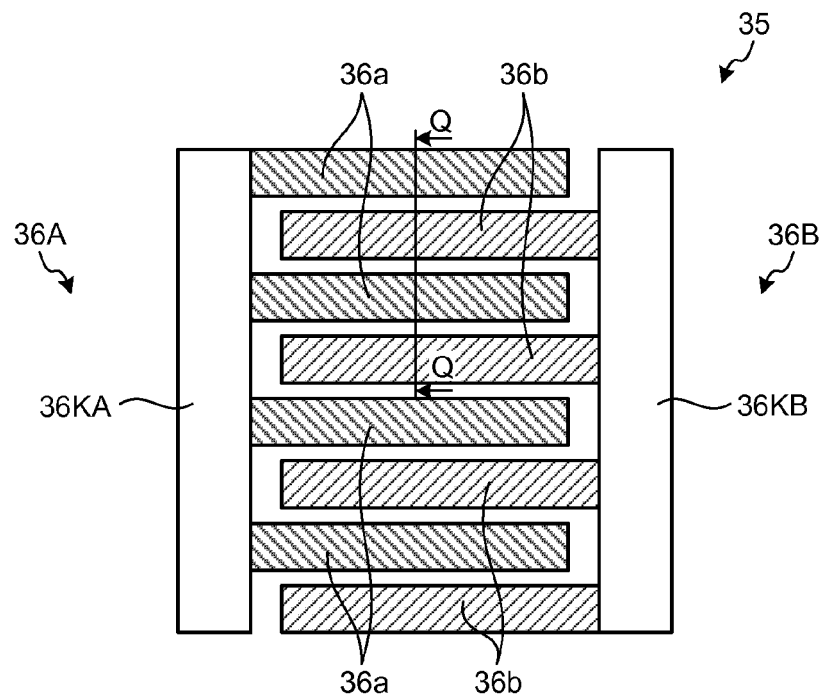
Figures 2, 15:
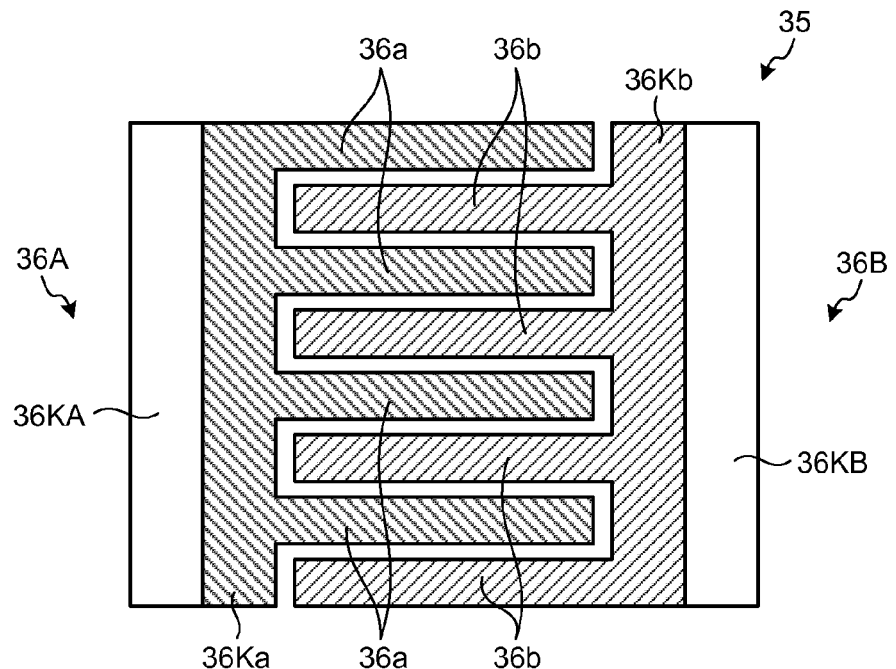
Figures 3, 15:
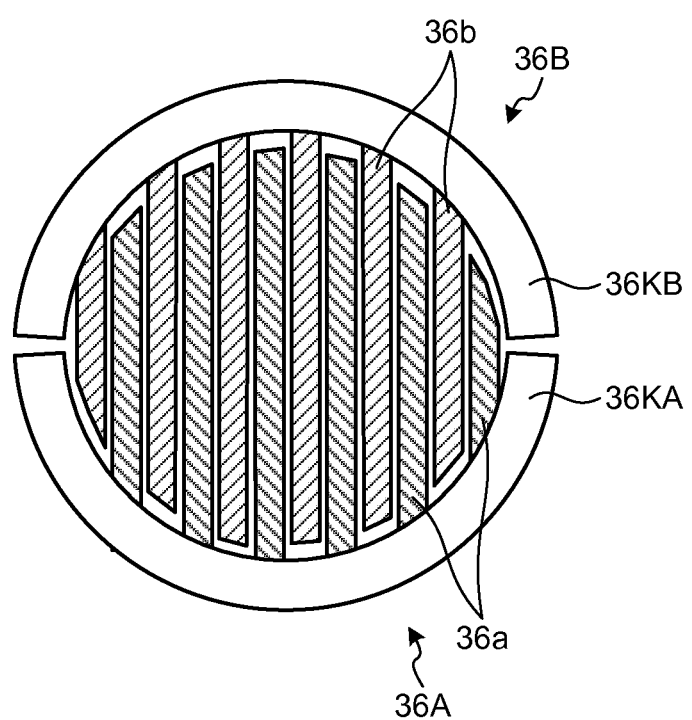
Figure 16:
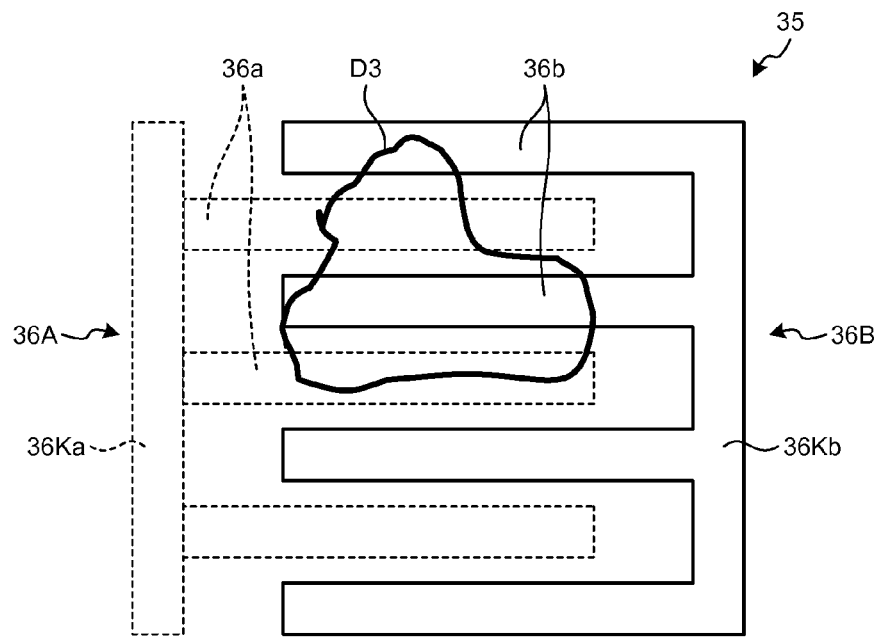
FIG. 16 is a schematic for explaining an exemplary modification of the optical sensor according to the first embodiment.

The second optical sensor 36B includes an electrode base 36KB and the second photoreceivers 36b, and is capable of detecting the intensity of light with a second polarization direction. Each of the second photoreceivers 36b has a second polarizing layer that splits incident light to light with the second polarization direction, and receives the second polarized light split by the second polarizing layer. As illustrated in FIG. 15-1, each of the first photoreceivers 36a and the second photoreceivers 36b is configured in a comb-like shape, engaging and spaced uniformly with each other. The electrode base 36KA and the electrode base 36KB are both made of a conductive material such as gold (Au) or aluminum (Al) so that the electricity can be conducted to the first photoreceivers 36a and the second photoreceivers 36b. When the electrode base 36KA and the electrode base 36KB are made of a light-shielding material, noise can be reduced.

Such a structure allows the incident light to be split into the first polarized light and the second polarized light. As a result, the computing unit 3 can calculate the polarization angle of the reflected light 72 or the transmissive light 73 based on the signal intensities of the polarized component having the first polarization direction and of the polarized component having the second polarization direction thus split. The first polarization direction and the second polarization direction are preferably different from each other by 90 degrees to allow the computing unit 3 to calculate the polarization angle easily.

As illustrated in FIG. 15-2, the optical sensor 35 includes the first optical sensor 36A and the second optical sensor 36B. The first optical sensor 36A includes the electrode base 36KA, a sensor base 36Ka connected to the electrode base 36KA, and the first photoreceivers 36a, and is capable of detecting the intensity of light with the first polarization direction. Each of the first photoreceivers 36a has the first polarizing layer that splits incident light to the light with the first polarization direction, and receives the first polarized light split by the first polarizing layer.

The second optical sensor 36B includes the electrode base 36KB, a sensor base 36Kb connected to the electrode base 36KB, and the second photoreceivers 36b, and is capable of detecting the intensity of light with the second polarization direction. Each of the second photoreceivers 36b has the second polarizing layer that splits the incident light to the light with the second polarization direction, and receives the second polarized light split by the second polarizing layer. As illustrated in FIG. 15-2, each of the first photoreceivers 36a and the second photoreceivers 36b is configured in a comb-like shape, engaging and spaced uniformly with each other. The electrode base 36KA and the electrode base 36KB are both made of a conductive material such as Au or Al so that the electricity can be conducted to the first photoreceivers 36a and the second photoreceivers 36b.

The optical sensor 35 may also have an outer circumference following an arc shape, as illustrated in FIG. 15-3, without limitation to the rectangular outer shape, which is illustrated in FIG. 15-1. For example, when the incident light that is incident to the optical sensor 35 is circular, such first photoreceivers 36a and second photoreceivers 36b are allowed to receive the incident light by approximately the same degree.

With such structures, even when a part of the sensing area is blocked by a foreign substance D3, as illustrated in FIG.

16, for example, the chances of the first photoreceivers 36a and the second photoreceivers 36b being blocked by approximately the same degree can be increased, so that the possibility of the signal intensity output from one of the first photoreceiver 36a and the second photoreceiver 36b dropping extremely can be reduced. Therefore, even when the intensity of the incident light is decreased by the foreign substance D3, the encoder 2 can detect a change in the polarization direction Pm via the differential signal V, in a manner less affected by foreign substances.

Method for Manufacturing Optical Sensor

Figure 17:
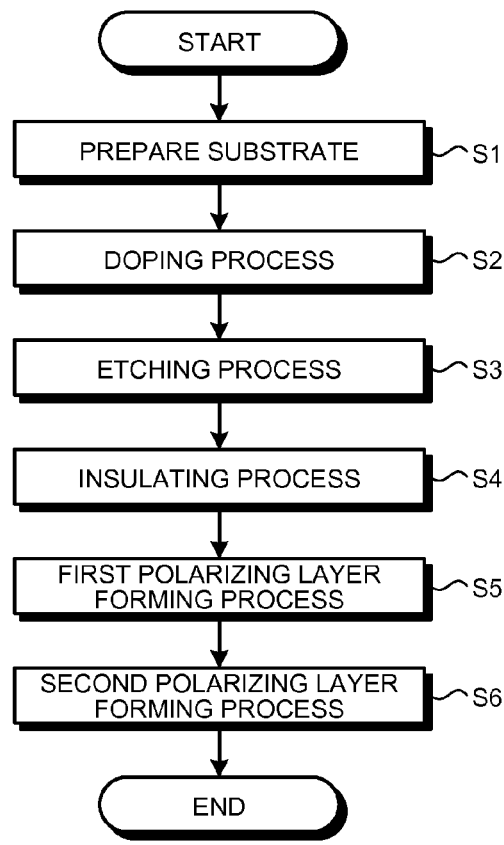
FIG. 17 is a flowchart for explaining an optical sensor manufacturing process according to the first embodiment.
Figures 1, 18:
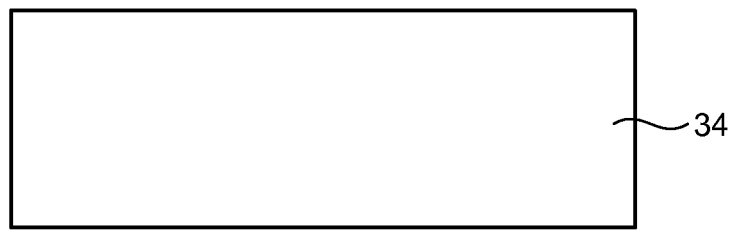
Figures 2, 18:
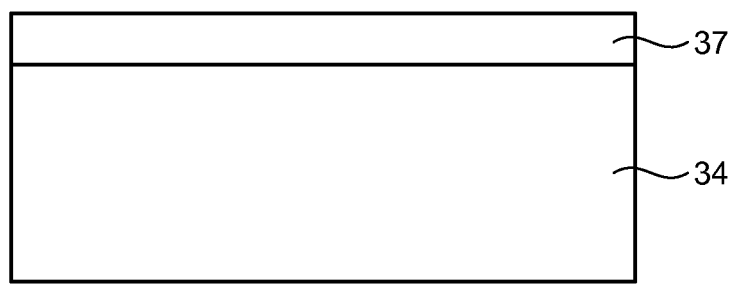
Figures 3, 18:
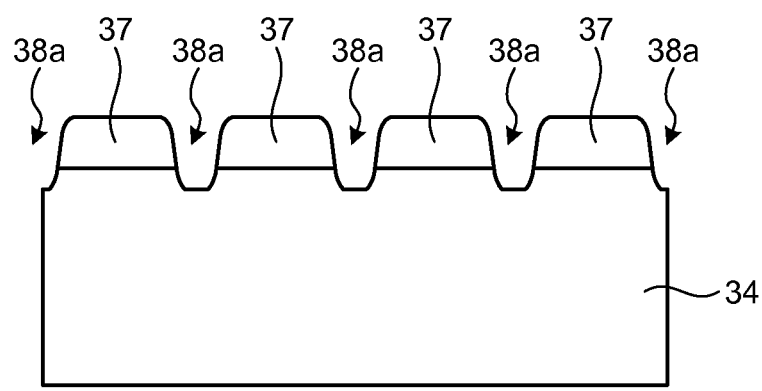
Figures 4, 18:
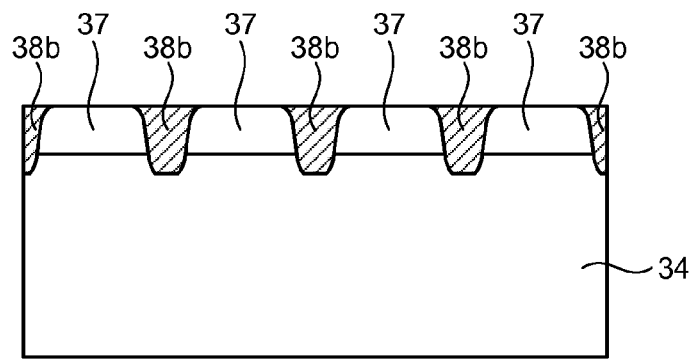
Figures 5, 18:
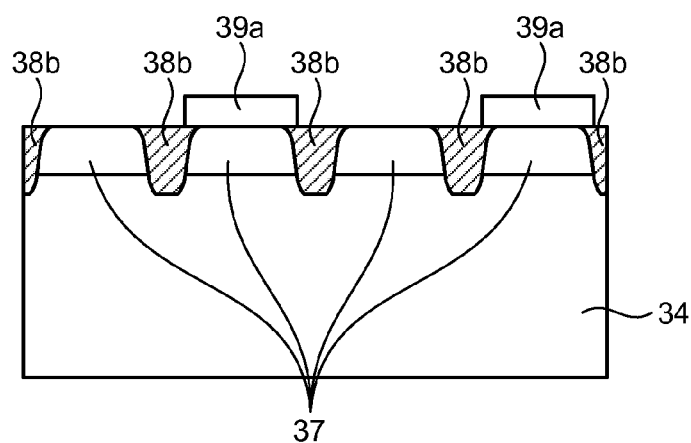
Figures 6, 18:
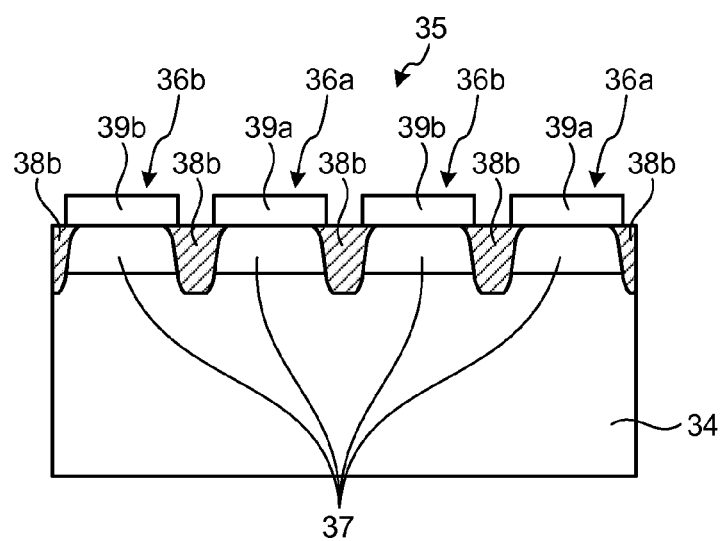

FIG. 17 is a flowchart for explaining an optical sensor manufacturing process according to the first embodiment. FIGS. 18-1 to 18-6 are schematics for explaining the optical sensor manufacturing process according to the first embodiment. FIGS. 18-1 to 18-6 are partial cross-sectional views for explaining the process of manufacturing the Q-Q cross section in FIG. 15-1. The method of manufacturing the optical sensor will be explained with reference to FIGS. 15-1, 17, and 18-1 to 18-6.

As illustrated in FIG. 17, to begin with, the manufacturing equipment prepares an n-type silicon substrate 34, as illustrated in FIG. 18-1 (Step S1). An n-type silicon substrate 34 is used as an example, but another semiconductor substrate such as gallium arsenide (GaAs) substrate may also be used instead of the n-type silicon substrate 34. The manufacturing equipment then performs a doping process in which the silicon substrate 34 is doped with an element such as boron (B) or indium (In) (Step S2). As illustrated in FIG. 18-2, a P-type semiconductor photoreceiver 37 is thus formed on the silicon substrate 34.

As illustrated in FIG. 17, the manufacturing equipment then performs an etching process in which the silicon substrate 34 is masked with a photoresist and etched so as to achieve the comb-like shape illustrated in FIG. 15-1 (Step S3). The etching may be physical etching or chemical etching. As illustrated in FIG. 18-3, as a result of the etching, recesses 38a are formed on the surface of the silicon substrate 34. As a result of this process, the first optical sensor 36A and the second optical sensor 36B are separated, in the manner illustrated in FIG. 15-1.

As illustrated in FIG. 17, the manufacturing equipment then performs an insulating process in which the recesses 38a are covered by an insulating material such as $SiO_2$ or alumina via sputtering (Step S4). As a result of this process, the recesses 38a on the silicon substrate 34 illustrated in FIG. 18-3 are filled with insulator 38b, as illustrated in FIG. 18-4. In this insulating process, the surface is preferably smoothed out so that the photoreceivers 37 become exposed.

As illustrated in FIG. 17, the manufacturing equipment performs a first polarizing layer forming process in which the first polarizing layer 39a is formed at the positions corresponding to the first photoreceivers 36a illustrated in FIG. 15-1 (Step S5). The first polarizing layer 39a may be formed using a photo-induced polarizing layer or a wire grid pattern in which wires are arranged in parallel, for example. In this manner, the first polarizing layer 39a is formed on every two photoreceivers 37, as illustrated in FIG. 18-5.

As illustrated in FIG. 17, the manufacturing equipment then performs a second polarizing layer forming process in which the second polarizing layer 39b is formed at positions corresponding to the second photoreceivers 36b illustrated in FIG. 15-1 (Step S6). The second polarizing layer 39b may be formed using a photo-induced polarizing layer or a wire grid pattern in which wires are arranged in parallel, for example. In this manner, the second polarizing layer 39b is formed on another every two photoreceivers 37, as illustrated in FIG. 18-6. The electrode base 36KA and the electrode base 36KB illustrated in FIG. 15-1 are then formed using a conductive material such as Au or Al so that the electricity can be conducted to the first photoreceivers 36a and the second photoreceivers 36b.

As illustrated in FIG. 18-6, the optical sensor 35 includes the first photoreceivers 36a and the second photoreceivers 36b each of which is configured in a comb-like shape, engaging and spaced uniformly with each other. Each of the first photoreceivers 36a has the first polarizing layer 39a for splitting incident light into the light with the first polarization direction so that the photodiode provided as a PN junction can receive the first polarized light split by the first polarizing layer 39a. Each of the second photoreceivers 36b has the second polarizing layer 39b for splitting the incident light to the light with the second polarization direction so that the photodiode provided as a PN junction can receive the second polarized light split by the second polarizing layer 39b. The photoreceivers are not limited to photodiodes formed as a PN junction, and phototransistors or the like may also be used. The photoreceiver may also be a photodiode formed with a pin junction. Furthermore, the photoreceiver may be manufactured as an integrated circuit in which an amplifier or peripheral circuitry is integrated.

As explained above, the method for manufacturing an optical sensor includes the photoreceiver forming process and the polarizing layer forming process. In the photoreceiver forming process, photoreceivers are formed on the surface of the silicon substrate 34 in such a manner that the first photoreceivers 36a and the second photoreceivers 36b receiving light are arranged alternatingly and spaced uniformly with each other. In the polarizing layer forming process, the first polarizing layer 39a that splits the incident light into the first polarized light with the first polarization direction is formed on top of the first photoreceivers 36a so that the first polarized light becomes incident on the first photoreceivers 36a, and the second polarizing layer 39b splitting the incident light into the second polarized light with the second polarization direction is formed on top of the second photoreceivers so that the second polarized light becomes incident on the second photoreceivers 36b.

Modification of Optical Scale

Figure 19:
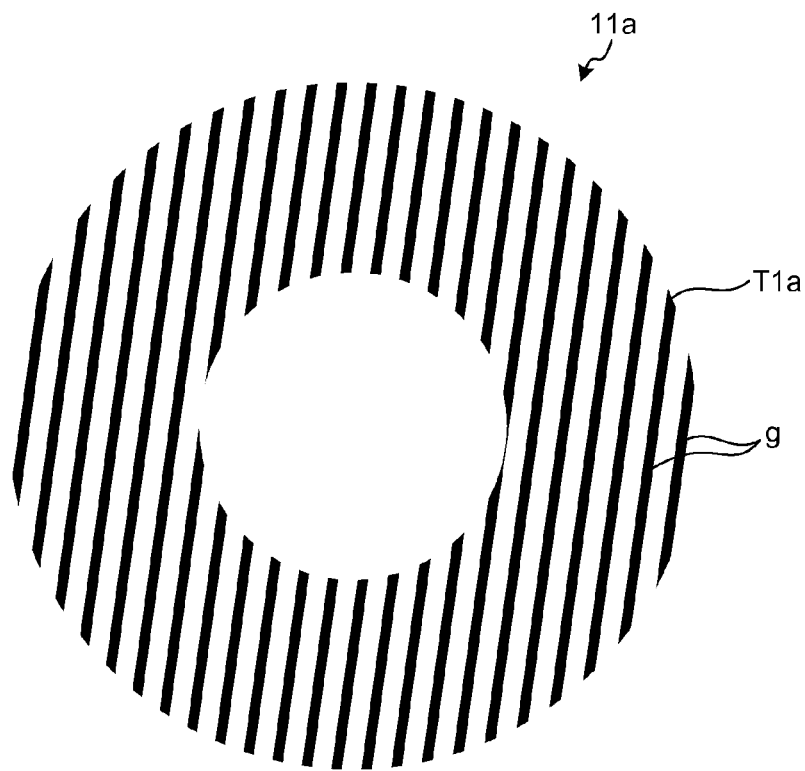
FIG. 19 is a schematic for explaining an exemplary modification of the optical scale according to the first embodiment.

FIG. 19 is a schematic for explaining an exemplary modification of the optical scale according to the first embodiment. On an optical scale 11a, the adjacent wires g are arranged linearly, in parallel with one another, as signal tracks T1a. The optical scale 11a according to the modification causes the polarization axis of the incident light that is incident on the optical sensor 35 to change in the rotating circumferential direction, as the optical scale 11a is rotated. In this embodiment, the optical scale 11a may be made of an optical anisotropic material in which the polarization axis of the incident light that is incident on the optical sensor 35 changes correspondingly to the rotation of the optical scale 11a.

As explained above, in the optical sensor 35 according to the first embodiment, each of the first photoreceivers 36a and the second photoreceivers 36b is configured in a comb-like shape, engaging and spaced uniformly with each other. Each of the first photoreceivers 36a has the first polarizing layer 39a that splits incident light into the light with the first polarization direction so that the photodiode provided as a PN junction can receive the first polarized light split by the first polarizing layer 39a. Each of the second photoreceivers 36b has the second polarizing layer 39b that splits the incident light to the light with the second polarization direction so that the photodiode provided as a PN junction can receive the second polarized light split by the second polarizing layer 39b.

Such a structure allows the incident light that is the transmissive light 73 or the reflected light 72 to be split into the first polarized light and the second polarized light. As a result, the computing unit 3 serving as a computing unit can calculate the polarization angle of the transmissive light 73 or the reflected light 72 from the signal intensities of the polarized components that are the first polarized light with the first polarization direction and the second polarized light with the second polarization direction thus split. Because the chances of the first photoreceivers 36a and the second photoreceivers 36b being blocked by a foreign substance by approximately the same degree can be increased, the possibility of the signal intensity output from one of the first photoreceivers 36a and the second photoreceivers 36b dropping extremely can be reduced. Therefore, even when the intensity of the incident light is decreased by a foreign substance, the optical sensor 35 can detect a change in the polarization direction of the transmissive light 73 or the reflected light 72, in a manner less affected by foreign substances.

Modification of Encoder

Figure 20:
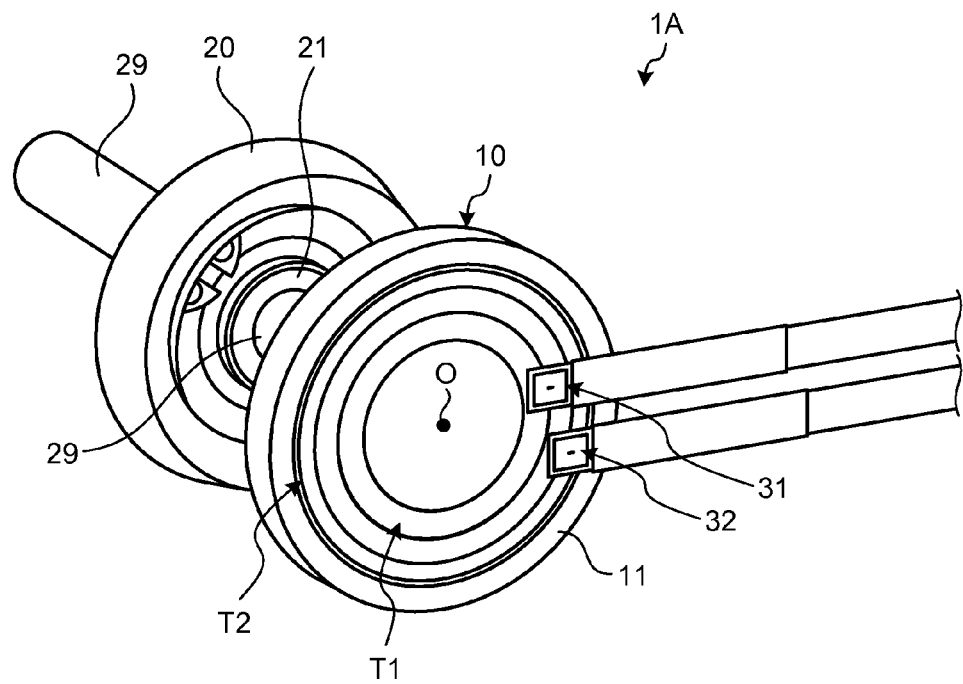
FIG. 20 is a schematic of a structure of an encoder according to a modification of the first embodiment.

FIG. 20 is a schematic of a structure of an encoder unit according to a modification of the first embodiment. The members that are the same as those described above are assigned with the same reference numerals, and redundant explanations thereof are omitted hereunder. An encoder unit 1A includes the shaft 29 connected to the rotary machine such as a motor, the stator 20, the rotor 10, and an optical sensor package 31 and an optical sensor package 32 both of which are capable of reading signal patterns. The rotor 10 includes an optical scale 11 that is a disk-shaped member. The optical scale 11 has the signal tracks T1 and signal tracks T2 on one or both of the disk surfaces.

The optical sensor package 32 has the same structure as the optical sensor package 31, and is capable of reading the signal tracks T2. The computing unit 3 can acquire the signal intensity I(−) of the component having the first polarization direction and the signal intensity I(+) of the component having the second polarization direction that are detection signals from the optical sensors 35 in the optical sensor packages 31 and 32.

The signal tracks T2 are formed as the wire grid pattern described above but having a phase shifted from that of the signal tracks T1 by a given degree, e.g., resulting in a differential signal V shifted by a one-quarter cycle from that of the signal tracks T1. When the rotor 10 is rotated, the signal tracks T2 are rotated by the same rotation angle as the signal tracks T1. Therefore, the computing unit 3 can identify an absolute position of the rotation angle of the rotor 10 by calculating a Lissajous pattern from the differential signal from the signal tracks T2 and the differential signal from the signal tracks T1. The encoder 2 according to the modification can thus be an absolute encoder capable of calculating an absolute position of the rotor 10.

Second Embodiment

Figure 21:
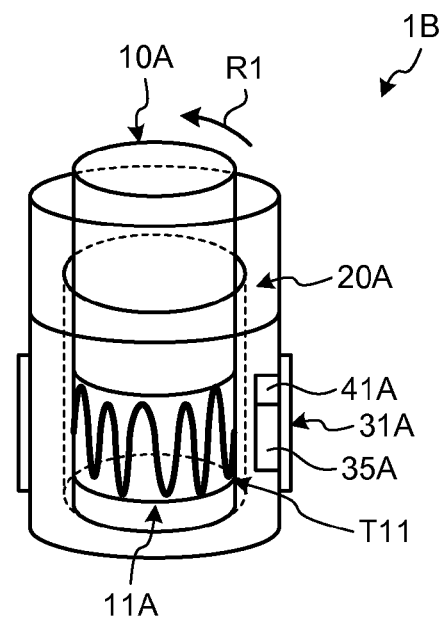
FIG. 21 is a schematic of an encoder according to a second embodiment of the present invention.
Figure 22:
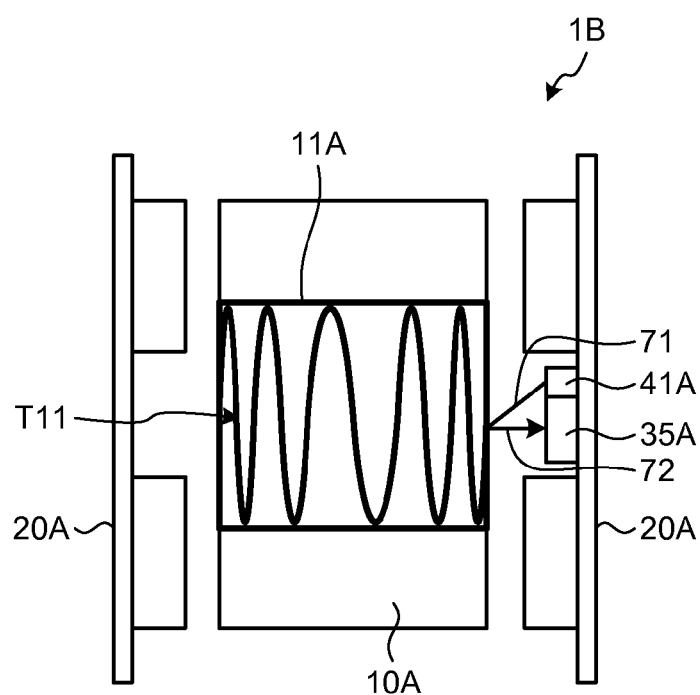
FIG. 22 is a side view illustrating a structure of the encoder according to the second embodiment.

FIG. 21 is a schematic of a structure of an encoder unit according to a second embodiment of the present invention. FIG. 22 is a side view illustrating a structure of an encoder according to the second embodiment. The members that are the same as those described above are assigned with the same reference numerals, and redundant explanations thereof are omitted hereunder. This encoder unit 1B includes a rotor 10A serving as a shaft connected to a rotary machine such as a motor, a stator 20A, and an optical sensor package 31A capable of reading signal patterns. The stator 20A is fixed independently of the rotor 10A.

The rotor 10A is a cylindrical member. On the outer circumferential surface of the cylindrical rotor 10A, an optical scale 11A is provided. The optical scale 11A has signal tracks T11 that are a wire grid pattern. The optical sensor package 31A is fixed via the stator 20A. When the rotor 10A is rotated in an R1 direction, the signal tracks T11 on the optical scale 11A move relatively to the optical sensor package 31A.

The optical sensor package 31A includes an optical sensor 35A capable of reading the signal tracks T11 on the optical scale 11A, and a light source 41A. The light source light 71 from the light source 41A is reflected on the signal tracks T11 on the optical scale 11A, and reflected light 72 thus reflected is detected by the optical sensor 35A as incident light. The optical sensor 35A is the same as the optical sensor 35 described above. The light source 41A is the same as the light source 41 described above. The encoder according to the embodiment includes the encoder unit 1B and the computing unit 3, and the optical sensor 35A in the encoder unit 1B is connected to the computing unit 3, in the same manner as illustrated in FIG. 3. The computing unit 3 is connected to the control unit 5 of the rotary machine such as a motor.

Figure 23:
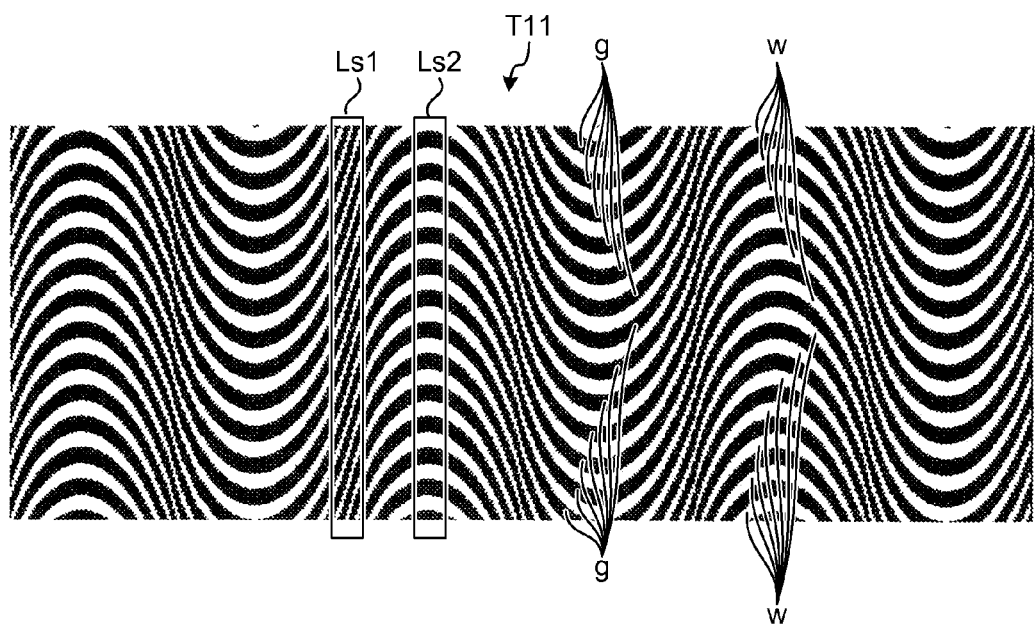
FIG. 23 is a schematic for explaining an example of a wire grid pattern on an optical scale according to the second embodiment.

FIG. 23 is a schematic for explaining an example of the wire grid pattern on the optical scale according to the second embodiment. An arrangement of wires g, which is referred to as a wire grid pattern, illustrated in FIG. 23 is formed on the optical scale 11A illustrated in FIGS. 21 and 22 as the signal tracks T11. Provided between the adjacent wires g is a transmissive area w through which the entire or a part of the light source light 71 is allowed to pass. When the width of the wire g and the pitch between the adjacent wires g, that is, the width of the wire g and the width of the transmissive area w are made sufficiently smaller than the wavelength of the light source light 71 from the light source 41A, the optical scale 11A can polarize the reflected light 72 of the light source light 71. When the rotor 10A is rotated, for example, the sensing area Ls1 of the optical sensor package 31A moves to the sensing area Ls2.

Figures 1, 24:
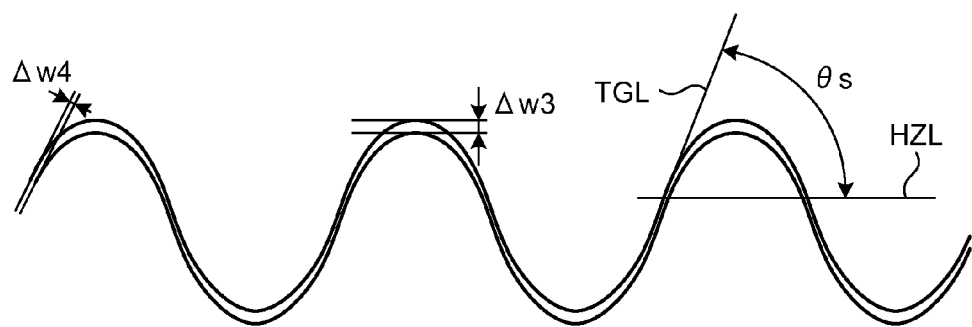
Figures 2, 24:
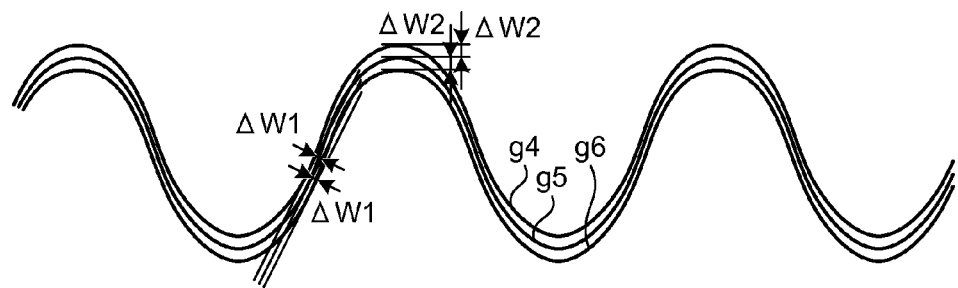
Figures 1, 25:
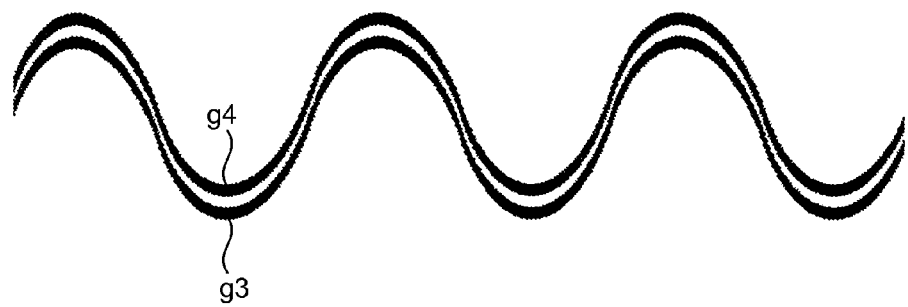
Figures 2, 25:
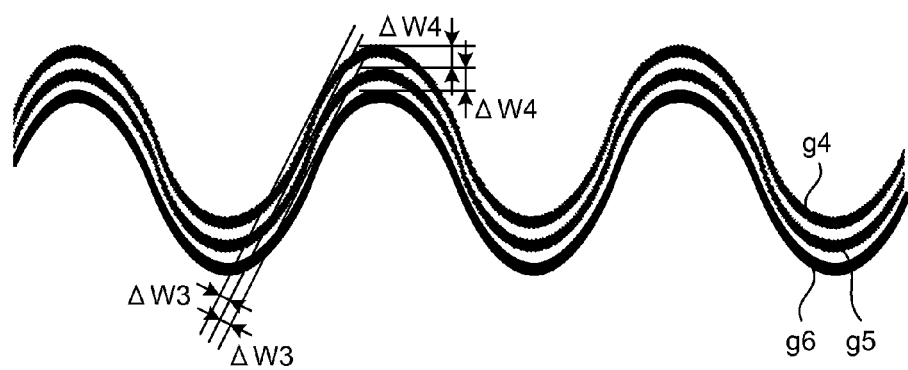

FIGS. 24-1, 24-2, 25-1, and 25-2 are schematics for explaining the wire grid pattern on the optical scale according to the second embodiment. To allow the polarization axis to be detected based on θs which is the tangential angle, adjacent wires g3 and g4 in the wire grid pattern according to the embodiment are changed continuously while keeping the same tangential angle. The adjacent wires g3 and g4 are arranged to have different transmissive area width Δw3 and width Δw4 in the areas where the tangential angles θs are different. For example, the transmissive area width Δw3 in the area where the adjacent wires g3 and g4 are curved is set wider than the transmissive area width Δw4. In this manner, a wire grid pattern such as that illustrated in FIG. 25-1 is achieved. By arranging the wire grid pattern at the same regularity, the signal tracks T11 having the wire grid pattern illustrated in FIG. 23 can be achieved on the optical scale 11A. The tangential angle θs is an angle formed by a direction in parallel with the R1 direction illustrated in FIG. 21, that is, a horizontal line HZL representing the direction of the movement, and the tangent line TGL.

FIG. 24-2 is a schematic for explaining the wire grid pattern on the optical scale according to the second embodiment. In the wire grid pattern according to the embodiment illustrated in FIG. 24-2, the center line of each of the wires g in FIG. 23 is indicated. To allow θs that is the tangential angle to be detected as a polarization axis, adjacent wires g4 and g5 in the wire grid pattern according to the embodiment are changed continuously while maintaining the same tangential angle. In the wire grid pattern, adjacent wires g5 and g6 are also changed continuously while maintaining the same tangential angle. The wires g4, g5, and g6 are arranged in a manner having a given interval therebetween, or in a manner offset from each other in a direction perpendicular to the direction in which the sensing area Ls1 moves to the sensing area Ls2 (in the vertical directions in FIG. 23).

In the sensing area Ls1 illustrated in FIG. 23, the pitch (interval) ΔW1 between the center lines of the respective adjacent wires g4 and g5 illustrated in FIG. 24-2 is the same as the pitch ΔW1 between the center lines of the respective adjacent wires g5 and g6. Similarly, in the sensing area Ls2 illustrated in FIG. 23, the pitch ΔW2 between the center lines of the respective adjacent wires g4 and g5 illustrated in FIG. 24-2 is the same as the pitch ΔW2 between the center lines of the respective adjacent wires g5 and g6. Therefore, the same tangential angle is retained among the wires g4, g5, and g6, in each of the sensing area Ls1 and the sensing area Ls2.

The wires g4, g5, and g6 are arranged in a manner not intersecting one another, and in such a manner that each of the tangential directions changes continuously. As a result, the wire grid pattern according to the embodiment is arranged in such a manner that the pitches ΔW1 and the pitches ΔW2 illustrated in FIG. 24-2 are different between the areas where the tangential angles are different, for example. For example, the pitch ΔW2 in the area where the adjacent wires g4 and g5 are curved (wound) is set wider than the pitch ΔW1 in the area where the wires g4 and g5 are linear. Such a configuration allows a plurality of wires to be arranged easily in a manner allowing each of the tangential directions to change continuously.

FIG. 25-2 is a schematic for explaining the wire grid pattern on the optical scale according to the second embodiment. The pitch of the wires may be defined as an interval between the edges of the adjacent wires g4 and g5, as illustrated in FIG. 25-2. In the sensing area Ls1 illustrated in FIG. 23, the pitch (interval) ΔW3 between edges of the adjacent wires g4 and g5 illustrated in FIG. 25-2 is the same as the pitch ΔW3 between the edges of the adjacent wires g5 and g6. Similarly, in the sensing area Ls2 illustrated in FIG. 23, the pitch ΔW4 between the edges of the adjacent wires g4 and g5 illustrated in FIG. 25-2 is the same as the pitch ΔW4 between the edges of the adjacent wires g5 and g6. Therefore, the same tangential angle is retained among the wires g4, g5, and g6, in each of the sensing area Ls1 and the sensing area Ls2.

The wires g4, g5, and g6 are arranged in a manner not intersecting one another, and in such a manner that each of the tangential directions changes continuously. As a result, the wire grid pattern according to the embodiment is arranged in such a manner that the pitch ΔW3 and the pitch ΔW4 illustrated in FIG. 25-2 are different between the areas where the tangential angles are different, for example. For example, the pitch ΔW4 in the area where the adjacent wires g4 and g5 are curved (wound) is set wider than the pitch ΔW3 in the area where the wires g4 and g5 are linear. Such a configuration allows a plurality of wires to be arranged easily in a manner allowing each of the tangential directions to change continuously. By arranging the wires g4, g5, and g6 at the same regularity, the signal tracks T11 having the wire grid pattern illustrated in FIG. 23 can be achieved on the optical scale 11A.

As the optical scale 11A, the wire grid pattern as illustrated in FIG. 23 may be directly formed on the outer circumferential surface of the cylindrical rotor 10A through vapor deposition, for example. The optical scale 11A may also be produced by forming the wire grid pattern as illustrated in FIG. 23 on an elastic and transparent base member, and by winding the base member around the outer circumferential surface of the cylindrical rotor 10A.

Figure 26:
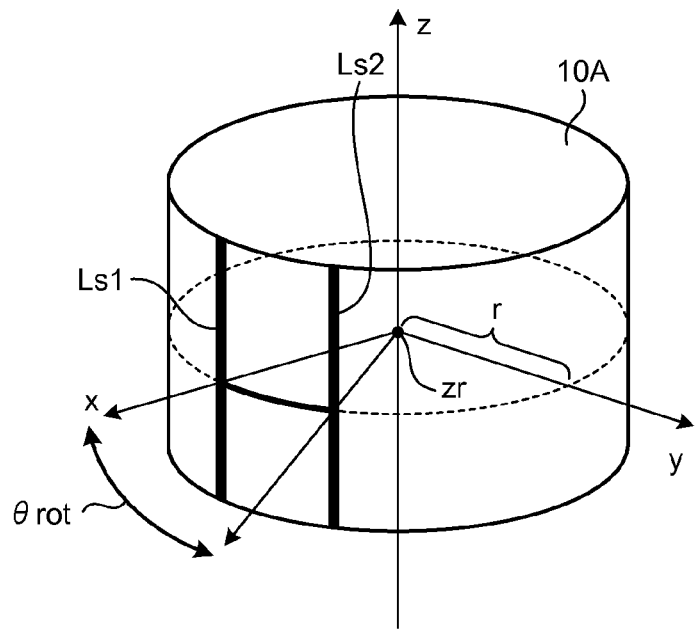
FIG. 26 is a schematic for explaining a relation between a rotation angle and a polarization axis direction in the optical scale according to the second embodiment.

FIG. 26 is a schematic for explaining a relation between a rotation angle and a polarization axis direction in the optical scale according to the second embodiment. In FIG. 26, r denotes the radius of the rotor 10A, and zr denotes the rotational center of the rotor 10A. When the rotor 10A is rotated, the sensing area Ls1 of the optical sensor package 31A moves to the sensing area Ls2. θrot denotes a rotation angle of the rotor 10A.

The computing unit 3 illustrated in FIG. 3 acquires the signal intensity I(−) of the component having the first polarization direction and the signal intensity I(+) of the component having the second polarization direction that are the detection signals from the optical sensor 35. The computing unit 3 then calculates the differential signal V from the signal intensity I(−) of the component having the first polarization direction and the signal intensity I(+) of the component having the second polarization direction, following Equation (3) below.

$$V=[I(+)-I(-)]/[I(+)+I(-)]=\sin(2\theta s) \quad (3)$$

Because the differential signal V calculated from Equation (3) does not include parameters affected by the light intensity of the light source 41A, the encoder 2 can reduce the influences of fluctuations such as those in the distance between the optical sensor 35A and the optical scale 11A, and in the light intensity of the light source 41A. Furthermore, the encoder 2 can detect a change in the polarization direction via the differential signal V in a manner less affected by foreign substances.

The relation between the rotation angle and the differential signal in the optical sensor according to the second embodiment is the same as that in the optical sensor according to the first embodiment illustrated in FIG. 14. As mentioned earlier, the vertical axis in FIG. 14 represents the differential signal V, and the horizontal axis represents the rotation angle θrot illustrated in FIG. 26. When the rotation angle θrot is 360 degrees, that is, when the optical scale 11A is rotated once about the rotational center zr, the differential signal V indicates a waveform with six cycles. This waveform matches the wire pattern illustrated in FIG. 23, having a wave-like form with six cycles in the 360 degrees. The waveform of the differential signal V illustrated in FIG. 14 is a sine wave, for example. The number of waves is merely an example, and is not limited to the number of cycles described above. Although the differential signal V has different phases for the transmissive light and for the reflected light, the differential signal V remains the same in having a waveform with six cycles.

For example, the computing unit 3 can calculate the tangential angle θs from the relation between the tangential angle θs and the rotation angle θrot, and the differential signal V expressed by Equation (3) mentioned above. A change ratio of θs per θrot can be expressed as Equation (4) below, where the maximum angle θmax denotes the rotational angle, which is related to the number of waves (curves), on the optical scale 11 of when the tangential angle θs is changed by the maximum degree.

$$\frac{d\theta s}{d\theta rot} = \pm \frac{(\pi/4)}{\theta \max} \quad (4)$$

Information of the relation between the rotation angle θrot and the differential signal V can be acquired by substituting θs calculated from Equation (4) in Equation (3). The computing unit 3 can then calculate the rotation angle θrot from the differential signal V from the detection signal of the optical sensor 35, based on the information of the relation between the rotation angle θrot and the differential signal V.

The computing unit 3 stores the information representing the relation between the rotation angle θrot and the differential signal V illustrated in FIG. 14 in at least one of the RAM 4e and the internal storage device 4f, so that the CPU 4c can calculate the number of rotations of the rotor 10A from the information of the differential signal V.

Modification of Encoder

Figure 27:
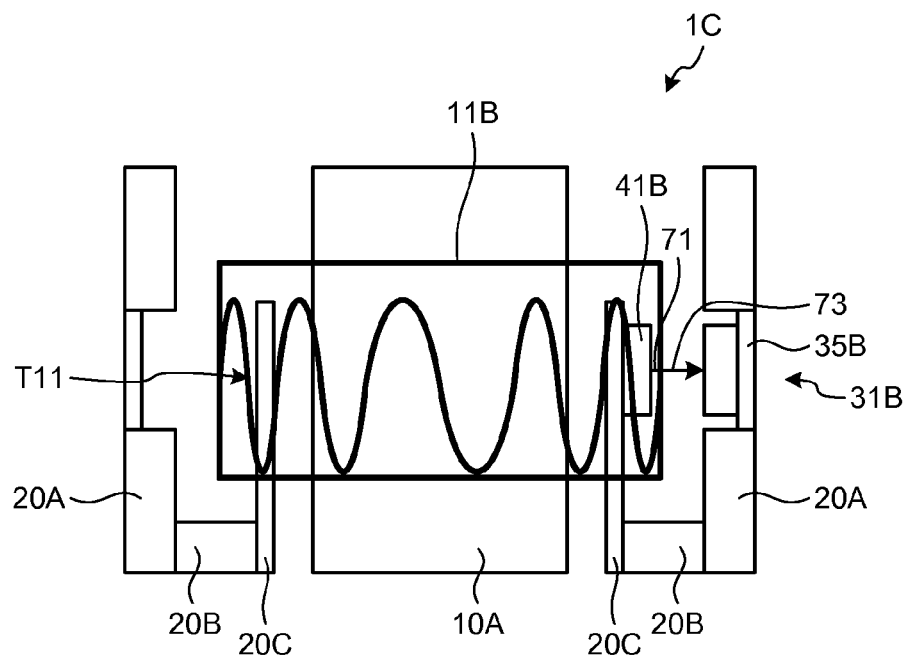
FIG. 27 is a schematic of a structure of an encoder according to a modification of the second embodiment.

FIG. 27 is a schematic of a structure of an encoder according to a modification of the second embodiment. The members that are the same as those described above are assigned with the same reference numerals, and redundant explanations thereof are omitted hereunder. This encoder unit 1C includes the rotor 10A serving as a shaft connected to a rotary machine such as a motor, the stator 20A, and an optical sensor package 31B capable of reading the signal patterns. The stator 20A is fixed independently of the rotor 10A. The optical scale 11B has the wire grid pattern as illustrated in FIG. 23, on the outer circumferential surface of the cylindrical rotor 10A.

The rotor 10A is rotated with the optical scale 11B. The optical scale 11B has the signal tracks T11 that are the wire grid pattern. The optical sensor package 31B is fixed to the stator 20A. The optical sensor package 31B includes the optical sensor 35B capable of reading the signal tracks T11 on the optical scale 11B.

A light source 41B is supported by a mount member 20B and a mount member 20C that are fixed to the stator 20A, and interposed between the rotor 10A and the optical scale 11B. The optical sensor 35B is the same as the optical sensor 35 described above. The light source 41B is the same as the light source 41 described above. With this structure, the light source 41B comes to be arranged at a position facing the optical sensor 35B across the optical scale 11B. Therefore, the light source light 71 from the light source 41B is passed through the signal tracks T11 on the optical scale 11B, and the optical sensor 35B can detect the transmissive light 73 thus passed through as incident light. When the rotor 10A is rotated, the signal tracks T11 on the optical scale 11B move relatively to the optical sensor package 31B.

The encoder according to the embodiment includes the encoder unit 1C and the computing unit 3, and the optical sensor 35B in the encoder unit 1C is connected to the computing unit 3, in the same manner as illustrated in FIG. 3. The computing unit 3 is connected to the control unit 5 of the rotary machine such as a motor.

As the signal tracks T11 illustrated in FIG. 23, an arrangement of wires g, which is referred to as a wire grid pattern, is formed on the optical scale 11B illustrated in FIG. 27. Provided between the adjacent wires g is a transmissive area w through which the entire or a part of the light source light 71 is allowed to pass. When the width of the wire g and the pitch between the adjacent wires g, that is, the width of the wire g and the width of the transmissive area w, are made sufficiently smaller than the wavelength of the light source light 71 from the light source 41, the optical scale 11B can polarize the transmissive light 73 of the light source light 71.

As mentioned earlier, in the encoder 2, the optical scales 11A, 11B are arranged in a manner not intersecting each other, and in such a manner that each of the tangential directions changes continuously. The encoder 2 is also provided with an optical sensor including the first polarizing layer that splits incident light to the light with the first polarization direction and on which the light source light from the light source 41A, 41B passing through or reflected on the optical scale 11A, 11B becomes incident, the first photoreceiver for receiving the first polarized light split by the first polarizing layer, the second polarizing layer that splits the incident light to the light with the second polarization direction, and a second photoreceiver for receiving the second polarized light split by the second polarizing layer. The computing unit 3 serving as a computing unit calculates the amount of relative movement between the optical scale 11A, 11B and the optical sensor 35A, 35B from the intensity of the first polarized light and the intensity of the second polarized light.

Using this structure, the optical sensors 35A, 35B detect a rotation angle of the rotor 10A by splitting the incident light into polarized components. Therefore, the encoder 2 can reduce the influence of fluctuations in the amount of detected light caused by foreign substances or the like compared with when the intensity of the incident light is directly detected. Because the tolerance of foreign substances is increased, the encoder can be used in an increased number of environments. Furthermore, the encoder 2 can reduce the influence of fluctuations in the amount of detected light due to precisions in the optical path (the distance from the optical scale to the optical sensor), even when used is an optical encoder unit. As a result, the arrangement of the light source 41A, 41B and the optical sensor 35A, 35B can be designed more freely. In this manner, the encoder unit 2 can be reduced in size, for example. Furthermore, an optical encoder can also achieve a higher resolution, compared with a magnetic encoder.

Third Embodiment

Figure 28:
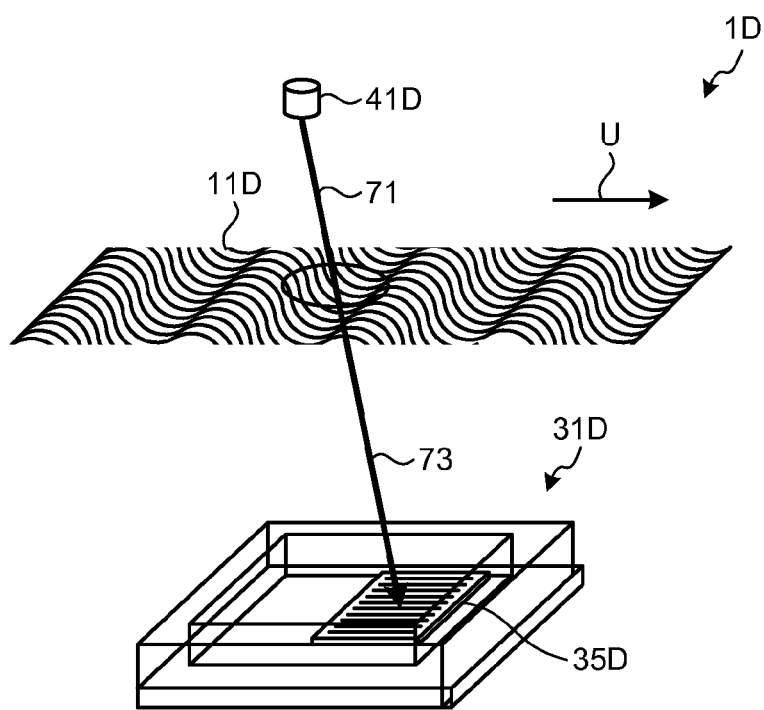
FIG. 28 is a schematic of an encoder according to a third embodiment of the present invention.
Figure 29:
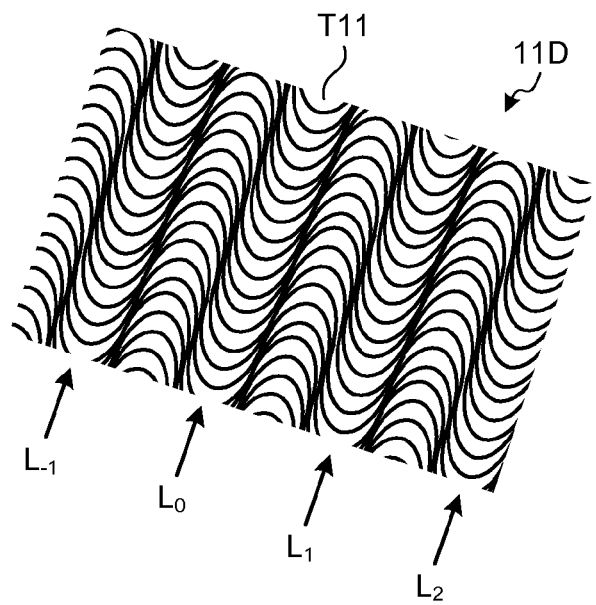
FIG. 29 is a schematic for explaining an example of a wire grid pattern on an optical scale according to the third embodiment.
Figure 30:
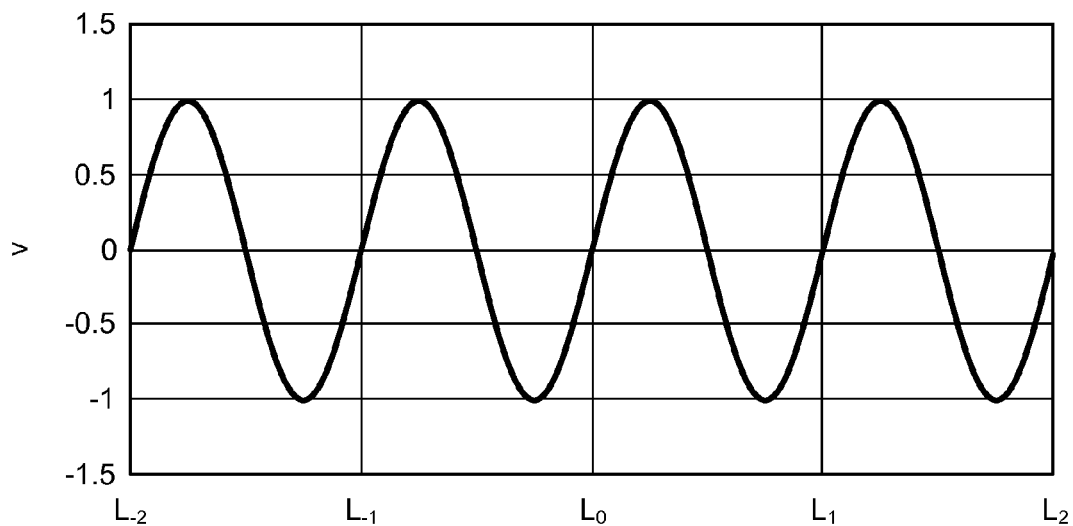
FIG. 30 is a schematic for explaining a relation between a rotation angle and a differential signal in the optical sensor according to the third embodiment.

FIG. 28 is a schematic of an encoder unit according to a third embodiment of the present invention. FIG. 29 is a schematic for explaining an example of a wire grid pattern on the optical scale according to the third embodiment. FIG. 30 is a schematic for explaining a relation between a rotation angle and a differential signal in the optical sensor according to the third embodiment. The members that are the same as those described above are assigned with the same reference numerals, and redundant explanations thereof are omitted hereunder. The encoder unit 1D includes an optical scale 11D, and an optical sensor package 31D capable of reading signal patterns. The optical scale 11D is moved in the U direction, for example, so that the relative position with respect to the optical sensor package 31D is changed.

The optical scale 11D has the signal tracks T11 that are the wire grid pattern described above. The optical sensor package 31D includes an optical sensor 35D capable of reading the signal tracks T11 on the optical scale 11D.

A light source 41D is arranged at a position facing the optical sensor 35D across the optical scale 11D. The optical sensor 35D is the same as the optical sensor 35 described above. The light source 41D is the same as the light source 41 described above. Therefore, the light source light 71 from the light source 41D is passed through the signal tracks T11 on the optical scale 11D, and the optical sensor 35D can detect the transmissive light 73 thus passed through as the incident light. When the optical scale 11D is moved linearly in the U direction by a linear motion mechanism, for example, the signal tracks T11 on the optical scale 11D move relatively to the optical sensor package 31D.

The encoder according to the embodiment includes the encoder unit 1D and the computing unit 3, and the optical sensor 35D in the encoder unit 1D is connected to the computing unit 3, in the same manner as illustrated in FIG. 3. The computing unit 3 is connected to a control unit 5 of a linear motion device or the like.

As the signal tracks T11, an arrangement of wires g, which is referred to as a wire grid pattern, is formed on the optical scale 11D illustrated in FIG. 29. Provided between the adjacent wires g illustrated in FIG. 29 is a transmissive area w through which the entire or a part of the light source light 71 is allowed to pass. When the width of the wire g and the pitch between the adjacent wires g, that is, the width of the wire g and the width of the transmissive area w, are made sufficiently smaller than the wavelength of the light source light 71 from the light source 41D, the optical scale 11D illustrated in FIG. 29 can polarize the transmissive light 73 of the light source light 71.

The computing unit 3 illustrated in FIG. 3 acquires the signal intensity I(−) of the component having the first polarization direction and the signal intensity I(+) of the component having the second polarization direction that are detection signals from the optical sensor 35D. The computing unit 3 calculates the differential signal V from the signal intensity I(−) of the component having the first polarization direction and the signal intensity I(+) of the component having the second polarization direction, following Equation (3) mentioned above.

The computing unit 3 stores information of a relation between a movement distance $L_{-1}$, $L_0$, $l_1$, $L_2$ illustrated in FIG. 29 and the differential signal V (see FIG. 30) in at least one of the RAM 4e and the internal storage device 4f, so that the CPU 4c can calculate the amount of relative movement between of the optical scale 11D from the information of the differential signal V.

Modification of Encoder

Figure 31:
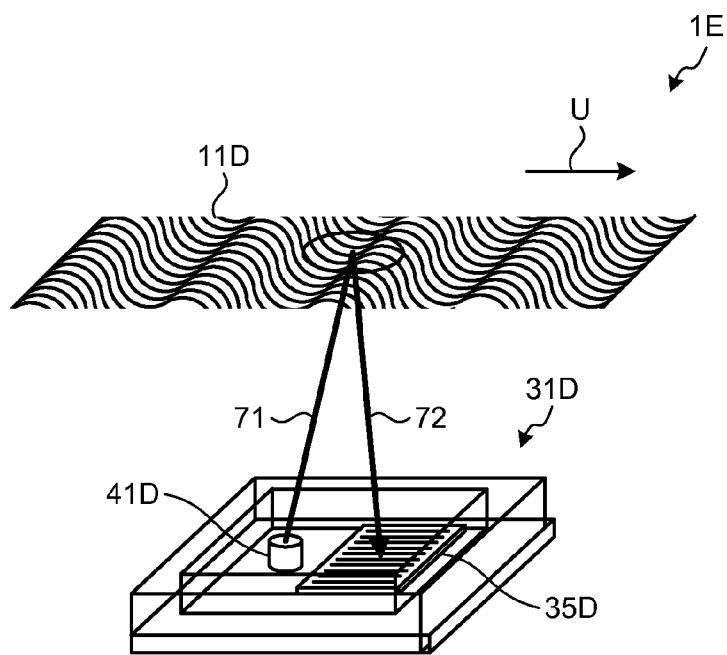
FIG. 31 is a schematic of a structure of an encoder according to a modification of the third embodiment.

FIG. 31 is a schematic of a structure of an encoder according to a modification of the third embodiment. The members that are the same as those described above are assigned with the same reference numerals, and redundant explanations thereof are omitted hereunder. The encoder unit 1E includes the optical scale 11D and an optical sensor package 31D capable of reading signal patterns. The optical scale 11D is moved in the U direction, for example, so that the relative position with respect to the optical sensor package 31D is changed.

The optical scale 11D has the signal tracks T11 that are the wire grid pattern. The optical sensor package 31D includes optical sensor 35D capable of reading the signal tracks T11 on the optical scale 11D and the light source 41D. The light source light 71 from the light source 41D is reflected on the signal tracks T11 on the optical scale 11D, and the optical sensor 35 detects the reflected light 72 thus reflected as incident light.

The encoder according to the embodiment includes the encoder unit 1E and the computing unit 3, and the optical sensor 35D in the encoder unit 1E is connected to the computing unit 3, in the same manner as illustrated in FIG. 3. The computing unit 3 is connected to the control unit 5 of a linear motion apparatus or the like.

As the signal tracks T11 illustrated in FIG. 23, an arrangement of wires g, which is referred to as a wire grid pattern, is formed on the optical scale 11D illustrated in FIG. 29. Provided between the adjacent wires g is a transmissive area w through which the entire or a part of the light source light 71 is allowed to pass. When the width of the wire g and the pitch between the adjacent wires g, that is, the width of the wire g and the width of the transmissive area w, are made sufficiently smaller than the wavelength of the light source light 71 from the light source 41D, the optical scale 11D can polarize the reflected light 72 of the light source light 71.

The computing unit 3 illustrated in FIG. 3 acquires the signal intensity I(−) of the component having the first polarization direction and the signal intensity I(+) of the component having the second polarization direction that are the detection signals from the optical sensor 35. The computing unit 3 then calculates the differential signal V from the signal intensity I(−) of the component having the first polarization direction and the signal intensity I(+) of the component having the second polarization direction, following Equation (3) mentioned above.

The computing unit 3 stores the information of the relation between the movement distance $L_{-1}$, $L_0$, $l_1$, $L_2$ illustrated in FIG. 29 and the differential signal V (see FIG. 30) in at least one of the RAM 4e and the internal storage device 4f, so that the CPU 4c can calculate the amount of relative movement of the optical scale 11D from the information of the differential signal V. The modifications illustrated in FIGS. 28 and 31 are applicable as a linear encoder.

As mentioned earlier, the encoder 2 includes the optical scale 11D provided with a plurality of wires arranged in a manner not intersecting one another, and in a manner so that each of the tangential directions changes continuously. The encoder 2 also includes the optical sensor 35D. The optical sensor 35D is provided with the first polarizing layer through or on which the light source light 71 from the light source 41D is passed or reflected becomes incident on the optical scale 11D, and that splits the incident light to the light with the first polarization direction, and the first photoreceivers receiving the first polarized light split by the first polarizing layer. The optical sensor 35D is also provided with the second polarizing layer that splits the incident light to the light with the second polarization direction, and the second photoreceivers receiving the second polarized light split by the second polarizing layer. The computing unit 3 serving as a computing unit then calculates the amount of relative movement of the optical scale 11D with respect to the optical sensor 35D from the intensity of the first polarized light and the intensity of the second polarized light.

With this structure, the optical sensor detects the amount of movement in the U direction using the polarizations of the transmissive light or reflected light thus split. Therefore, the encoder 2 can reduce the influence of fluctuations in the amount of detected light caused by foreign substances or the like, compared with when the intensity of the incident light is directly detected. Because the tolerance of foreign substances is increased, the encoder can be used in an increased number of environments. Furthermore, even when used is an optical encoder unit, the encoder 2 can reduce the influence of fluctuations in the amount of detected light due to precisions in the optical path (the distance from the optical scale to the optical sensor). As a result, the arrangement of the light sources and the optical sensors can be designed more freely. In this manner, for example, the encoder unit can be reduced in size. Furthermore, an optical encoder can also achieve a higher resolution, compared with a magnetic encoder.

Fourth Embodiment

Figure 32:
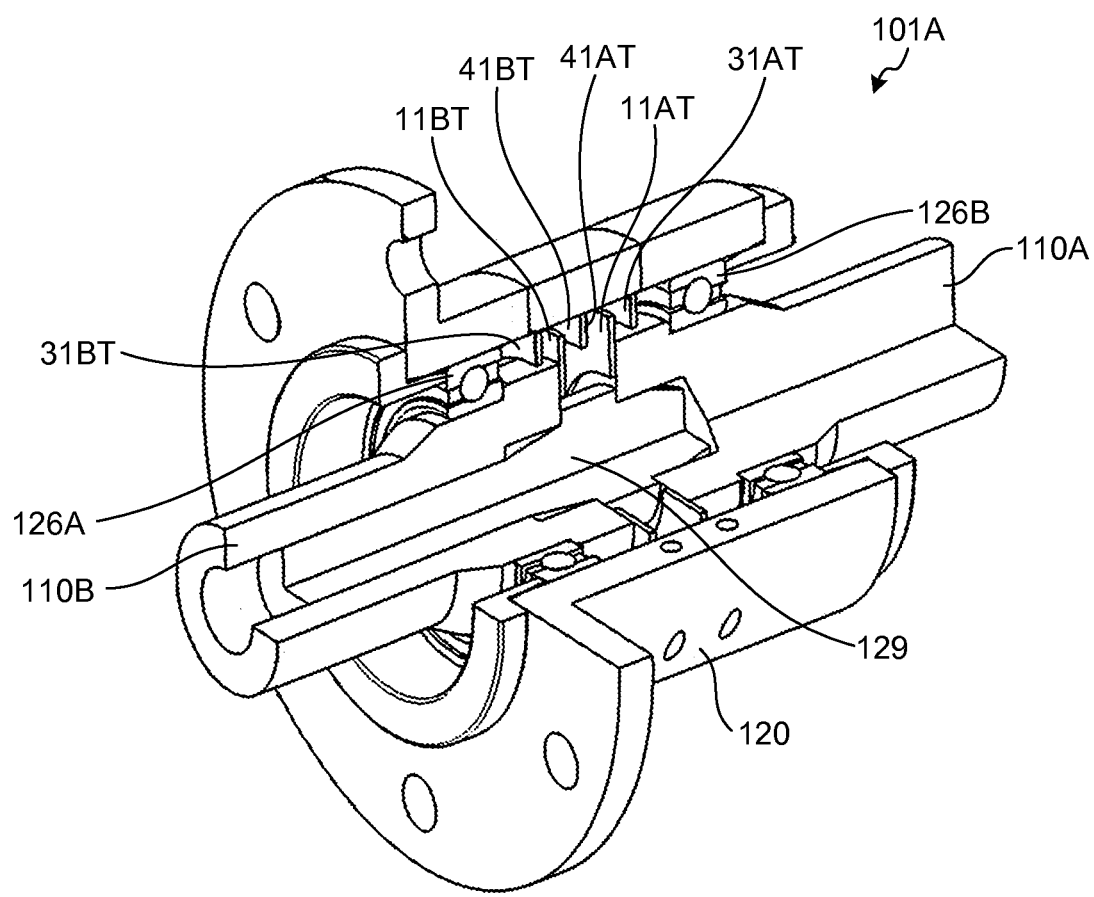
FIG. 32 is an exploded perspective view for explaining main components of a torque sensor according to a fourth embodiment of the present invention.
Figures 1, 33:
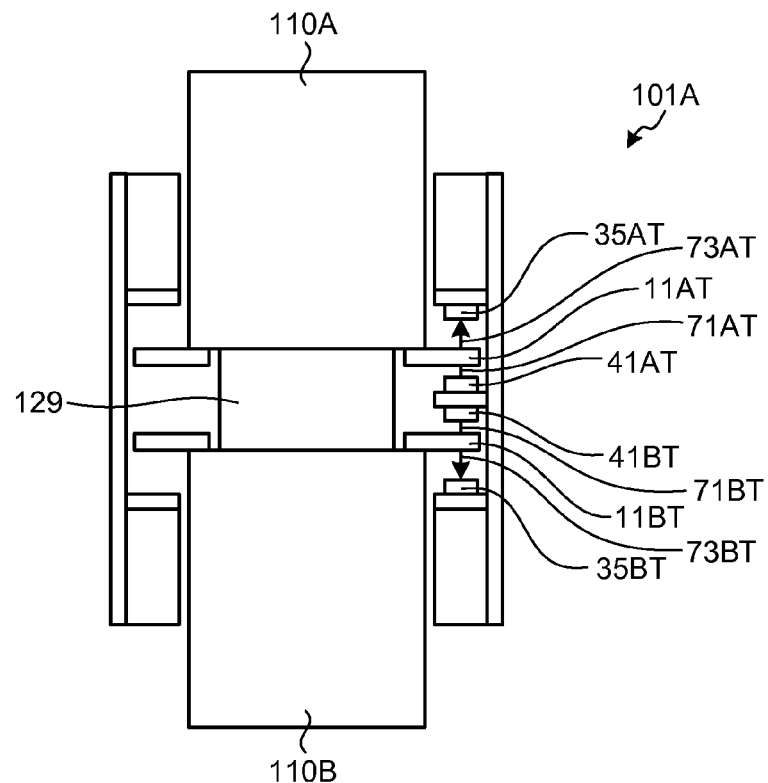
Figures 2, 33:
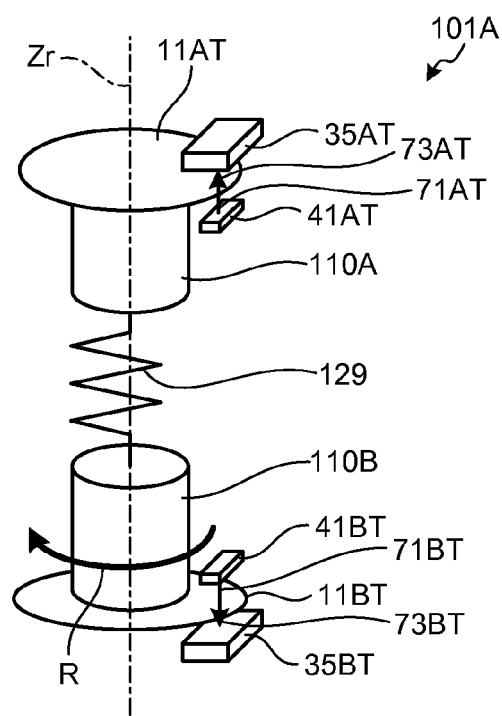

FIG. 32 is an exploded perspective view for explaining main components of a torque sensor according to a fourth embodiment of the present invention. FIG. 33-1 is a schematic for explaining an arrangement of optical scales and optical sensors in the torque sensor according to the fourth embodiment. FIG. 33-2 is a schematic for schematically explaining the optical scales and the optical sensors in the torque sensor according to the fourth embodiment. This torque sensor 101A will be explained in detail with reference to FIGS. 32 to 33-2. The members that are the same as those described above are assigned with the same reference numerals, and redundant explanations thereof are omitted hereunder.

The torque sensor 101A includes a first rotating shaft 110A, a second rotating shaft 110B, a torsion bar 129, an optical scale 11AT, an optical sensor 35AT, a light source 41AT, an optical scale 11BT, an optical sensor 35BT, and a light source 41BT provided inside of the housing 120. The torque sensor 101A is referred to as an axial torque sensor.

Mounted on one end of the torsion bar 129 is the first rotating shaft 110A, and mounted on the other end of the torsion bar 129 (the end on the opposite side of the end on which the first rotating shaft 110A is mounted) is the second rotating shaft 110B. In other words, one end of the torsion bar 129 is provided with the first rotating shaft 110A, and the other end is provided with the second rotating shaft 110B. The first rotating shaft 110A is connected to an input shaft, for example, and the second rotating shaft 110B is connected to an output shaft. The first rotating shaft 110A and the second rotating shaft 110B are supported rotatably by the housing 120 via a bearing 126A and a bearing 126B, respectively.

In the torque sensor 101A, the first rotating shaft 110A may be manufactured integrally with the input shaft, and the second rotating shaft 110B may be manufactured integrally with the output shaft. This structure allows the input shaft, the first rotating shaft 110A, the torsion bar 129, the second rotating shaft 110B, and the output shaft to be positioned coaxially. In the embodiment, the first rotating shaft 110A is connected to the one end of the torsion bar 129 unrotatably, and the other end of the torsion bar 129 is connected to the second rotating shaft 110B unrotatably. When a torque is applied to the torsion bar 129, torsion is generated in the torsion bar 129. In other words, when a torque is applied via the first rotating shaft 110A, the first rotating shaft 110A is rotationally displaced with respect to the second rotating shaft 110B, whereby causing torsion to be produced in the torsion bar 129.

The first rotating shaft 110A is an approximately cylindrical member. In the embodiment, the optical scale 11AT is provided on the outer circumference of the first rotating shaft 110A. In the embodiment, the optical scale 11AT protrudes outwardly from the outer circumference of the first rotating shaft 110A, and has a ring-like shape along the circumferential direction of the first rotating shaft 110A.

The second rotating shaft 110B is an approximately cylindrical member. The optical scale 11BT is provided on the outer circumference of the second rotating shaft 110B. In the embodiment, the optical scale 11BT protrudes outwardly from the outer circumference of the second rotating shaft 110B, and has a ring-like shape along the circumferential direction of the second rotating shaft 110B.

As illustrated in FIGS. 32 to 33-2, at least two pairs of light sources 41AT, 41BT and optical sensor packages 31AT, 31BT are arranged and provided outside of the first rotating shaft 110A and the second rotating shaft 110B, respectively, along the direction of the rotational axis Zr of the first rotating shaft 110A and the second rotating shaft 110B. In the embodiment, two pairs of the light source and the optical sensor are provided, but the number of the light sources and the optical sensors is not limited thereto. These pairs of the light source 41AT and the optical sensor package 31AT, and the light source 41BT and the optical sensor package 31BT are combinations of the same light source and optical sensor, and are positioned inside of the housing 120.

The torque sensor 101A detects a relative displacement (rotational displacement) between the first rotating shaft 110A and the second rotating shaft 110B that are connected via the torsion bar 129, by reflecting a detection result from the optical sensor package 31AT which reads the optical scale 11AT or a detection result from the optical sensor package 31BT which reads the optical scale 11BT.

The optical scales 11AT, 11BT are made of silicon, glass, or a polymer material, for example. The optical scales 11AT, 11BT both have the signal tracks T1 on one or both of the surfaces. As illustrated in FIGS. 33-1 and 33-2, the light source 41AT is arranged at a position facing the optical sensor 35AT across the optical scale 11AT. The light source 41BT is arranged at a position facing the optical sensor 35BT across the optical scale 11BT.

Figure 34:
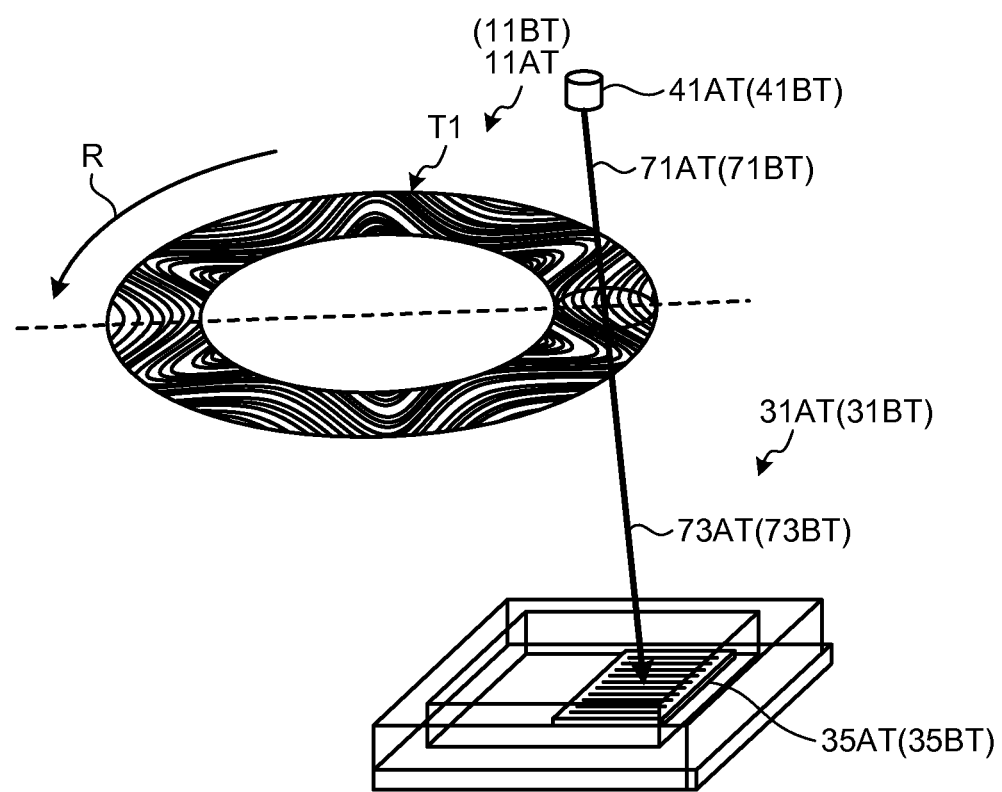
FIG. 34 is a schematic for explaining an arrangement of the optical scales and the optical sensors in the torque sensor according to the fourth embodiment.

FIG. 34 is a schematic for explaining an arrangement of the optical scales and the optical sensors in the torque sensor according to the fourth embodiment. In the same manner as in the optical sensor 35 illustrated in FIG. 2-2, the optical sensor 35AT illustrated in FIG. 34 is capable of reading signal tracks T1 on the optical scale 11AT, and the light source 41AT is arranged at a position facing the optical sensor 35AT across the optical scale 11AT. With this structure, the light source light 71AT from the light source 41AT is passed through the signal tracks T1 on the optical scale 11AT, and the optical sensor 35AT detects the transmissive light 73AT thus passed through as incident light. A relation between the optical sensor 35BT, the optical scale 11BT, and the light source 41BT is the same as the relation between the optical sensor 35AT, the optical scale 11AT, and the light source 41AT. With this structure, the light source light 71BT from the light source 41BT is passed through the signal tracks T1 on the optical scale 11BT, and the optical sensor 35BT detects the transmissive light 73BT thus passed through as incident light.

As the first rotating shaft 110A is rotated, the signal tracks T1 on the optical scale 11AT move relatively to the optical sensor 35AT. As the second rotating shaft 110B is rotated, the signal tracks T1 on the optical scale 11BT moves relatively to the optical sensor 35BT.

Figure 35:
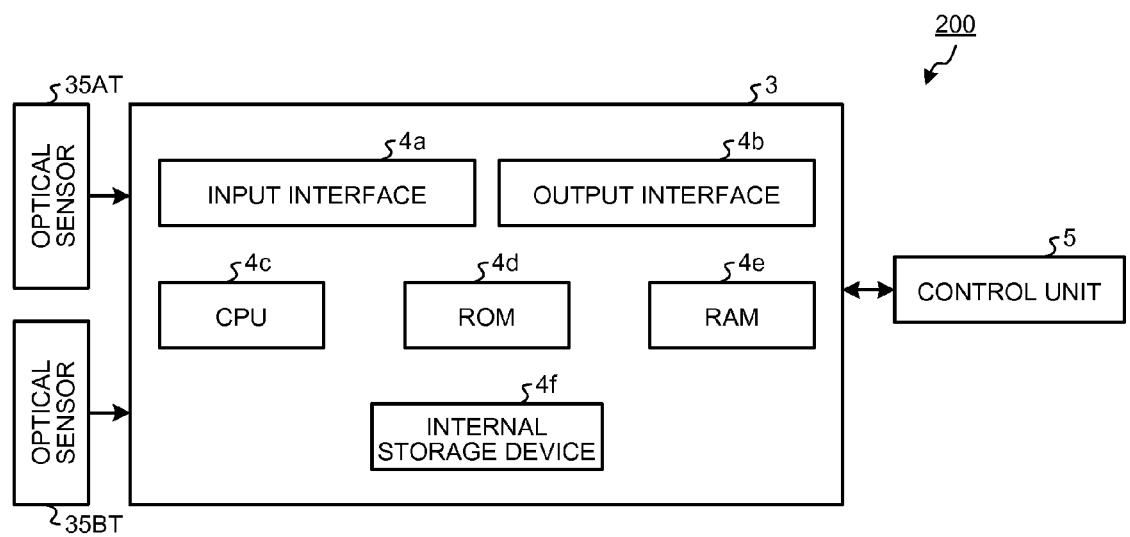
FIG. 35 is a block diagram of a torque detection apparatus according to the fourth embodiment.

FIG. 35 is a block diagram of a torque detection apparatus according to the fourth embodiment. This torque detection apparatus 200 includes the torque sensor 101A and the computing unit 3. The optical sensor 35AT and the optical sensor 35BT in the torque sensor 101A are connected to the computing unit 3, as illustrated in FIG. 35. The computing unit 3 is connected to the control unit 5 of the rotary machine such as a motor.

The torque detection apparatus 200 uses the optical sensors 35AT and 35BT to detect the incident transmissive light 73AT and 73BT that is the light source light 71AT and 71BT having passed through the respective optical scales 11AT and 11BT. The computing unit 3 calculates a relative position of the first rotating shaft 110A with respect to the optical sensor package 31AT in the torque sensor 101A from the detection signal from the optical sensor 35AT. The computing unit 3 also calculates a relative position of the second rotating shaft 110B with respect to the optical sensor package 31BT in the torque sensor 101A from the detection signal from the optical sensor 35BT.

The computing unit 3 stores the torsional elastic coefficient of the torsion bar 129 in the RAM 4e and the internal storage device 4f. Torque is proportional to a torsional elastic coefficient of the torsion bar 129. Therefore, in order to acquire torsion, the computing unit 3 calculates the rotational displacement (the amount of displacement) of the rotation angle of the first rotating shaft 110A with respect to the rotation angle of the second rotating shaft 110B. The computing unit 3 can then calculate the torque from the elastic coefficient of the torsion bar 129 and the information of the relative positions of the first rotating shaft 110A and the second rotating shaft 110B. The computing unit 3 then outputs the torque to the control unit 5 of a rotary machine (motor) or the like, as a control signal.

The computing unit 3 is a computer such as a PC, and includes the input interface 4a, the output interface 4b, the CPU 4c, the ROM 4d, the RAM 4e, and the internal storage device 4f. The input interface 4a, the output interface 4b, the CPU 4c, the ROM 4d, the RAM 4e, and the internal storage device 4f are connected via an internal bus. The computing unit 3 may be configured as a dedicated processing circuit.

The input interface 4a receives input signals from the optical sensors 35AT and 35BT in the torque sensor 101A, and outputs the signals to the CPU 4c. The output interface 4b receives the control signal from the CPU 4c, and outputs the control signal to the control unit 5.

The ROM 4d stores therein computer programs such as a BIOS. The internal storage device 4f is a HDD or a flash memory, for example, and stores therein an operating system program and application programs. The CPU 4c implements various functions by executing the computer programs stored in the ROM 4d or in the internal storage device 4f, using the RAM 4e as a working area.

The internal storage device 4f stores therein a database in which a polarization axis of each of the optical scales 11AT, 11BT, which are described later, is associated with an output of the corresponding optical sensor 35AT, 35BT.

As the signal tracks T1, an arrangement of wires g, which is referred to as a wire grid pattern, illustrated in FIG. 4 is formed on each of the optical scales 11AT and 11BT illustrated in FIGS. 32 to 33-2.

The wires g are arranged in a manner not intersecting one another, and in such a manner that each of the tangential directions changes continuously. Provided between the adjacent wires g is a transmissive area w through which the entire or a part of the light source light 71AT, 71BT is allowed to pass. When the width of the wire g and the pitch between the adjacent wires g, that is, the width of the wire g and the width of the transmissive area w, are made sufficiently smaller than the wavelength of the light source light 71AT, 71BT, the optical scale 11AT, 11BT can polarize the transmissive light 73AT, 73BT of the light source light 71AT, 71BT.

This structure allows the polarization of the transmissive light 73AT, 73BT (or reflected light) to change correspondingly to the tangential direction, which is dependent on the position where the light source light 71AT, 71BT output to the optical scale 11AT, 11BT is passed through. Therefore, each of the optical scales 11AT, 11BT does not need to be provided with highly granular segments each having a different polarizing direction. As a result, the optical scales 11AT, 11BT allow a high resolution to be achieved even when the size of the optical scale is reduced. When the sizes of the optical scales 11AT, 11BT are reduced, the arrangement of the light sources 41AT, 41BT and the optical sensors 35AT, 35BT can be designed more freely. Furthermore, the optical scale 11AT, 11BT can have a higher heat resistance, compared with a photo-induced polarizer. Moreover, because the optical scale 11AT, 11BT has a line pattern without any intersections even locally, a highly accurate optical scale with a smaller error can be achieved. Furthermore, because the optical scales 11AT, 11BT can be manufactured stably with a bulk-exposure, a highly accurate optical scale with a smaller error can be achieved.

As the tangential angle of the wire grid pattern changes, the polarization axis of the incident light that becomes incident on the optical sensor 35AT changes correspondingly to the rotation of the optical scale 11AT. Therefore, by detecting a change in the polarization axis, the rotation of the optical scale 11AT can be recognized. Explained now is the optical sensor 35AT according to the fourth embodiment that detects a change in the polarization axis and serves as a polarization splitting unit. Because the optical sensor 35BT is the same as the optical sensor 35AT, a detailed explanation of the optical sensor 35BT is omitted herein.

In the same manner as in the optical sensor 35 illustrated in FIG. 15-1, the optical sensor 35AT includes a first optical sensor 36A and a second optical sensor 36B. The first optical sensor 36A includes a sensor base 36Ka and the first photoreceivers 36a, and is capable of detecting the intensity of light with the first polarization direction. Each of the first photoreceivers 36a is provided with the first polarizing layer that splits incident light to the light with the first polarization direction, and receives the first polarized light split by the first polarizing layer.

The second optical sensor 36B includes the sensor base 36Kb and the second photoreceivers 36b, and is capable of detecting the intensity of light with the second polarization direction. Each of the second photoreceivers 36b is provided with the second polarizing layer that splits the incident light to the light with the second polarization direction, and receives the second polarized light split by the second polarizing layer. Each of the first photoreceivers 36a and the second photoreceivers 36b is configured in a comb-like shape, as illustrated in FIG. 15-1, engaging and spaced uniformly with each other.

This structure allows the incident light to be split into the first polarized light and the second polarized light. As a result, the computing unit can calculate the polarization angle of the transmissive light or the reflected light based on the signal intensities of the polarized component having the first polarization direction and of the polarized component having the second polarization direction thus split. The first polarization direction and the second polarization direction are preferably different from each other by 90 degrees to allow the computing unit to calculate the polarization angle easily.

The computing unit 3 acquires the signal intensity I(−) of the component having the first polarization direction and the signal intensity I(+) of the component having the second polarization direction that are detection signals from the optical sensor 35AT. The computing unit 3 then calculates the differential signal V following Equation (1) below, from the signal intensity I(−) of the component having the first polarization direction and the signal intensity I(+) of the component having the second polarization direction Because the differential signal V calculated from Equation (1) does not include parameters affected by the light intensity of the light source light 71AT, the torque detection apparatus 200 can reduce the influences of fluctuations such as those in the distance between the optical sensor 35AT and the optical scale 11AT, and in the light intensity of the light source 41AT. Therefore, even when the intensity of the incident light is decreased by a foreign substance, the torque detection apparatus 200 can detect a change in the polarization direction Pm via the differential signal V, in a manner less affected by foreign substances.

In FIG. 14, the vertical axis represents the differential signal V and the horizontal axis represents the rotation angle θrot illustrated in FIG. 6. When the rotation angle θrot is 360 degrees, that is, when the optical scale 11AT is rotated once, the differential signal V indicates a waveform with six cycles. This waveform matches the cycles of the curves in the wire pattern illustrated in FIG. 4 having a wave-like form with six cycles in the 360 degrees. The waveform of the differential signal V illustrated in FIG. 14 is a sine wave, for example. The number of waves is merely an example, and is not limited to the number of cycles described above. Although the differential signal V has different phases for the transmissive light and for the reflected light, the differential signal V remains the same in having a waveform with six cycles.

The computing unit 3 stores information representing the relation between the rotation angle θrot and the differential signal V illustrated in FIG. 14 in at least one of the RAM 4e and the internal storage device 4f, so that the CPU 4c can calculate the number of rotations or the rotation angles of the first rotating shaft 110A and of the second rotating shaft 110B from the information of the differential signal V. In other words, the torque detection apparatus 200 also has a function of an angle sensor. Therefore, a separate angle sensor does not need to be provided, so that torque detection apparatus 200 can reduce costs.

The computing unit 3 can calculate the amount of torque from the amount of difference between the rotation angle of the first rotating shaft 110A and the rotation angle of the second rotating shaft 110B, and from the elastic coefficient of the torsion bar 129.

The computing unit 3 also calculates the rotation angle θrot from the differential signal V. The computing unit 3 can then calculate the tangential angle θd from the relation between the tangential angle θd and the rotation angle θrot illustrated in FIG. 7 and the differential signal V indicated in Equation (1) above. By providing the optical scale 11AT with the wire grid pattern in which the tangential angle θd and the maximum angle θmax illustrated in FIG. 7 are changed by given degrees, the torque detection apparatus 200 can achieve a detection apparatus having the relation between the rotation angle and the differential signal. Because the relation between the optical scale 11BT and the optical sensor 35BT is the same as that between the optical scale 11AT and the optical sensor 35AT described above, a detailed explanation thereof is omitted herein.

As described earlier, the torque detection apparatus 200 detects torque using torsion of a torsion bar 129. The first rotating shaft 110A and the second rotating shaft 110B are connected via the torsion bar 129 in which torsion is generated when a torque is applied. The torque detection apparatus 200 includes the optical scale 11AT moving with the rotation of the first rotating shaft 110A, the optical scale 11BT moving with the rotation of the second rotating shaft 110B, the optical sensor 35AT paired with the optical scale 11AT, and the optical sensor 35BT paired with the optical scale 11BT. The torque detection apparatus 200 detects the polarization of the transmissive light that changes depending on the position where the light source light output to the optical scale 11AT and the optical scale 11BT is passed through. In the torque detection apparatus 200, the computing unit 3 serving as a computing unit calculates a relative rotation angle of the optical scale 11AT with respect to the optical sensor 35AT, calculates a relative rotation angle of the optical scale 11BT with respect to the optical sensor 35BT, and calculates rotational displacements of the first rotating shaft 110A and the second rotating shaft 110B.

With this structure, these optical sensors detect rotational angles of a plurality of respective optical scales that are caused to rotate as the respective first and second rotating shafts are rotated, using the polarizations of the transmissive light or the reflected light thus split. Therefore, compared with when the light intensity of the transmissive light is directly detected, the torque detection apparatus can reduce the influence of fluctuations in the amount of detected light caused by foreign substances or the like, even when used are optical torque sensors. Because the tolerance of foreign substances is increased, the torque detection apparatus can be used in an increased number of environments. Furthermore, the torque detection apparatus can reduce the influence of fluctuations in the amount of detected light due to precisions in the optical path (the distance from the optical scale to the optical sensor), even when used are optical torque sensors. As a result, the arrangement of the light sources and the optical sensors can be designed more freely. In this manner, the torque sensors in the torque detection apparatus can be reduced in size. The torque detection apparatus can also achieve a higher resolution, compared with a magnetic torque sensor.

Modification of Torque Sensor

Figure 36:
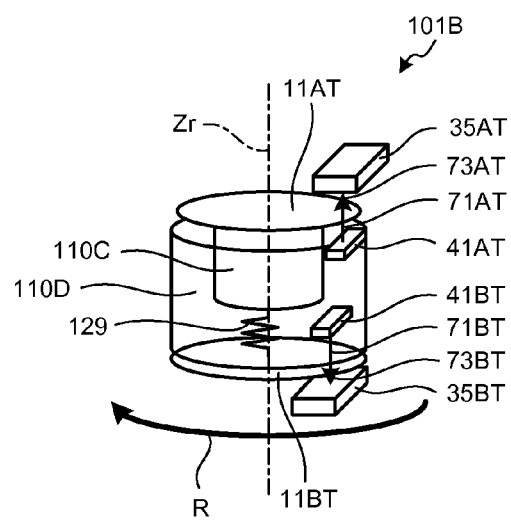
FIG. 36 is a schematic for explaining an exemplary modification of the torque sensor according to the fourth embodiment.

FIG. 36 is a schematic for explaining an exemplary modification of the torque sensor according to the fourth embodiment. The members that are the same as those described above are assigned with the same reference numerals, and redundant explanations thereof are omitted hereunder. This torque sensor 101B includes a first rotating shaft 110C, a second rotating shaft 110D, the torsion bar 129, the optical scale 11AT, the optical sensor 35AT, the light source 41AT, the optical scale 11BT, the optical sensor 35BT, and the light source 41BT provided inside of the housing 120 illustrated in FIG. 32. The torque sensor 101B is referred to as an embedded torque sensor.

Mounted on one end of the torsion bar 129 is the first rotating shaft 110C, and mounted on the other end (the end on the opposite side of the end on which the first rotating shaft 110C is mounted) is the second rotating shaft 110D. In other words, one end of the torsion bar 129 is provided with the first rotating shaft 110C, and the other end is provided with the second rotating shaft 110D. The first rotating shaft 110C is embedded in the second rotating shaft 110D, and is supported rotatably via a bearing. This structure allows the torque sensor 101B to be reduced in length in the axial direction of the rotational axis Zr.

Fifth Embodiment

FIG. 37 is a schematic for explaining a torque sensor according to a fifth embodiment of the present invention. The members that are the same as those described above are assigned with the same reference numerals, and redundant explanations thereof are omitted hereunder. This torque sensor 101C includes the first rotating shaft 110A, the second rotating shaft 110B, the torsion bar 129, an optical scale 11CT, an optical sensor 35AT, the light source 41AT, an optical scale 11DT, the optical sensor 35BT, and the light source 41BT provided inside of the housing 120 illustrated in FIG. 32.

In the torque sensor 101C, the direction from the light source 41AT toward the optical sensor 35AT is orientated the same as the direction from the light source 41BT toward the optical sensor 35BT. The light source 41AT, the optical sensor 35AT, the light source 41BT, and the optical sensor 35BT are positioned so that optical path from the light source 41AT to the optical sensor 35AT and the optical path from the light source 41BT to the optical sensor 35BT are offset from each other in the radial direction.

Both of the optical scale 11CT and the optical scale 11DT have the signal tracks T1, in the same manner as the optical scale 11AT and the optical scale 11BT described above. The signal tracks T1 on the optical scale 11CT are positioned on the optical path from the light source 41AT to the optical sensor 35AT, and the signal tracks T1 on the optical scale 11DT are positioned on the optical path from the light source 41BT to the optical sensor 35BT. Therefore, the optical scale 11CT has a larger diameter than that of the optical scale 11DT, for example.

In the torque sensor 101C according to the fifth embodiment, the optical scale 11CT has a larger diameter than the optical scale 11DT. The light having passed through the optical scale 11CT is passed through the optical scale 11DT, and reaches the optical sensor package 31BT. In this manner, because the tolerance of foreign substances is increased, the torque sensor 101C can be used in an increased number of environments. Furthermore, because the influence of fluctuations in the amount of detected light can be reduced, the optical sensor 35BT can detect even the transmissive light having passed through the optical scale 11CT and the optical scale 11DT. As a result, with the torque sensor 101C according to the fifth embodiment, the arrangement of the light sources and the optical sensors can be designed more freely.

Sixth Embodiment

FIG. 38 is a schematic for explaining a torque sensor according to a sixth embodiment of the present invention. The members that are the same as those described above are assigned with the same reference numerals, and redundant explanations thereof are omitted hereunder. This torque sensor 101D includes the first rotating shaft 110A, the second rotating shaft 110B, the torsion bar 129, the optical scale 11AT, the optical sensor 35AT, the light source 41AT, a waveguide 45A, the optical scale 11BT, the optical sensor 35BT, the light source 41BT, and a waveguide 45B provided inside of the housing 120 illustrated in FIG. 32.

In the torque sensor 101D, the light source 41AT and the optical sensor 35AT are arranged adjacent to each other. The light source light from the light source 41AT is passed through the optical scale 11AT to achieve transmissive light, and the optical sensor 35AT detects the transmissive light refracted on the waveguide 45A such as a prism. Similarly, the light source 41BT and the optical sensor 35BT are arranged adjacent to each other in the torque sensor 101D. The light source light from the light source 41BT is then passed through the optical scale 11BT to achieve transmissive light, and the optical sensor 35BT detects the transmissive light refracted on the waveguide 45B such as a prism.

In the torque sensor 101D according to the sixth embodiment, the light is passed through the waveguides 45A and 45B and reaches the optical sensors 35AT and 35BT, respectively. In this manner, because the tolerance of foreign substances is increased, the torque sensor 101D can be used in an increased number of environments. Furthermore, because the influence of fluctuations in the amount of detected light can be reduced, the optical sensors 35AT, 35BT can detect the transmissive light passed through the waveguide 45A, 45B. As a result, with the torque sensor 101D according to the sixth embodiment, the arrangement of the light sources and the optical sensors can be designed more freely.

Seventh Embodiment

Figure 39:
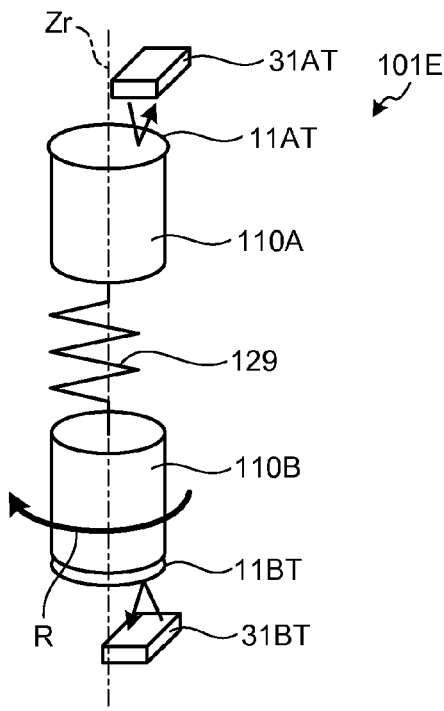
FIG. 39 is a schematic for schematically explaining a torque sensor according to a seventh embodiment of the present invention.
Figure 40:
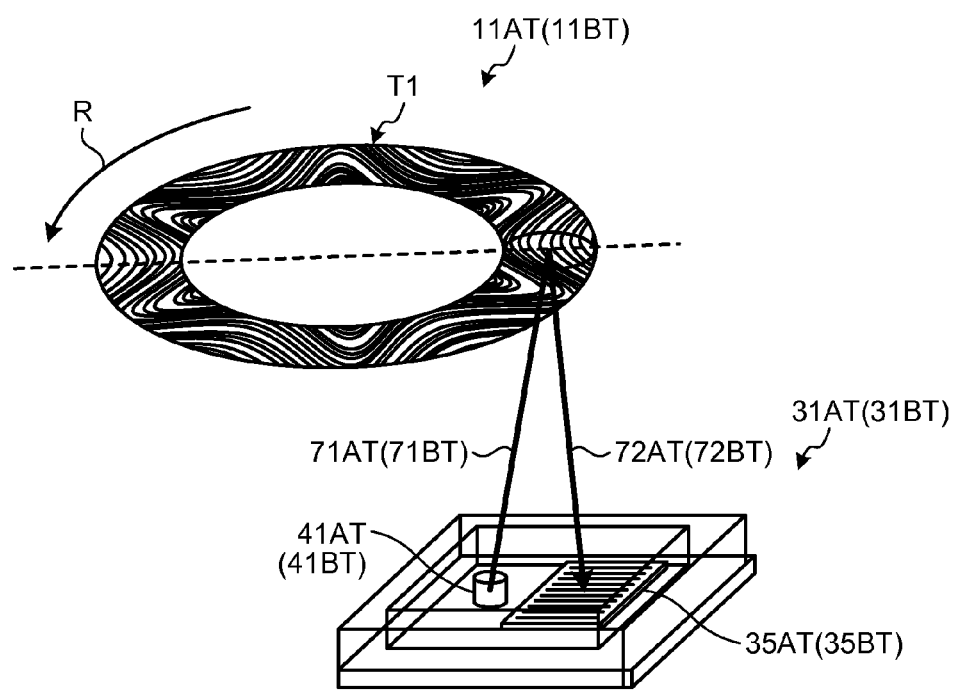
FIG. 40 is a schematic for explaining an arrangement of the optical scale and the optical sensor in a torque sensor according to the seventh embodiment.

FIG. 39 is a schematic for schematically explaining the torque sensor according to the seventh embodiment. FIG. 40 is a schematic for explaining an arrangement of an optical scale and an optical sensor in the torque sensor according to the seventh embodiment. The members that are the same as those described above are assigned with the same reference numerals, and redundant explanations thereof are omitted hereunder. This torque sensor 101E includes the first rotating shaft 110A, the second rotating shaft 110B, the torsion bar 129, the optical scale 11AT, the optical sensor package 31AT, the light source 41AT, the optical scale 11BT, the optical sensor package 31BT, and the light source 41BT provided inside of the housing 120 illustrated in FIG. 32.

As illustrated in FIG. 40, the optical sensor packages 31AT, 31BT include optical sensors 35AT, 35BT capable of reading the signal tracks T1 on the optical scales 11AT, 11BT, and the light sources 41AT, 41BT, respectively. For example, the light source light 71AT from the light source 41AT is reflected on the signal tracks T1, and the optical sensor 35AT detects the reflected light 72AT thus reflected as incident light.

As described earlier, the torque detection apparatus 200 includes the optical scales 11AT and the optical scale 11BT respectively moving as the first rotating shaft 110A and the second rotating shaft 110B are rotated, and the optical sensor 35AT and the optical sensor 35BT that are paired with the optical scale 11AT and the optical scale 11BT, respectively, to detect the polarization of reflected light changing correspondingly to the position where the light source light output to the optical scale 11AT and the optical scale 11BT is reflected. In the torque detection apparatus 200, the computing unit 3 serving as a computing unit calculates a relative rotation angle of the optical scale 11AT with respect to the optical sensor 35AT, calculates a relative rotation angle of the optical scale 11BT with respect to the optical sensor 35BT, and calculates rotational displacements of the first rotating shaft 110A and the second rotating shaft 110B.

With this structure, the optical sensors detect the rotational angles of a plurality of respective optical scales that are caused to rotate as the respective first and second rotating shafts are rotated, as the polarizations of the light split from the reflected light. Therefore, the torque detection apparatus can reduce the influence of fluctuations in the amount of detected light caused by foreign substances or the like, compared with when the light intensity of reflected light is directly detected, even when used are optical torque sensors. Because the tolerance of foreign substances is increased, the torque detection apparatus can be used in an increased number of environments. Furthermore, the torque detection apparatus can reduce the influence of fluctuations in the amount of detected light due to precisions in the optical path (the distance from the optical scale to the optical sensor), even when used are optical torque sensors. As a result, the arrangement of the light sources and the optical sensors can be designed more freely. In this manner, the torque sensors in the torque detection apparatus can be reduced in size. Furthermore, the torque detection apparatus can also achieve a higher resolution, compared with a magnetic torque sensor.

Modification of Torque Sensor

Figure 41:
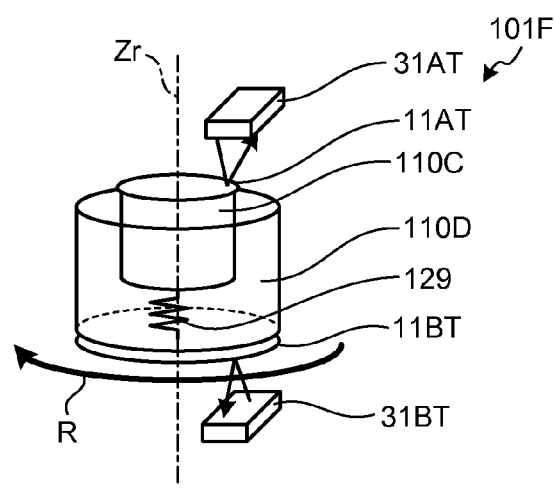
FIG. 41 is a schematic for explaining an exemplary modification of the torque sensor according to the seventh embodiment.

FIG. 41 is a schematic for explaining an exemplary modification of the torque sensor according to the seventh embodiment. The members that are the same as those described above are assigned with the same reference numerals, and redundant explanations thereof are omitted hereunder. This torque sensor 101F includes the first rotating shaft 110C, the second rotating shaft 110D, the torsion bar 129, the optical scale 11AT, the optical sensor package 31AT, the light source 41AT, the optical scale 11BT, the optical sensor package 31BT, and the light source 41BT that are provided inside of the housing 120. The torque sensor 101F is referred to as an embedded torque sensor.

Mounted on one end of the torsion bar 129 is the first rotating shaft 110C, and mounted on the other end (the end on the opposite side of the end to which the first rotating shaft 110C is attached) is the second rotating shaft 110D. In other words, the one end of the torsion bar 129 is provided with the first rotating shaft 110C, and the other end is provided with the second rotating shaft 110D. The first rotating shaft 110C is embedded in the second rotating shaft 110D, and is supported rotatably via a bearing. With this structure, the torque sensor 101F can reduce the length in the axial direction Zr.

Eighth Embodiment

Figure 42:
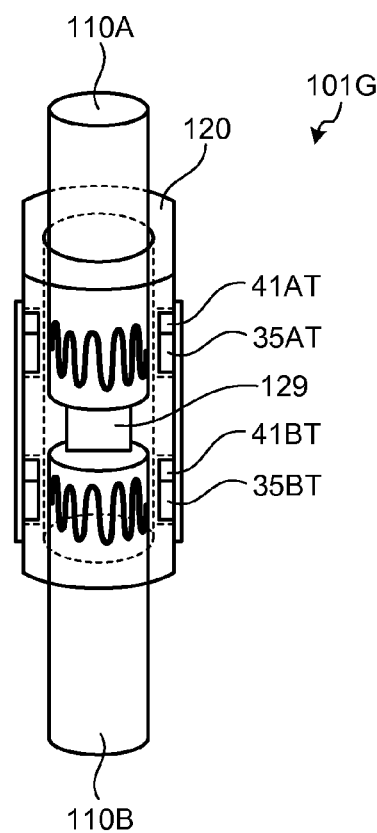
FIG. 42 is a schematic of a structure of a torque sensor according to an eighth embodiment of the present invention.
Figure 43:
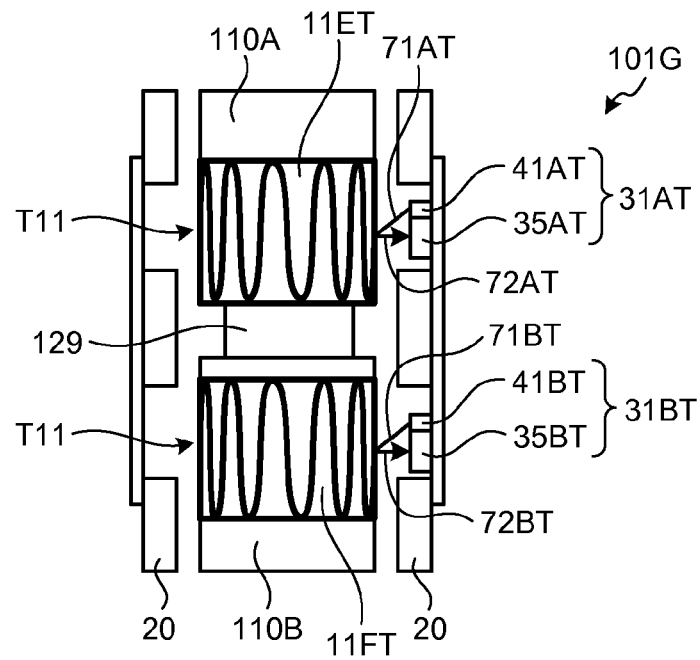
FIG. 43 is a side view of a structure of the torque sensor according to the eighth embodiment.

FIG. 42 is a schematic of a structure of a torque sensor according to an eighth embodiment of the present invention. FIG. 43 is a side view of a structure of the torque sensor according to the eighth embodiment. The members that are the same as those described above are assigned with the same reference numerals, and redundant explanations thereof are omitted hereunder.

This torque sensor 101G includes the first rotating shaft 110A, the second rotating shaft 110B, the torsion bar 129, an optical scale 11ET, the optical sensor 35AT, the light source 41AT, an optical scale 11FT, the optical sensor 35BT, and the light source 41BT that are provided inside of the housing 120. The torque sensor 101G is referred to as a radial torque sensor.

Each of the first rotating shaft 110A and the second rotating shaft 110B is both a cylindrical member. The first rotating shaft 110A and the second rotating shaft 110B have the optical scale 11ET and the optical scale 11FT, respectively, on their outer circumferential surface of the cylindrical members. Each of the optical scale 11ET and the optical scale 11FT has signal tracks T11 that are the wire grid pattern. The optical sensor 35AT and the optical sensor 35BT are both fixed to the housing 120. When the first rotating shaft 110A is rotated, the signal tracks T11 on the optical scale 11ET moves relatively to the optical sensor package 31AT. When the second rotating shaft 110B is rotated, the signal tracks T11 on the optical scale 11FT moves relatively to the optical sensor package 31BT.

The optical sensor package 31AT includes the optical sensor 35AT capable of reading the signal tracks T11 on the optical scale 11ET, and the light source 41AT. The light source light 71AT from the light source 41AT is reflected on the signal tracks T11 on the optical scale 11ET, and the optical sensor 35AT detects the reflected light 72AT thus reflected as incident light. The optical sensor package 31BT includes the optical sensor 35BT capable of reading the signal tracks T11 on the optical scale 11FT, and the light source 41BT. The light source light 71BT from the light source 41BT is reflected on the signal tracks T11 on the optical scale 11FT, and the optical sensor 35BT detects the reflected light 72BT thus reflected as incident light. The torque detection apparatus according to the embodiment is provided with the torque sensor 101G and the computing unit 3 described above, and the optical sensor 35AT and the optical sensor 35BT in the torque sensor 101G are connected to the computing unit 3, as illustrated in FIG. 35. The computing unit 3 is connected to the control unit 5 of the rotary machine such as a motor.

The signal tracks T11 illustrated in FIG. 23 is an arrangement of wires g, which is referred to as a wire grid pattern, formed on the optical scale 11ET and the optical scale 11FT illustrated in FIGS. 42 and 43.

The wire g is arranged in plurality, in such a manner that each of the wires does not intersect with one another, and in such a manner that each of the tangential directions changes continuously. Provided between the adjacent wires g is a transmissive area w through which the entire or a part of the light source light 71AT, 71BT is allowed to pass. When the width of the wire g and the pitch between the adjacent wires g, that is, the width of the wire g and the width of the transmissive area w, are made sufficiently smaller than the wavelength of the light source light 71AT, 71BT from the light sources 41AT, 41BT, the optical scale 11ET can polarize the reflected light 72AT from the light source light 71AT, and the optical scale 11FT can polarize the reflected light 72BT from the light source light 71BT.

With this structure, the polarization of the transmissive light or the reflected light can be changed correspondingly to the tangential direction, which is dependent on the positions where the light source light output to the optical scales is passed through or is reflected. Therefore, the optical scales do not need to be provided with highly granular segments each having a different polarizing direction. As a result, the optical scales allow a high resolution to be achieved even when the sizes of the optical scales is reduced. Furthermore, by reducing the sizes of the optical scales, the arrangement of the light sources and the optical sensors can be designed more freely. Furthermore, compared with photo-induced polarizers, optical scales have a higher heat resistance. Because the optical scales 11AT, 11BT have line patterns without any intersections even locally, highly accurate optical scales with smaller errors can be achieved. Furthermore, because the optical scales can be manufactured stably with a bulk-exposure, highly accurate optical scales with smaller errors can be achieved.

The optical scale 11ET and the optical scale 11FT may be achieved by directly forming the wire grid patterns illustrated in FIG. 23 on the outer circumferential surface of the cylindrical first rotating shaft 110A and second rotating shaft 110B via vapor deposition, for example. The optical scale 11ET and the optical scale 11FT may also be achieved by forming the wire grid patterns illustrated in FIG. 23 on elastic, transparent base members, and winding such base members around the respective outer circumferential surfaces of the cylindrical first rotating shaft 110A and second rotating shaft 110B.

In the same manner as in FIG. 26, r denotes the radius of the first rotating shaft 110A and the second rotating shaft 110B, and zr denotes the rotational center of the first rotating shaft 110A and the second rotating shaft 110B. When the first rotating shaft 110A and the second rotating shaft 110B are rotated, the sensing area Ls1 of the optical sensor 35AT and the optical sensor 35BT moves to the sensing area Ls2. θrot denotes a rotation angle of the first rotating shaft 110A or the second rotating shaft 110B.

The computing unit 3 illustrated in FIG. 35 acquires the signal intensity I(−) of the component having the first polarization direction and the signal intensity I(+) of the component having the second polarization direction that are detection signals from each of the optical sensor 35AT and the optical sensor 35BT. The computing unit 3 then calculates the differential signal V the signal intensity I(−) of the component having the first polarization direction and the signal intensity I(+) of the component having the second polarization direction following Equation (1) mentioned above. Although the differential signal V has different phases for the transmissive light and for the reflected light, the differential signal V remains the same in having a waveform with six cycles.

In FIG. 14, the vertical axis represents the differential signal V and the horizontal axis represents the rotation angle θrot illustrated in FIG. 26. When the rotation angle θrot is 360 degrees, that is, when the optical scale 11ET or the optical scale 11FT is rotated once about the rotational center zr, the differential signal V indicates a waveform with six cycles. This waveform matches the cycles of the curves in the wire pattern illustrated in FIG. 23, which has a wave-like form with six cycles in the 360 degrees. The waveform of the differential signal V illustrated in FIG. 14 is a sine wave, for example. The number of waves is merely an example, and is not limited to the number of cycles described above.

The computing unit 3 stores the information representing the relation between the rotation angle θrot and the differential signal V illustrated FIG. 26 in at least one of the RAM 4e and the internal storage device 4f, so that the CPU 4c can calculate the number of rotations of the first rotating shaft 110A or the second rotating shaft 110B from the information of the differential signal V. In other words, the torque detection apparatus 200 also has a function of an angle sensor. Therefore, a separate angle sensor does not need to be provided, so that the torque detection apparatus 200 can reduce costs. The computing unit 3 can calculate the amount of torque from the amount of displacement between the rotation angle of the first rotating shaft 110A and the rotation angle of the second rotating shaft 110B, and the elastic coefficient of the torsion bar 129.

As described earlier, the torque detection apparatus 200 includes the optical scale 11ET and the optical scale 11FT that are caused to move as the first rotating shaft 110A and the second rotating shaft 110B are rotated, respectively, and the optical sensors 35AT and 35BT that are paired with the optical scale 11ET and the optical scale 11FT, respectively, and that detects the polarization of the reflected light changing correspondingly to the positions where the light source light output to the optical scale 11ET and the optical scale 11FT is reflected. In the torque detection apparatus 200, the computing unit 3 serving as a computing unit calculates a relative rotation angle of the optical scale 11ET with respect to the optical sensor 35AT, and calculates a relative rotation angle of the optical scale 11FT with respect to the optical sensor 35BT, and calculates rotational displacements of the first rotating shaft 110A and the second rotating shaft 110B.

With this structure, the optical sensors detect the rotational angles of a plurality of respective optical scales that are caused to move when the respective first and second rotating shafts are rotated, using the polarizations of the light split from the reflected light. Therefore, the torque detection apparatus can reduce the influence of fluctuations in the amount of detected light caused by foreign substances or the like, compared with when the light intensity of reflected light is directly detected, even when used are optical torque sensors. Because the tolerance of foreign substances is increased, the torque detection apparatus can be used in an increased number of environments. Furthermore, the torque detection apparatus can reduce the influence of fluctuations in the amount of detected light due to precisions in the optical path (the distance from the optical scale to the optical sensor), even when used are optical torque sensors. As a result, the arrangement of the light sources and the optical sensors can be designed more freely. In this manner, the torque sensors in the torque detection apparatus can be reduced in size. Furthermore, such a torque detection apparatus can also achieve a higher resolution, compared with a magnetic torque sensor.

Modification of Torque Sensor

Figure 44:
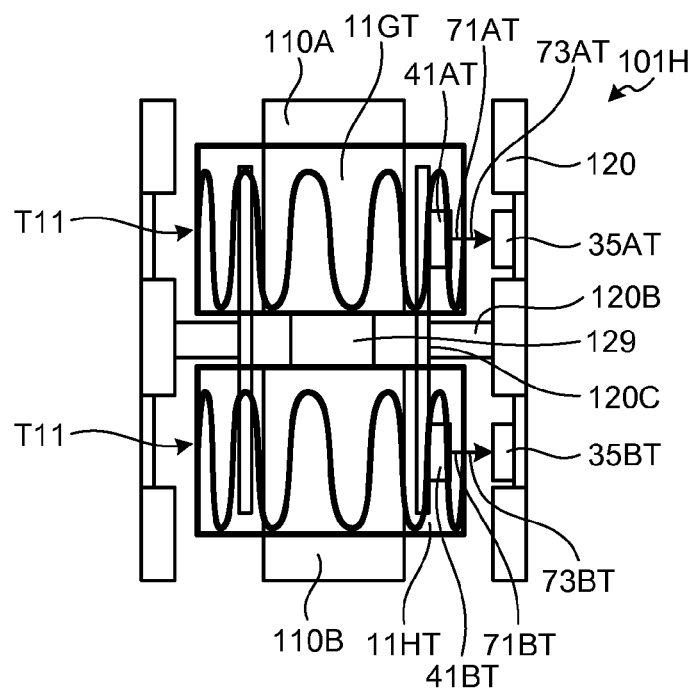
FIG. 44 is a schematic of a structure of the torque sensor according to a modification of the eighth embodiment.

FIG. 44 is a schematic of a structure of a torque sensor according to a modification of the eighth embodiment. The members that are the same as those described above are assigned with the same reference numerals, and redundant explanations thereof are omitted hereunder. This torque sensor 101H includes the first rotating shaft 110A, the second rotating shaft 110B, the torsion bar 129, an optical scale 11GT, the optical sensor 35AT, the light source 41AT, an optical scale 11HT, the optical sensor 35BT, and the light source 41BT that are provided inside of the housing 120.

Each of the first rotating shaft 110A and the second rotating shaft 110B is a cylindrical member. The signal tracks T11 illustrated in FIG. 23 are an arrangement of wires g, which is referred to as a wire grid pattern, formed on each of the optical scale 11GT and the optical scale HT. Provided between the adjacent wires g is a transmissive area w through which the entire or a part of the light source light 71AT, 71BT is allowed to pass. When the width of the wire g and the pitch between the adjacent wires g, that is, the width of the wire g and the width of the transmissive area w, are made sufficiently smaller than the wavelength of the light source light 71AT, 71BT from the light source 41AT, 41BT, the optical scale 11GT and the optical scale 11HT can polarize the transmissive light 73AT from the light source light 71AT and the transmissive light 73BT from the light source light 71BT.

The light source 41AT is supported by a mount member 120B and a mount member 120C that are fixed to the housing 120, and positioned between the first rotating shaft 110A and the optical scale 11GT. In this structure, the light source 41AT is arranged at a position facing the optical sensor 35AT across the optical scale 11GT. Therefore, the light source light 71AT from the light source 41AT is passed through the signal tracks T11 on the optical scale 11GT, so that the optical sensor 35AT can detect the transmissive light 73AT thus passed through as incident light. When the first rotating shaft 110A is rotated, the signal tracks T11 on the optical scale 11GT move relatively to the optical sensor 35AT.

The light source 41BT is supported by the mount member 120B and the mount member 120C that are fixed to the housing 120, and positioned between the second rotating shaft 110B and the optical scale 11HT. In this structure, the light source 41BT is arranged at a position facing the optical sensor 35BT across the optical scale 11HT. Therefore, the light source light 71BT from the light source 41BT is passed through the signal tracks T11 on the optical scale 11HT, so that optical sensor 35BT can detect the transmissive light 73BT thus passed through. When the second rotating shaft 110B is rotated, the signal tracks T11 on the optical scale 11HT move relatively to the optical sensor 35BT.

As described earlier, the torque detection apparatus 200 includes the optical scales 11GT and 11HT that are caused to rotate as the respective first and second rotating shafts 110A and 110B are rotated, the optical sensors 35AT and 35BT that are paired with the respective optical scales 11GT and 11HT, and that detect the polarization of the transmissive light that changes correspondingly to the positions where the light source light output to the optical scale 11GT and the optical scale 11HT is passed through. In the torque detection apparatus 200, the computing unit 3 serving as a computing unit calculates a relative rotation angle of the optical scale 11GT with respect to the optical sensor 35AT, calculates a relative rotation angle of the optical scale 11HT with respect to the optical sensor 35BT, and calculates rotational displacements of the first rotating shaft 110A and the second rotating shaft 110B.

With this structure, the optical sensors detect the rotational angles of a plurality of respective optical scales that are caused to rotate as the first and second rotating shafts are rotated, respectively, using the polarizations of the transmissive light or reflected light thus split. Therefore, the torque detection apparatus can reduce the influence of fluctuations in the amount of detected light caused by foreign substances or the like, compared with when the light intensity of the transmissive light is directly detected, even when used are optical torque sensors. Because the tolerance of foreign substances is increased, the torque detection apparatus can be used in an increased number of environments. Furthermore, the torque detection apparatus can reduce the influence of fluctuations in the amount of detected light due to precisions in the optical path (the distance from the optical scale to the optical sensor), even when used are optical torque sensors. As a result, the arrangement of the light sources and the optical sensors can be designed more freely. In this manner, the torque sensors in the torque detection apparatus can be reduced in size. Furthermore, the torque detection apparatus can also achieve a higher resolution, compared with a magnetic torque sensor.

Ninth Embodiment

Figure 45:
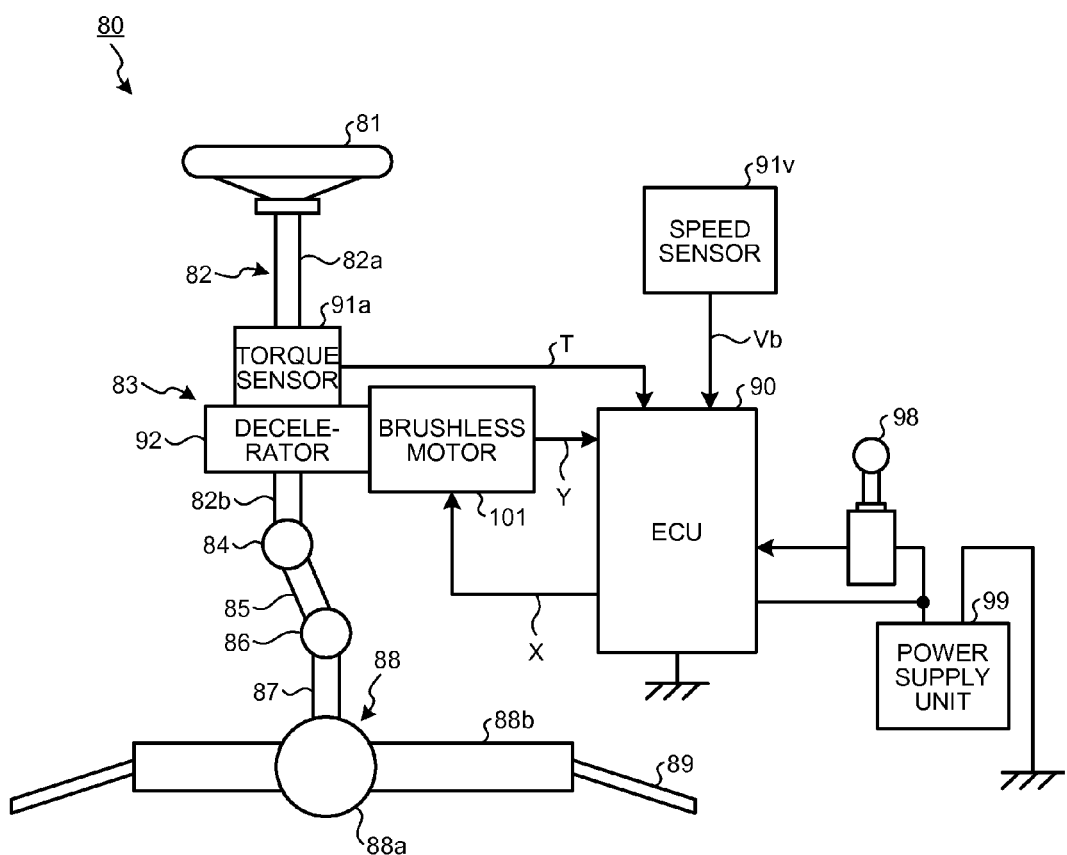
FIG. 45 is a schematic of a structure of an electric power steering apparatus according to a ninth embodiment of the present invention.

FIG. 45 is a schematic of a structure of an electric power steering apparatus according to a ninth embodiment of the present invention. The members that are the same as those described above are assigned with the same reference numerals, and redundant explanations thereof are omitted hereunder.

This electric power steering apparatus 80 includes a steering wheel 81, a steering shaft 82, a steering force assisting mechanism 83, a universal joint 84, a lower shaft 85, another universal joint 86, a pinion shaft 87, a steering gear 88, and a tie rod 89, in the order in which a force given by a steerer is communicated. The electric power steering apparatus 80 also includes an electronic control unit (ECU) 90, a torque sensor 91a, and a speed sensor 91v. The computing unit 3 described above may function as the ECU 90, or may be provided separately from the ECU 90.

The steering shaft 82 includes an input shaft 82a and an output shaft 82b. One end of the input shaft 82a is connected to the steering wheel 81, and the other end is connected to the steering force assisting mechanism 83 via the torque sensor 91a. One end of the output shaft 82b is connected to the steering force assisting mechanism 83, and the other end is connected to the universal joint 84. In the embodiment, the input shaft 82a and the output shaft 82b are made of a magnetic material such as iron.

One end of the lower shaft 85 is connected to the universal joint 84, and the other end is connected to the universal joint 86. One end of the pinion shaft 87 is connected to the universal joint 86, and the other end is connected to the steering gear 88.

The steering gear 88 includes a pinion 88a and a rack 88b. The pinion 88a is connected to the pinion shaft 87. The rack 88b is engaged with the pinion 88a. The steering gear 88 is structured as a rack and pinion. The rack 88b in the steering gear 88 converts the rotating movement communicated to the pinion 88a into a linear movement. The tie rod 89 is connected to the rack 88b.

The steering force assisting mechanism 83 includes a decelerator 92 and a brushless motor 101. The decelerator 92 is connected to the output shaft 82b. The brushless motor 101 is connected to the decelerator 92, and is a motor for generating an assisting steering torque. In the electric power steering apparatus 80, the steering shaft 82, the torque sensor 91a, and the decelerator 92 form a steering column. The brushless motor 101 applies an assisting steering torque to the output shaft 82b in the steering column. In other words, the electric power steering apparatus 80 according to the embodiment is a column-assisted steering apparatus. The brushless motor 101 may also be a motor with a brush, as long as such a motor is a rotary motor.

The torque sensor described in the earlier embodiments can be used as the torque sensor 91a. The torque sensor 91a detects the steering force of the driver communicated via the steering wheel 81 to the input shaft 82a as a steering torque. The speed sensor 91v detects the running speed of a vehicle on which the electric power steering apparatus 80 is mounted. The ECU 90 is electrically connected to the brushless motor 101, the torque sensor 91a, and the speed sensor 91v.

The ECU 90 controls the operation of the brushless motor 101. The ECU 90 acquires a signal from each of the torque sensor 91a and the speed sensor 91v. In other words, the ECU 90 acquires the steering torque T from the torque sensor 91a, and acquires the running speed Vb of the vehicle from the speed sensor 91v. To the ECU 90, a power is supplied from a power supply unit (e.g., buttery on the vehicle) 99 while an ignition switch 98 is turned ON. The ECU 90 calculates an assisting steering command value for an assisting command, based on the steering torque T and the running speed Vb. The ECU 90 adjusts a power X to be supplied to the brushless motor 101 based on the assisting steering command value thus calculated. The ECU 90 acquires information of an inductive voltage from the brushless motor 101 as operation information Y.

The steering force of the steerer (driver) input to the steering wheel 81 is communicated via the input shaft 82a to the decelerator 92 in the steering force assisting mechanism 83. At this time, the ECU 90 acquires the steering torque T input to the input shaft 82a from the torque sensor 91a, and acquires the running speed Vb from the speed sensor 91v. The ECU 90 then controls the operation of the brushless motor 101. The assisting steering torque generated by the brushless motor 101 is communicated to the decelerator 92.

The steering torque (including the assisting steering torque) output via the output shaft 82b is communicated to the lower shaft 85 via the universal joint 84, and further communicated to the pinion shaft 87 via the universal joint 86. The steering force communicated to the pinion shaft 87 is communicated to the tie rod 89 via the steering gear 88, whereby causing a steered wheel to rotate.

As described earlier, in the electric power steering apparatus 80, the first rotating shaft and the second rotating shaft of the torque sensor according to the embodiment are mounted on the steering shaft so that the torque detection apparatus 200 can detect the steering torque.

With this structure, the optical sensor can detect a change in the polarization direction of the transmissive light or the reflected light in a manner less affected by foreign substances. In this manner, the reliability of the electric power steering apparatus can be improved.

Tenth Embodiment

Figure 46:
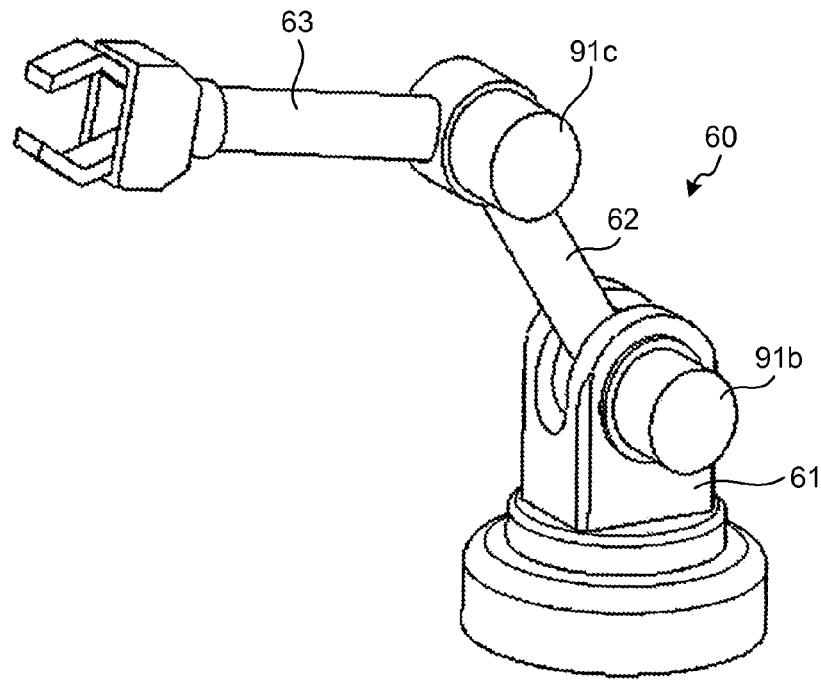
FIG. 46 is a schematic of a structure of a robot arm according to a tenth embodiment of the present invention.

FIG. 46 is a schematic of a structure of a robot arm according to a tenth embodiment of the present invention. The members that are the same as those described above are assigned with the same reference numerals, and redundant explanations thereof are omitted hereunder. This robot arm 60 includes an arm 62 and an arm 63, in the order in which a force given by a driving force 61 is communicated. The robot arm 60 also includes a torque sensor 91b and a torque sensor 91c.

As the torque sensor 91b and the torque sensor 91c, the torque sensor explained above in the embodiments can be used. The torque sensor 91b illustrated in FIG. 46 can detect the torque communicated from the driving force 61 to the arm 62. The torque sensor 91c can detect the torque communicated from the arm 62 to the arm 63.

Modification

Figure 47:
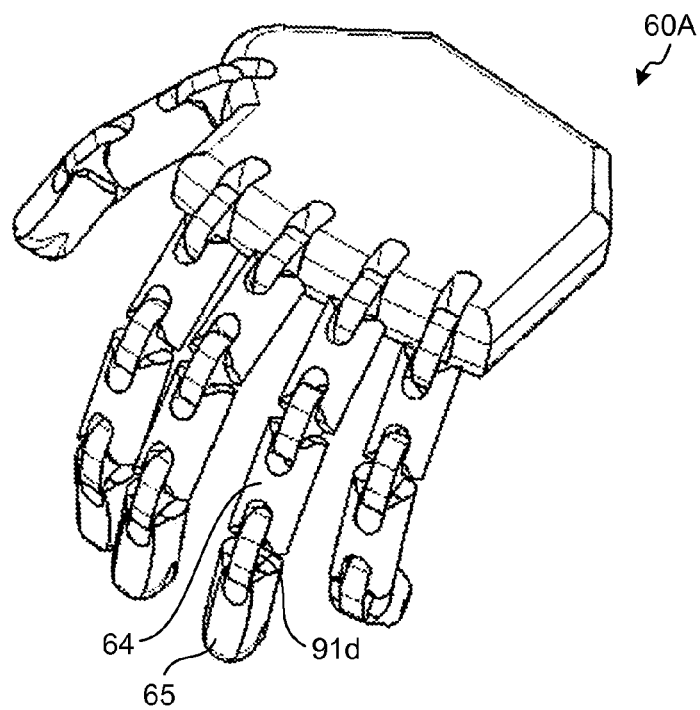
FIG. 47 is a schematic of a structure of a robot arm according to a modification of the tenth embodiment.

FIG. 47 is a schematic of a structure of a robot arm according to a modification of the tenth embodiment. The members that are the same as those described above are assigned with the same reference numerals, and redundant explanations thereof are omitted hereunder. This robot arm 60A includes an arm 64 and an arm 65, in an order in which an applied force is communicated. The robot arm 60A is provided with a torque sensor 91d. The torque sensor 91d can detect the torque communicated from the arm 64 to the arm 65.

As explained above, the torque detection apparatus according to the embodiment can calculate the torque applied to a joint in the robot arm.

Eleventh Embodiment

Figure 48:
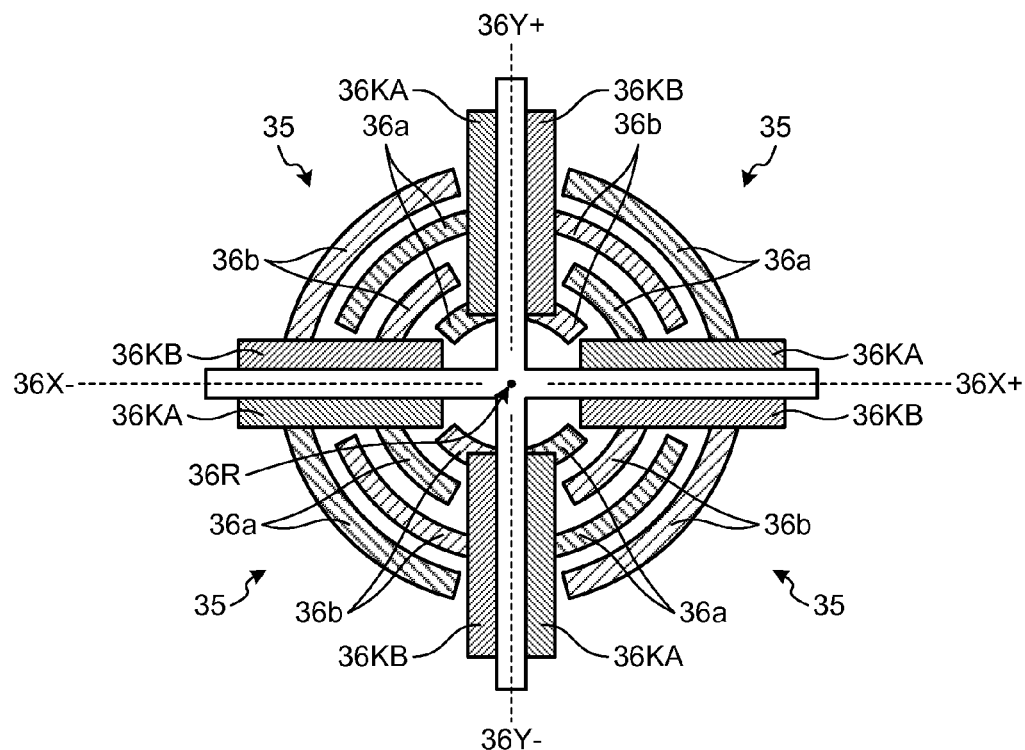
FIG. 48 is a schematic for explaining an optical sensor according to an eleventh embodiment of the present invention.

FIG. 48 is a schematic for explaining an optical sensor according to an eleventh embodiment of the present invention. The members that are the same as those described above are assigned with the same reference numerals, and redundant explanations thereof are omitted hereunder. As illustrated in FIG. 48, four optical sensors 35 are arranged around a sensor arrangement center 36R. A sensor arrangement axis passing through the sensor arrangement center 36R and extending from 36X− to 36X+ intersects with a sensor arrangement axis passing through the sensor arrangement center 36R and extended from 36Y− to 36Y+. The four optical sensors 35 are arranged symmetrically with respect to the sensor arrangement axes.

Even if the sensor arrangement center 36R is designed to be irradiated with the reflected light or the transmissive light from the light source 41, some fluctuations might cause the position irradiated with the light to deviate. In such a case, by comparing the outputs from the four optical sensors 35 arranged symmetrically with respect to the sensor arrangement axes, it is possible to recognize in which direction, that is, toward which one of four quadrants defined by the sensor arrangement axes extending from 36X− to 36X+ and extending from 36Y− to 36Y+, the position irradiated with the reflected light or the transmissive light from the light source 41 is deviated with respect to the sensor arrangement center 36R. Therefore, the optical axis of the reflected light or the transmissive light from the light source 41 can be adjusted to improve the precision of the optical encoder or the torque sensor described above.

Twelfth Embodiment

Figure 49:
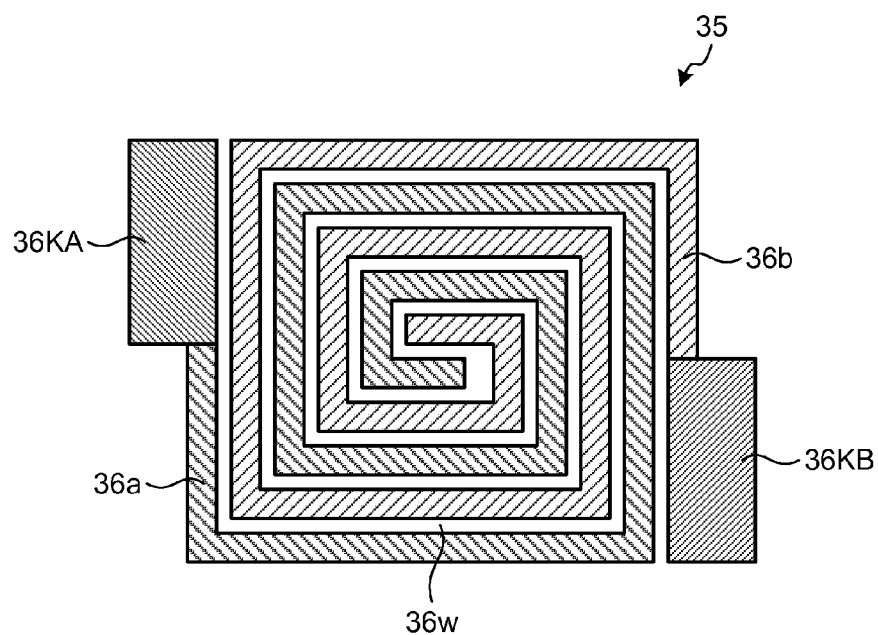
FIG. 49 is a schematic for explaining an optical sensor according to a twelfth embodiment of the present invention.

FIG. 49 is a schematic for explaining an optical sensor according to a twelfth embodiment of the present invention. The members that are the same as those described above are assigned with the same reference numerals, and redundant explanations thereof are omitted hereunder. As illustrated in FIG. 49, this optical sensor 35 includes the first optical sensor 36A and the second optical sensor 36B. The first optical sensor 36A is provided with the electrode base 36KA, a sensor base 36Ka connected to the electrode base 36KA, and a first photoreceiver 36a, and is capable of detecting the intensity of light with the first polarization direction. The first photoreceiver 36a is provided with the first polarizing layer that splits incident light to the light with the first polarization direction, and receives the first polarized light split by the first polarizing layer.

The second optical sensor 36B includes the electrode base 36KB, the sensor base 36Kb connected to the electrode base 36KB, and the second photoreceiver 36b, and is capable of detecting the intensity of light with the second polarization direction. The second photoreceivers 36b is provided with the second polarizing layer that splits the incident light to the light with the second polarization direction, and receives the second polarized light split by the second polarizing layer.

Each of the first photoreceiver 36a and the second photoreceiver 36b has a spiral shape interlocking with each other, provided alternatingly and spaced uniformly with each other by a given distance 36w, as illustrated in FIG. 49.

With this structure, even when a foreign substance blocks a part of the sensing area, for example, the chances of the first photoreceiver 36a and the second photoreceiver 36b being blocked by approximately the same degree can be increased, so that the possibility of the signal intensity output from one of the first photoreceiver 36a and the second photoreceiver 36b dropping extremely can be reduced. Therefore, even when the intensity of the incident light is decreased by a foreign substance, the optical sensor 35 can detect a change in the polarization direction Pm via the differential signal V, in a manner less affected by foreign substances.

Figure 50:
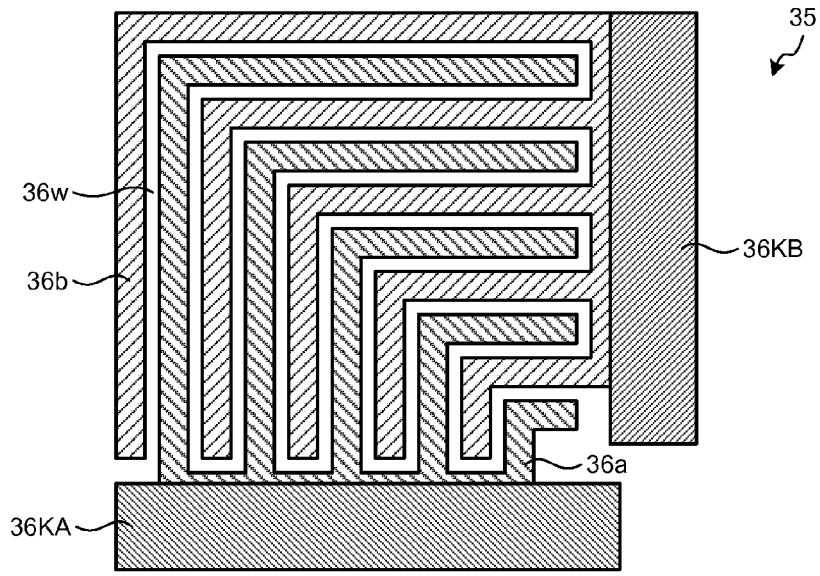
FIG. 50 is a schematic for explaining an exemplary modification of the optical sensor according to the twelfth embodiment.

FIG. 50 is a schematic for explaining an exemplary modification of the optical sensor according to the twelfth embodiment. The members that are the same as those described above are assigned with the same reference numerals, and redundant explanations thereof are omitted hereunder. As illustrated in FIG. 50, the electrode base 36KA is arranged in a manner extending in a direction perpendicular to the direction in which the electrode base 36KB extends. The first photoreceiver 36a extends in a direction perpendicular to the direction in which the electrode base 36KA extends, and is bent in the middle, in the direction approaching the electrode base 36KB. The second photoreceiver 36b extends in a direction perpendicular to the direction in which the electrode base 36KB extends, and is bent in the middle, in the direction approaching the electrode base 36KA. Each of the first photoreceiver 36a and the second photoreceiver 36b is disposed in a manner interlocking each other, provided alternatingly and spaced uniformly with each other by a given distance 36w. The optical sensor according to the modification of the twelfth embodiment has the same advantageous effect as that optical sensor 35 according to the first embodiment and the twelfth embodiment.

Thirteenth Embodiment

Figure 51:
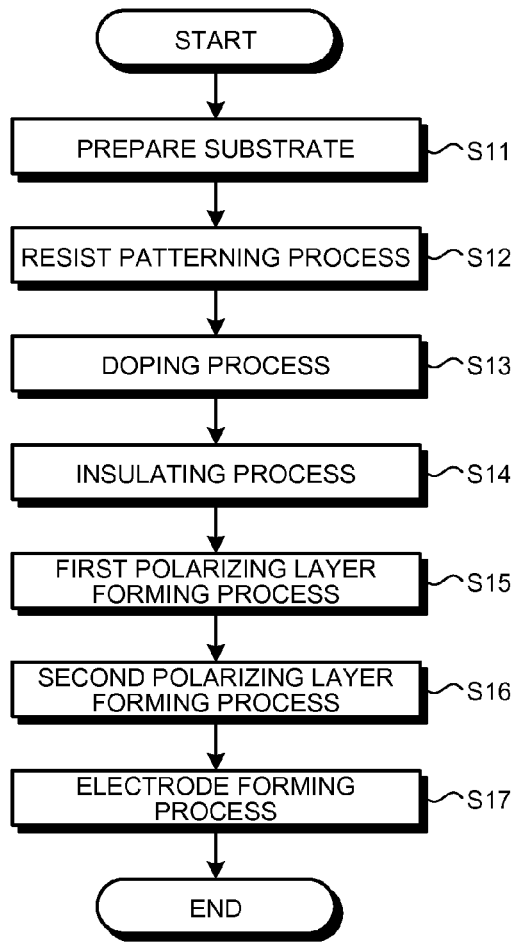
FIG. 51 is a flowchart for explaining an optical sensor manufacturing process according to a thirteenth embodiment of the present invention.
Figures 1, 52:
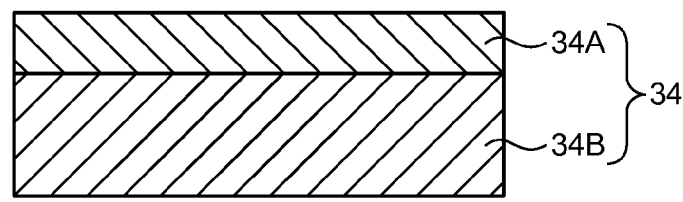
Figures 2, 52:
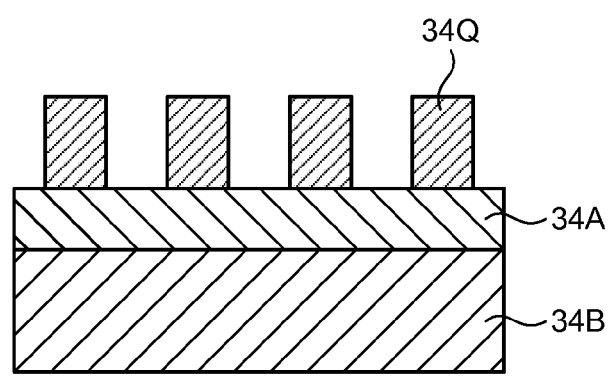
Figures 3, 52:
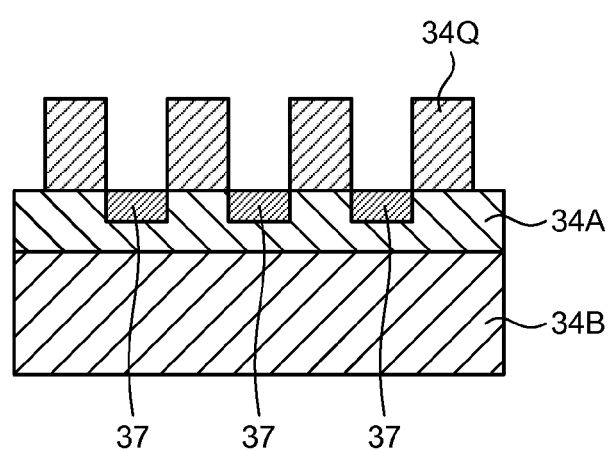
Figures 4, 52:
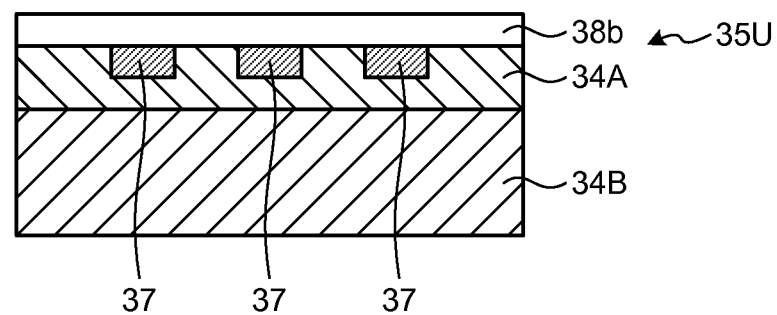
Figures 5, 52:
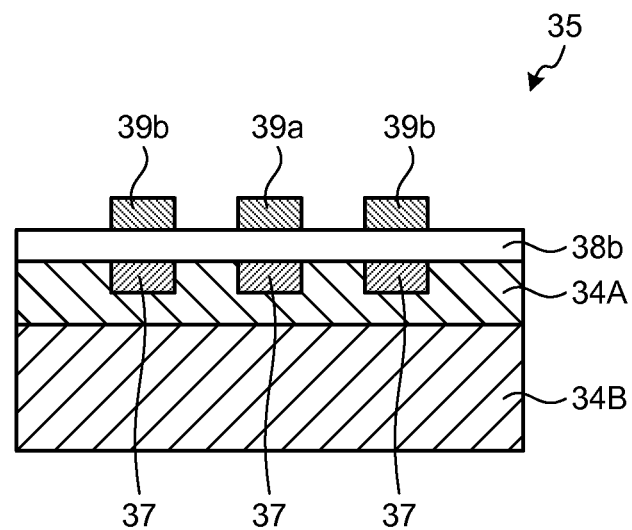

FIG. 51 is a flowchart for explaining an optical sensor manufacturing process according to a thirteenth embodiment of the present invention. FIGS. 52-1 to 52-5 are schematics for explaining the optical sensor manufacturing process according to the thirteenth embodiment. FIGS. 52-1 to 52-5 are partial cross-sectional views for explaining the process of manufacturing the Q-Q cross section in FIG. 15-1. The members that are the same as those described above are assigned with the same reference numerals, and redundant explanations thereof are omitted hereunder. The optical sensor manufacturing process will now be explained with reference to FIGS. 15-1, 51, and 52-1 to 52-5.

As illustrated in FIG. 51, to begin with, the manufacturing equipment prepares an n-type silicon substrate 34, as illustrated in FIG. 52-1 (Step S11). In the n-type silicon substrate 34 illustrated in FIG. 52-1, a base silicon substrate 34B which is a substrate surface 34 of the silicon substrate 34 has an n+ layer doped with many donors.

As illustrated in FIG. 52-2, the manufacturing equipment then performs a resist patterning process in which patterning is performed to the substrate surface 34A using a resist pattern 34Q of photoresists so as to achieve the shapes of the first photoreceivers 36a and the second photoreceivers 36b illustrated in FIG. 15-1 (Step S12).

The manufacturing equipment then performs a doping process in which the substrate surface 34A is doped with an element such as B or In (Step S13). As illustrated in FIG. 52-3, P-type semiconductor photoreceivers 37 are formed on the substrate surface 34A.

As illustrated in FIG. 52-4, the manufacturing equipment then removes the resist pattern 34Q, and performs an insulating process in which the substrate surface 34A is covered by an insulating layer 38b that is $Al_2O_3$ or $SiO_2$, for example (Step S14). The insulating layer 38b is made of a material having translucency. Through the manufacturing process described above, a photoreceiver body 35U of the optical sensor 35 is provided.

As illustrated in FIG. 52-5, the manufacturing equipment then performs a first polarizing layer forming process in which the first polarizing layer 39a is formed at positions corresponding to the first photoreceivers 36a illustrated in FIG. 15-1 (Step S15). The first polarizing layer 39a may be formed using a photo-induced polarizing layer or a wire grid pattern in which wires are arranged in parallel, for example. In this manner, as illustrated in FIG. 52-5, the first polarizing layer 39a is formed on every two photoreceivers 37.

The manufacturing equipment then performs a second polarizing layer forming process in which the second polarizing layer 39b is formed at positions corresponding to the second photoreceivers 36b illustrated in FIG. 15-1 (Step S16). The second polarizing layer 39b may be formed using a photo-induced polarizing layer or a wire grid pattern in which wires are arranged in parallel, for example. In this manner, as illustrated in FIG. 52-5, the second polarizing layer 39b is formed on every two photoreceivers 37. The manufacturing equipment then performs an electrode forming process in which the electrode base 36KA and the electrode base 36KB illustrated in FIG. 15-1 are formed using a conductive material such as Au or Al so that electricity can be conducted to the first photoreceivers 36a and the second photoreceivers 36b through respective through-holes not illustrated that are formed through the insulator 38b (Step S17).

As explained above, the method for manufacturing an optical sensor includes the photoreceiver forming process and the polarizing layer forming process. In the photoreceiver forming process, photoreceivers are formed on the surface of the silicon substrate 34 in such a manner that the first photoreceivers 36a and the second photoreceivers 36b receiving light are arranged alternatingly and spaced uniformly with each other. In the polarizing layer forming process, the first polarizing layer 39a for splitting the incident light into the first polarized light with the first polarization direction is provided on top of the first photoreceivers 36a so that the first polarized light becomes incident on the first photoreceivers 36a, and the second polarizing layer 39b for splitting the incident light into the second polarized light with the second polarization direction is provided on top of the second photoreceivers so that the second polarized light becomes incident on the second photoreceivers 36b.

Modification of Optical Sensor Manufacturing Process

Figures 1, 53:
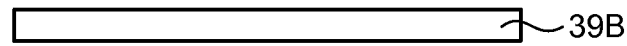
Figures 2, 53:
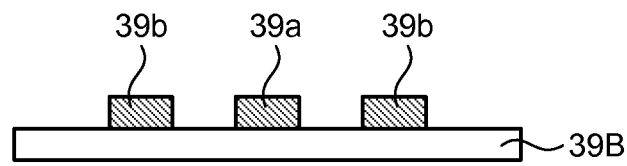
Figures 3, 53:
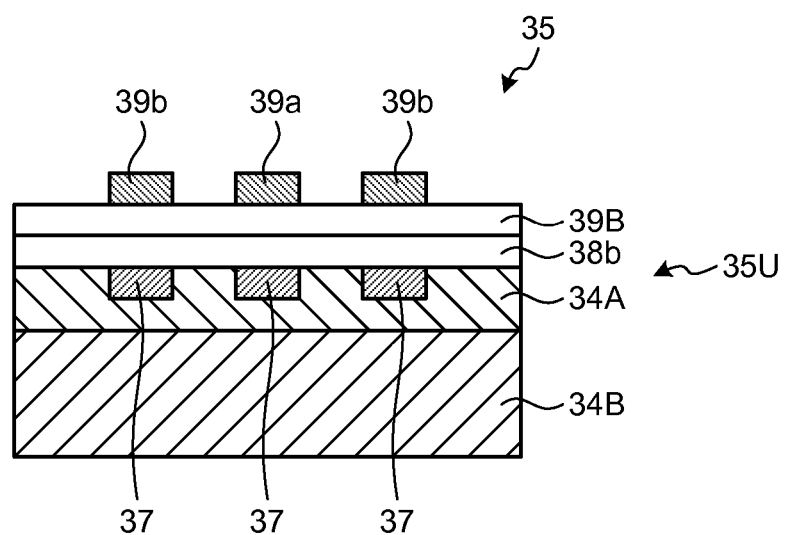

FIGS. 53-1 to 53-3 are schematics for explaining manufacturing of a polarizing layer in the optical sensor manufacturing process according to a modification of the thirteenth embodiment. The members that are the same as those described above are assigned with the same reference numerals, and redundant explanations thereof are omitted hereunder. Through Steps S11, S12, S13, and S14 illustrated in FIG. 51, the photoreceiver body 35U of the optical sensor 35 illustrated in FIG. 53-3 is achieved.

As illustrated in FIG. 53-1, the manufacturing equipment then prepares a translucent substrate 39B that allows light to pass through. As illustrated in FIG. 53-2, the manufacturing equipment performs a first polarizing layer forming process in which the first polarizing layer 39a is formed at positions corresponding to the first photoreceivers 36a illustrated in FIG. 15-1 on the translucent substrate 39B allowing light to pass through (Step S15). The first polarizing layer 39a may be formed using a photo-induced polarizing layer or a wire grid pattern in which wires are arranged in parallel, for example.

The manufacturing equipment then performs a second polarizing layer forming process in which the second polarizing layer 39b is formed at positions corresponding to the second photoreceivers 36b illustrated in FIG. 15-1 (Step S16). The second polarizing layer 39b may be formed using a photo-induced polarizing layer or a wire grid pattern in which wires are arranged in parallel, for example. In this manner, the second polarizing layer 39b is formed on every two photoreceivers 37, as illustrated in FIG. 53-2. The translucent substrate 39B is then mounted on and fixed to the insulator 38b in the photoreceiver body 35U of the optical sensor 35, as illustrated in FIG. 53-3. The insulator 38b and the translucent substrate 39B are adjusted to thicknesses not causing light to attenuate.

The manufacturing equipment then performs an electrode forming process in which the electrode base 36KA and the electrode base 36KB are formed using a conductive material such as Au or Al so that the electricity can be conducted to the first photoreceivers 36a and the second photoreceivers 36b illustrated in FIG. 15-1 through the respective through-holes (not illustrated) formed through the translucent substrate 39B and the insulator 38b (Step S17). The manufacturing equipment may perform the electrode forming process (Step S17) before performing the first polarizing layer forming process (Step S15) and the second polarizing layer forming process (Step S16).

As explained above, the method for manufacturing an optical sensor includes the photoreceiver forming process and the polarizing layer forming process. In the photoreceiver forming process, photoreceivers are formed on the surface of the silicon substrate 34 in such a manner that the first photoreceivers 36a and the second photoreceivers 36b receiving light are arranged alternatingly and spaced uniformly with each other. In the polarizing layer forming process, the first polarizing layer 39a for splitting the incident light into the first polarized light with the first polarization direction is provided on top of the first photoreceivers 36a so that the first polarized light becomes incident on the first photoreceivers 36a, and the second polarizing layer 39b for splitting the incident light into the second polarized light with the second polarization direction is provided on top of the second photoreceivers so that the second polarized light becomes incident on the second photoreceivers 36b. In the polarizing layer forming process, using the silicon substrate 34 as a first substrate, the first polarizing layer 39a and the second polarizing layer 39b are formed on the surface of the translucent substrate 39B which is the second substrate, and the second substrate is bonded onto the first substrate. The first polarizing layer 39a is then aligned in a manner overlapping with the corresponding first photoreceiver 36a, and the second polarizing layer 39b is aligned in a manner overlapping with the corresponding second photoreceiver 36b.

Another Modification of Optical Sensor Manufacturing Process

Figures 1, 54:
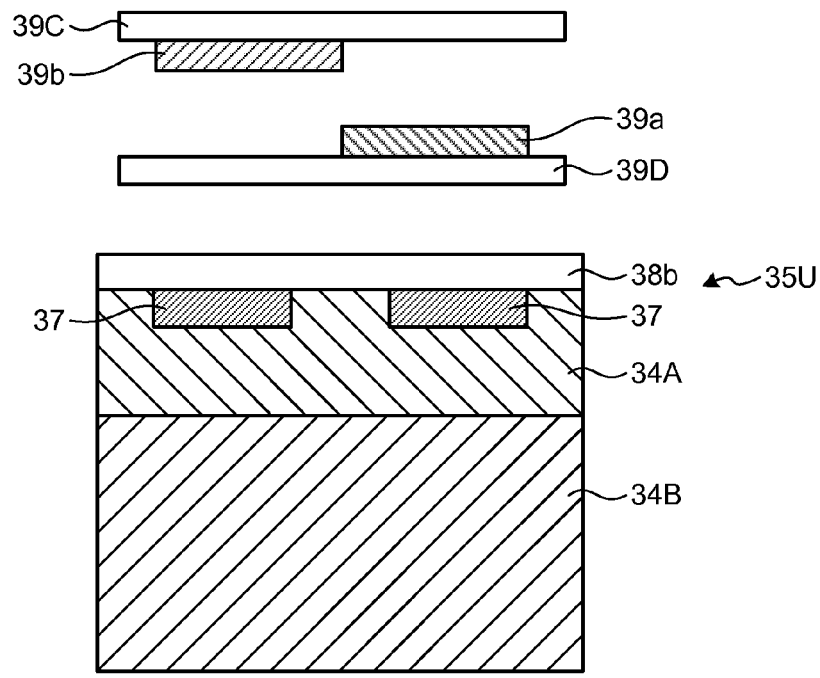
Figures 2, 54:
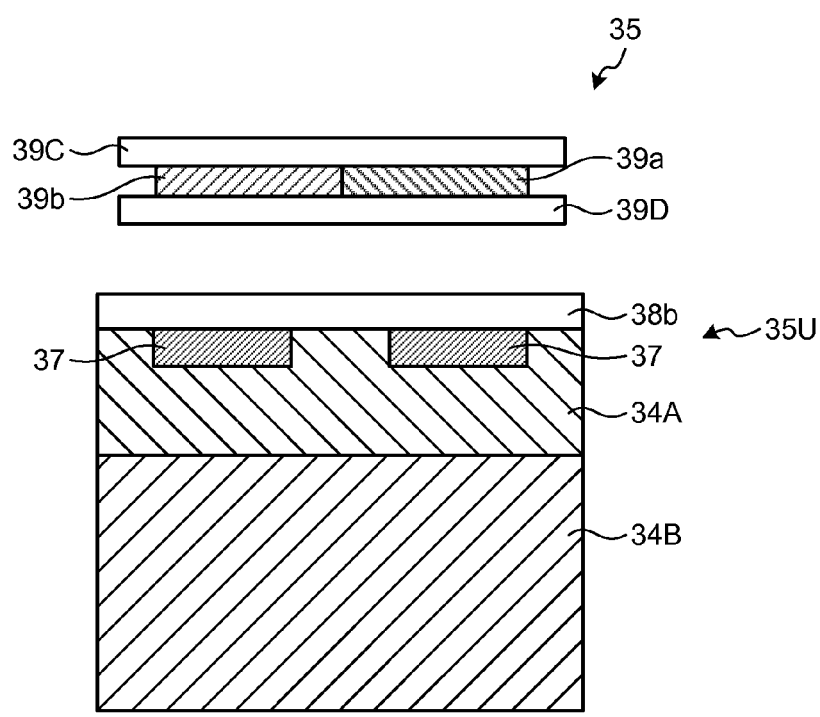
Figure 55:
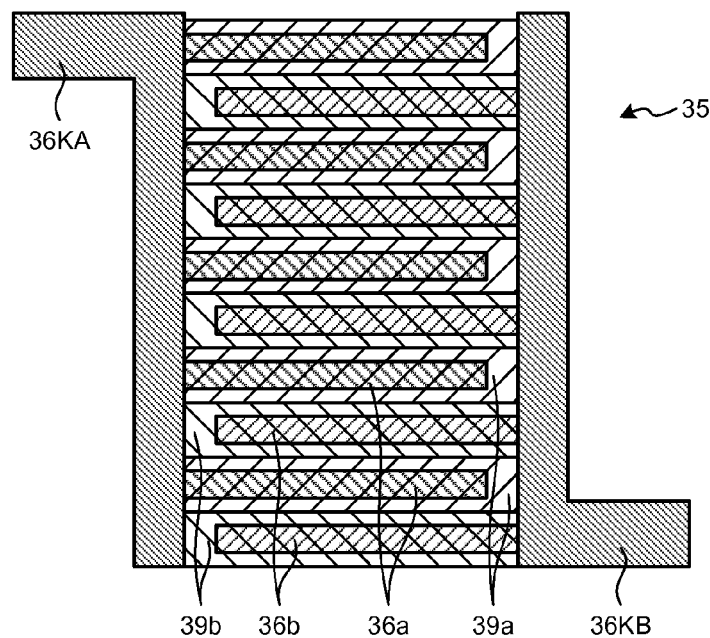
FIG. 55 is a schematic for explaining an example of the optical sensor according to the thirteenth embodiment.

FIGS. 54-1 and 54-2 are schematics for explaining manufacturing of the polarizing layer in the optical sensor manufacturing process according to another modification of the thirteenth embodiment. FIG. 55 is a schematic for explaining an example of the optical sensor according to the thirteenth embodiment. The members that are the same as those described above are assigned with the same reference numerals, and redundant explanations thereof are omitted hereunder. Through Steps S11, S12, S13, and S14 illustrated in FIG. 51, the photoreceiver body 35U of the optical sensor 35 illustrated in FIG. 53-3 is achieved.

As illustrated in FIG. 54-1, the manufacturing equipment prepares translucent substrates 39C and 39D allowing light to pass through. The manufacturing equipment then performs the first polarizing layer forming process in which the first polarizing layer 39a is formed at positions corresponding to the first photoreceivers 36a illustrated in FIG. 15-1 on the translucent substrate 39D (Step S15). The first polarizing layer 39a may be formed using a photo-induced polarizing layer or a wire grid pattern in which wires are arranged in parallel, for example.

The manufacturing equipment then performs a second polarizing layer forming process in which the second polarizing layer 39b is formed at positions corresponding to the second photoreceivers 36b illustrated in FIG. 15-1 on the side of the translucent substrate 39C facing the translucent substrate 39D (Step S16). The second polarizing layer 39b may be formed using a photo-induced polarizing layer or a wire grid pattern in which wires are arranged in parallel, for example. As illustrated in FIG. 54-2, the translucent substrate 39C and the translucent substrate 39D are then laminated. The translucent substrate 39D is then mounted on and fixed to the insulator 38b in the photoreceiver body 35U of the optical sensor 35. The insulator 38b and the translucent substrates 39C, 39D are adjusted to thicknesses not causing light to attenuate. In this manner, the second polarizing layer 39b is formed on every two photoreceivers 37 and the first polarizing layer 39a is formed on the other every two photoreceivers 37, as illustrated in FIG. 55.

The manufacturing equipment then performs the electrode forming process in which the electrode base 36KA and the electrode base 36KB illustrated in FIG. 55 are formed using a conductive material such as Au or Al so that the electricity can be conducted to the first photoreceivers 36a and the second photoreceivers 36b through the respective through-holes (not illustrated) formed through the translucent substrates 39C and 39D and the insulator 38b (Step S17). The manufacturing equipment may perform the electrode forming process (Step S17) before performing the first polarizing layer forming process (Step S15) and the second polarizing layer forming process (Step S16).

As explained above, the method for manufacturing an optical sensor includes the photoreceiver forming process and the polarizing layer forming process. In the photoreceiver forming process, photoreceivers are formed on the surface of the silicon substrate 34 in such a manner that the first photoreceivers 36a and the second photoreceivers 36b receiving light are arranged alternatingly and spaced uniformly with each other. In the polarizing layer forming process, the first polarizing layer 39a for splitting the incident light into the first polarized light with the first polarization direction is provided on top of the first photoreceivers 36a so that the first polarized light becomes incident on the first photoreceivers 36a, and the second polarizing layer 39b for splitting the incident light into the second polarized light with the second polarization direction is provided on top of the second photoreceivers so that the second polarized light becomes incident on the second photoreceivers 36b. In the polarizing layer forming process, using the silicon substrate 34 as the first substrate, the first polarizing layer 39a is formed on the surface of the translucent substrate 39D which is the second substrate, and the second polarizing layer 39b is formed on the surface of the translucent substrate 39C which is a third substrate. The second substrate and the third substrate are then bonded onto the first substrate, and the first polarizing layer 39a is aligned in a manner overlapping with the corresponding first photoreceiver 36a, and the second polarizing layer 39b is aligned in a manner overlapping with the corresponding second photoreceiver 36b.

Fourteenth Embodiment

Figure 56:
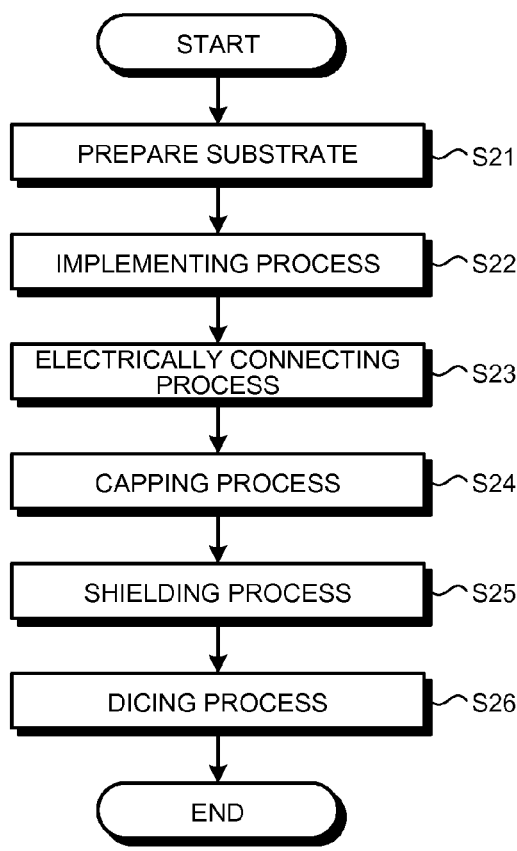
FIG. 56 is a flowchart for explaining an optical sensor package manufacturing process according to a fourteenth embodiment of the present invention.
Figures 1, 57:
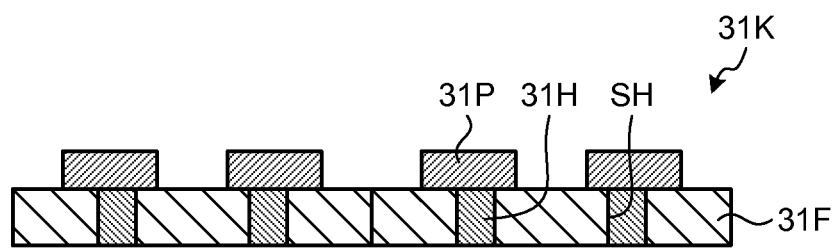
Figures 2, 57:
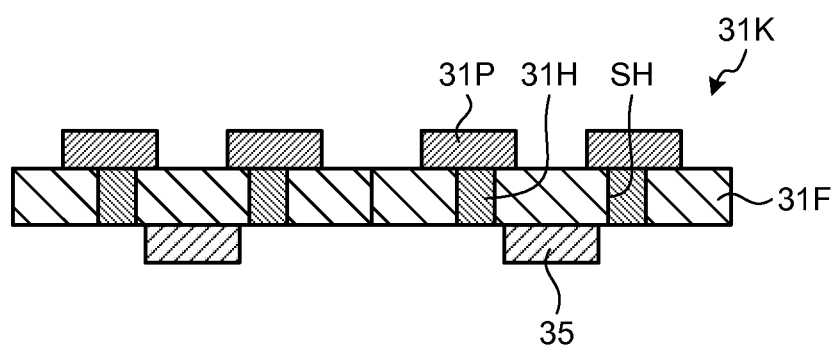
Figures 3, 57:
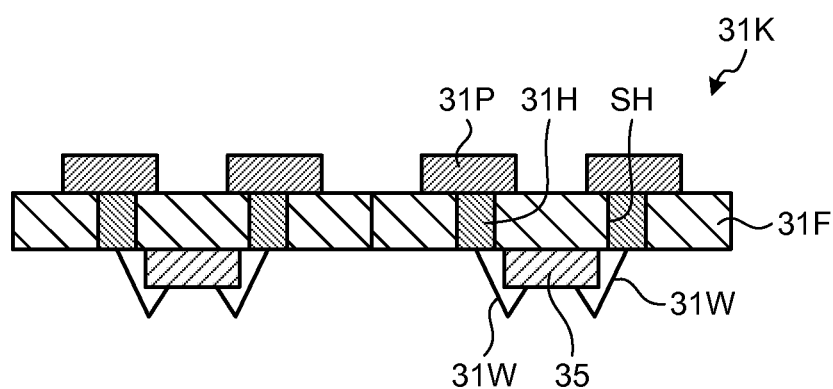
Figures 4, 57:
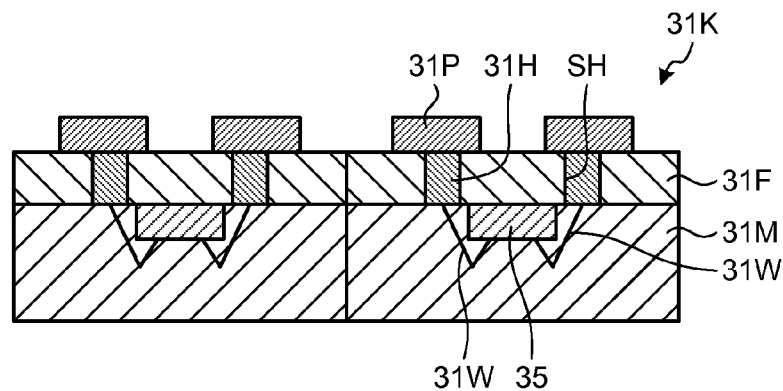
Figures 5, 57:
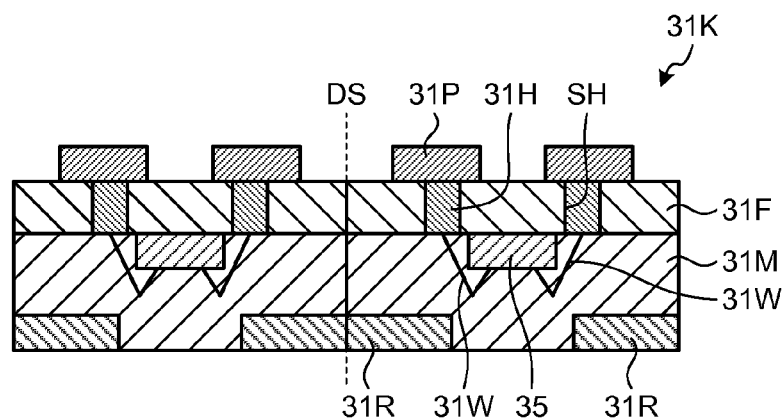
Figures 6, 57:
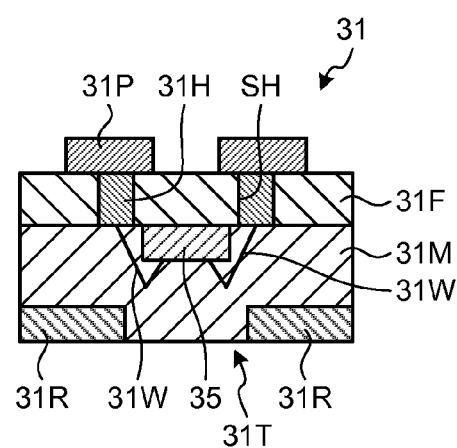
Figure 58:
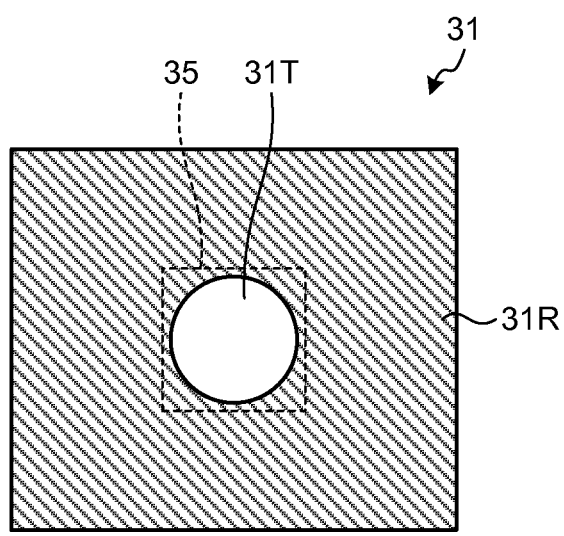
FIG. 58 is a plan view for explaining an aperture in the optical sensor according to the fourteenth embodiment.

FIG. 56 is a flowchart for explaining an optical sensor package manufacturing process according to a fourteenth embodiment of the present invention. FIGS. 57-1 to 57-6 are schematics for explaining the optical sensor package manufacturing process according to the fourteenth embodiment. FIG. 58 is a plan view for explaining an aperture on the optical sensor according to the fourteenth embodiment. The optical sensor package 31 illustrated in FIG. 2-2 is manufactured by packaging the optical sensor 35. The members that are the same as those described above are assigned with the same reference numerals, and redundant explanations thereof are omitted hereunder. The optical sensor manufacturing process will now be explained with reference to FIGS. 56, 57-1 to 57-6, and 58.

As illustrated in FIG. 56, to begin with, the manufacturing equipment prepares a sensor substrate 31K made of glass, quartz (SiO$_2$), silicon, a printed substrate, or a film material, as illustrated in FIG. 57-1 (Step S21). The sensor substrate 31K illustrated in FIG. 57-1 includes a base substrate 31F, a penetrating conductive layer 31H embedded in each through-hole SH penetrating through the surfaces of the base substrate 31F, and external electrodes 31P that are electrically connected to the penetrating conductive layer 31H.

As illustrated in FIG. 57-2, the manufacturing equipment then performs an implementing process in which the optical sensors 35 are implemented on one surface of the sensor substrate 31K (Step S22).

As illustrated in FIG. 57-3, the manufacturing equipment then performs an electrically connecting process in which a conductive connection via a bonding wire 31W is established between each of the optical sensors 35 and the corresponding penetrating conductive layers 31H (Step S23). The electrical connection is not limited to wire bonding via bonding wires 31W, as long as such a conductive connection between the optical sensor 35 and the penetrating conductive layer 31H is ensured.

As illustrated in FIG. 57-4, the manufacturing equipment then performs a capping process in which the optical sensors 35 are protected with encapsulation resin 31M (Step S24). The encapsulation resin 31M is a translucent insulating material.

As illustrated in FIG. 57-5, the manufacturing equipment then performs a process of forming the light-shielding film 31R on the surface of the encapsulation resin 31M with a light-shielding material such as a black resist, a synthetic resin, paint, or a metal film (Step S25). Because the light-shielding film 31R serves as a stop for the incident light, the light-shielding film 31R is formed in a manner not overlapping with the first photoreceivers 36a and the second photoreceivers 36b in the optical sensor 35 in a plan view. The optical sensor 35 can adjust the amount of incident light using the light-shielding film 31R, so that the reachable range of the incident light is adjusted. As a result, the optical sensor 35 can detect a change in the polarization direction of the transmissive light or the reflected light highly accurately.

The manufacturing equipment then performs a dicing process in which the sensor substrate 31K is cut across dicing lines DS illustrated in FIG. 57-5 (Step S26). The sensor substrate 31K is then separated into each package illustrated in FIG. 57-6. In this manner, the optical sensor package 31 is manufactured.

As illustrated in FIGS. 57-6 and 58, to allow the optical sensor 35 to receive light, an aperture 31T surrounded by the light-shielding film 31R is provided, so that the optical sensor 35 can receive incident light passing through the aperture 31T. The aperture 31T is illustrated to have a round shape in FIG. 58, as an example, but may also have a rectangular shape.

Modification of Optical Sensor Package Manufacturing Process

Figures 1, 59:
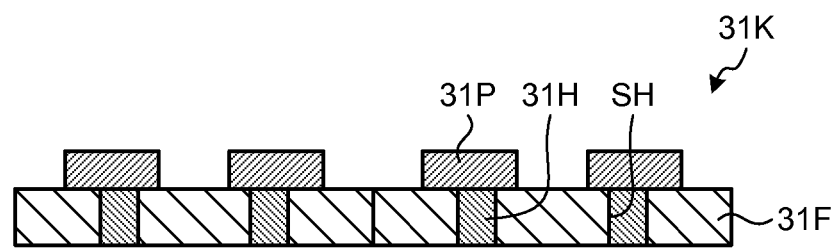
Figures 2, 59:
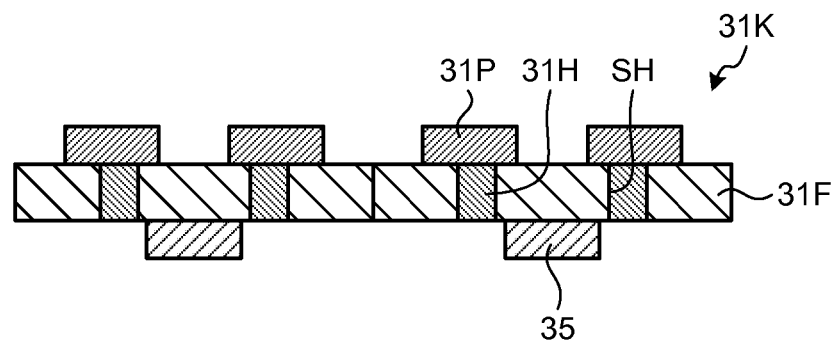
Figures 3, 59:
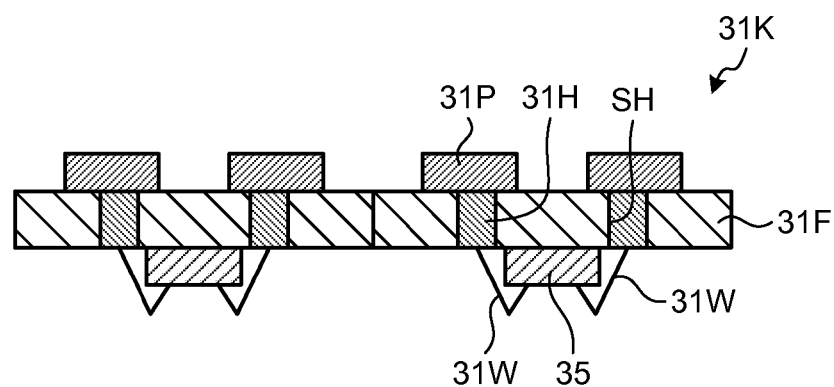
Figures 4, 59:
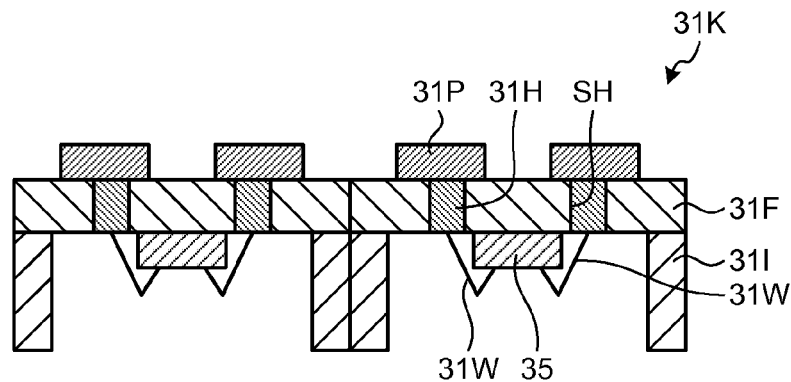
Figures 5, 59:
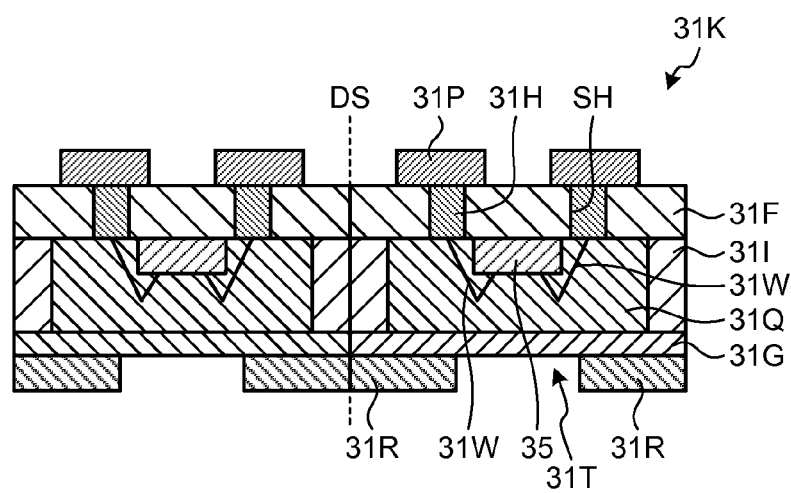
Figures 6, 59:
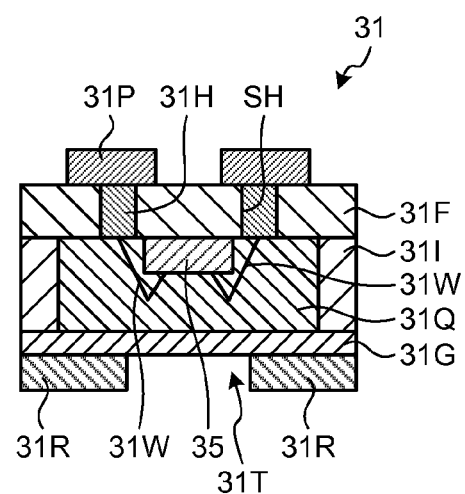

FIGS. 59-1 to 59-6 are schematics for explaining an optical sensor package manufacturing process according to the fourteenth embodiment. The members that are the same as those described above are assigned with the same reference numerals, and redundant explanations thereof are omitted hereunder. The modification of the optical sensor manufacturing process will now be explained with reference to FIGS. 56, 58, and 59-1 to FIG. 59-6.

As illustrated in FIG. 56, to begin with, the manufacturing equipment prepares the sensor substrate 31K illustrated in FIG. 59-1 (Step S21). The sensor substrate 31K illustrated in FIG. 59-1 includes the base substrate 31F, a penetrating conductive layer 31H embedded in the through-holes SH penetrating through the surfaces of the base substrate 31F, and external electrodes 31P that are electrically connected to the penetrating conductive layer 31H.

As illustrated in FIG. 59-2, the manufacturing equipment then performs an implementing process in which the optical sensors 35 are implemented on one surface of the sensor substrate 31K (Step S22).

As illustrated in FIG. 59-3, the manufacturing equipment then performs an electrically connecting process for establishing a conductive connection between each of the optical sensors 35 and the penetrating conductive layer 31H using bonding wires 31W (Step S23). The electrical connection is not limited to wire bonding using bonding wires 31W, as long as a conductive connection between each of the optical sensors 35 and the penetrating conductive layer 31H can be ensured.

As illustrated in FIGS. 59-4 and 59-5, the manufacturing equipment then performs a capping process in which the optical sensor 35 is protected with a wall member 311 and a cap substrate 31G (Step S24). The wall member 311 and the cap substrate 31G are made of glass, silicon, a ceramic, or an insulating material. By covering the wall member 311 by the cap substrate 31G under a nitrogen atmosphere or a vacuum atmosphere, the internal space 31Q of the optical sensor package 31 can be nitrogen-sealed or vacuum-sealed. As a result, the space surrounding the optical sensor 35 is kept clean, so that the optical sensor 35 is less affected by foreign substances or the like.

As illustrated in FIG. 59-5, the manufacturing equipment then performs a process of forming the light-shielding film 31R on the surface of the cap substrate 31G with a light-shielding material such as a black resist, a synthetic resin, paint, or a metal film (Step S25). Because the light-shielding film 31R serves as a stop for the incident light, in the manner described later, the light-shielding film 31R is formed in a manner not overlapping with the first photoreceivers 36a and the second photoreceivers 36b in the optical sensor 35 in a plan view.

The manufacturing equipment then performs a dicing process in which the sensor substrate 31K is cut across dicing lines DS illustrated in FIG. 59-5 (Step S26). The sensor substrate 31K is then separated into each die, into the package as illustrated in FIG. 59-6. In this manner, the optical sensor packages 31 are manufactured.

As illustrated in FIGS. 58 and 59-6, to allow the optical sensor 35 to receive light, the aperture 31T surrounded by the light-shielding film 31R is provided, so that the optical sensor 35 can receive incident light passing through the aperture 31T. The aperture 31T is illustrated to have a round shape in FIG. 58, as an example, but may also have a rectangular shape.

Fifteenth Embodiment

Figure 60:
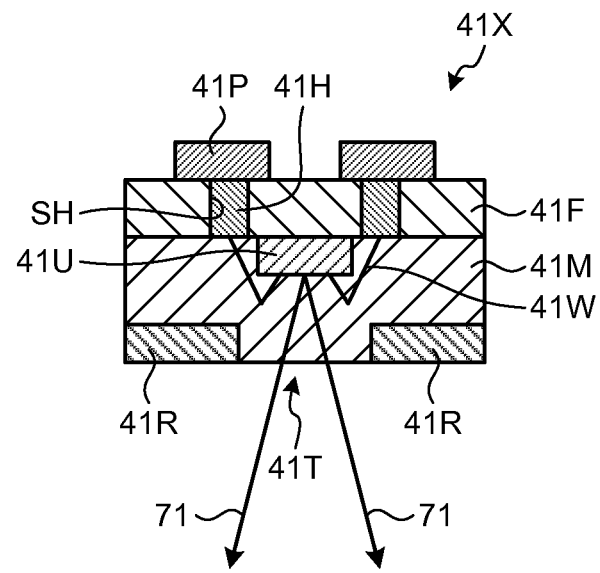
FIG. 60 is a plan view for explaining a light source according to a fifteenth embodiment of the present invention.
Figure 61:
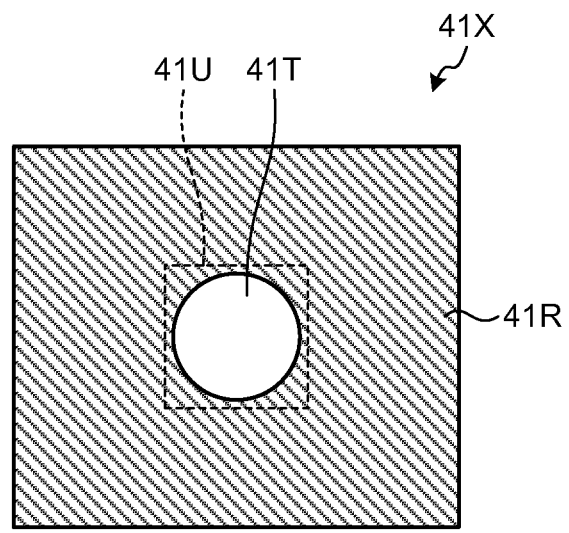
FIG. 61 is a plan view for explaining a light emitting portion of the light source according to the fifteenth embodiment.

FIG. 60 is a plan view for explaining a light source according to a fifteenth embodiment of the present invention. FIG. 61 is a plan view for explaining a light emitting portion of the light source according to the fifteenth embodiment. The members that are the same as those described above are assigned with the same reference numerals, and redundant explanations thereof are omitted hereunder. The light source 41 according to the embodiments described above is the same as a light source 41X illustrated in FIG. 60, and is a package of a light emitting device 41U such as a light-emitting diode, a laser light source such as a vertical-cavity surface-emitting laser, or a filament. In the light emitting device 41U, a surface-emitting light source is used.

The light source 41X includes a base substrate 41F, a penetrating conductive layer 41H embedded in the through-holes SH, external electrodes 41P that are electrically connected to the penetrating conductive layer 41H, the light emitting device 41U implemented on the base substrate 41F, bonding wires 41W that establish conductive connections between the light emitting device 41U and the respective penetrating conductive layers 41H, encapsulation resin 41M that protects the light emitting device 41U, and a light-shielding film 41R.

In the light source 41X, the light-shielding film 41R functions as a stop for the light source light 71 that limits the light source light 71 emitted from the light emitting device 41U illustrated in FIGS. 60 and 61 to the size of the light emitting portion 41T.

Figure 62:
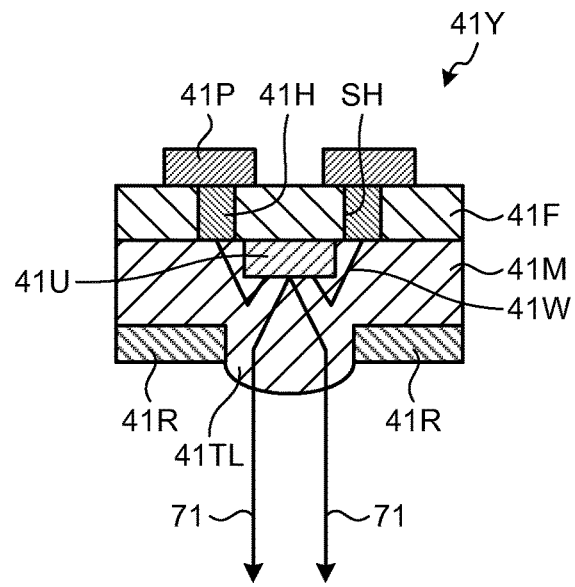
FIG. 62 is a plan view for explaining an exemplary modification of the light source according to the fifteenth embodiment.

FIG. 62 is a plan view for explaining an exemplary modification of the light source according to the fifteenth embodiment. The light source 41Y illustrated in FIG. 62 has a light emitting portion 41TL with a convex surface, compared with the light emitting portion 41T of the light source 41X, and the convex shape of the surface serves as a collimate lens that converts the light source light 71 emitted from the light emitting device 41U into parallel rays, or as a condensing lens. With this structure, the light source 41Y can emit the light source light 71 having a uniform light intensity distribution.

Figure 63:
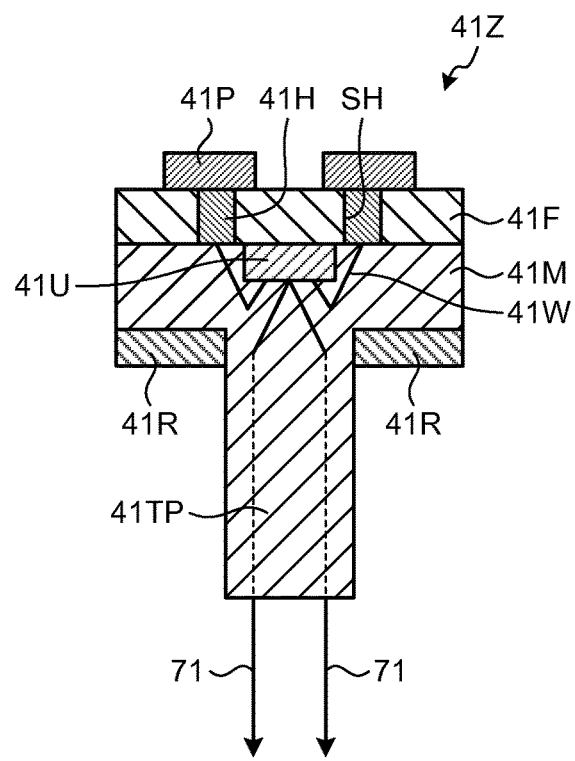
FIG. 63 is a plan view for explaining another exemplary modification of the light source according to the fifteenth embodiment.

FIG. 63 is a plan view for explaining another modification of the light source according to the fifteenth embodiment. This light source 41Z illustrated in FIG. 63 has a light emitting portion 41TP in a cylindrical shape, compared with the light emitting portion 41T of the light source 41X, and the internal cylindrical body serves as a light pipe so that the light source light 71 emitted from the light emitting device 41U is passed through the light pipe as a waveguide. With this structure, the light source 41Z can emit the light source light 71 having a uniform light intensity distribution.

Figure 64:
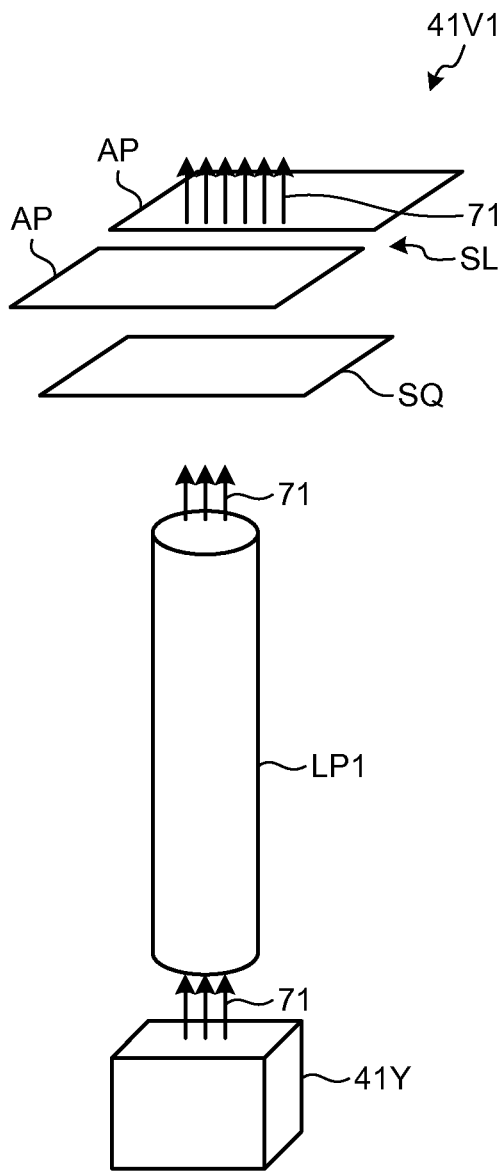
FIG. 64 is a plan view for explaining a waveguide for guiding the light from the light source according to the fifteenth embodiment.
Figure 65:
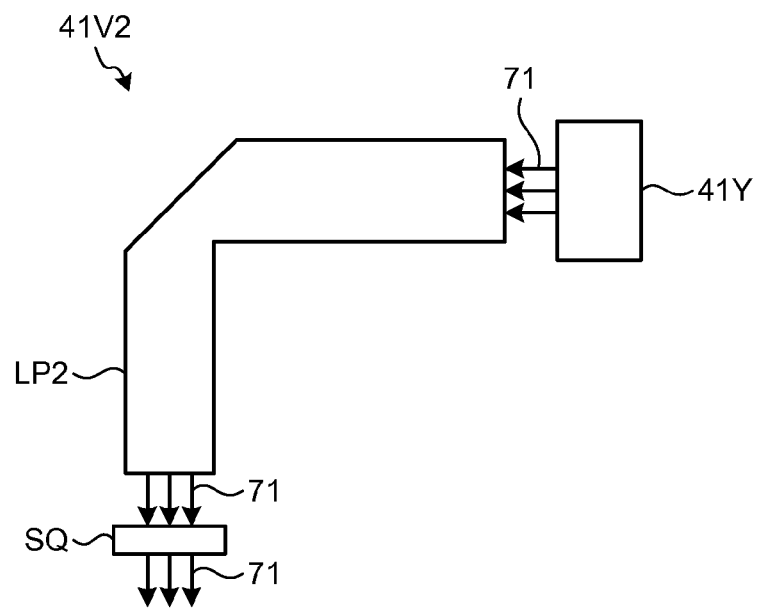
FIG. 65 is a plan view for explaining a waveguide for guiding the light from the light source according to the fifteenth embodiment.
Figure 66:
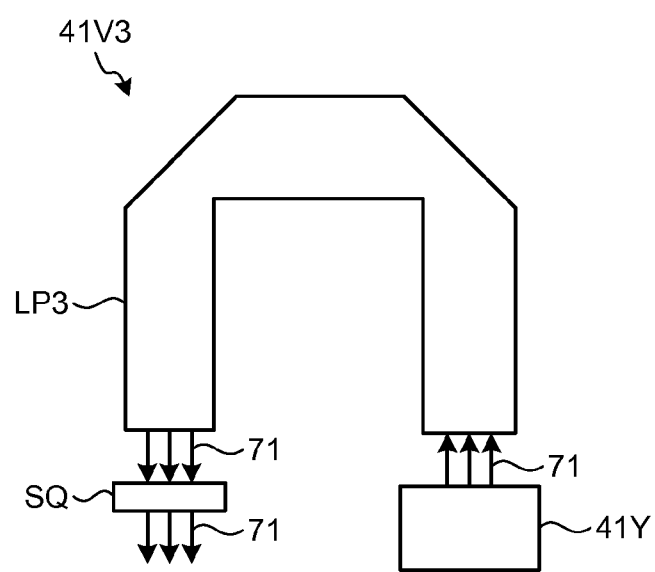
FIG. 66 is a plan view for explaining a waveguide for guiding the light from the light source according to the fifteenth embodiment.

FIGS. 64, 65, 66, and 67 are plan views for explaining waveguides for guiding the light from the light source according to the fifteenth embodiment. In the light source 41Z illustrated in FIG. 63, the light pipe is integrated with a package, but the light source may be configured as an optical system. For example, in this optical system 41V1, the light source 41Y, a light pipe LP1, a scattering plate SQ, and a slit SL that is a gap formed between a plurality of shielding plates AP are arranged in line, as illustrated in FIG. 64. The scattering plate SQ and the shielding plates AP, which are described later, may not be provided. The scattering plate SQ allows the light passing through the scattering plate SQ to be scattered so that the illuminance unevenness can be reduced. The light pipe LP1 is a cylindrical member made of a material such as a resin material including acrylic, glass, or quartz. The cross section of the light pipe LP1 may have a circular shape or a polygonal shape. As another example, this optical system 41V2 may be bent as the light pipe LP2 illustrated in FIG. 65. As another example, this optical system 41V3 may be bent in a U shape as the light pipe LP3 illustrated in FIG. 66. The light pipe LP2 and the light pipe LP3 can improve the freedom in positions where the light source Y is arranged.

Figure 67:
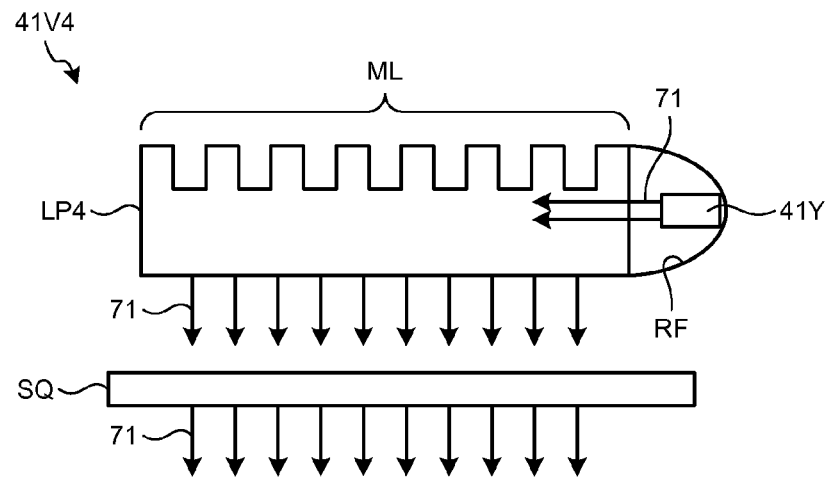
FIG. 67 is a plan view for explaining a waveguide for guiding the light from the light source according to the fifteenth embodiment.

An optical system 41V4 illustrated in FIG. 67 includes the light source 41Y, a plate-shaped waveguide plate LP4, and a scattering plate SQ. In this optical system 41V4, the light source 41Y is covered by a reflector RF, so that the light source light 71 from the light source 41Y becomes incident on a side surface of the waveguide plate LP4. A mirror surface ML provided on one side of the waveguide plate LP4 and having recesses and protrusions changes the direction of the light source light 71 that is incident on the side surface of the waveguide plate LP4 to a direction in which the light source light 71 is output vertically from the surface of the waveguide plate LP4. With this structure, the optical system 41V4 can emit the light source light 71 having a uniform light intensity distribution.

Process of Manufacturing Light Source Package

Figure 68:
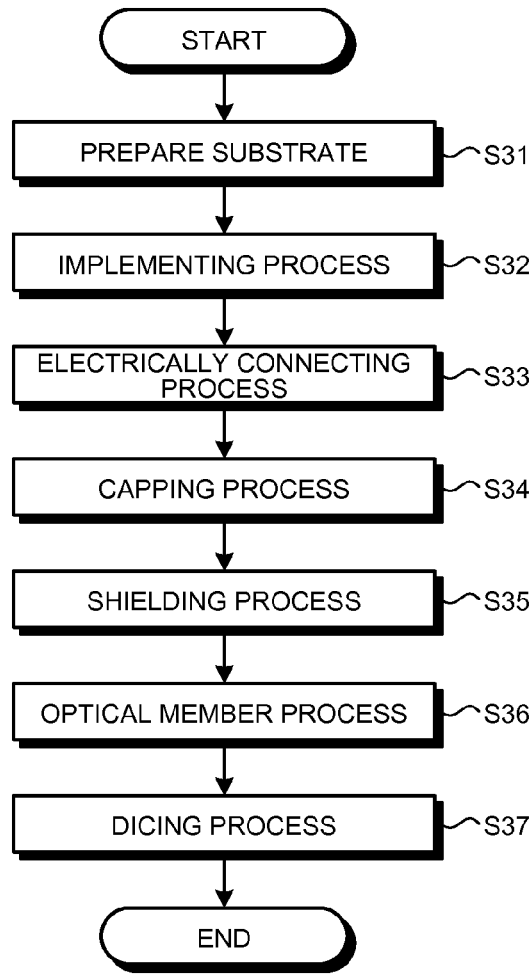
FIG. 68 is a flowchart for explaining a light source package manufacturing process according to the fifteenth embodiment.
Figures 1, 69:
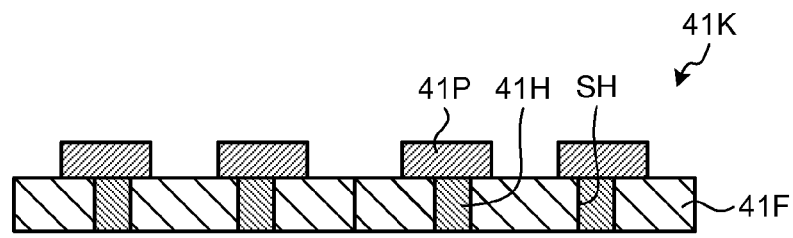
Figures 2, 69:
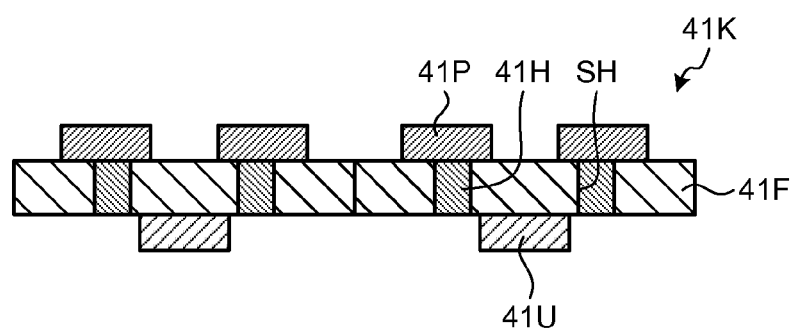
Figures 3, 69:
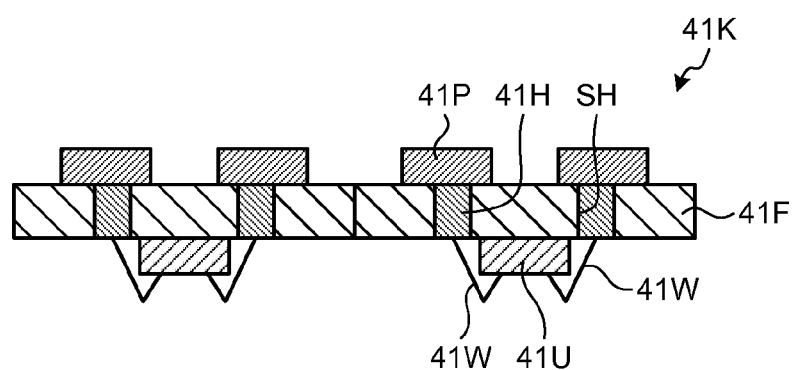
Figures 4, 69:
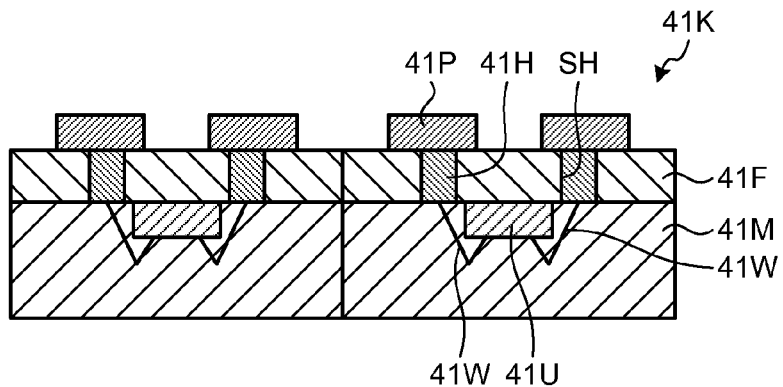
Figures 5, 69:
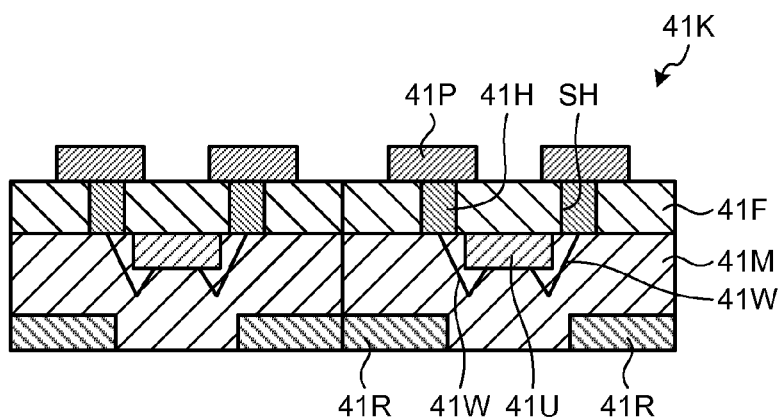
Figures 6, 69:
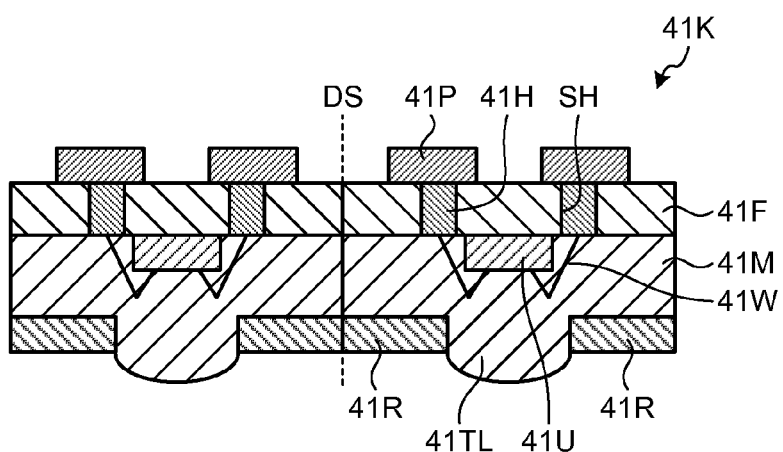

FIG. 68 is a flowchart for explaining a light source package manufacturing process according to the fifteenth embodiment. FIGS. 69-1 to 69-6 are schematics for explaining the light source package manufacturing process according to the fifteenth embodiment. The members that are the same as those described above are assigned with the same reference numerals, and redundant explanations thereof are omitted hereunder. The process of manufacturing the light source 41Y will now be explained with reference to FIGS. 62, 68, 69-1 to 69-6.

As illustrated in FIG. 68, to begin with, the manufacturing equipment prepares a light source substrate 41K illustrated in FIG. 69-1 (Step S31). The light source substrate 41K illustrated in FIG. 69-1 includes the base substrate 41F, the penetrating conductive layer 41H embedded in the through-holes SH penetrating through the surfaces of the base substrate 41F, and the external electrodes 41P that are electrically connected to the penetrating conductive layer 41H.

As illustrated in FIG. 69-2, the manufacturing equipment then performs an implementing process in which the light emitting devices 41U are implemented on one surface of the light source substrate 41K (Step S32).

As illustrated in FIG. 69-3, the manufacturing equipment then performs an electrically connecting process in which a conductive connection via a bonding wire 41W is established between each of the light emitting devices 41U and the penetrating conductive layer 41H (Step S33). The electrical connection is not limited to wire bonding via a bonding wire 41W, as long as a conductive connection between the light emitting device 41U and the penetrating conductive layer 41H can be ensured.

As illustrated in FIG. 69-4, the manufacturing equipment then performs a capping process in which the light emitting device 41U is protected using the encapsulation resin 41M (Step S34). The encapsulation resin 41M is a translucent insulating material.

As illustrated in FIG. 69-5, the manufacturing equipment then performs the process of forming the light-shielding film 41R on the surface of the encapsulation resin 41M, with a light-shielding material such as a black resist, a synthetic resin, paint, or a metal film (Step S35).

The manufacturing equipment then performs an optical member process in which the light emitting portions 41TL illustrated in FIG. 69-6 are formed (Step S36). The light emitting portions 41TL are formed by mold-crimping using the same material as the encapsulation resin 41M, for example.

The manufacturing equipment then performs a dicing process in which the light source substrate 41K illustrated in FIG. 69-6 is cut across the dicing lines DS (Step S37). The light source substrate 41K is then separated into each die, into each package illustrated in FIG. 62. In this manner, the light source 41Y is manufactured.

Figure 70:
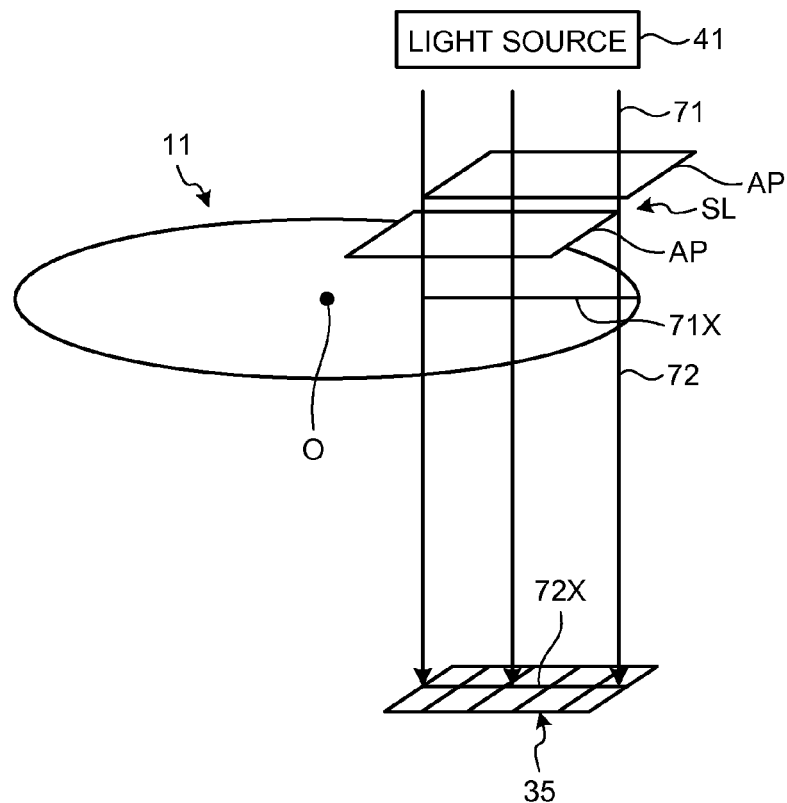
FIG. 70 is a schematic for explaining shielding of the light source according to the fifteenth embodiment.

FIG. 70 is a schematic for explaining shielding of the light source according to the fifteenth embodiment. The light source light 71 from the light source 41 is output toward the optical scale 11 through the slit SL that is a gap between the shielding plates AP. The sensing area 71X on the optical scale 11 is dependent on the shape of the slit SL. Therefore, by changing the shape and the arrangement of the shielding plates AP, the sensing area 71X can be changed as appropriate. The sensing area 71X on the optical scale 11 corresponds to a detection area 72X of the optical sensor.

Figure 71:
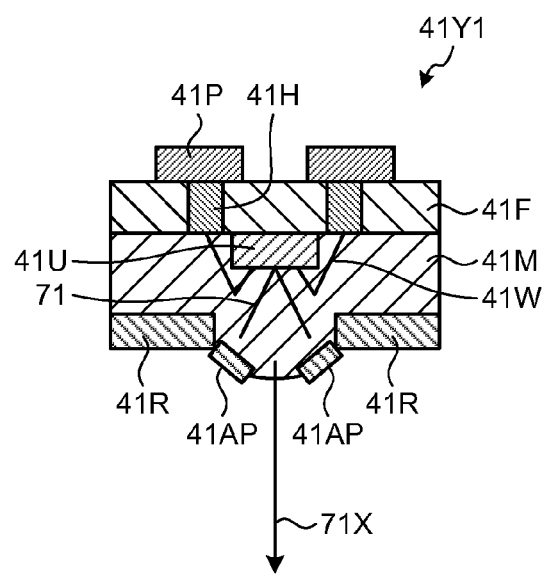
FIG. 71 is a schematic for explaining a light source with a higher shielding efficiency according to the fifteenth embodiment.
Figure 72:
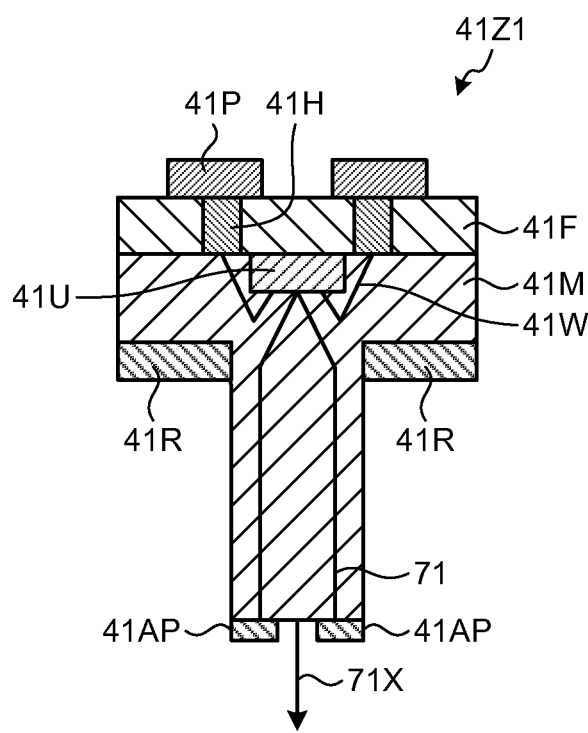
FIG. 72 is a schematic for explaining a light source with a higher shielding efficiency according to the fifteenth embodiment.

FIGS. 71 and 72 are schematics for explaining light sources with a higher shielding efficiency according to the fifteenth embodiment. Each of the light sources 41Y1 and 41Z1 illustrated in FIGS. 71 and 72, respectively, is integrated with the shielding plates 41AP, and the shielding plates 41AP allow the light source light 71 to focus to a given shape. The sensing area 71X is thus defined.

Sixteenth Embodiment

Figure 73:
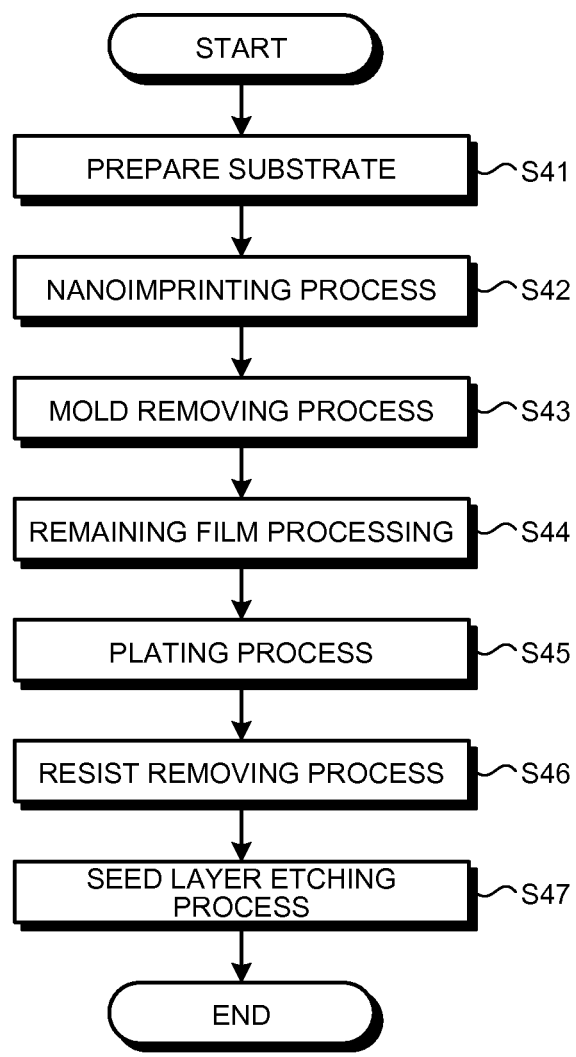
FIG. 73 is a flowchart for explaining an optical scale manufacturing process according to a sixteenth embodiment of the present invention.

FIG. 73 is a flowchart for explaining an optical scale manufacturing process according to a sixteenth embodiment of the present invention. FIGS. 74-1 to 74-7 are schematics for explaining the optical scale manufacturing process according to the sixteenth embodiment. The members that are the same as those described above are assigned with the same reference numerals, and redundant explanations thereof are omitted hereunder. FIGS. 74-1 to 74-7 are partial cross-sectional views of the optical scale 11 illustrated in FIG. 4 during the manufacturing process. The process of manufacturing the optical scale 11 according to the sixteenth embodiment using nanoimprinting will now be explained with reference to FIGS. 4, 73, and 74-1 to 74-7.

As illustrated in FIG. 73, to begin with, the manufacturing equipment prepares a base substrate 11be made of glass, quartz ($SiO_2$), silicon, a printed substrate, or a film material, as illustrated in FIG. 74-1 (Step S41). A resist layer 11r such as polymethyl methacrylate (PMMA) or polyimide resin is applied on the surface of the base substrate 11be, with a seed layer 11se interposed between the resist layer 11r and base substrate 11be, as illustrated in FIG. 74-1. The seed layer use is a multi-layered film that are a Cr layer and a Cu layer formed on the base substrate 11be, for example.

As illustrated in FIG. 74-2, the manufacturing equipment then performs a nanoimprinting process in which a mold 11K made of a metal, as illustrated in FIG. 74-2, is pressed against the resist layer 11r, so that the recesses and protrusions in a size of 50 nanometers to 500 nanometers engraved in the mold 11K is transferred onto the resist layer 11r as fine patterns 11rp (Step S42). In the nanoimprinting process (Step S42), processes for forming the fine patterns 11rp referred to as thermal nanoimprinting or UV nanoimprinting may be used. In the thermal nanoimprinting, the resist layer 11r is heated, whereas the resist layer 11r is irradiated with UV light in the UV nanoimprinting. As illustrated in FIG. 74-3, the manufacturing equipment then performs a mold removing process in which the mold 11K is removed from the resist layer 11r (Step S43). The resist layer 11r after the transfer has a remaining film 11rn as well as the fine patterns 11rp. Therefore, the manufacturing equipment performs a remaining film process in which unnecessary remaining film 11rn is removed by reactive ion etching (RIE) as illustrated in FIG. 74-4 (Step S44).

The manufacturing equipment then performs a plating process in which electroplating is used to allow metal 11m to be deposited on the seed layer 11se (Step S45). As illustrated in FIG. 74-5, the metal 11m is deposited in the space between the fine patterns 11rp. The metal 11m is a metal such as Ni, Cr, Al, Mo, Cu, or Au, or an alloy composed of one or more these metals, for example, As illustrated in FIG. 74-6, the manufacturing equipment then performs a resist removing process in which the resist on the fine patterns 11rp is removed (Step S46). Once the resist on the fine patterns 11rp is removed, the pattern of wires limp formed by the metal 11m remains.

As illustrated in FIG. 74-7, the manufacturing equipment then performs a seed layer etching process in which the seed layer 11se between the wires 11mp is removed (Step S47). The seed layer etching process (Step S47) may be omitted if the seed layer 11se is thin enough, so that the optical characteristics of the optical scale 11 are not affected.

Through the manufacturing process described above, the manufacturing equipment can form the signal tracks T1 having the wires g referred to as a wire grid pattern and the transmissive area w through which the entire or a part of the light source light 71 is allowed to pass on the optical scale 11.

Seventeenth Embodiment

Figure 75:
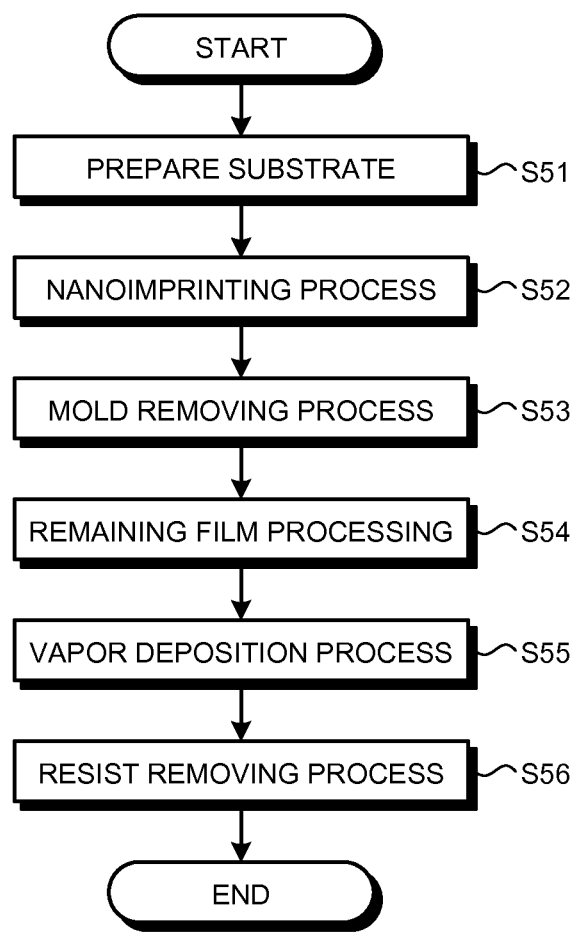
Figures 1, 76:
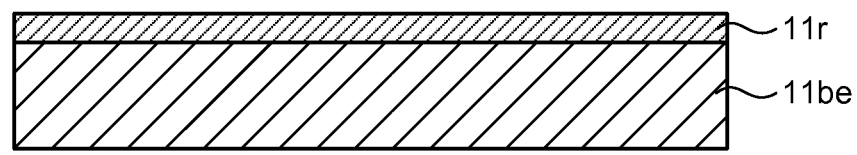
Figures 2, 76:
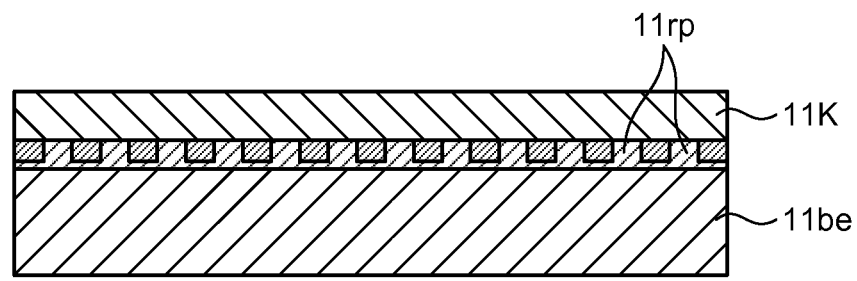
Figures 3, 76:
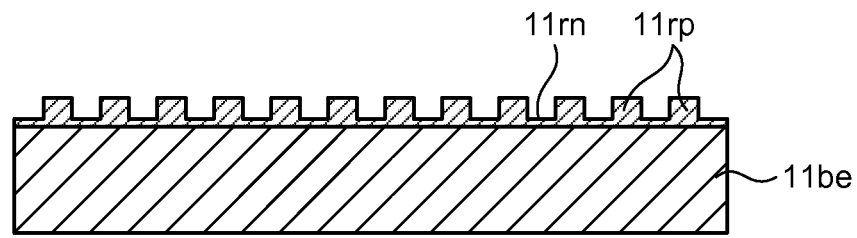
Figures 4, 76:
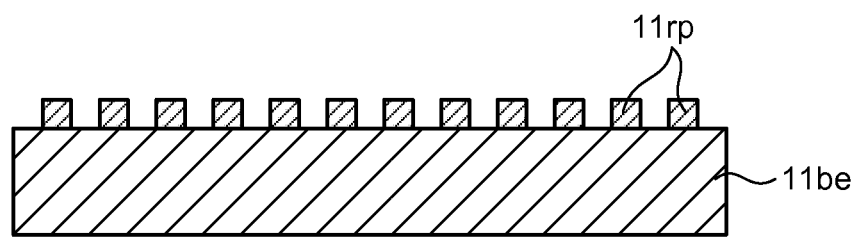
Figures 5, 76:
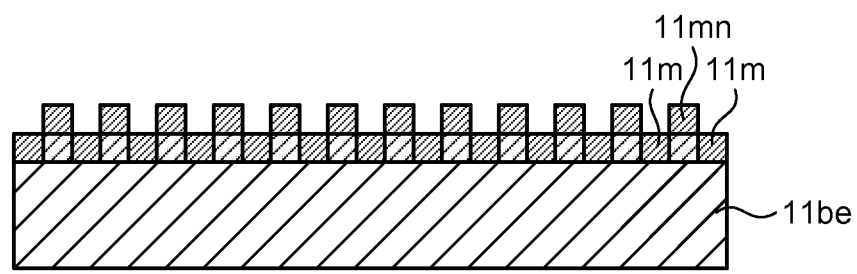
Figures 6, 76:
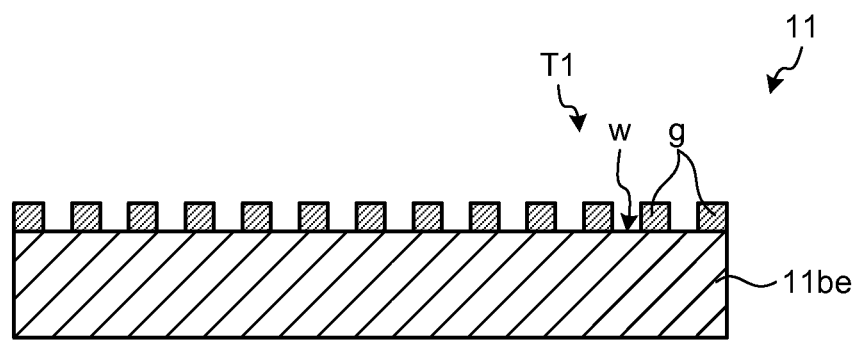

FIG. 75 is a flowchart for explaining an optical scale manufacturing process according to a seventeenth embodiment of the present invention. FIGS. 76-1 to 76-6 are schematics for explaining the optical scale manufacturing process according to the seventeenth embodiment. The members that are the same as those described above are assigned with the same reference numerals, and redundant explanations thereof are omitted hereunder. FIGS. 76-1 to 76-6 are partial cross-sectional views of the optical scale 11 illustrated in FIG. 4 during the manufacturing process. The process of manufacturing the optical scale 11 according to the seventeenth embodiment will now be explained with reference to FIGS. 4, 75, and 76-1 to 76-6.

As illustrated in FIG. 75, to begin with, the manufacturing equipment prepares a base substrate 11be made of glass, quartz ($SiO_2$), silicon, a printed substrate, or a film material, as illustrated in FIG. 76-1 (Step S51). As illustrated in FIG. 76-1, the resist layer 11r such as polymethyl methacrylate (PMMA) or polyimide resin is applied on the surface of the base substrate 11be.

As illustrated in FIG. 76-2, the manufacturing equipment then performs a nanoimprinting process in which the mold 11K made of a metal, as illustrated in FIG. 76-2, is pressed against the resist layer 11r, so that the recesses and protrusions in a size of 50 nanometers to 500 nanometers engraved in the mold 11K are transferred as fine patterns 11rp on the resist layer 11r (Step S52). In the nanoimprinting process (Step S52), processes for forming the fine patterns 11rp referred to as thermal nanoimprinting or UV nanoimprinting may be used. In the thermal nanoimprinting, the resist layer 11r is heated, whereas the resist layer 11r is irradiated with UV light in the UV nanoimprinting. As illustrated in FIG. 76-3, the manufacturing equipment then performs a mold removing process in which the mold 11K is removed from the resist layer 11r (Step S53). The resist layer 11r after the transfer has a remaining film 11rn as well as the fine patterns 11rp. Therefore, the manufacturing equipment performs remaining film processing in which unnecessary remaining film 11rn is removed by RIE, as illustrated in FIG. 76-4 (Step S54).

The manufacturing equipment then performs a vapor deposition process in which the metal 11m is vapor-deposited in a manner covering the fine patterns 11rp (Step S55). As illustrated in FIG. 76-5, the metal 11m is provided in the space between the fine patterns 11rp. The metal 11mn is also vapor-deposited on the resist on the fine patterns 11rp. The metal 11m is a metal such as Ni, Cr, Al, Mo, Cu, or Au, or an alloy composed of one or more these metals. The vapor deposition is performed as vacuum deposition, sputtering, or vapor phase epitaxy (VPE).

As illustrated in FIG. 76-6, the manufacturing equipment then performs a resist removing process in which the resist on the fine patterns 11rp is removed (Step S56). When the resist on the fine patterns 11rp is removed, the metal 11mn on the resist illustrated in FIG. 76-5 is simultaneously lifted off, and the patterns of the metal 11m (wire g) remain on the base substrate 11be. Through the manufacturing process described above, the manufacturing equipment can form a signal tracks T1 having wires g which are referred to as a wire grid pattern, and the transmissive area w through which the entire or a part of the light source light 71 is allowed to pass on the optical scale 11.

Figure 77:
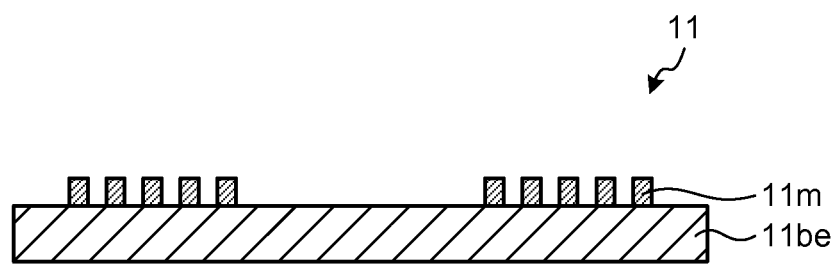
Figure 78:
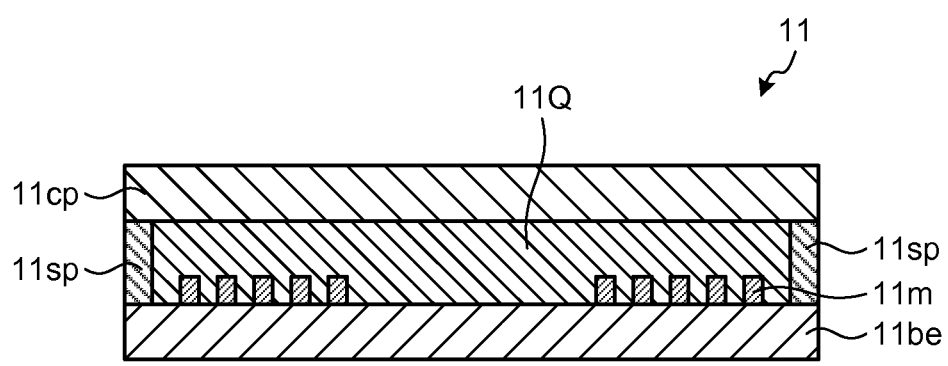

FIG. 77 is a schematic for explaining an example of the wire grid pattern on the optical scale according to the seventeenth embodiment. The manufacturing method described above results in an optical scale 11 on which the metal 11m is exposed from the surface of the base substrate 11be, as illustrated in FIG. 77, for example. Therefore, foreign substances could become attached to the surfaces of the metal 11m.

FIGS. 78 to 86 are schematics for explaining an example of the wire grid pattern on the optical scale according to the seventeenth embodiment. The optical scale 11 illustrated in FIG. 78 includes the base substrate 11be, a spacer member 11sp, and a cap substrate 11cp. The spacer member 11sp is provided in a manner standing from the base substrate 11be and surrounding the outer periphery of the base substrate 11be. The cap substrate 11cp serves as a lid on the spacer member 11sp, and the metal 11m is surrounded by the base substrate 11be, the spacer member 11sp, and the cap substrate 11cp. The spacer member 11sp and the cap substrate 11cp are made of glass, silicon, ceramic, an insulating material, or resin such as acrylic resin, for example. By covering the spacer member 11sp with the cap substrate 11cp under a nitrogen atmosphere or a vacuum atmosphere, the internal space 11Q surrounded by the base substrate 11be, the spacer member 11sp, and the cap substrate 11cp can be nitrogen-sealed or vacuum-sealed. As a result, the space surrounding the metal 11m (wire pattern) are kept clean on the optical scale 11, so that the metal 11m is less affected by foreign substances or the like.

As illustrated in FIG. 79, the optical scale 11 may include a cap substrate 11cp also provided with the metal 11m (wire pattern), and the same wire patterns may be positioned and layered in a manner facing each other. In this manner, the optical scale 11 may include multiple layers of an arrangement of wires referred to as a wire grid pattern in a thickness direction in which the transmissive light 73 or the reflected light 72 become incident, so that a highly accurate optical scale with a smaller error can be achieved.

As illustrated in FIG. 80, the optical scale 11 may also include a base substrate 11be both sides of which are provided with the metal 11m (wire pattern), and in which the same wire patterns are positioned facing each other with the base substrate 11be interposed between the wire patterns. In this manner, multiple layers of an arrangement of wires referred to as a wire grid pattern can be arranged (layered) in the optical scale 11 in the thickness direction in which the transmissive light 73 or the reflected light 72 becomes incident, so that a highly accurate optical scale with a smaller error can be achieved. The optical scale 11 illustrated in FIG. 80 includes the base substrate 11be, spacer members 11sp1 and 11sp2, and cap substrates 11cp1 and 11cp2. Each of the spacer members 11sp1 and 11sp2 is provided in a manner standing from the corresponding surface of the base substrate 11be. The cap substrates 11cp1 and 11cp2 surrounding the outer periphery of the base substrate 11be serve as lids on the respective spacer members 11sp1 and 11sp2, so that the metal 11m is surrounded by the base substrate 11be, the spacer members 11sp1 and 11sp2, and the cap substrates 11cp1 and 11cp2. The internal space 11Q of the optical scale 11 may be nitrogen-sealed or vacuum-sealed. The optical scale 11 may also include cap substrates 11cp1 and 11cp2 each of which is also provided with the metal 11m (wire pattern), as illustrated in FIG. 81, and in which the same wire patterns are positioned facing each other. In this manner, the optical scale 11 can be provided with four layers of an arrangement of wires referred to as a wire grid pattern in the thickness direction in which the transmissive light 73 or the reflected light 72 becomes incident, so that a highly accurate optical scale with a smaller error can be achieved.

In the optical scale 11 illustrated in FIG. 82, the metal 11m is covered by a translucent protection layer 11v allowing light to pass through. Therefore, the space surrounding the metal 11m (wire pattern) are kept clean on the optical scale 11, so that the metal 11m is less affected by foreign substances or the like.

As illustrated in FIG. 83, the optical scale 11 may also include base substrates 11be each provided with a pair of metal 11m, and in which the same wire patterns are positioned facing each other with the protection layer 11v interposed between the wire patterns. In this manner, the optical scale 11 can be provided with multiple layers of an arrangement of wires referred to as a wire grid pattern in the thickness direction in which the transmissive light 73 or the reflected light 72 becomes incident, so that a highly accurate optical scale with a smaller error can be achieved.

As illustrated in FIG. 84, the optical scale 11 may also include a base substrate 11be both sides of which are provided with the metal 11m (wire pattern), and in which the same wire patterns are positioned facing each other with the base substrate 11be interposed between the wire patterns. In this optical scale 11, the metals 11m are covered by translucent protection layers 11v that pass through the light. Therefore, the space surrounding the metals 11m (wire pattern) are kept clean on the optical scale 11, so that the metal 11m is less affected by foreign substances or the like.

In the optical scale 11 illustrated in FIG. 85, the optical scale 11 illustrated in FIG. 84 is stacked in plurality, in the thickness direction in which the transmissive light 73 or the reflected light 72 becomes incident. In this manner, the optical scale can be provided with four layers of an arrangement of wires referred to as a wire grid pattern, in the thickness direction in which the transmissive light 73 or the reflected light 72 becomes incident, so that a highly accurate optical scale with a smaller error can be achieved.

The optical scale 11 illustrated in FIG. 86, an antireflection film 11AR is provided on each side of the optical scale illustrated in FIG. 82. In this manner, diffused reflections can be suppressed on the optical scale 11. The antireflection film 11AR may also be provided to the surfaces of the optical scales 11 illustrated in FIGS. 78 to 85.

Eighteenth Embodiment

FIG. 87 is a schematic for explaining an optical scale according to an eighteenth embodiment of the present invention. FIGS. 88, 89, and 90 are schematics for explaining the polarizing axes in the optical sensor according to the eighteenth embodiment. The members that are the same as those described above are assigned with the same reference numerals, and redundant explanations thereof are omitted hereunder.

This optical scale 11I illustrated in FIG. 87 includes an optical scale 11a in which the polarization direction of the polarizer is oriented one direction across the 360 degrees of a plane having the reference point at the center O, and an optical scale 11b provided in a manner surrounding the outer circumference of the optical scale 11a and rotating about the center O with the optical scale 11a. The optical scale 11b is provided with signal tracks T21 and T22, each of which occupies 180 degrees of the plane having the reference point at the center O, and each of which forms a polarizer whose polarization direction is oriented differently. The signal tracks T21 form a concentric polarization pattern in which the polarization direction of the polarizer is oriented one direction, concentrically about the center O. The signal tracks T22 form a radial polarization pattern in which the polarization direction of the polarizer is oriented one direction in the radial direction (moving radius direction) from the center O. An optical sensor SE1 and an optical sensor SE2, which are the optical sensors 35 arranged 180-degree symmetrical with respect to the center O, read the signal tracks T1a on the optical scale 11a. Another optical sensor SE3 including the optical sensor 35 reads the signal tracks T21 and T22 on the optical scale 11b that passes through the optical sensor SE3 alternatingly.

The optical sensor SE1 includes the first optical sensor 36A and the second optical sensor 36B illustrated in FIG. 88, in the same manner as in the optical sensor 35 explained above. The first optical sensor 36A includes a first polarizing layer 39a1 for splitting incident light to the light with the first polarization direction, and the first photoreceivers for receiving the first polarized light split by the first polarizing layer 39a1, and is capable of detecting the intensity of light with the first polarization direction. The second optical sensor 36B includes a second polarizing layer 39b1 for splitting the incident light to the light with the second polarization direction, and the second photoreceivers for receiving the second polarized light split by the second polarizing layer 39b1, and is capable of detecting the intensity of light with the second polarization direction.

The optical sensor SE2 includes the first optical sensor 36A and the second optical sensor 36B illustrated in FIG. 89, in the same manner as in the optical sensor 35 explained above. The first optical sensor 36A includes a first polarizing layer 39a2 for splitting incident light into the light with a first polarization direction, and the first photoreceivers for receiving the first polarized light split by the first polarizing layer 39a2, and is capable of detecting the intensity of light with the first polarization direction. The second optical sensor 36B includes a second polarizing layer 39b2 for splitting the incident light to the light with the second polarization direction, and the second photoreceivers for receiving the second polarized light split by the second polarizing layer 39b2, and is capable of detecting the intensity of light with the second polarization direction. The polarization direction detected by the first polarizing layer 39a1 is different by 45 degrees from that detected by the first polarizing layer 39a2. The polarization direction detected by the second polarizing layer 39b1 is different by 45 degrees from that detected by the second polarizing layer 39b2.

The optical sensor SE3 also includes the first optical sensor 36A and the second optical sensor 36B illustrated in FIG. 90, in the same manner as in the optical sensor 35 explained above. The first optical sensor 36A includes a first polarizing layer 39a3 for splitting incident light into the light with the first polarization direction, and the first photoreceivers for receiving the first polarized light split by the first polarizing layer 39a3, and is capable of detecting the intensity of light with the first polarization direction. The second optical sensor 36B includes a second polarizing layer 39b3 for splitting the incident light to the light with the second polarization direction, and the second photoreceivers for receiving the second polarized light split by the second polarizing layer 39b3, and is capable of detecting the intensity of light with the second polarization direction. In the optical sensors SE1, SE2, and SE3, it is more preferable that the first photoreceivers 36a and the second photoreceivers 36b be arranged alternatingly and spaced uniformly with each other. With such a configuration, even when a foreign substance blocks a part of the sensing area, the chances of the first photoreceivers 36a and the second photoreceivers 36b being blocked by approximately the same degree can be increased, so that the possibility of the signal intensity output from one of the first photoreceivers 36a and the second photoreceivers 36b dropping extremely can be reduced.

Modification

FIG. 91 is a schematic for explaining an exemplary modification of the optical scale according to the eighteenth embodiment. FIG. 92 is a schematic for explaining an exemplary modification of the optical sensor according to the eighteenth embodiment. The members that are the same as those described above are assigned with the same reference numerals, and redundant explanations thereof are omitted hereunder.

The optical scale 11J illustrated in FIG. 91 includes an optical scale 11a in which the polarization direction of the polarizer is oriented one direction across the entire 360 degrees of a plane having the reference point at the center O, and an optical scale 11c provided in a manner surrounding the outer circumference of the optical scale 11a and rotating about the center O with the optical scale 11a. The optical scale 11c is provided with signal tracks T31 which form a light-shielding pattern that shields light, and signal tracks T32 which form a translucent pattern allowing light to pass through. Each of the signal tracks T31 and the signal tracks T32 occupies 180 degrees of the plane having the reference point at the center O. An optical sensor SE1 and an optical sensor SE2, which are the optical sensors 35 arranged 180-degree symmetrical with respect to the center O, read signal tracks T1a on the optical scale 11a. Another optical sensor SE3 in a photodiode 36PD illustrated in FIG. 92 reads the signal tracks T31 and T32 on the optical scale 11c passing through the optical sensor SE alternatingly. The photodiode 36PD may be any optical sensor other than a photodiode, as long as such an optical sensor is capable of determining the light intensity.

Encoder

FIG. 93 is a schematic for explaining outputs from the encoder according to the eighteenth embodiment. FIG. 93 illustrates outputs from the encoder with the optical scale 11I illustrated in FIG. 87. The optical scale 11a has a polarizer whose polarization axis is uniform across the plane. The optical scale 11a causes the polarization axis of the incident light that is incident on the optical sensors SE1 and SE2 to change in the rotating circumferential direction, as the optical scale 11a is rotated. As described earlier, the polarization direction detected by the first polarizing layer 39a1 is different from that detected by the first polarizing layer 39a2 by 45 degrees, and the polarization direction detected by the second polarizing layer 39b1 is different from that detected by the first polarizing layer 39b2 by 45 degrees. Therefore, when the output from the optical sensor SE1 is a sine wave illustrated in FIG. 93, the output from the optical sensor SE2 will be a cosine wave. The CPU 4c serving as a computing unit can then calculate the differential signal V indicating a relative amount of movement of the optical scale 11a with respect to each of the optical sensors SE1 and SE2 from the intensities of the first polarized light and the intensities of the second polarized light. However, because the differential signal V acquired from the optical scale 11a repeats an increase and decrease twice as the optical scale 11a is rotated once, correspondingly to the rotation angle of the polarization axis, the CPU 4c serving as a computing unit needs to determine whether the rotation angle of the optical scale 11I (11J) is in a range equal to or more than zero degrees and less than 180 degrees, or in a range equal to or more than 180 degrees and less than 360 degrees, before calculating an absolute angle.

Therefore, the optical scale 11b is provided with the signal tracks T31 and the signal tracks T32 each of which occupies 180 degrees of the plane having a reference point at the center O, and each of which has a polarizer with a different polarization direction. The optical sensor SE3 outputs a branch detecting signal output "branch" allowing such a border to be identified at one position in the 360 degrees as a differential signal, as illustrated in FIG. 93. When the optical sensor SE3 reads the optical scale 11c, the optical sensor SE3 outputs the branch detecting signal output "branch" allowing the border to be identified at one position in the 360 degrees as an intensity signal representing light intensity. Therefore, the CPU 4c can determine if the rotation angle of the optical scale 11I (11J) is in the range equal to or more than zero degrees and less than 180 degrees or in the range equal to or more than 180 degrees and less than 360 degrees. The computing unit 3 can identify the absolute position of the rotation angle of the rotor 10 from the differential signal of the signal tracks T11a and the differential signal of the signal tracks T21, T21 (T31, T32). In this manner, the encoder 2 according to the eighteenth embodiment can provide an absolute encoder capable of calculating an absolute position of the rotor 10.

Nineteenth Embodiment

FIG. 94 is a schematic for explaining an optical scale according to a nineteenth embodiment of the present invention. FIGS. 95 and 96 are schematics for explaining polarizing axes of the optical sensor according to the nineteenth embodiment. The members that are the same as those described above are assigned with the same reference numerals, and redundant explanations thereof are omitted hereunder.

This optical scale 11HY illustrated in FIG. 94 includes the optical scale 11a, and the optical scale 11b provided in a manner surrounding the outer circumference of the optical scale 11a and rotating about the center O with the optical scale 11a, both of which are as described above. The optical scale 11HY also includes the optical scale 11, which is explained earlier, provided in a manner surrounding the outer circumference of the optical scale 11b and rotating about the center O with the optical scale 11b.

The optical sensor SE1 and the optical sensor SE2 each of which includes the optical sensors 35 and that are arranged 180-degree symmetrically with respect to the center O read the signal tracks T1a on the optical scale 11a. The optical sensor SE3 including the optical sensor 35 reads the signal tracks T21 and the signal tracks T22 on the optical scale 11b passing across these optical sensors alternatingly.

Optical sensors SECOS and SESIN each including the optical sensor 35 read the signal tracks T1 on the optical scale 11. As explained earlier, the signal tracks T1 has a wire pattern consisting of curves having a wave-like form with six cycles in the 360 degrees with reference to the center O, and in which each of the cycles corresponds to 60 degrees. Therefore, the optical sensor SECOS is positioned at such a phase offset from the optical sensor SESIN that a line extended from the optical sensor SECOS to the center O forms an angle of 15 degrees, which corresponds to one quarter of the cycle, with a line extended from the optical sensor SESIN to the center O.

The optical sensor SECOS includes the first optical sensor 36A and the second optical sensor 36B illustrated in FIG. 95, in the same manner as in the optical sensor 35 explained above. The first optical sensor 36A includes a first polarizing layer 39a4 for splitting incident light to the light with the first polarization direction, and the first photoreceivers for receiving the first polarized light split by the first polarizing layer 39a4, and is capable of detecting the intensity of light with the first polarization direction. The second optical sensor 36B includes a second polarizing layer 39b4 for splitting the incident light to the light with the second polarization direction, and the second photoreceivers for receiving the second polarized light split by the second polarizing layer 39b4, and is capable of detecting the intensity of light with the second polarization direction.

The optical sensor SESIN includes the first optical sensor 36A and the second optical sensor 36B illustrated in FIG. 96, in the same manner as in the optical sensor 35 explained above. The first optical sensor 36A includes a first polarizing layer 39a4 for splitting incident light into the light with a first polarization direction and the first photoreceivers for receiving the first polarized light split by the first polarizing layer 39a4, and is capable of detecting the intensity of light with the first polarization direction. The second optical sensor 36B includes a second polarizing layer 39b4 for splitting the incident light to the light with the second polarization direction, and the second photoreceivers for receiving the second polarized light split by the second polarizing layer 39b4, and is capable of detecting the intensity of the light with the second polarization direction. Because the optical sensor SECOS and the optical sensor SESIN are positioned offset from each other by 15 degrees, the polarization direction detected by the optical sensor SECOS is different from that detected by the optical sensor SESIN by 15 degrees. In the optical sensors SECOS and SESIN, it is more preferable that the first photoreceivers 36a and the second photoreceivers 36b be arranged alternatingly and spaced uniformly with each other. With such a configuration, even when a foreign substance blocks a part of the sensing area, the chances of the first photoreceivers 36a and the second photoreceivers 36b being blocked by approximately the same degree can be increased, so that the possibility of the signal intensity output from one of the first photoreceivers 36a and the second photoreceivers 36b dropping extremely can be reduced.

FIG. 97 is a schematic for explaining outputs from the encoder according to the nineteenth embodiment. The optical scale 11a has a polarizer whose polarization axis is uniform across the plane. The optical scale 11a causes the polarization axis of the incident light that is incident on the optical sensors SE1 and SE2 to change in the rotating circumferential direction, as the optical scale 11a is rotated. As described earlier, the polarization direction detected by the first polarizing layer 39a1 is different from that detected by the first polarizing layer 39a2 by 45 degrees. The polarization direction detected by the second polarizing layer 39b1 is different from that detected by the first polarizing layer 39b2 by 45 degrees. Therefore, when the output from the optical sensor SE1 is a sine wave illustrated in FIG. 97, the output from the optical sensor SE2 will be cosine wave. The CPU 4c serving as a computing unit can then calculate the differential signal V indicating a relative amount of movement of the optical scale 11a with respect to each of the optical sensors SE1 and SE2 from the intensities of the first polarized light and the intensities of the second polarized light. However, because the differential signal V acquired from the optical scale 11a repeats an increase and decrease twice as the optical scale 11a is rotated once, correspondingly to the rotation angle of the polarization axis, the CPU 4c serving as a computing unit needs to determine whether the rotation angle of the optical scale 11I (11J) is in a range equal to or more than zero degrees and less than 180 degrees, or in a range equal to or more than 180 degrees and less than 360 degrees, before calculating an absolute angle.

Therefore, the optical scale 11b is provided with signal tracks T21 and T22 each of which occupies 180 degrees of the plane having a reference point at the center O, and each of which has a polarizer with a different polarization direction. The optical sensor SE3 outputs a branch detecting signal output "branch" allowing the border to be identified at one position in the 360 degrees, as illustrated in FIG. 97. Therefore, the CPU 4c can determine if the rotation angle of the optical scale 11HY is in the range equal to or more than zero degrees and less than 180 degrees or in the range equal to or more than 180 degrees and less than 360 degrees.

FIG. 98 is a schematic for explaining outputs from the encoder according to the nineteenth embodiment. The optical scale 11HY has the optical scale 11, and each of the optical sensor SECOS and the optical sensor SESIN outputs the signal intensity I(−) of the component having the first polarization direction and the signal intensity I(+) of the component having the second polarization direction. The computing unit 3 illustrated in FIG. 3 then acquires the signal intensity I(−) of the component having the first polarization direction and the signal intensity I(+) of the component having the second polarization direction that are the detection signals from the optical sensors 35. The computing unit 3 then calculates the differential signal V from the signal intensity I(−) of the component having the first polarization direction and the signal intensity I(+) of the component having the second polarization direction, following Equation (1) mentioned above. As the optical scale 11 is rotated by once, the differential signal V indicates a waveform with six cycles. Therefore, the CPU 4c needs to determine to which one of 30-degree units the rotation angle of the optical scale 11HY belongs. Therefore, the computing unit 3 identifies one of the 30 degree-units where the absolute position of the rotation angle of the rotor 10 belongs, from the differential signal from the signal tracks T11*a* and the differential signal from the signal tracks T21, T21 illustrated in FIG. 97. The computing unit 3 then calculate a more specific rotation angle from the differential signal V illustrated in FIG. 98. In this manner, the encoder 2 can provide an absolute encoder capable of calculating an absolute position of the rotor 10.

Modification

FIG. 99 is a schematic for explaining an exemplary modification of the encoder according to the nineteenth embodiment. FIG. 100 is a schematic for explaining an optical sensor in the encoder illustrated in FIG. 99. FIG. 101 is a schematic for explaining the optical sensor in the encoder illustrated in FIG. 99. As illustrated in FIG. 99, the optical sensor SECOS and the optical sensor SESIN may be positioned in line with the center O. In this modification, the optical sensor SECOS includes the first optical sensor 36A and the second optical sensor 36B illustrated in FIG. 100, in the same manner as in the optical sensor 35 explained above. The first optical sensor 36A includes a first polarizing layer 39*a*4 for splitting incident light to the light with the first polarization direction, and the first photoreceivers for receiving the first polarized light split by the first polarizing layer 39*a*4, and is capable of detecting the intensity of light with the first polarization direction. The second optical sensor 36B includes a second polarizing layer 39*b*4 for splitting the incident light to the light with the second polarization direction, and the second photoreceivers for receiving the second polarized light split by the second polarizing layer 39*b*4, and is capable of detecting the intensity of light with the second polarization direction.

The optical sensor SESIN includes the first optical sensor 36A and the second optical sensor 36B illustrated in FIG. 101, in the same manner as in the optical sensor 35 explained above. The first optical sensor 36A includes a first polarizing layer 39*a*5 for splitting incident light to the light with the first polarization direction, and the first photoreceivers for receiving the first polarized light split by the first polarizing layer 39*a*5, and is capable of detecting the intensity of light with the first polarization direction. The second optical sensor 36B includes a second polarizing layer 39*b*5 for splitting the incident light to the light with the second polarization direction, and the second photoreceivers for receiving the second polarized light split by the second polarizing layer 39*b*5, and is capable of detecting the intensity of light with the second polarization direction.

The first polarizing layer 39*a*4 is positioned at such a phase offset from the first polarizing layer 39*a*5 in such a manner that the polarization directions detected by the respective polarizing layers are shifted by 15 degrees, which corresponds to one quarter of one cycle. In the same manner, the second polarizing layer 39*b*4 is positioned at such a phase offset from the second polarizing layer 39*b*5 that the polarization directions detected by the respective polarizing layers become shifted by 15 degrees, which corresponds to one quarter of one cycle.

Alternatively, each of the optical sensors SESIN and SECOS may be provided in plurality along the circumferential direction of the optical scale 11HY. FIG. 102 is a schematic for explaining such an exemplary modification of the encoder according to the nineteenth embodiment. FIG. 103 is a schematic for explaining an arrangement of optical sensors in the encoder illustrated in FIG. 102. For example, as illustrated in FIG. 102, because the optical scale 11 has a wire pattern consisting of curves having a wave-like form with six cycles in the 360 degrees with reference to the center O, in the same manner as in the signal tracks T1 described above, the optical scale 11 may have 12 pairs of optical sensors SESIN and SECOS along the circumferential direction. In this manner, the redundancy of the optical sensors SESIN and SECOS can be ensured. As illustrated in FIG. 103, in the configuration in which each of the optical sensors SESIN and SECOS is provided in plurality, the optical sensor 35 may be implemented in plurality on a single sensor-implementing substrate (e.g., a printed substrate or a silicon substrate) 340, at the positions corresponding to the respective optical sensors SESIN and SECOS. Alternatively, a silicon substrate or a glass substrate may be used as the sensor-implementing substrate 340, and the sensors SESIN and SECOS may be implemented integrally on the one substrate, using the method described above (such as the method illustrated in FIG. 17). Furthermore, the sensor-implementing substrate 340 may be provided with a slit 340SL that is large enough for the shaft 29 which is present on the line extended from the central axis of the center O to be avoided. Such a slit 340SL allows easy mounting to the central axis after the sensors are implemented.

Encoder

FIGS. 104 and 105 are block diagrams of the encoder according to the nineteenth embodiment. FIG. 105 is a block diagram for explaining the noise removal circuit illustrated in FIG. 104 in detail. FIGS. 106 and 107 are schematics for explaining angle detection signal outputs from the encoder according to the nineteenth embodiment.

As illustrated in FIG. 104, a computing unit 3A in the encoder 2 includes noise removal circuits NR1, NR2 . . . , NR4, NR5 . . . , a multiplying circuit AP1, and a computing circuit CU. The computing unit 3A is connected to the control unit 5 of the rotary machine such as a motor. To explain the noise removal circuit NR1 as a representative example, the noise removal circuit NR1 includes an alternating current amplifier 1 NR11, a phase adjustment circuit 1 NR12, a polarity inversion circuit 1 NR13, an integration circuit 1 NR14, and a direct current amplifier 1 NR15, as illustrated in FIG. 105. The light source 41 includes the light emitting device 41U and a driver 41*dv* that supplies power to the light emitting device 41U. The optical sensor package 31 includes an optical sensor SECOS (35) having photoreceivers including the first optical sensor 36A and the second optical sensor 36B, and a received light amplifier AMP1. The received light amplifier AMP1 is an amplifier that converts a current into a voltage, and is a transimpedance amplifier.

A reference signal ISIG generated by the signal generator SIG is input to the driver 41*dv*. The light emitting device 41U emits light based on the reference signal ISIG, to output the light source light 71 to the optical scale 11, 11I. The reflected light 72 (may also be the transmissive light 73) is received by the optical sensors SECOS, SESIN, SE1, SE2, and SE3 that are photoreceivers. As illustrated in FIG. 105, a received light signal VSIG1 amplified by the received light amplifier AMP1 is input to the noise removal circuit NR1. The noise removal circuit NR1 is a lock-in amplifier. When the received light signal VSIG1 and a reference signal IREF generated by the signal generator SIG are input to the noise removal circuit NR1, the reference signal IREF having phase adjusted via the phase adjustment circuit 1NR12 acts only on the received light signal VSIG1 that is targeted to be detected in the polarity inversion circuit 1NR13, and the integration circuit 1NR14 detects the amplitude information of the received light signal VSIG1 targeted to be detected. The direct current amplifier 1NR15 amplifies the amplitude information of the received light signal VSIG1 thus detected, and outputs the information to the multiplying circuit AP1 illustrated in FIG. 104. The multiplying circuit AP1 generates a harmonic signal that is several times of a basic frequency from the basic frequency. The computing circuit CU includes an absolute angle computing circuit AB that calculates the absolute angle described above, and an angle computation correcting circuit RE that corrects the angle computation from the outputs of the optical sensors SECOS, SESIN, SE1, SE2, and SE3, and a multiple rotation computing circuit ADA.

The multiple rotation computing circuit ADA computes a multiple rotation angle which includes rotations of optical scale 11HY equal to or more than 360 degrees. When the rotor 10 is rotated, the optical scale 11a and the optical scale 11b are rotated by the same rotation angle as the optical scale 11. The optical sensor SE3 outputs the branch detecting signal output "branch" allowing the border to be identified at one position in the 360 degrees as a differential signal, as illustrated in FIG. 93. The computing unit 3A then becomes capable of determining the absolute range of the rotation angle of the rotor 10 from the differential signals V output from SE1 and SE2, as illustrated in FIG. 93, in the manner described in the eighteenth embodiment. The computing unit 3A acquires the amount of movement from the differential signals V output from SECOS and SESIN illustrated in FIG. 106, using the absolute range (absolute position) thus determined as the initial position. For example, the computing unit 3A calculates the Lissajous pattern illustrated in FIG. 107 in order to identify the absolute rotation angle of the rotor 10 having rotated with respect to the initial position, from the differential signals V output from SECOS and SESIN illustrated in FIG. 106. The Lissajous pattern illustrated in FIG. 107 is cycled six times as the rotor 10 is rotated once. In this manner, the encoder 2 can provide an absolute encoder capable of calculating an absolute position of the rotor 10.

FIG. 108 is a schematic for explaining angle detection signal outputs from the encoder according to the nineteenth embodiment. FIG. 109 is a schematic for explaining angle detection signal outputs from the encoder according to the nineteenth embodiment. The differential signal VCOS of SECOS and the differential signal VSIN of SESIN as illustrated in FIG. 108 are differential signals V whose phases are different by $\lambda/4$. As described earlier, when a Lissajous pattern is drawn by plotting the differential signal VCOS to the horizontal axis and plotting the differential signal VSIN to the vertical axis, as illustrated in FIG. 109, the Lissajous angle θLA illustrated in FIG. 109 is determined by the rotation angle θrot illustrated in FIG. 108.

FIG. 110 is a flowchart for explaining angle detection signal outputs from the encoder according to the nineteenth embodiment. As illustrated in FIGS. 110 and 104, the multiple rotation computing circuit ADA in the encoder 2 reads a rotation count of the rotor 10 stored in at least one of the RAM 4e and the internal storage device 4f (Step S61).

The angle computation correcting circuit RE then calculates an angle range from the outputs of the optical sensors SE1, SE2, and SE3 (Step S62). Because the outputs from the optical scale 11a repeats an increase and decrease twice while the optical scale 11HY is rotated once, the angle computation correcting circuit RE needs to perform an angle range calculation to determine whether the rotation angle of the optical scale 11HY is in a range equal to or more than zero degrees and less than 180 degrees, or in a range equal to or more than 180 degrees and less than 360 degrees. Within the rotational angles of the optical scale 11HY thus identified, that is, within one of the angle range equal to or more than zero degrees and less than 180 degrees or the angle range equal to or more than 180 degrees and less than 360 degrees, the angle computation correcting circuit RE calculates the differential signals V indicating the amounts of relative movement of the optical scale 11a with respect to the optical sensors SE1, SE2, respectively. As a result, the computing unit 3 identifies a 30-degree range (angle range) including the absolute position of the rotation angle of the rotor 10 from the differential signal corresponding to the signal tracks T11a and the differential signal corresponding to the signal tracks T21 and T22.

As described earlier, the Lissajous pattern illustrated in FIG. 107 is cycled six times while the optical scale 11 in the rotor 10 is rotated once. Therefore, the absolute angle computing circuit AB determines which one of the six cycles while which the optical scale 11 is rotated the rotation angle belongs, based on the 30-degree range (angle range) including the absolute position of the rotation angle of the rotor 10 identified at Step S62, and calculates the specific angle (Step S63). The absolute angle computing circuit AB then establishes the Lissajous angle θLA within the cycle while which the optical scale 11 is rotated as the rotation angle θrot. The computing circuit CU then outputs the rotation angle θrot as an absolute angle (Step S64).

If the rotor 10 is still being rotated and the operation of the encoder 2 is not ended (No at Step S65), the computing unit 3A returns the process to Step S62, and causes the angle computation correcting circuit RE to calculate the angle range from the outputs of the optical sensors SE1, SE2, and SE3 (Step S62). If the rotation of the rotor 10 is stopped and the operation of the encoder 2 is to be ended (Yes at Step S65), the computing unit 3A moves the process to Step S66.

The encoder 2 stores the rotation count for the time for which the multiple rotation computing circuit ADA is being operated as the rotation count at the time of ending, in at least one of the RAM 4e and the internal storage device 4f (Step S66). By adding the information of the rotation count that can be output by the multiple rotation computing circuit ADA and the absolute angle that can be output by the absolute angle computing circuit AB, the encoder 2 can output an absolute angle equal to or more than 360 degrees to the control unit 5 when the optical scale 11HY is rotated more than once.

Twentieth Embodiment

FIG. 111 is a schematic for explaining an optical scale according to a twentieth embodiment of the present invention. FIG. 112 is a schematic for explaining a relation between a rotation angle and an angle range in the optical scale according to the twentieth embodiment. The members that are the same as those described above are assigned with the same reference numerals, and redundant explanations thereof are omitted hereunder.

This optical scale 11HW illustrated in FIG. 111 includes the optical scale 11a, and the optical scale 11b provided in a manner surrounding the outer circumference of the optical scale 11a and rotating about the center O with the optical scale 11a. The optical scale 11HW also includes optical scales 11Y4, 11Y8, and 11Y16 provided in a manner surrounding the outer circumference of the optical scale 11b, and rotating about the center O with the optical scale 11b.

The optical scale 11HW includes wire grid patterns consisting of curves having a wave-like form with four cycles, eight cycles, and sixteen cycles, respectively, in the 360 degrees. The intervals of the adjacent wires are the same at positions where the tangential directions of the respective wires are oriented the same. When compared are the positions in which the tangential directions are different, the intervals are also different. An optical scale 11Y4 is provided with a wire grid pattern whose wires form a curved pattern in a wave-like form with four cycles in the 360 degrees, in which the intervals between the adjacent wires are constant at positions where the tangential directions are oriented the same, and such intervals are different when compared are those at the positions where the tangential directions are oriented differently, in the same manner as in the optical scale 11. The optical scale 11Y8 is provided with a wire grid pattern whose wires form a curved pattern in a wave-like form with eight cycles in the 360 degrees, in which the intervals between the adjacent wires are constant at positions where the tangential directions are oriented the same, and such intervals are different when compared are those at the positions where the tangential directions are oriented differently, in the same manner as in the optical scale 11. The optical scale 11Y16 is provided with a wire grid pattern whose wires form a curved pattern in a wave-like form with sixteen cycles in 360 degree, in which the intervals between the adjacent wires are constant at positions where the tangential directions are oriented the same, and such intervals are different when compared are those at the positions where the tangential directions are oriented differently, in the same manner as in the optical scale 11.

The optical sensor SECOS and the optical sensor SESIN are linearly arranged toward outside in the radial direction, from the viewpoint at the center O, as illustrated in FIG. 99, for each of the optical scales 11Y4, 11Y8, and 11Y16. The optical sensor SECOS includes the first optical sensor 36A and the second optical sensor 36B illustrated in FIG. 100, in the same manner as in the optical sensor 35 explained above. The first optical sensor 36A includes a first polarizing layer 39a4 for splitting incident light to the light with the first polarization direction, and the first photoreceivers for receiving the first polarized light split by the first polarizing layer 39a4, and is capable of detecting the intensity of light with the first polarization direction. The second optical sensor 36B includes a second polarizing layer 39b4 for splitting the incident light to the light with the second polarization direction, and the second photoreceivers for receiving the second polarized light split by the second polarizing layer 39b4, and is capable of detecting the intensity of light with the second polarization direction.

The optical sensor SESIN includes the first optical sensor 36A and the second optical sensor 36B illustrated in FIG. 101, in the same manner as in the optical sensor 35 explained above. The first optical sensor 36A includes a first polarizing layer 39a5 for splitting incident light to the light with the first polarization direction, and the first photoreceivers for receiving the first polarized light split by the first polarizing layer 39a5, and is capable of detecting the intensity of light with the first polarization direction. The second optical sensor 36B includes a second polarizing layer 39b5 for splitting the incident light to the light with the second polarization direction, and the second photoreceivers for receiving the second polarized light split by the second polarizing layer 39b5, and is capable of detecting the intensity of light with the second polarization direction.

As illustrated in FIGS. 110 and 104, the encoder 2 causes the multiple rotation computing circuit ADA to read the rotation count of the rotor 10 stored in at least one of the RAM 4e and the internal storage device 4f (Step S61).

The angle computation correcting circuit RE then calculates the angle range from the outputs of the optical sensors SE1, SE2, and SE3, and the optical sensors SESIN and SECOS provided for each of the optical scale 11Y4, 11Y8, 11Y16 (Step S62). Because the outputs from the optical scale 11a repeats an increase and decrease twice while the optical scale 11HW is rotated once, the angle computation correcting circuit RE needs to perform an angle range calculation to determine whether the rotation angle of the optical scale 11HW is in a range equal to or more than zero degrees and less than 180 degrees, or in a range equal to or more than 180 degrees and less than 360 degrees.

As illustrated in FIG. 112, the rotation angle θrot of the optical scale 11HW belongs to one of an angle range branch Q21 that is a range equal to or more than zero degrees and less than 180 degrees, or to an angle range branch Q22 that is a range equal to or more than 180 degrees and less than 360 degrees, on the synchronizing optical scale 11a. As illustrated in FIG. 112, for example, it is assumed that the rotation angle θrot of the optical scale 11HW is at a position indicated by the arrow QQ, when the absolute angle is θab. At each position MM where the absolute angle θab exceeds 360 degrees, the multiple rotation computing circuit ADA makes the storage described above in at least one of the RAM 4e and the internal storage device 4f. The angle computation correcting circuit RE performs an angle range calculation considering that the position of the arrow QQ belongs to the angle range branch Q21, for example.

The angle computation correcting circuit RE calculates the angle range from the outputs of the SESIN and SECOS reading the optical scale 11Y4. As illustrated in FIG. 112, the rotation angle θrot of the optical scale 11HW thus identified belongs to one of an angle range branch Q41 that is a range equal to or more than 0 degrees and less than 90 degrees, an angle range branch Q42 that is a range equal to or more than 90 degrees and less than 180 degrees, an angle range branch Q43 that is a range equal to or more than 180 degrees and less than 270 degrees, and an angle range branch Q44 that is a range equal to or more than 270 degrees and less than 360 degrees, on the synchronizing optical scale 11Y4. The angle computation correcting circuit RE calculates the output from the SESIN and SECOS reading the optical scale 11Y4 as the Lissajous pattern illustrated in FIG. 107, assigns the angle range branches Q41, Q42, Q43, and Q44 to the respective four cycles, and performs the angle range calculation by considering that the position of the arrow QQ corresponding to the angle range branch Q21 belongs to the angle range branch Q41.

The angle computation correcting circuit RE then calculates the angle range from the outputs of the SESIN and SECOS reading the optical scale 11Y8. As illustrated in FIG. 112, the rotation angle θrot of the optical scale 11HW thus identified belongs to one of an angle range branch Q81 that is a range equal to or more than 0 degrees and less than 45 degrees, an angle range branch Q82 that is a range equal to or more than 45 degrees and less than 90 degrees, an angle range branch Q83 that is a range equal to or more than 90 degrees and less than 135 degrees, an angle range branch Q84 that is a range equal to or more than 135 degrees and less than 180 degrees, an angle range branch Q85 that is a range equal to or more than 180 degrees and less than 225 degrees, an angle range branch Q86 that is a range equal to or more than 225 degrees and less than 270 degrees, an angle range branch Q87 that is a range equal to or more than 270 degrees and less than 315 degrees, and an angle range branch Q88 that is a range equal to or more than 315 degrees and less than 360 degrees, on the synchronizing optical scale 11Y8. The angle computation correcting circuit RE then calculates the output from the SESIN and SECOS reading the optical scale 11Y8 as the Lissajous pattern illustrated in FIG. 107, assigns the angle range branches Q81, Q82, Q83, Q84, Q85, Q86, Q87, and Q88 to the respective eight cycles, and performs the angle range calculation by considering that the position of the arrow QQ corresponding to the angle range branch Q41 belongs to the angle range branch Q82.

The angle computation correcting circuit RE then calculates the angle range from the outputs of the SESIN and SECOS reading the optical scale 11Y16. As illustrated in FIG. 112, the rotation angle θrot of the optical scale 11HW thus identified belongs to one of an angle range branch Q161 that is a range equal to or more than 0 degrees and less than 22.5 degrees, an angle range branch Q162 that is a range equal to or more than 22.5 degrees and less than 45 degrees, an angle range branch Q163 that is a range equal to or more than 45 degrees and less than 67.5 degrees, an angle range branch Q164 that is a range equal to or more than 67.5 degrees and less than 90 degrees, an angle range branch Q165 that is a range equal to or more than 90 degrees and less than 112.5 degrees, an angle range branch Q166 that is a range equal to or more than 112.5 degrees and less than 135 degrees, an angle range branch Q167 that is a range equal to or more than 135 degrees and less than 157.5 degrees, an angle range branch Q168 that is a range equal to or more than 157.5 degrees and less than 180 degrees, an angle range branch Q169 that is a range equal to or more than 180 degrees and less than 202.5 degrees, an angle range branch Q1610 that is a range equal to or more than 202.5 degrees and less than 225 degrees, an angle range branch Q1611 that is a range equal to or more than 225 degrees and less than 247.5 degrees, an angle range branch Q1612 that is a range equal to or more than 247.5 degrees and less than 270 degrees, an angle range branch Q1613 that is a range equal to or more than 270 degrees and less than 292.5 degrees, an angle range branch Q1614 that is a range equal to or more than 292.5 degrees and less than 315 degrees, an angle range branch Q1615 that is a range equal to or more than 315 degrees and less than 337.5 degrees, and an angle range branch Q1616 that is a range equal to or more than 337.5 degrees and less than 360 degrees, on the synchronizing optical scale 11Y16. The angle computation correcting circuit RE calculates the output from the SESIN and SECOS reading the optical scale 11Y16 as the Lissajous pattern illustrated in FIG. 107, and assigns the angle range branches Q161, Q162, Q163, Q164, Q165, Q166, Q167, Q168, Q169, Q1610, Q1611, Q1612, Q1613, Q1614, Q1615, and Q1616 to the respective sixteen cycles, and performs the angle range calculation by considering that the position of the arrow QQ corresponding to the angle range branch Q82 belongs to the angle range branch Q163.

As described earlier, the absolute angle computing circuit AB establishes the Lissajous angle θLA in the third cycle, while which the optical scale 11Y16 is rotated, as the rotation angle θrot, based on the angle range branch Q163 identified at Step S62. The computing circuit CU then outputs the rotation angle θrot as the absolute angle (Step S64).

If the rotor 10 is still being rotated and the operation of the encoder 2 is not ended (No at Step S65), the computing unit 3A returns the process to Step S62, and causes the angle computation correcting circuit RE to calculate the angle range from the outputs of the optical sensors SE1, SE2, and SE3 (Step S62). If the rotation of the rotor 10 is stopped and the operation of the encoder 2 is to be ended (Yes at Step S65), the computing unit 3A moves the process to Step S66.

The encoder 2 stores the rotation count, that is the number of times the position MM is passed, while the multiple rotation computing circuit ADA is being operated, as the rotation count at the time of ending, in at least one of the RAM 4e and the internal storage device 4f (Step S66). By adding the information of the rotation count that can be output by the multiple rotation computing circuit ADA and the absolute angle that can be output by the absolute angle computing circuit AB, the encoder 2 can output an absolute angle equal to or more than 360 degrees to the control unit 5 when the optical scale 11HY is rotated more than once.

Twenty-First Embodiment

FIGS. 113-1 and 113-2 are schematics for explaining an optical scale according to a twenty-first embodiment of the present invention. FIGS. 114-1 to 118-4 are schematics for explaining a relation between a rotation angle and a Lissajous angle in the optical scale according to the twenty-first embodiment. FIGS. 119-1 to FIG. 119-4 are schematics for explaining a relation between a rotation angle and a Lissajous angle in an optical scale according to a comparative example. The members that are the same as those described above are assigned with the same reference numerals, and redundant explanations thereof are omitted hereunder.

As illustrated in FIG. 113-1, the optical scale 11HX includes an optical scale 11Y11 provided in a manner surrounding the outer circumference of an optical scale 11Y5 and rotating about the center O with the optical scale 11Y5.

The optical scale 11 is provided with a wire grid pattern whose wires form a curved pattern in a wave-like form with six cycles in the 360 degrees, in which the intervals between the adjacent wires are constant at positions where the tangential directions are oriented the same, and such intervals are different when compared are those at the positions where the tangential directions are oriented differently. The optical scale 11Y5 is provided with a wire grid pattern whose wires form a curved pattern in a wave-like form with five and eleven cycles in the 360 degrees, in which the intervals between the adjacent wires are constant at positions where the tangential directions are oriented the same, and such intervals are different when compared are those at the positions where the tangential directions are oriented differently, in the same manner as in the optical scale 11. The optical sensor SESIN is positioned at such a phase offset from the optical sensor SECOS that a line extended from the optical sensor SECOS to the center O forms an angle θY5, which corresponds to one quarter of the cycle, with a line extended from the optical sensors SESIN to the center O, when λ denotes one cycle of the wire pattern.

The optical scale 11Y11 is provided with a wire grid pattern whose wires form a curved pattern in a wave-like form with eleven cycles in the 360 degrees, in which the intervals between the adjacent wires are constant at positions where the tangential directions are oriented the same, and such intervals are different when compared are those at the positions where the tangential directions are oriented differently, in the same manner as in the optical scale 11. The optical sensor SESIN is positioned at such a phase offset from the optical sensor SECOS that an angle formed by a line extended from the optical sensor SECOS to the center O forms an angle θY11, which corresponds to λ/4 cycle, with a line extended from the optical sensor SESIN to the center O, when λ denotes one cycle of the wire pattern.

The number of wave-like forms (number of cycles) in the wire pattern on the inner optical scale 11Y5 which is "5" and the number of wave-like forms (number of cycles) in the wire pattern on the outer optical scale 11Y11 which is "11" are in a mutually prime relation, and a relation in which the larger number of wave-like forms (number of cycles) is not a divisor of the smaller number of wave-like forms (number of cycles). In this manner, the number of wave-like forms (number of cycles) in the wire pattern on the inner optical scale 11Y5, which is "5", and the number of wave-like forms (number of cycles) in the wire pattern on the outer optical scale 11Y11, which is "11", are integers not having a common divisor except for one. The number of wave-like forms (number of cycles) in the wire pattern on the inner optical scale 11Y5 "5" and the number of wave-like forms (number of cycles) in the wire pattern on the outer optical scale 11Y11 "11" are mutually prime.

The optical scale 11HZ illustrated in FIG. 113-2 includes optical scales 11Y11a, 11Y11b provided in a manner surrounding the outer circumference of the optical scales 11Y5a, 11Y5b and rotating about the center O with the optical scales 11Y5a, 11Y5b. The optical scales 11Y5a, 11Y5b have the same wire pattern as that on the optical scale 11Y5. In the optical scales 11Y5a and 11Y5b, the optical scale 11Y5b is provided in a manner surrounding the outer circumference of the optical scale 11Y5a, and the wire pattern of the optical scale 11Y5b is positioned at such a phase offset from that on the optical scale 11Y5a by θY5 which corresponds to one quarter of the cycle, when λ denotes one cycle of the wire pattern.

The optical scales 11Y11a and 11Y11b have the same wire pattern as that on the optical scale 11Y11. In the optical scales 11Y11a, 11Y11b, the optical scale 11Y11b is provided in a manner surrounding the outer circumference of the optical scale 11Y11a, and the wire pattern of the optical scale 11Y11b is positioned at such a phase offset from that on the optical scale 11Y11a by θY11 which corresponds to one quarter of the cycle, when λ denotes one cycle of the wire pattern.

With such a structure, on the optical scale 11HZ illustrated in FIG. 113-2, the optical sensor SECOS and the optical sensor SESIN are provided for each of the optical scales 11Y5a, 11Y5b, 11Y11a, and 11Y11b, and linearly positioned alternatingly toward outside of the radial direction from the viewpoint of the center O. The optical scale 11HX illustrated in FIG. 113-1 can reduce the number of optical scales surrounding the outer circumference that is outside of the radial direction, compared with the optical scale 11HZ illustrated in FIG. 113-2, so that the size of the rotor 10 can be reduced.

An operation of the encoder 2 according to the twenty-first embodiment will now be explained. FIGS. 114-1 to 118-4 are schematics for explaining a relation between a rotation angle and a Lissajous angle in the optical scales 11Y5 and 11Y11 according to the twenty-first embodiment. As illustrated in FIGS. 110 and 104, in the encoder 2, the multiple rotation computing circuit ADA reads the rotation count of the rotor 10 stored in at least one of the RAM 4e and the internal storage device 4f (Step S61).

The angle computation correcting circuit RE then calculates the angle range from the outputs of the SESIN and SECOS that are provided for each of the optical scales 11Y5 and 11Y11 (Step S62). To begin with, for a single rotation of the optical scale 11HX, the Lissajous pattern for the inner optical scale 11Y5 illustrated in FIG. 114-1 is cycled five times as the rotor 10 is rotated once. For a single rotation of the optical scale 11HX, the Lissajous pattern for the outer optical scale 11Y11 illustrated in FIG. 114-2 is cycled 11 times as the rotor 10 is rotated once. Therefore, when the Lissajous pattern of the inner optical scale 11Y5 illustrated in FIG. 114-1 is folded at an angle acquired by dividing 360-degree angle corresponding to one rotation of the rotor 10 by 11 that is the largest number of cycles on the outer optical scale 11Y11, a branch plot with 11 branches each representing an angle range of the optical scale 11Y5, as illustrated in FIG. 114-3, is achieved. The angle computation correcting circuit RE then calculates the Lissajous angle of the inner optical scale 11Y5, and acquires the angle range to which the rotation angle of the outer optical scale 11Y11 belongs from the Lissajous angle of the inner optical scale 11Y5.

Similarly, when the Lissajous pattern of the outer optical scale 11Y5 illustrated in FIG. 114-2 is folded at an angle acquired by dividing 360-degree angle corresponding to one rotation of the rotor 10 by 11 that is the largest number of cycles on the outer optical scale 11Y11, a plot with 11 overlapping branches each representing an angle range on the optical scale 11Y11 is achieved, as illustrated in FIG. 114-4. The angle computation correcting circuit RE calculates the relation between the rotation angle of the optical scale 11Y11 and the Lissajous angle illustrated in FIG. 114-4 from the angle range at which the rotation angle of the optical scale 11Y11 is positioned, and calculates the specific angle (Step S63).

As described earlier, the absolute angle computing circuit AB establishes the Lissajous angle θLA in the third cycle at which the optical scale 11Y16 is rotating as the rotation angle θrot, based on the angle range branch Q163 identified at Step S63. The computing circuit CU then outputs the rotation angle θrot as the absolute angle (Step S64).

If the rotor 10 is still being rotated and the operation of the encoder 2 is not ended (No at Step S65), the computing unit 3A returns the process to Step S62, and causes the angle computation correcting circuit RE to calculate the angle range from the outputs of the optical sensors SE1, SE2, and SE3 (Step S62). If the rotation of the rotor 10 is stopped and the operation of the encoder 2 is to be ended (Yes at Step S65), the computing unit 3A moves the process to Step S66.

The encoder 2 stores the rotation count for the time for which the multiple rotation computing circuit ADA is being operated as the rotation count at the time of ending, in at least one of the RAM 4e and the internal storage device 4f (Step S66). By adding the information of the rotation count that can be output by the multiple rotation computing circuit ADA and the absolute angle that can be output by the absolute angle computing circuit AB, the encoder 2 can output an absolute angle equal to or more than 360 degrees to the control unit 5 when the optical scale 11HX is rotated more than once.

Modification

FIGS. 115-1 to 115-4 are schematics for explaining a relation between the rotation angle and the Lissajous angle when the inner optical scale has a wire grid pattern such as that on the optical scale 11a (a wire grid pattern corresponding to a curve in a wave-like form with two cycles in the 360 degrees), and the outer optical scale has a wire grid pattern curved in a wave-like form with five cycles in the 360 degrees. When the Lissajous pattern of the inner optical scale illustrated in FIG. 115-1 is folded at an angle acquired by dividing 360-degree angle corresponding to one rotation of the rotor 10 by five which is the maximum number of cycles on the outer optical scale, as illustrated in FIG. 115-2, a branch plot with five branches each representing an angle range of the inner optical scale is achieved, as illustrated in FIG. 115-3. Similarly, when the Lissajous pattern of the outer optical scale illustrated in FIG. 115-2 is folded at an angle acquired by dividing 360-degree angle corresponding to one rotation of the rotor 10 by five which is the maximum number of cycles on the outer optical scale, a plot with five overlapping branches each representing an angle range of the outer optical scale is achieved, as illustrated in FIG. 115-4. The number of wave-like forms (number of cycles) in the wire pattern on the inner optical scale and the number of wave-like forms (number of cycles) in the wire pattern on the outer optical scale are in a mutually prime relation, and a relation in which the larger number of wave-like forms (number of cycles) is not a divisor of the smaller number of wave-like forms (number of cycles). Therefore, "two" which is the number of wave-like forms (number of cycles) in the wire pattern on the inner optical scale and "five" which is the number of wave-like forms (number of cycles) in the wire pattern on the outer optical scale are integers not having a common divisor except for one. Furthermore, "two" which is the number of wave-like forms (number of cycles) in the wire pattern on the inner optical scale and "five" which is the number of wave-like forms (number of cycles) in the wire pattern on the outer optical scale are mutually prime.

FIGS. 116-1 to 116-4 are schematics for explaining a relation between the rotation angle and the Lissajous angle when the inner optical scale has a wire grid pattern such as that on the optical scale 11a (a wire grid pattern corresponding to a curve in a wave-like form with two cycles in the 360 degrees), and the wire pattern on the outer optical scale has a wire grid pattern curved in a wave-like form with three cycles in the 360 degrees. When the Lissajous pattern of the inner optical scale illustrated in FIG. 116-1 is folded at an angle acquired by dividing 360-degree angle corresponding to one rotation of the rotor 10 by three which is the maximum number of cycles on the outer optical scale illustrated in FIG. 116-2, a branch plot with three branches each representing an angle range of the inner optical scale is achieved, as illustrated in FIG. 116-3. Similarly, when the Lissajous pattern of the outer optical scale illustrated in FIG. 116-2 is folded at an angle acquired by dividing 360-degree angle corresponding to one rotation of the rotor 10 by three which is the maximum number of cycles on the outer optical scale, a plot with three overlapping branches each representing an angle range of the outer optical scale is achieved, as illustrated in FIG. 116-4. The number of wave-like forms (number of cycles) in the wire pattern on the inner optical scale and the number of wave-like forms (number of cycles) in the wire pattern on the outer optical scale are in a mutually prime relation, and a relation in which the larger number of wave-like forms (number of cycles) is not a divisor of the smaller number of wave-like forms (number of cycles). Therefore, "two" which is the number of wave-like forms (number of cycles) in the wire pattern on the inner optical scale and "three" which is the number of wave-like forms (number of cycles) in the wire pattern on the outer optical scale are integers not having a common divisor except for one. Furthermore, "two" which is the number of wave-like forms (number of cycles) in the wire pattern on the inner optical scale and "three" which is the number of wave-like forms (number of cycles) in the wire pattern on the outer optical scale are mutually prime.

FIGS. 117-1 to 117-4 are schematics for explaining a relation between the rotation angle and the Lissajous angle when the inner optical scale has a wire grid pattern whose wires form a curved pattern in a wave-like form with three cycles in the 360 degrees, the outer optical scale has a wire grid pattern whose wires form a curved pattern in a wave-like form with 11 cycles in the 360 degrees. When the Lissajous pattern of the inner optical scale illustrated in FIG. 117-1 is folded at an angle acquired by dividing 360-degree angle corresponding to one rotation of the rotor 10 by 11 which is the maximum number of cycles on the outer optical scale, as illustrated in FIG. 117-2, a branch plot with 11 branches each representing an angle range of the inner optical scale is achieved, as illustrated in FIG. 117-3. Similarly, when the Lissajous pattern of the outer optical scale illustrated in FIG. 117-2 is folded at an angle acquired by dividing 360-degree angle corresponding to one rotation of the rotor 10 by 11 which is the maximum number of cycles on the outer optical scale, a plot with 11 overlapping branches each representing an angle range of the outer optical scale is achieved, as illustrated in FIG. 117-4. The number of wave-like forms (number of cycles) in the wire pattern on the inner optical scale and the number of wave-like forms (number of cycles) in the wire pattern on the outer optical scale are in a mutually prime relation, and a relation in which the larger number of wave-like forms (number of cycles) is not a divisor of the smaller number of wave-like forms (number of cycles). In this manner, "three" which is the number of wave-like forms (number of cycles) in the wire pattern on the inner optical scale and "11" which is the number of wave-like forms (number of cycles) in the wire pattern on the outer optical scale are integers not having a common divisor except for one. Furthermore, "three" which is the number of wave-like forms (number of cycles) in the wire pattern on the inner optical scale and "11" which is the number of wave-like forms (number of cycles) in the wire pattern on the outer optical scale are mutually prime.

FIGS. 118-1 to 118-4 are schematics for explaining a relation between the rotation angle and the Lissajous angle when the inner optical scale has a wire grid pattern whose wires form a curved pattern in a wave-like form with five cycles in the 360 degrees, and the outer optical scale has a wire grid pattern whose wire form a curved pattern in a wave-like form with 12 cycles in the 360 degrees. When the Lissajous pattern of the inner optical scale illustrated in FIG. 118-1 is folded at an angle acquired by dividing 360-degree angle corresponding to one rotation of the rotor 10 by 12 which is the maximum number of cycles on the outer optical scale as illustrated in FIG. 118-2, a branch plot with 12 branches each representing an angle range of the inner optical scale is achieved, as illustrated in FIG. 118-3. Similarly, when the Lissajous pattern of the outer optical scale illustrated in FIG. 118-2 is folded at an angle acquired by dividing 360-degree angle corresponding to one rotation of the rotor 10 by 12 which is the maximum number of cycles on the outer optical scale, a plot with 12 overlapping branches each representing an angle range of the outer optical scale is achieved, as illustrated in FIG. 118-4. The number of wave-like forms (number of cycles) in the wire pattern on the inner optical scale and the number of wave-like forms (number of cycles) in the wire pattern on the outer optical scale are integers not having a common divisor except for one, and the larger number of wave-like forms (number of cycles) and the smaller number of wave-like forms (number of cycles) are mutually prime. In the examples explained above, a pattern with a larger number of wave-like forms (number of cycles) is provided outside, but such a pattern may also be provided inside, without limitation to the outside. However, it is more preferable to place the pattern with a larger number of wave-like forms to the outside, from the viewpoint of sensitivity.

Comparative Example

FIGS. 119-1 to 119-4 are schematics for explaining a relation between the rotation angle and the Lissajous angle when the inner optical scale has a wire grid pattern whose wires form a curved pattern in a wave-like form with three cycles in the 360 degrees, and the outer optical scale has a wire grid pattern whose wire form a curved pattern in a wave-like form with 12 cycles in the 360 degrees. The number of wave-like forms (number of cycles) in the wire pattern on the inner optical scale and the number of wave-like forms (number of cycles) in the wire pattern on the outer optical scale are integers that have three as a divisor other than one. In other words, these are in a relation in which the larger number of wave-like forms (number of cycles) is a divisor of the smaller number of wave-like forms (number of cycles). In this comparative example, when the Lissajous pattern of the inner optical scale illustrated in FIG. 119-1 is folded at an angle acquired by dividing 360-degree angle corresponding to one rotation of the rotor 10 by 12 which is the maximum number of cycles on the outer optical scale as illustrated in FIG. 119-2, the Lissajous angle for the inner optical scale and the Lissajous angle for the outer optical scale overlap each other, in the manner illustrated in FIG. 119-3. Therefore, even if an angle range of the outer optical scale illustrated in FIG. 119-4 is calculated by folding the Lissajous pattern of the outer optical scale illustrated in FIG. 119-2 at an angle acquired by dividing 360-degree angle corresponding to one rotation of the rotor 10 by 12 which is the maximum number of cycles on the outer optical scale, the encoder 2 is not capable of calculating an absolute angle unambiguously.

Twenty-Second Embodiment

FIG. 120 is a flowchart for explaining an operation of a torque detection apparatus according to a twenty-second embodiment of the present invention. Explained in the twenty-second embodiment is an operation in which the torque detection apparatus 200 in the electric power steering apparatus 80 according to the ninth embodiment is used to detect steering torque. The members that are the same as those described above are assigned with the same reference numerals, and redundant explanations thereof are omitted hereunder.

A torque sensor explained in the embodiments described above can be used as the torque sensor 91a in the electric power steering apparatus 80. The torque sensor 91a detects a steering force of a driver communicated via the steering wheel 81 to the input shaft 82a as steering torque. The speed sensor 91v detects the running speed of a vehicle on which the electric power steering apparatus 80 is mounted. The ECU 90 is electrically connected to the brushless motor 101, the torque sensor 91a, and the speed sensor 91v. The torque sensor 91a can output a rotation angle of the steering operation to the ECU 90. Such a torque sensor 91a is also referred to as a torque angle sensor.

As illustrated in FIG. 120, the torque detection apparatus 200 illustrated in FIG. 35 serving as the torque sensor 91a reads the rotation count of the first rotating shaft 110A or the second rotating shaft 110B stored in at least one of the RAM 4e and the internal storage device 4f (Step S71).

The torsional angle of the first rotating shaft 110A or the second rotating shaft 110B is in a range approximately from ±5 degrees to ±10 degrees, and the first rotating shaft 110A and the second rotating shaft 110B are rotated with a steering operation of a steerer or the like inside of the housing 120. Therefore, in the torque detection apparatus 200, the configuration of the encoder 2 described above is applied so as to output the rotation angle of the first rotating shaft 110A or the second rotating shaft 110B. In the torque detection apparatus 200, it is also possible to apply the configuration of the encoder 2 described above to output the rotation angles of the first rotating shaft 110A and the second rotating shaft 110B. Alternatively, the torque detection apparatus 200 may apply the configuration of the encoder 2 described above to calculate and to output an average of the rotation angles of the first rotating shaft 110A and the second rotating shaft 110B. As the optical scales 11AT and 11BT, the optical scales 11HT, 11HW, 11HX, 11HY, 11HZ, 11Y4, 11Y5, 11Y8, 11Y11, and 11Y12 described above may be used, for example. In this manner, the torque detection apparatus 200 can output the rotation angle as an absolute angle.

For example, the torque detection apparatus 200 calculates an angle range following the same process at Step 62 in the nineteenth, the twentieth, the twenty-first, and the twenty-second embodiments described above (Step S72).

The torque detection apparatus 200 then calculates a specific angle following the same process at Step 63 in the nineteenth, the twentieth, the twenty-first, and the twenty-second embodiments described above (Step S73).

The torque detection apparatus 200 then outputs an absolute angle following the same process at Step 64 in the nineteenth, the twentieth, the twenty-first, and the twenty-second embodiments described above (Step S74).

The torque detection apparatus 200 then causes the optical sensor 35AT and the optical sensor 35BT to detect the transmissive light 73AT and 73BT, respectively, that are the light source light 71AT and 71BT having passed through the optical scales 11AT and 11BT and being incident on these optical sensors. The computing unit 3 calculates a relative position of the first rotating shaft 110A with respect to the optical sensor package 31AT in the torque sensor 101A from the detection signal from the optical sensor 35AT. The computing unit 3 also calculates a relative position of the second rotating shaft 110B with respect to the optical sensor package 31BT in the torque sensor 101A from the detection signal from the optical sensor 35BT.

The computing unit 3 stores the torsional elastic coefficient of the torsion bar 129 in the RAM 4e and the internal storage device 4f. Torque is proportional to the torsional elastic coefficient of the torsion bar 129. Therefore, in order to acquire torsion, the computing unit 3 calculates the rotational displacement (the amount of displacement) of the rotation angle of the first rotating shaft 110A and the rotation angle of the second rotating shaft 110B. The computing unit 3 can then calculate the torque from the elastic coefficient of the torsion bar 129 and the information of the relative position of the first rotating shaft 110A and the second rotating shaft 110B. The computing unit 3 then outputs the torque to the control unit 5 of a rotary machine (motor) or the like, as a control signal (Step S75).

The ECU 90 controls the operation of the brushless motor 101. The ECU 90 acquires a signal from each of the torque sensor 91a and the speed sensor 91v. In other words, the ECU 90 acquires the steering torque T from the torque sensor 91a, and acquires the running speed Vb of the vehicle from the speed sensor 91v. To the ECU 90, a power is supplied from a power supply unit (e.g., buttery on the vehicle) 99 while the ignition switch 98 is turned ON. The ECU 90 calculates an assisting steering command value for an assisting command, based on the steering torque T and the running speed Vb. The ECU 90 adjusts a power X to be supplied to the brushless motor 101 based on the assisting steering command value thus calculated. The ECU 90 acquires information of an inductive voltage from the brushless motor 101 as operation information Y.

The steering force of the steerer (driver) input to the steering wheel 81 is communicated via the input shaft 82a to the decelerator 92 in the steering force assisting mechanism 83. At this time, the ECU 90 acquires the steering torque T input to the input shaft 82a from the torque sensor 91a, and acquires the running speed Vb from the speed sensor 91v. The ECU 90 then controls the operation of the brushless motor 101. The assisting steering torque generated by the brushless motor 101 is communicated to the decelerator 92.

The steering torque (including the assisting steering torque) output via the output shaft 82b is communicated to the lower shaft 85 via the universal joint 84, and further communicated to the pinion shaft 87 via the universal joint 86. The steering force communicated to the pinion shaft 87 is communicated to the tie rod 89 via the steering gear 88, whereby causing a steered wheel to rotate.

If the operation of the electric power steering apparatus 80 is still continuing and the operation of the torque detection apparatus 200 is not ended (No at Step S76), the computing unit 3 returns the process to Step S72, and calculates the angle range (Step S72). If the operation of the electric power steering apparatus 80 is to be ended (Yes at Step S76), the computing unit 3 moves the process to Step S77.

The torque detection apparatus 200 stores the rotation count of the time for which the first rotating shaft 110A or the second rotating shaft 110B is being operated as the rotation count at the time of ending, in at least one of the RAM 4e and the internal storage device 4f (Step S77).

As described earlier, in the electric power steering apparatus 80, the first rotating shaft and the second rotating shaft of the torque sensor according to the embodiment are mounted on the steering shaft so that the torque detection apparatus 200 can detect steering torque, a rotation count, and a steered angle of the steering.

With this structure, the optical sensor can detect a change in the polarization direction of the transmissive light or the reflected light in a manner less affected by foreign substances. In this manner, the reliability of the electric power steering apparatus can be improved.

REFERENCE SIGNS LIST 1, 1A, 1B, 1C, 1D, 1E encoder unit
2 encoder
3 computing unit
5 control unit
10, 10A rotor
11, 11a, 11A, 11B, 11I, 11J, 11AT, 11BT, 11CT, 11DT, 11ET, 11FT, 11GT, 11HT, 11HW, 11HX, 11HY, 11HZ, 11Y4, 11Y5, 11Y8, 11Y11, 11Y12 optical scale
20, 20A stator
20B, 20C mount member
21 bearing
29 shaft
31, 31A, 31B, 31AT, 31BT optical sensor package
35, 36A, 36B, 35AT, 35BT optical sensor
36Ka, 36Kb sensor base
36a first photoreceiver
36b second photoreceiver
41, 41AT, 41BT light source
71, 71AT, 71BT light source light
72, 72AT, 72BT reflected light
73, 73AT, 73BT transmissive light
101A, 101B, 101C, 101D, 101E, 101F, 101G, 101H torque sensor
110A, 110B, 110C, 110D rotating shaft
120 housing
120B, 120C mount member
126A, 126B bearing
200 torque detection apparatus
C1, C2, Ls1, Ls2 sensing area
g, g1, g2, g3, g4 wires

The invention claimed is:

1. An optical sensor comprising:
   a first polarizing layer;
   a first photoreceiver that receives first polarized light polarized in a first polarization direction through the first polarizing layer;
   a first electrode base that is connected perpendicularly to a long side of a plurality of the first photoreceivers which are arrayed in parallel to each other:
   a second polarizing layer;
   a second photoreceiver that receives second polarized light polarized in a second polarization direction through the second polarizing layer; and
   a second electrode base that is connected perpendicularly to a long side of a plurality of the second photoreceivers which are arrayed in parallel to each other,
   wherein the first photoreceivers and the second photoreceivers are positioned alternatingly and spaced uniformly with each other, and
   wherein the first photoreceiver on the first electrode base side, the first photoreceiver on the second electrode base side, the second photoreceiver on the first electrode base side, and the second photoreceiver on the second electrode base side each have a portion having a same width in an extending direction of the first and second electrode bases.

2. The optical sensor according to claim 1, wherein a polarization axis of the first polarized light is relatively different from a polarization axis of the second polarized light by 90 degrees.

3. The optical sensor according to claim 1, further comprising a light-shielding film to adjust an amount of the incident light that is incident on the first photoreceiver and the second photoreceiver.

4. An optical encoder comprising:
   a light source;
   an optical scale causing light from the light source to be polarized differently depending on positions at which the light is passed or is reflected on the optical scale;
   an optical sensor as defined in claim 1; and
   a computing unit that calculates a relative movement of the optical scale with respect to the optical sensor based on a light intensity of the first polarized light and a light intensity of the second polarized light.

5. The optical encoder according to claim 4, wherein a polarization axis of the first polarized light is relatively different from a polarization axis of the second polarized light by 90 degrees.

6. The optical encoder according to claim 4, further comprising a light-shielding film to adjust an amount of the incident light that is incident on the first photoreceiver and the second photoreceiver.

7. A torque detection apparatus that detects torque by using torsion of a torsion bar, the torque detection apparatus comprising:
   a first rotating shaft and a second rotating shaft that are connected with the torsion bar in which torsion is produced by receiving torque;
   at least one optical scale that moves with respective rotations of the first rotating shaft and the second rotating shaft;

at least one optical sensor that is paired with the optical scale, and detects a polarization of transmissive light or reflected light varying depending on where a light from a light source output to the optical scale is passed through or is reflected; and a computing unit that calculates a rotation angle of the optical scale with respect to the optical sensor, and calculates rotational displacements of the first rotating shaft and the second rotating shaft, wherein the optical sensor as defined in claim 1.

8. The torque detection apparatus according to claim 7, wherein a polarization axis of the first polarized light is relatively different from a polarization axis of the second polarized light by 90 degrees.

9. The torque detection apparatus according to claim 7, further comprising a light-shielding film to adjust an amount of the incident light that is incident on the first photoreceiver and the second photoreceiver.

10. The torque detection apparatus according to claim 7, wherein the computing unit calculates an absolute rotation angle of at least one of the first rotating shaft and the second rotating shaft from a relative rotation angle of the optical scale with respect to the optical sensor, and outputs detected torque acquired from the rotational displacements of the first rotating shaft and the second rotating shaft, and the absolute rotation angle.

11. An electric power steering apparatus comprising a torque detection apparatus according to claim 7, wherein the first rotating shaft and the second rotating shaft are mounted on a steering shaft.

12. A method for manufacturing an optical sensor comprising:

forming photoreceivers including a first photoreceiver and a second photoreceiver receiving light such that a plurality of the first photoreceivers and a plurality of the second photoreceivers are positioned alternatingly and spaced uniformly with each other on a surface of a substrate; and forming polarizing layers by positioning a first polarizing layer on top of the first photoreceiver to allow first polarized light polarized in a first polarization direction to be incident on the first photoreceiver through the first polarizing layer, and by positioning a second polarizing layer on top of the second photoreceiver to allow second polarized light polarized in a second polarization direction to be incident on the second photoreceiver through the second polarizing layer, wherein the first photoreceivers arrayed in parallel to each other are connected perpendicularly to a long side of a first electrode base, wherein the second photoreceivers arrayed in parallel to each other are connected perpendicularly to a long side of a second electrode base, and wherein the first photoreceiver on the first electrode base side, the first photoreceiver on the second electrode base side, the second photoreceiver on the first electrode base side, and the second photoreceiver on the second electrode base side each have a portion having a same width in an extending direction of the first and second electrode bases.

13. The method for manufacturing an optical sensor according to claim 12, wherein, at the forming polarizing layers, using the substrate as a first substrate, the first polarizing layer and the second polarizing layer are formed on a surface of a second substrate, the second substrate is bonded onto the first substrate in such a manner that the first polarizing layer is positioned on top of the first photoreceiver and the second polarizing layer is positioned on top of the second photoreceiver.

14. The method for manufacturing an optical sensor according to claim 12, wherein, at the forming polarizing layers, using the substrate as a first substrate, the first polarizing layer is formed on a surface of a second substrate, the second polarizing layer is formed on a surface of a third substrate, and the first substrate, the second substrate, and the third substrate are bonded together in such a manner that the first polarizing layer is positioned on top of the first photoreceiver and the second polarizing layer is positioned on top of the second photoreceiver.

* * * * *